US012597251B2

(12) United States Patent
Hammer et al.

(10) Patent No.: US 12,597,251 B2
(45) Date of Patent: Apr. 7, 2026

(54) VIDEO FRAMING BASED ON TRACKED CHARACTERISTICS OF MEETING PARTICIPANTS

(71) Applicant: Huddly AS, Oslo (NO)

(72) Inventors: Vegard Hammer, Tårnåsen (NO); Jon Tore Hafstad, Oslo (NO)

(73) Assignee: Huddly AS, Oslo (NO)

( * ) Notice: Subject to any disclaimer, the term of this patent is extended or adjusted under 35 U.S.C. 154(b) by 69 days.

(21) Appl. No.: 18/244,024

(22) Filed: Sep. 8, 2023

(65) Prior Publication Data

US 2024/0119731 A1     Apr. 11, 2024

Related U.S. Application Data

(60) Provisional application No. 63/533,992, filed on Aug. 22, 2023, provisional application No. 63/471,631, filed on Jun. 7, 2023, provisional application No. 63/441,655, filed on Jan. 27, 2023, provisional application No. 63/441,657, filed on Jan. 27, 2023, provisional application No. 63/441,660, filed on Jan. 27, 2023, provisional application No. 63/441,642, (Continued)

(51) Int. Cl.
| | |
|---|---|
| *G06V 20/40* | (2022.01) |
| *G06V 10/94* | (2022.01) |
| *G06V 40/10* | (2022.01) |
| *G06V 40/20* | (2022.01) |
| *G06V 10/77* | (2022.01) |

(52) U.S. Cl.
CPC ............ *G06V 20/41* (2022.01); *G06V 10/945* (2022.01); *G06V 40/10* (2022.01); *G06V 40/23* (2022.01); *G06V 40/28* (2022.01); *G06V 10/77* (2022.01)

(58) Field of Classification Search
CPC ........ G06V 20/41; G06V 40/10; G06V 40/28; G06V 40/23; G06V 10/945
See application file for complete search history.

(56) References Cited

U.S. PATENT DOCUMENTS 6,894,714 B2 * 5/2005 Gutta ...................... H04N 7/15
                                                    348/E7.083
8,842,161 B2 * 9/2014 Feng ........................ H04N 7/15
                                                    348/14.08

(Continued)

OTHER PUBLICATIONS

International Search Report and Written Opinion of the International Search Authority in counterpart International Application No. PCT/EP2023/074813 dated Dec. 7, 2023 (28 pages).

*Primary Examiner* — Olisa Anwah
(74) *Attorney, Agent, or Firm* — FINNEGAN, HENDERSON, FARABOW, GARRETT & DUNNER LLP

(57)     ABSTRACT

Multi- and single-camera video conferencing systems are disclosed including at least one camera, each configured to generate an overview video output stream representative of a meeting environment, and at least one video processing unit. The video processing unit(s) are configured to automatically analyze the overview video output stream(s) to identify one or more meeting participants and assign respective role designations to the meeting participants based on analysis of the overview video output stream(s). The video processing unit(s) are further configured to generate, and output for display, one or more primary video streams including one or more of the meeting participants, based on the assigned roles.

68 Claims, 67 Drawing Sheets

Related U.S. Application Data filed on Jan. 27, 2023, provisional application No. 63/411,930, filed on Sep. 30, 2022.

(56) References Cited

U.S. PATENT DOCUMENTS

| | | | |
|---|---|---|---|
| 10,659,731 B2 | 5/2020 | Harrison et al. | |
| 2007/0120966 A1* | 5/2007 | Murai | H04N 7/15 |
| | | | 348/E7.083 |
| 2013/0194508 A1* | 8/2013 | Pb | G06F 16/783 |
| | | | 348/700 |
| 2014/0085404 A1* | 3/2014 | Kleinsteiber | H04N 7/15 |
| | | | 348/E7.083 |
| 2017/0099459 A1 | 4/2017 | Nimri et al. | |
| 2018/0176508 A1 | 6/2018 | Pell | |
| 2018/0376108 A1* | 12/2018 | Bright-Thomas | G06V 20/40 |
| 2019/0007623 A1* | 1/2019 | Wang | H04N 7/147 |
| 2020/0267427 A1* | 8/2020 | Rogers | H04N 21/84 |
| 2020/0322536 A1* | 10/2020 | Johansen | G06F 18/214 |
| 2021/0051035 A1 | 2/2021 | Atkins et al. | |
| 2022/0182428 A1 | 6/2022 | Roedel et al. | |
| 2022/0417364 A1* | 12/2022 | Engi | H04M 3/568 |
| 2023/0283740 A1* | 9/2023 | Sayer | H04N 7/04 |
| | | | 348/14.01 |

* cited by examiner

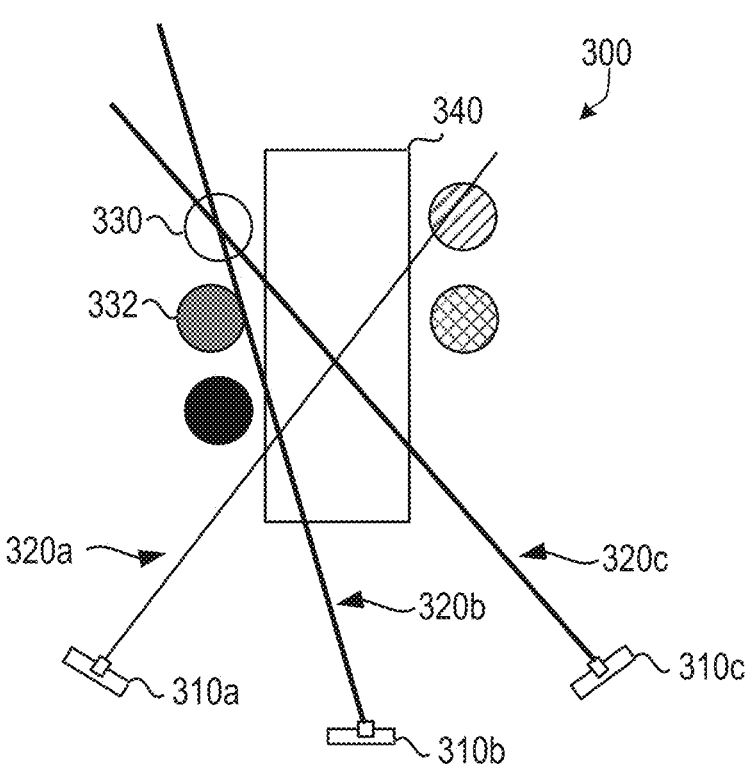
FIG. 3A
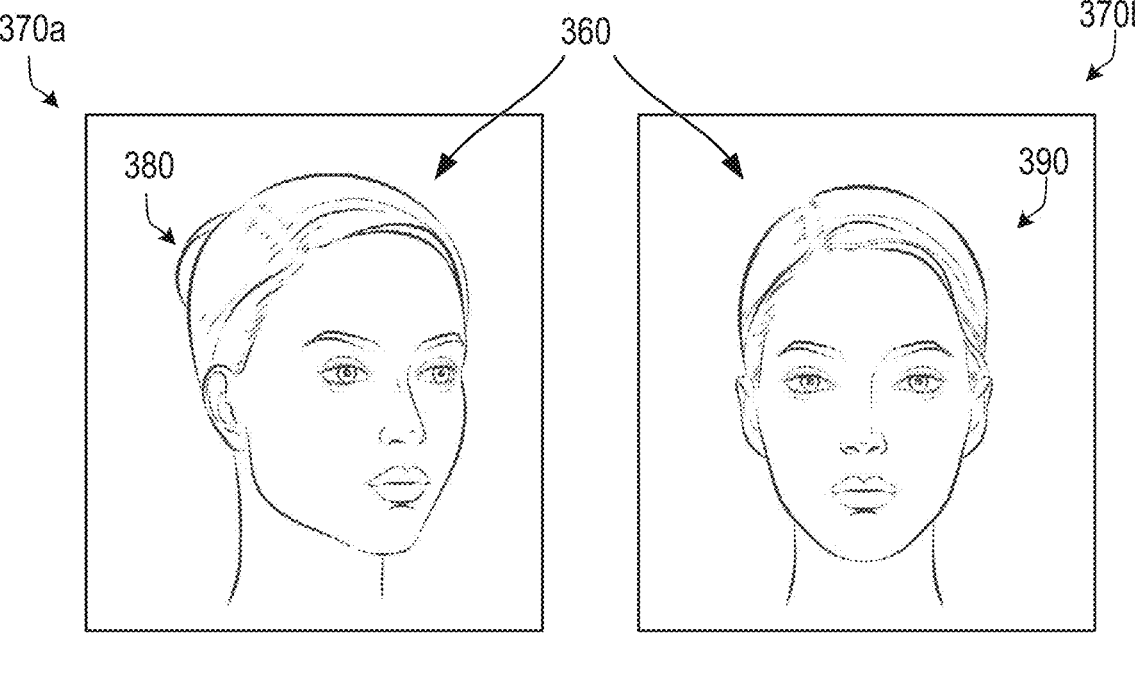
FIG. 3B                  FIG. 3C

400

*800*

Automatically analyze a plurality of video output streams          *810*

Identify at least one video output stream among the plurality of video output streams that includes a representation of a first subject facing a second subject          *820*

Generate a primary video output stream based on the identified video output stream          *830*

1510

1520

1530

2100

3210

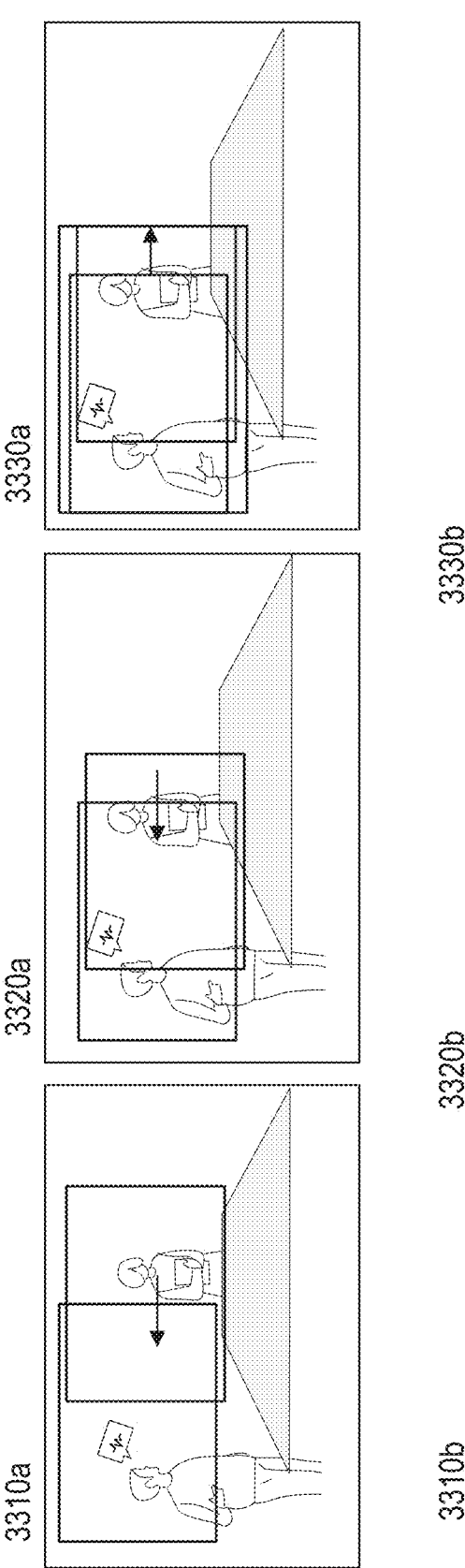
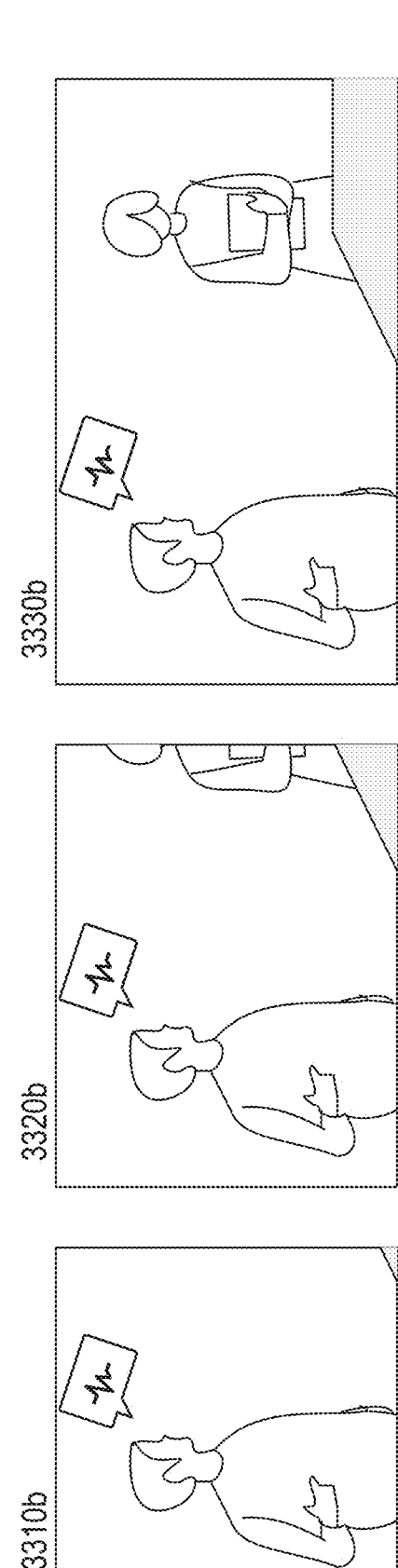
*FIG. 33*

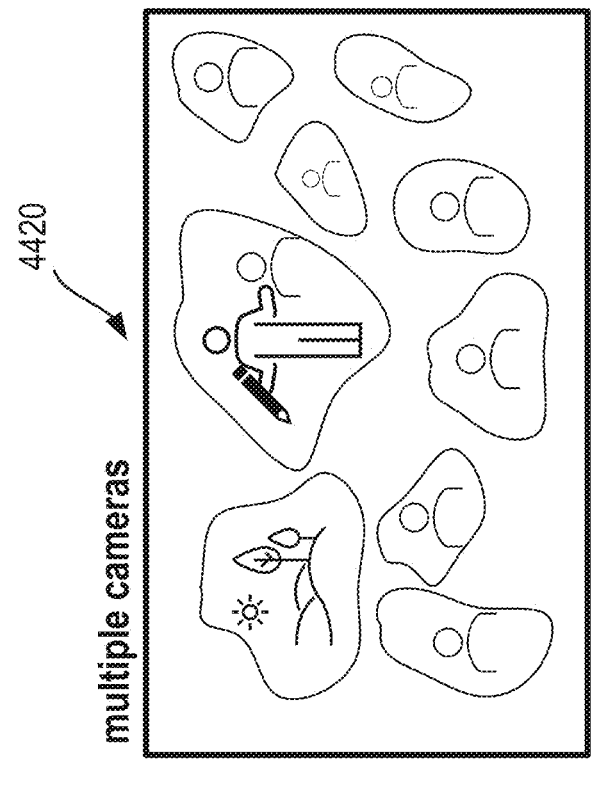
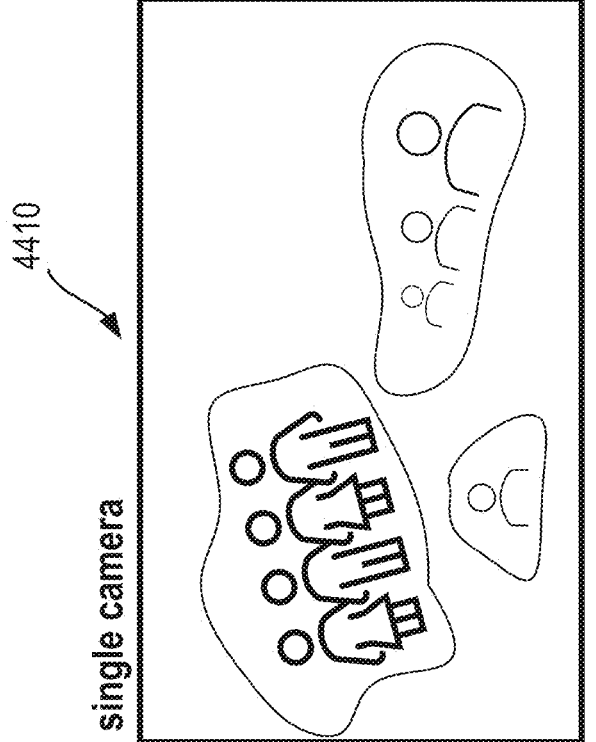
*FIG. 44*

Table #1

| Person ID | Role | Property | Priority |
|---|---|---|---|
| Person # 1 | Presenter | Serious | 1 |
| Person # 2 | Contributor | Humorous | 2 |
| Person # 3 | Contributor | Questioning | 2 |
| Person # 4 | Audience | Listening | 3 |
| Person # 5 | Audience | Disengaged | 4 |

Table #2

| Person ID | Role | Property | Priority |
|---|---|---|---|
| Person # 1 | Presenter | Serious | 1 |
| Person # 2 | Contributor | Humorous | 1 |
| Person # 3 | Contributor | Questioning | 2 |
| Person # 4 | Audience | Listening | 3 |
| Person # 5 | Audience | Disengaged | 4 |

Table #3

| Person ID | Role | Property | Action | Priority |
|---|---|---|---|---|
| Person # 1 | Presenter | Serious | Standing | 1 |
| Person # 2 | Contributor | Humorous | Sitting | 3 |
| Person # 3 | Contributor | Questioning | Hand raised | 2 |
| Person # 4 | Audience | Listening | Sitting | 4 |
| Person # 5 | Audience | Disengaged | Sitting | 5 |

Table #4

| Person ID | Role | Property | Action | Priority |
|---|---|---|---|---|
| Person # 1 | Presenter | Serious | Standing and Writing on a whiteboard | 1 |
| Person # 2 | Contributor | Humorous | Sitting | 2 |
| Person # 3 | Contributor | Questioning | Sitting | 3 |
| Person # 4 | Audience | Listening | Applauding | 1 |
| Person # 5 | Audience | Disengaged | Sitting | 4 |

*FIG. 48*

Table #6

| Person ID | Role | Property | Priority |
|---|---|---|---|
| Person # 1 | Presenter | Serious | 1 |
| Person # 2 | User-Assigned | Serious | 1 |
| Person # 3 | Contributor | Questioning | 3 |
| Person # 4 | Audience | Listening | 4 |
| Person # 5 | Audience | Disengaged | 5 |

Table #7

| Person ID | Role | Property | Priority |
|---|---|---|---|
| Person # 1 (lawyer) | Presenter | Serious | 1 |
| Person # 2 (judge) | User-Assigned | Serious | 1 |
| Person # 3 (witness) | Contributor | Questioning | 2 |
| Person # 4 | Audience | Listening | 4 |
| Person # 5 | Audience | Disengaged | 5 |

Table #8

| Person ID | Role | Property | Action | Priority |
|---|---|---|---|---|
| Person # 1 (teacher) | Presenter | Serious | Standing | 1 |
| Person # 2 (student) | User-Assigned | Humorous | Hand raised | 1 |
| Person # 3 (student) | User-Assigned | Questioning | Hand raised | 1 |
| Person # 4 (student) | Audience | Listening | Sitting | 2 |
| Person # 5 (student) | Audience | Disengaged | Sitting | 3 |

Table #9

| Person ID | Role | Property | Action | Priority |
|---|---|---|---|---|
| Person # 1 (teacher) | Presenter | Serious | Standing | 1 |
| Person # 2 (student) | User-Assigned | Humorous | Hand raised | 1 |
| Person # 3 (student) | User-Assigned | Questioning | Hand raised | 1 |
| Person # 4 (student) | User-Assigned | Listening | Sitting | 9 |
| Person # 5 (student) | Audience | Disengaged | Sitting | 3 |

*FIG. 49*

VIDEO FRAMING BASED ON TRACKED CHARACTERISTICS OF MEETING PARTICIPANTS

CROSS-REFERENCE TO RELATED APPLICATIONS

This application claims the benefit of priority of U.S. Provisional Application No. 63/411,930, filed Sep. 30, 2022; U.S. Provisional Application No. 63/441,660, filed Jan. 27, 2023; U.S. Provisional Application No. 63/441,655, filed Jan. 27, 2023; U.S. Provisional Application No. 63/441,657, filed Jan. 27, 2023; U.S. Provisional Application No. 63/441,642, filed Jan. 27, 2023; U.S. Provisional Application No. 63/471,631, filed Jun. 7, 2023; and U.S. Provisional Application No. 63/533,992, filed Aug. 22, 2023. The content of each of the above-referenced applications is incorporated herein by reference in its entirety.

TECHNICAL FIELD AND BACKGROUND

The present disclosure relates generally to multi-camera systems and, more specifically, to systems and methods for determining roles associated with meeting participants represented in outputs of a single or multi-camera system, selecting outputs to source framed video streams of a particular meeting participants based on determined roles, and/or framing meeting participants based on the determined roles.

In traditional video conferencing, the experience for the participants may be static. Cameras used in meeting rooms may not consider social cues (e.g., reactions, body language, and other non-verbal communication), speaker awareness, or attention direction in the meeting situation. For meeting participants located in corners of the meeting environment or far from the speaker (e.g., far end participants), the video conferencing experience may lack engagement, making it difficult to engage in the conversation. Single camera systems may display the meeting environment at a limited number of angles, which may lack the ability to feature non-speaking meeting participants. Additionally, in a large video conferencing room, it may be difficult to frame some or all meeting participants and maintain a display or representation of meeting participants located further from a camera. Meeting participants viewing the streamed video conference may not be able to see facial expressions of meeting participants in the meeting environment, and thus may not be able to actively engage with meeting participants present in the meeting environment.

In traditional video conference systems (even multi-camera systems), the user experience may be limited to the display of meeting participants determined to be speaking. Such systems may lack the ability to vary shots of the detected speaker (e.g., by selecting different camera outputs to source a frame video stream featuring the detected speaker, by selectively including other meeting participants in the shot, etc.). Such systems may also lack the ability to feature shots of non-speaking meeting participants (together with or in isolation from a shot featuring the speaker) that are actively listening or reacting to the speaker. Thus, the user experience offered by traditional video conferencing systems may lack a certain degree of depth and interaction by displaying a representation of the speaking meeting participant without conveying information associated with, e.g., reactions, interactions, spatial relationships, etc. between speakers and other meeting participants.

There is a need for a single-camera and/or multi-camera system that may increase user experience and interactivity through the identification of meeting participants and roles associated with represented meeting participants, the selective framing of dialogues and interactions between speakers and meeting participants based on the determined roles of meeting participants, and/or the adaptive framing and layout of meeting participants based on roles to create a more robust user experience that conveys a greater degree of contextual information regarding the physical meeting environment and the meeting participants.

SUMMARY

Disclosed embodiments may address one or more of these challenges. The disclosed cameras and camera systems may include a smart camera or multi-camera system that understands the dynamics of the meeting room participants (e.g., using artificial intelligence (AI), such as trained networks), determines or infers roles associated with meeting participants represented in one or more camera outputs, and provides a video output stream for display to remote meeting participants in which framed representations of meeting participants are selected or based on pertinent contextual information regarding the roles and interactions of meeting participants in the physical meeting environment, for example, the determined roles of meeting participants, among other factors. In this way, the remote meeting participants may be provided with a video stream that focuses on the most relevant meeting participants (e.g. presenters or speakers), while also providing information regarding other meeting participants in a balanced manner to provide further contextual information regarding the interactions between the meeting participants and the engagement of non-speaking or non-presenting meeting participants. The disclosed embodiments may thus provide a more informative and engaging videoconference meeting experience.

In some embodiments, by dividing a conference room into zones, and identifying the zone a speaking participant is located in, disclosed systems and methods may alternate between showing speaker shots and listening shots to give a closer view of the speaker, create better flow in the conversation, and provide spatial context for remote participants. This may also provide a more dynamic viewing experience for remote participants that is similar to how a meeting participant would naturally look around the meeting environment and engage with other meeting participants.

Embodiments consistent with the present disclosure include a camera system or video conferencing system, where the system includes at least one camera, each configured to generate an overview video output stream representative of a meeting environment; and at least one video processing unit configured to: automatically analyze the at least one overview video output stream to identify at least a first meeting participant and a second meeting participant represented in the overview video output stream; assign a first role designation to the first meeting participant and a second role designation to the second meeting participant based on one or more detected characteristics associated with at least one of the first meeting participant or the second meeting participant, wherein the first role designation is different from the second role designation; select a framed representation of the first meeting participant or the second meeting participant based on relative priorities associated with the first role designation and the second role designation; and generate, as an output, a primary video stream including the selected framed representation of the first meeting participant or the second meeting participant.

Embodiments consistent with the present disclosure also include a camera system or video conferencing system, comprising: at least one camera, each configured to generate an overview video output stream representative of a meeting environment; and at least one video processing unit configured to: automatically analyze the at least one overview video output stream to identify at least a first meeting participant represented in the at least one overview video output stream; assign a first role designation to the first meeting participant based on one or more detected characteristics associated with the first meeting participant; determine, based on the first role designation assigned to the first meeting participant, a likelihood that the first meeting participant will begin to speak; perform, in response to the likelihood that the first meeting participant will begin to speak meeting a likeliness condition, one or more actions to prepare the video processing unit to output a primary video stream featuring a framed representation of the first meeting participant for display; determine, based on analysis of the at least one overview video output stream, whether the first meeting participant begins to speak; and in response to a determination that the first meeting participant begins to speak, outputting for display the primary video stream featuring the framed representation of the first meeting participant.

Embodiments consistent with the present disclosure also include a camera system or video conferencing system, comprising: at least one camera, each configured to generate an overview video output stream representative of a meeting environment; and at least one video processing unit configured to: automatically analyze the at least one overview video output stream to identify a plurality of meeting participants featured in the at least one overview video output stream; identify a speaking meeting participant amongst the identified meeting participants; identify a plurality of non-speaking meeting participants amongst the identified meeting participants; assign a respective role designation to each of the identified non-speaking meeting participants based on one or more detected characteristics associated with each of the non-speaking meeting participants; and generate, as an output for display, a primary video stream featuring the speaking meeting participant and one or more of the non-speaking meeting participants, wherein selection of the one or more non-speaking meeting participants for inclusion in the primary video stream is based on the roles assigned to each of the non-speaking meeting participants.

Embodiments consistent with the present disclosure also include a camera system or video conferencing system or camera system, comprising: at least one camera, each configured to generate an overview video output stream representative of a meeting environment; and at least one video processing unit configured to: automatically analyze the at least one overview video output stream to identify at least a first meeting participant and a second meeting participant represented in the at least one overview video output stream; assign a first role designation to the first meeting participant and a second role designation to the second meeting participant based on one or more detected characteristics associated with at least one of the first meeting participant or the second meeting participant, wherein the first role designation and the second role designation are the same; assign a first attribute designation to the first meeting participant and a second attribute designation to the second meeting participant based on one or more detected properties or actions associated with at least one of the first meeting participant or the second meeting participant, wherein the first attribute designation is different from the second attribute designation; determine a relative framing priority between the first meeting participant and the second meeting participant based on a first combination, including the first role designation and the first attribute designation, and based on a second combination, including the second role designation and the second attribute designation; select a framed representation of the first meeting participant or the second meeting participant based on the determined relative framing priority; and generate, as an output, a primary video stream including the selected framed representation of the first meeting participant or the second meeting participant.

Embodiments consistent with the present disclosure also include a camera system or video conferencing system or camera system, comprising: at least one camera, each configured to generate at an overview video output stream representative of a meeting environment; and at least one video processing unit configured to: automatically analyze the at least one overview video output stream to identify at least a first meeting participant and a second meeting participant represented in the at least one overview video output stream; assign a first role designation to the first meeting participant and a second role designation to the second meeting participant based on one or more detected characteristics associated with at least one of the first meeting participant or the second meeting participant, wherein the first role designation is different from the second role designation; generate a framed representation of the first meeting participant and a framed representation of the second meeting participant; and generate, as an output, a first primary video stream including the framed representation of the first meeting participant during a first period of time and a second primary video stream including the framed representation of the second meeting participant during a second period of time; wherein relative durations of the first and second periods of time are based on relative priorities associated with the first role designation and the second role designation.

BRIEF DESCRIPTION OF THE DRAWINGS

The accompanying drawings, which are incorporated in and constitute a part of this specification, illustrate disclosed embodiments and, together with the description, serve to explain the disclosed embodiments. The particulars shown are by way of example and for purposes of illustrative discussion of embodiments of the present disclosure. The description taken with the drawings makes apparent to those skilled in the art how embodiments of the present disclosure may be practiced.

FIG. 3A is a diagrammatic representation of a multi-camera system in a meeting environment, consistent with some embodiments of the present disclosure.

FIGS. 3B and 3C are examples of output streams including representations of a common meeting participant, consistent with some embodiments of the present disclosure.

FIG. 33 illustrates an example of transitions between frames or sub-frames, consistent with some embodiments of the present disclosure.

FIG. 44 illustrates various example organic layouts, consistent with some embodiments of the present disclosure.

FIG. 48 provides exemplary tables illustrating possible meeting scenarios along with example role and priority assignments, consistent with some embodiments of the present disclosure.

FIG. 49 provides exemplary tables illustrating possible meeting scenarios along with example user-assigned role and priority assignments, consistent with some embodiments of the present disclosure.

DETAILED DESCRIPTION

Figure 1:
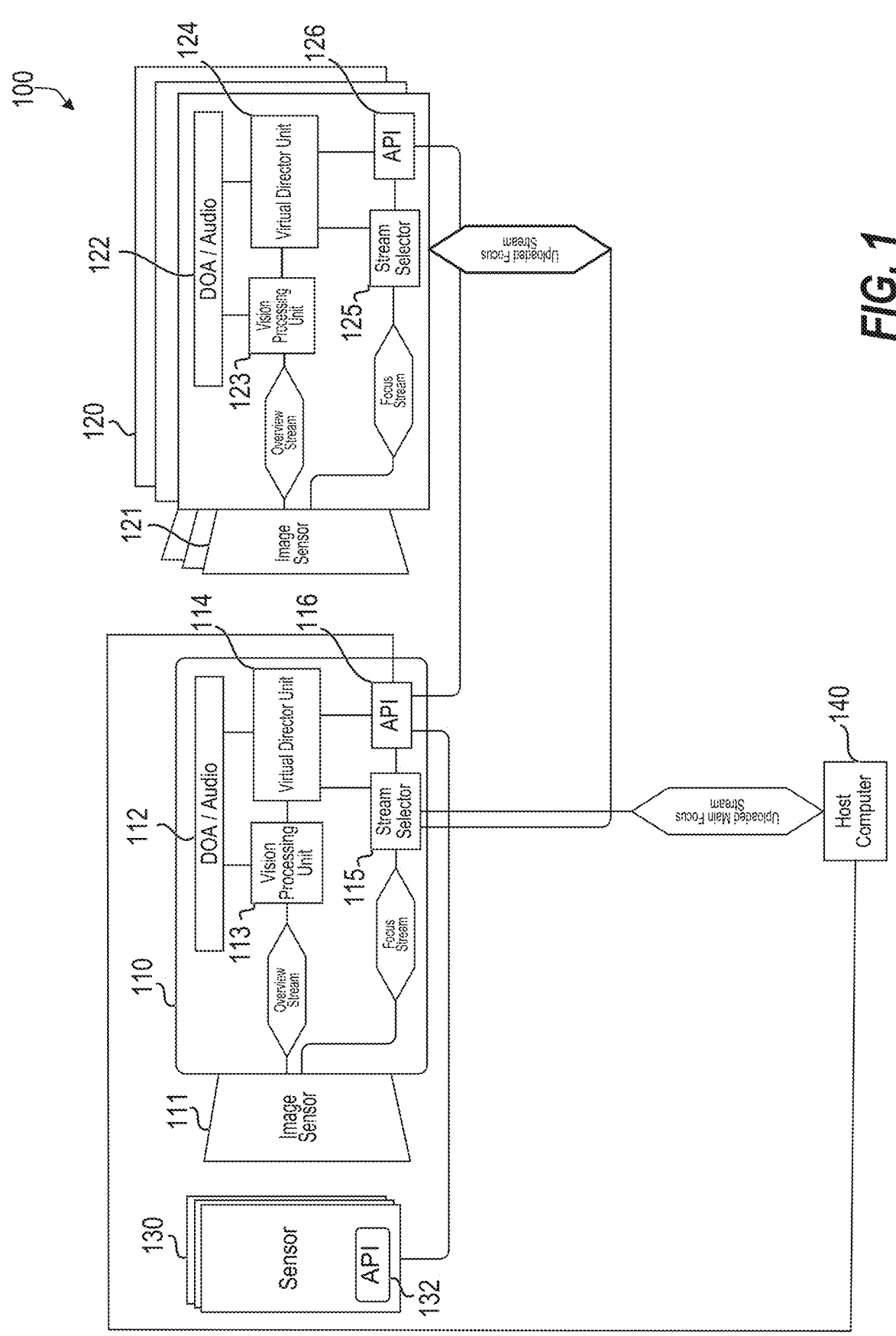
FIG. 1 is a diagrammatic representation of an example of a multi-camera system, consistent with some embodiments of the present disclosure.

Embodiments of the present disclosure may include features and techniques for showing video of participants on a display. Traditional video conferencing systems and associated software may have the ability to show video of participants on a display. In some cases, a static image of one or more meeting participants may be shown on the display. In other cases, one or more meeting participants may be selectively featured on a display (e.g., based on detected audio from one or more microphones). With such systems, however, it may be difficult for a far end user to adequately see or interact with certain conference participants. For example, in a video shot showing a conference room table and all of the participants sitting around the table, it may be difficult for a far end user to see and interact with meeting participants sitting at the other far end of the table. Additionally, it may be difficult to see and interact with meeting participants shown on a video feed in profile or from behind. Moreover, even in systems capable of highlighting one or more meeting participants, it may be difficult or impossible for far end users to determine how a featured speaker is being received by others in the room, especially where the others are not shown together with the featured speaker. For at least these reasons, far end users may feel isolated, detached, and/or not as integrated during videoconference events.

Disclosed systems and methods may provide single or multi-camera video conferencing systems that naturally and dynamically follow the conversation and meeting interactions, occurring both among participants sitting in a conference room and, more broadly, among meeting participants distributed over multiple environments. In some embodiments, disclosed systems and methods may detect what is happening within an environment (e.g., a meeting room, classroom, virtual distributed meeting environment, etc.) and adapt the video feed view based on analysis of detected events, interactions, movements, audio, etc. In some cases, the adapted video feed, e.g., including framing and display of selected meeting participants in one or more output video streams may be based on determined or inferred roles for detected meeting participants. The adapted video feed may further be based on determined characteristics for detected meeting participants (e.g., level of engagement, etc.).

In this way, far end users may feel and be more engaged and included with a group of meeting participants, including in situations where the group is located together in a common physical environment. For example, the disclosed video conferencing camera systems can facilitate end users' ability to determine who is speaking, to whom a discussion is directed, how the discussion is being received by non-speaking participants, etc. As a result of being provided with this contextual information regarding the meeting environment and the meeting participants, a far end user participating in a meeting virtually may feel closer to being in the same room with a group of meeting participants. Such far end users may more easily follow the flow of conversation, comprehend more of the discussion (even where information is transmitted subtly through body language, facial expressions, gestures, etc.—common features of a multi-person discussion that may be missed or not be discernable using traditional video conferencing platforms), more easily identify speakers and listeners, and gain more context from a meeting conversation. Such features may help remote participants to take a more active role in conversations with other meeting participants.

Furthermore, disclosed embodiments may provide systems and methods for event detection and analysis relative to the bodies of meeting participants (e.g., in the head region), direction of received audio (e.g., in combination with video analysis/detection), movement patterns/history of meeting participants, speaker tracking, predicted roles of meeting participants, etc. Such event detection and analysis may be used to determine which subjects to feature in a composite video (or series of video stream outputs), where on a display to show meeting participants, relative positioning on a display among meeting participants, what types of highlighting techniques to use relative to selected meeting participants, what audio feeds to select, how long to show certain video streams, how to transition among different video frames, etc.

Traditional video conferencing platforms may be associated with additional challenges. For example, when calling into a meeting, it can be difficult for remote video conferencing participants to feel integrated in the physical meeting environment. At the same time, it can be difficult to divide attention between the screen and the meeting environment for meeting participants located in the physical meeting environment.

Meetings may require different spaces depending on the activity and the number of attendees. They may also require different types and levels of concentration, attention, and presence. Examples of meeting participants may include a main speaker, a contributor, or a listening audience. For example, in an educational setting the meeting participants may include a teacher or lecturer and students, with the teacher or lecturer typically being a main speaker, and the students typically being either contributors or listening audience members. Regardless of the situation, it may be beneficial for all participants to feel connected and have opportunities to contribute to the meeting. Additionally, hybrid office situations may continue to be prevalent, and participants may attend meetings with some being located in a physical meeting environment, and others joining the video conference from elsewhere. Disclosed embodiments may provide experiences where all meeting participants (including those physically present and remote participants) can contribute and participate on the same level in a meeting. Furthermore, disclosed embodiments may provide a remote meeting participant with contextual information regarding the physical meeting environment and the meeting participants present in the meeting environment.

The present disclosure provides video conferencing systems, and camera systems for use in video conferencing. Thus, where a camera system is referred to herein, it should be understood that this may alternatively be referred to as a video conferencing system, a video conferencing camera system, or a camera system for video conferencing. As used herein, the term "video conferencing system" refers to a system, such as a video conferencing camera, that may be used for video conferencing, and may be alternatively referred to as a system for video conferencing. The video conferencing system need not be capable of providing video conferencing capabilities on its own, and may interface with other devices or systems, such as a laptop, PC, or other network-enabled device, to provide video conferencing capabilities.

Video conferencing systems/camera systems in accordance with the present disclosure may comprise at least one camera and a video processor for processing video output generated by the at least one camera. The video processor may comprise one or more video processing units.

In accordance with embodiments, a video conferencing camera may include at least one video processing unit. The at least one video processing unit may be configured to process the video output generated by the video conferencing camera. As used herein, a video processing unit may include any electronic circuitry designed to read, manipulate and/or alter computer-readable memory to create, generate or process video images and video frames intended for output (in, for example, a video output or video feed) to a display device. A video processing unit may include one or more microprocessors or other logic based devices configured to receive digital signals representative of acquired images. The disclosed video processing unit may include application-specific integrated circuits (ASICs), microprocessor units, or any other suitable structures for analyzing acquired images, selectively framing subjects based on analysis of acquired images, generating output video streams, etc.

In some cases, the at least one video processing unit may be located within a single camera. In other words, video conferencing camera may comprise the video processing unit. In other embodiments, the at least one video processing unit may be located remotely from the camera, or may be distributed among multiple cameras and/or devices. For example, the at least one video processing unit may comprise more than one, or a plurality of, video processing units be distributed among a group of electronic devices including one or more cameras (e.g., a multi-camera system), personal computers, a mobile devices (e.g., tablet, phone, etc.), and/or one or more cloud-based servers. Therefore, disclosed herein are video conferencing systems, for example video conferencing camera systems, comprising at least one camera and at least one video processing unit, as described herein. The at least one video processing unit may or may not be implemented as part of the at least one camera. The at least one video processing unit may be configured to receive video output generated by the one or more video conferencing cameras. The at least one video processing unit may generate video output (e.g. one or more video output streams) for display. The at least one video processing unit may decode digital signals to display a video and/or may store image data in a memory device. In some embodiments, a video processing unit may include a graphics processing unit. It should be understood that where a video processing unit is referred to herein in the singular, more than one video processing units is also contemplated. The various video processing steps described herein may be performed by the at least one video processing unit, and the at least one video processing unit may therefore be configured to perform a method as described herein, for example a video processing method, or any of the steps of such a method. Where a determination of a parameter, value, or quantity is disclosed herein in relation to such a method, it should be understood that the at least one video processing unit may perform the determination, and may therefore be configured to perform the determination.

Single camera and multi-camera systems are described herein. Although some features may be described with respect to single cameras and other features may be described with respect to multi-camera systems, it is to be understood that any and all of the features, embodiments, and elements herein may pertain to or be implemented in both single camera and multi-camera systems. For example, some features, embodiments, and elements may be described as pertaining to single camera systems. It is to be understood that those features, embodiments, and elements may pertain to and/or be implemented in multi-camera systems. Furthermore, other features, embodiments, and elements may be described as pertaining to multi-camera systems. It is also to be understood that those features, embodiments, and elements may pertain to and/or be implemented in single camera systems.

Embodiments of the present disclosure include multi-camera systems. As used herein, multi-camera systems may include two or more cameras that are employed in an environment, such as a meeting environment, and that can simultaneously record or broadcast one or more representations of the environment. The disclosed cameras may include any device including one or more light-sensitive sensors configured to capture a stream of image frames. Examples of cameras may include, but are not limited to, Huddly® L1 or S1 cameras, Huddly® IQ cameras, digital cameras, smart phone cameras, compact cameras, digital single-lens reflex (DSLR) video cameras, mirrorless cameras, action (adventure) cameras, 360-degree cameras, medium format cameras, webcams, or any other device for recording visual images and generating corresponding video signals.

Referring to FIG. 1, a diagrammatic representation of an example of a multi-camera system 100, consistent with some embodiments of the present disclosure, is provided. Multi-camera system 100 may include a main camera 110, one or more peripheral cameras 120, one or more sensors 130, and a host computer 140. In some embodiments, main camera 110 and one or more peripheral cameras 120 may be of the same camera type such as, but not limited to, the examples of cameras discussed above. Furthermore, in some embodiments, main camera 110 and one or more peripheral cameras 120 may be interchangeable, such that main camera 110 and the one or more peripheral cameras 120 may be located together in a meeting environment, and any of the cameras may be selected to serve as a main camera. Such selection may be based on various factors such as, but not limited to, the location of a speaker, the layout of the meeting environment, a location of an auxiliary item (e.g., whiteboard, presentation screen, television), etc. In some cases, the main camera and the peripheral cameras may operate in a master-slave arrangement. For example, the main camera may include most or all of the components used for video processing associated with the multiple outputs of the various cameras included in the multi-camera system. In other cases, the system may include a more distributed arrangement in which video processing components (and tasks) are more equally distributed across the various cameras of the multi-camera system.

As shown in FIG. 1, main camera 110 and one or more peripheral cameras 120 may each include an image sensor 111, 121. Furthermore, main camera 110 and one or more peripheral cameras 120 may include a directional audio (DOA/Audio) unit 112, 122. DOA/Audio unit 112, 122 may detect and/or record audio signals and determine a direction that one or more audio signals originate from. In some embodiments, DOA/Audio unit 112, 122 may determine, or be used to determine, the direction of a speaker in a meeting environment. For example, DOA/Audio unit 112, 122 may include a microphone array that may detect audio signals from different locations relative to main camera 110 and/or one or more peripheral cameras 120. DOA/Audio unit 112, 122 may use the audio signals from different microphones and determine the angle and/or location that an audio signal (e.g., a voice) originates from. Additionally, or alternatively, in some embodiments, DOA/Audio unit 112, 122 may distinguish between situations in a meeting environment where a meeting participant is speaking, and other situations in a meeting environment where there is silence. In some embodiments, the determination of a direction that one or more audio signals originate from and/or the distinguishing between different situations in a meeting environment may be determined by a unit other than DOA/Audio unit 112, 122, such as one or more sensors 130.

Main camera 110 and one or more peripheral cameras 120 may include a vision processing unit 113, 123. Vision processing unit 113, 123 may include one or more hardware accelerated programmable convolutional neural networks with pretrained weights that can detect different properties from video and/or audio. For example, in some embodiments, vision processing unit 113, 123 may use vision pipeline models to determine the location of meeting participants in a meeting environment based on the representations of the meeting participants in an overview stream. As used herein, an overview stream may include a video recording of a meeting environment at the standard zoom and perspective of the camera used to capture the recording, or at the most zoomed out perspective of the camera. In other words, the overview shot or stream may include the maximum field of view of the camera. Alternatively, an overview shot may be a zoomed or cropped portion of the full video output of the camera, but may still capture an overview shot of the meeting environment. In general, an overview shot or overview video stream may capture an overview of the meeting environment, and may be framed to feature, for example, representations of all or substantially all of the meeting participants within the field of view of the camera, or present in the meeting environment and detected or identified by the system, e.g. by the video processing unit(s) based on analysis of the camera output. A primary, or focus stream may include a focused, enhanced, or zoomed in, recording of the meeting environment. In some embodiments, the primary or focus stream may be a sub-stream of the overview stream. As used herein, a sub-stream may pertain to a video recording that captures a portion, or sub-frame, of an overview stream. Furthermore, in some embodiments, vision processing unit 113, 123 may be trained to be not biased on various parameters including, but not limited to, gender, age, race, scene, light, and size, allowing for a robust meeting or videoconferencing experience.

As shown in FIG. 1, main camera 110 and one or more peripheral cameras 120 may include virtual director unit 114, 124. In some embodiments, virtual director unit 114, 124 may control a main video stream that may be consumed by a connected host computer 140. In some embodiments, host computer 140 may include one or more of a television, a laptop, a mobile device, or projector, or any other computing system. Virtual director unit 114, 124 may include a software component that may use input from vision processing unit 113, 123 and determine the video output stream, and from which camera (e.g., of main camera 110 and one or more peripheral cameras 120), to stream to host computer 140. Virtual director unit 114, 124 may create an automated experience that may resemble that of a television talk show production or interactive video experience. In some embodiments, virtual director unit 114, 124 may frame representations of each meeting participant in a meeting environment. For example, virtual director unit 114, 124 may determine that a camera (e.g., of main camera 110 and/or one or more peripheral cameras 120) may provide an ideal frame, or shot, of a meeting participant in the meeting environment. The ideal frame, or shot, may be determined by a variety of factors including, but not limited to, the angle of each camera in relation to a meeting participant, the location of the meeting participant, the level of participation of the meeting participant, or other properties associated with the meeting participant. More non-limiting examples of properties associated with the meeting participant that may be used to determine the ideal frame, or shot, of the meeting participant may include: whether the meeting participant is speaking, the duration of time the meeting participant has spoken, the direction of gaze of the meeting participant, the percent that the meeting participant is visible in the frame, the reactions and body language of the meeting participant, or other meeting participants that may be visible in the frame.

Multi-camera system 100 may include one or more sensors 130. Sensors 130 may include one or more smart sensors. As used herein, a smart sensor may include a device that receives input from the physical environment and uses built-in or associated computing resources to perform predefined functions upon detection of specific input, and process data before transmitting the data to another unit. In some embodiments, one or more sensors 130 may transmit data to main camera 110 and/or one or more peripheral cameras 120, or to the at least one video processing units. Non-limiting examples of sensors may include level sensors, electric current sensors, humidity sensors, pressure sensors, temperature sensors, proximity sensors, heat sensors, flow sensors, fluid velocity sensors, and infrared sensors. Furthermore, non-limiting examples of smart sensors may include touchpads, microphones, smartphones, GPS trackers, echolocation sensors, thermometers, humidity sensors, and biometric sensors. Furthermore, in some embodiments, one or more sensors 130 may be placed throughout the meeting environment. Additionally, or alternatively, the sensors of one or more sensors 130 may be the same type of sensor, or different types of sensors. In other cases, sensors 130 may generate and transmit raw signal output(s) to one or more processing units, which may be located on main camera 110 or distributed among two or more cameras including in the multi-camera system. Processing units may receive the raw signal output(s), process the received signals, and use the processed signals in providing various features of the multi-camera system (such features being discussed in more detail below).

As shown in FIG. 1, one or more sensors 130 may include an application programming interface (API) 132. Furthermore, as also shown in FIG. 1, main camera 110 and one or more peripheral cameras 120 may include APIs 116, 126. As used herein, an API may pertain to a set of defined rules that may enable different applications, computer programs, or units to communicate with each other. For example, API 132 of one or more sensors 130, API 116 of main camera 110, and API 126 of one or more peripheral cameras 120 may be connected to each other, as shown in FIG. 1, and allow one or more sensors 130, main camera 110, and one or more peripheral cameras 120 to communicate with each other. It is contemplated that APIs 116, 126, 132 may be connected in any suitable manner such as—but not limited to—via Ethernet, local area network (LAN), wired, or wireless networks. It is further contemplated that each sensor of one or more sensors 130 and each camera of one or more peripheral cameras 120 may include an API. In some embodiments, host computer 140 may be connected to main camera 110 via API 116, which may allow for communication between host computer 140 and main camera 110.

Main camera 110 and one or more peripheral cameras 120 may include a stream selector 115, 125. Stream selector 115, 125 may receive an overview stream and a focus stream of main camera 110 and/or one or more peripheral cameras 120, and provide an updated focus stream (based on the overview stream or the focus stream, for example) to host computer 140. The selection of the stream to display to host computer 140 may be performed by virtual director unit 114, 124. In some embodiments, the selection of the stream to display to host computer 140 may be performed by host computer 140. In other embodiments, the selection of the stream to display to host computer 140 may be determined by a user input received via host computer 140, where the user may be a meeting participant.

In some embodiments, an autonomous video conferencing (AVC) system is provided. The AVC system may include any or all of the features described above with respect to multi-camera system 100, in any combination. Furthermore, in some embodiments, one or more peripheral cameras and smart sensors of the AVC system may be placed in a separate video conferencing space (or meeting environment) as a secondary space for a video conference (or meeting). These peripheral cameras and smart sensors may be networked with the main camera and adapted to provide image and non-image input from the secondary space to the main camera. In some embodiments, the AVC system may be adapted to produce an automated television studio production for a combined video conferencing space based on input from cameras and smart sensors in both spaces.

In some embodiments, the AVC system may include a smart camera adapted with different degrees of field of view. For example, in a small video conference (or meeting) space with fewer smart cameras, the smart cameras may have a wide field of view (e.g., approximately 150 degrees). As another example, in a large video conference (or meeting) space with more smart cameras, the smart cameras may have a narrow field of view (e.g., approximately 90 degrees). In some embodiments, the AVC system may be equipped with smart cameras with various degrees of field of view, allowing optimal coverage for a video conferencing space.

Furthermore, in some embodiments, at least one image sensor of the AVC system may be adapted to zoom up to 10×, enabling close-up images of objects at a far end of a video conferencing space. Additionally, or alternatively, in some embodiments, at least one smart camera in the AVC system may be adapted to capture content on or about an object that may be a non-person item within the video conferencing space (or meeting environment). Non-limiting examples of non-person items include a whiteboard, a television (TV) display, a poster, or a demonstration bench. Cameras adapted to capture content on or about the object may be smaller and placed differently from other smart cameras in an AVC system, and may be mounted to, for example, a ceiling to provide effective coverage of the target content.

At least one audio device in a smart camera of an AVC system (e.g., a DOA audio device) may include a microphone array adapted to output audio signals representative of sound originating from different locations and/or directions around the smart camera. Signals from different microphones may allow the smart camera to determine a direction of audio (DOA) associated with audio signals and discern, for example, if there is silence in a particular location or direction. Such information may be made available to a vision pipeline and virtual director included in the AVC system. In some embodiments, a computational device with high computing power may be connected to the AVC system through an Ethernet switch. The computational device may be adapted to provide additional computing power to the AVC system. In some embodiments, the computational device may include one or more high performance CPUs and GPUs and may run parts of a vision pipeline for a main camera and any designated peripheral cameras.

Figure 2A:
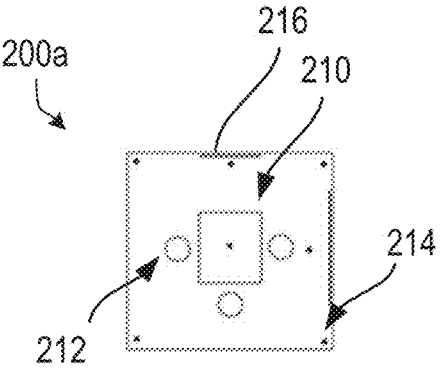
FIGS. 2A-2F are examples of meeting environments, consistent with some embodiments of the present disclosure.
Figure 2B:
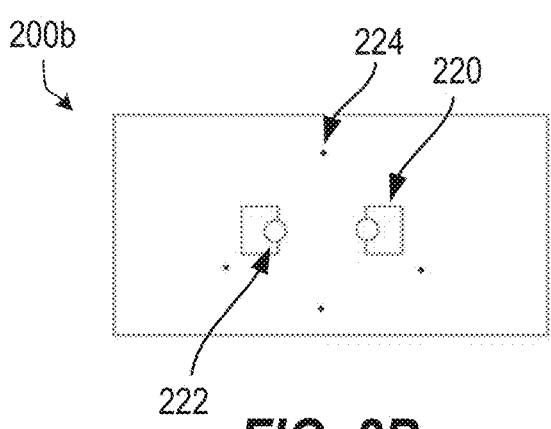
Figure 2C:
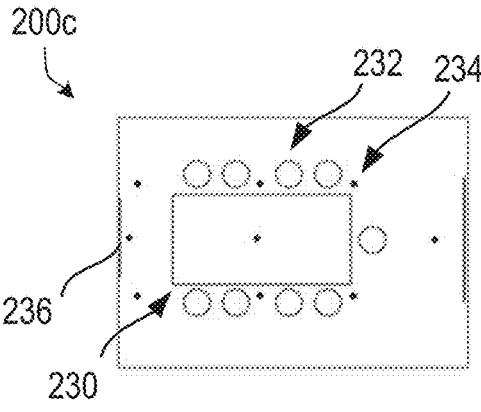
Figure 2D:
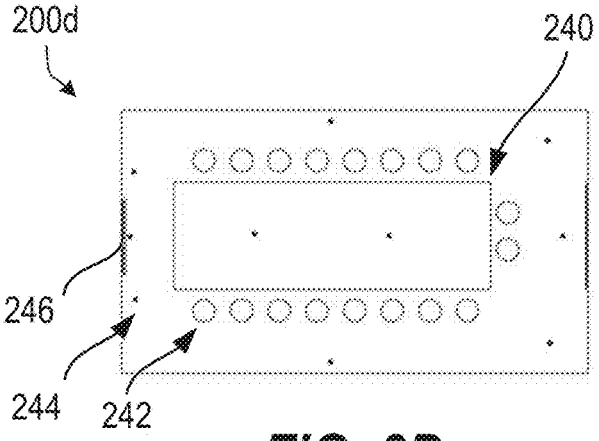
Figure 2E:
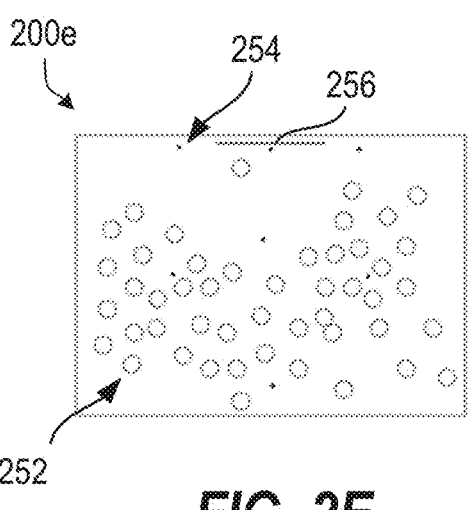
Figure 2F:
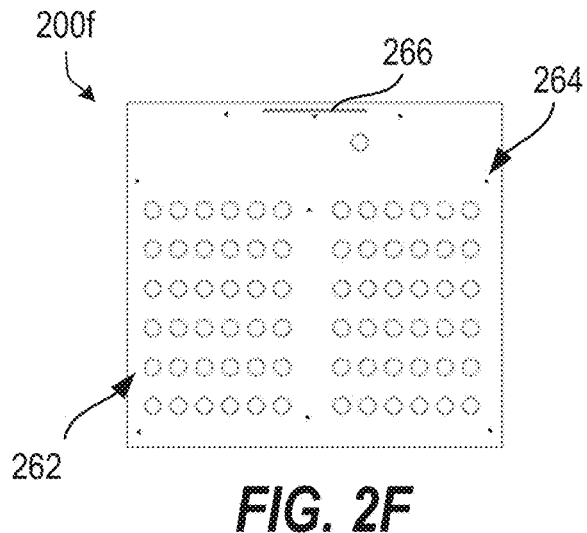

FIGS. 2A-2F include diagrammatic representations of various examples of meeting environments, consistent with some embodiments of the present disclosure. FIG. 2A depicts an example of a conference room 200*a*. Conference room 200*a* may include a table 210, three meeting participants 212, seven cameras 214, and a display unit 216. FIG. 2B depicts an example of a meeting room 200*b*. Meeting room 200*b* may include two desks 220, two meeting participants 222, and four cameras 224. FIG. 2C depicts an example of a videoconferencing space 200*c*. Videoconferencing space 200*c* may include a table 230, nine meeting participants 232, nine cameras 234, and two display units 226. FIG. 2D depicts an example of a board room 200*d*. Board room 200*d* may include a table 240, eighteen meeting participants 242, ten cameras 244, and two display units 246. FIG. 2E depicts an example of a classroom 200*e*. Classroom 200*e* may include a plurality of meeting participants 252, seven cameras 254, and one display unit 256. FIG. 2F depicts an example of a lecture hall 200*f*. Lecture hall 200*f* may include a plurality of meeting participants 262, nine cameras 264, and a display unit 266. Although particular numbers are used to make reference to the number of, for example, tables, meeting participants, cameras, and display units, it is contemplated that meeting environments may contain any suitable number of tables, furniture (sofas, benches, conference pods, etc.), meeting participants, cameras, and display units. It is further contemplated that the tables, meeting participants, cameras, and display units may be organized in any location within a meeting environment, and are not limited to the depictions herein. For example, in some embodiments, cameras may be placed "in-line," or placed in the same horizontal and/or vertical plane relative to each other. Furthermore, it is contemplated that a meeting environment may include any other components that have not been discussed above such as, but not limited to, whiteboards, presentation screens, shelves, and chairs. Names are given to each meeting environment (e.g., conference room, meeting room, videoconferencing space, board room, classroom, lecture hall) for descriptive purposes and each meeting environment shown in FIGS. 2A-2F is not limited to the name it is associated with herein.

In some embodiments, by placing multiple wide field of view single lens cameras that collaborate to frame meeting participants in a meeting environment as the meeting participants engage and participate in the conversation from different camera angles and zoom levels, the multi-system camera may create a varied, flexible and interesting experience. This may give far end participants (e.g., participants located further from cameras, participants attending remotely or via video conference) a natural feeling of what is happening in the meeting environment.

Disclosed embodiments may include a multi-camera system comprising a plurality of cameras. Each camera may be configured to generate a video output stream representative of a meeting environment. Each video output stream may feature one or more meeting participants present in the meeting environment. In this context, "featured" means that the video output stream includes or features representations of the one or more meeting participants. For example, a first representation of a meeting participant may be included in a first video output stream from a first camera included in the plurality of cameras, and a second representation of a meeting participant may be included in a second video output stream from a second camera included in the plurality of cameras. As used herein, a meeting environment may pertain to any space where there is a gathering of people interacting with one another. Non-limiting examples of a meeting environment may include a board room, classroom, lecture hall, videoconference space, or office space. As used herein, a representation of a meeting participant may pertain to an image, video, or other visual rendering of a meeting participant that may be captured, recorded, and/or displayed to, for example, a display unit. A video output stream, or a video stream, may pertain to a media component (may include visual and/or audio rendering) that may be delivered to, for example, a display unit via wired or wireless connection and played back in real time. Non-limiting examples of a display unit may include a computer, tablet, television, mobile device, projector, projector screen, or any other device that may display, or show, an image, video, or other rendering of a meeting environment.

Referring to FIG. 3A, diagrammatic representation of a multi-camera system in a meeting environment 300, consistent with some embodiments of the present disclosure, is provided. Cameras 310a-c (e.g., a plurality of cameras) may record meeting environment 300. Meeting environment 300 may include a table 340 and meeting participants, such as meeting participants 330, 332. As shown in FIG. 3A, cameras 310a-c may capture portions of meeting environment 300 in their respective stream directions, such as stream directions 320a-c.

Referring to FIGS. 3B-3C, output streams 370a, 370b may include representations 380, 390 of a common meeting participant 360. For example, representation 380 may be included in an output stream 370a from camera 310b in stream direction 320b. Similarly, representation 390 may be included in an output stream 370b from camera 310c in stream direction 320c. As shown in FIG. 3A, cameras 310b and 310c may be located in different locations and include different stream directions 320b, 320c such that the output stream 370a, 370b from each camera 310b, 310c may include a different representation 380, 390 of the common, or same, meeting participant 360.

It is contemplated that, in some embodiments, output streams may display representations of more than one meeting participant, and the representations may include representations of the common, or same, meeting participant(s). It is further contemplated that, in some embodiments, output streams may include representations of different meeting participants. For example, in some embodiments, the output video streams generated by cameras 310a-c may include overview streams that include a wider or larger field of view as compared to the examples of FIGS. 3B and 3C. In some cases, e.g., the output streams provided by cameras 310b and 310c may include representations of meeting participant 360 together with representations of one or more (or all) of the other meeting participants included in the meeting environment (e.g., any or all of the participants positioned around table 340). From the overview video stream, a focused, primary video stream, such as those shown in FIGS. 3B and 3C may be selected and generated based on shot selection criteria, as discussed further below.

In some embodiments, the multi-camera system may comprise one or more video processing unit. In some embodiments, the video processing unit may include at least one microprocessor deployed in a housing associated with one of the plurality of cameras. For example, the video processing unit may include vision processing unit 113, 123; virtual director unit 114, 124; or both vision processing unit 113, 123 and virtual director unit 114, 124. The video processing unit may also implement the processing pipelines described herein, such as a vision pipeline. As shown by example in FIG. 1, video processing may occur on camera, shown by the video processing unit located on the cameras of the multi-camera system. Furthermore, in some embodiments, the video processing unit(s) may be remotely located relative to the plurality of cameras. For example, and referring to FIG. 1, the video processing unit(s) may be located in host computer 140. As another example, the video processing unit(s) may be located on a remote server such as a server in the cloud. In some embodiments, the video processing unit may include a plurality of logic devices distributed across two or more of the plurality of cameras. Furthermore, the video processing unit(s) may be configured to perform a method 400 of analyzing a plurality of video output streams and generating a primary video stream, as shown in FIG. 4.

Figure 4:
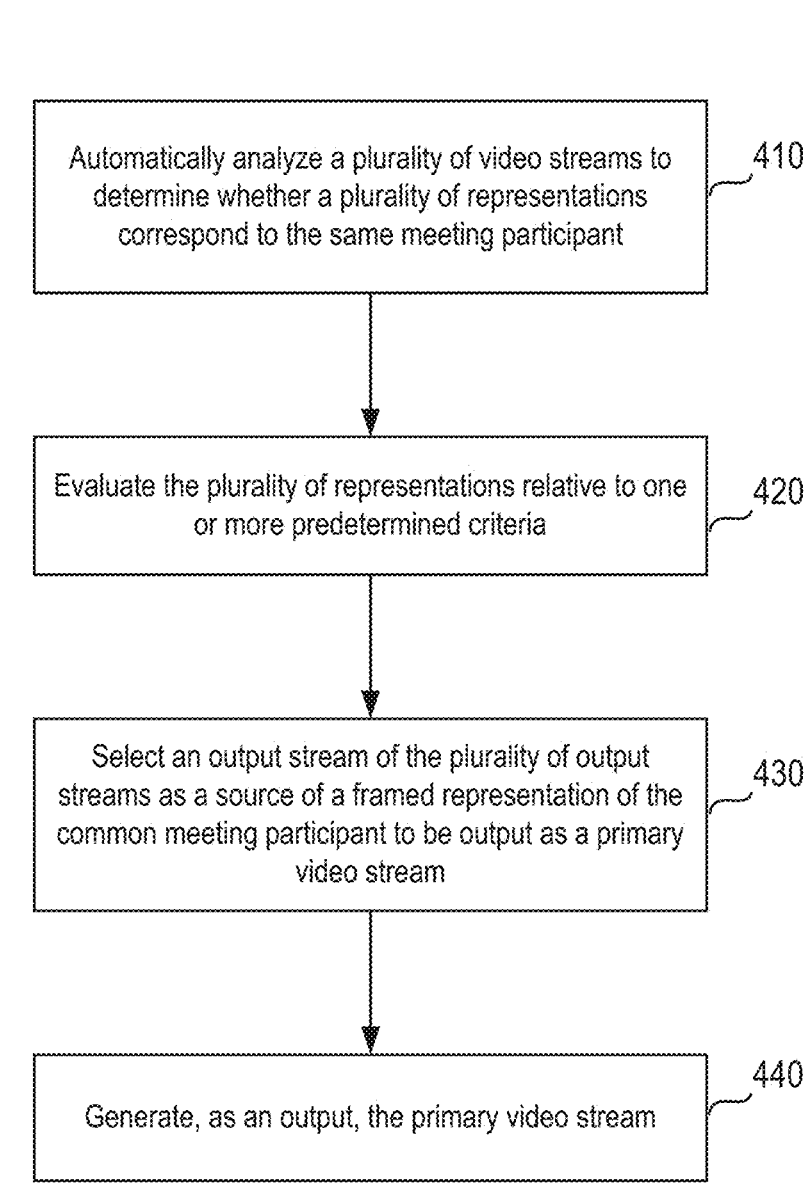
FIG. 4 is a flowchart of an example method of analyzing a plurality of video output streams and generating a primary video stream, consistent with some embodiments of the present disclosure.

Referring to FIG. 4, as shown in step 410, method 400 may include automatically analyzing a plurality of video streams to determine whether a plurality of representations, each representation included in a video stream among the plurality of video streams, correspond to the same meeting participant. For example, the video processing unit may be configured to automatically analyze the first video output stream and the second video output stream to determine whether the first representation of a meeting participant and the second representation of a meeting participant correspond to a common meeting participant (i.e., the same person). A common meeting participant may refer to a single particular meeting participant that is represented in the outputs of two or more output video streams. As an example, and referring to FIGS. 3A-C, a video processing unit (e.g., vision processing unit 113 and/or virtual director unit 114, a video processing unit located in host computer 140, etc.) may automatically analyze video output streams 370a, 370b to determine whether representations 380, 390 correspond to common meeting participant 360. A similar analysis can be performed relative to a plurality of output video streams that each include representations of multiple individuals. Using various identification techniques, the video processing unit can determine which individual representations across a plurality of camera outputs correspond to participant A, which correspond to participant B, which correspond to participant C, and so on. Such identification of meeting participants across the video outputs of multiple camera systems may provide an ability for the system to select one representation of a particular meeting participant over another representation of the same meeting participant to feature in the output of the multi-camera system. As just one example, in some cases and based on various criteria relating to the individual, interactions among meeting participants, and/or conditions or characteristics of the meeting environment, the system may select the representation 380 of meeting participant 360 over the representation 390 of meeting participant 360 to feature in the output of the multi-camera system.

The analysis for determining whether two or more meeting participant representations correspond to a common meeting participant may be based on at least one identity indicator. The identity indicator may include any technique or may be based on any technique suitable for correlating identities of individuals represented in video output streams. In some embodiments, the at least one identity indicator may include an embedding determined for each of the first representation and the second representation. As used herein, an embedding may include numerical representations of a video stream (e.g., one or more frames associated with output stream 370a, 370b), a section or segment of a video stream (e.g., sub-sections associated with one or more captured frames included in a video stream), an image, an area of a captured image frame including a representation of a particular individual, etc. In some cases the embedding may be expressed as a vector (e.g., a feature vector) of N dimension. For example, an embedding may include at least one feature vector representation. In the example of FIGS. 3B and 3C, the at least one identity indicator may include a first feature vector embedding determined relative to the first representation of the meeting participant (e.g., representation 380) and a second feature vector determined relative to the second representation of the meeting participant (e.g., representation 390).

The at least one feature vector representation may include a series of numbers generated based on features unique to, or representative of, the subject being represented. Factors that may contribute to the series of numbers generated may include, among many other things, eye color, hair color, clothing color, body outline, skin tone, eye shape, face shape, facial hair presence/color/type, etc. Notably, the generation of feature vectors are repeatable. That is, exposing the feature vector generator repeatedly to the same image or image section will result in repeated generation of the same feature vector.

Such embeddings may also be used as a basis for identification. For example, in a case where feature vectors are determined for each of individuals A, B, and C represented in a first image frame derived from a first camera output, those feature vectors may be used to determined if any of individuals A, B, or C are represented in a second image frame derived from the output of a second camera. That is, feature vectors may be generated for each of individuals X, Y, and Z represented in the second image frame. The distance between the various feature vectors, in vector space, may be determined as a basis for comparing feature vectors. Thus, while the feature vector determined for individual A may not be exactly the same as any one of the feature vectors generated for individuals X, Y, or Z, the A feature vector may be closely match one of the X, Y, or Z feature vectors. If the distance, for example, between the A feature vector for individual A is within a predetermined distance threshold of the feature vector generated for individual Z, it may be determined that individual A in the first frame corresponds to individual Z in the second frame. Similar comparisons may be performed relative to the other meeting participants and for multiple frames from multiple different camera outputs. Based on this analysis, the system can: determine and track which individuals are represented in the outputs of which cameras; and also identify the various individuals across the available camera outputs. Such identification, correlation, and tracking may allow the system to compare available shots of a particular individual and select, based on various criteria, a particular shot of an individual over another shot of the individual to output as part of the camera system output.

Other types of identifiers or identification techniques may also be used to correlate representations of individuals across multiple camera outputs. Such alternative techniques may be used alone or in combination with the feature vector embedding approach or any other identification technique described herein. In some cases, the at least one identity indicator may include one or more of a body outline or profile shape, at least one body dimension, and/or at least one color indicator associated with an individual. Such techniques may be helpful relative to situations where one or more image frames include a representation of a face that is either not visible or only partially visible. As used herein, a body outline may pertain to the shape of a meeting participant's body. A profile shape may pertain to the shape of a meeting participant's body, face, etc. (or any subsection of a face or body) represented in an image frame. A body dimension may include, but is not limited to, height, width, or depth of any feature associated with a meeting participant's body. A color indicator may be associated with the color and/or shade of a representation of a meeting participant's skin, hair, eyes, clothing, jewelry, or any other portion of the meeting participant's body. It is contemplated that the at least one identity indicator may include any unique features of a meeting participant, such as unique facial features and/or body features.

The identifier/identification technique may be based on a series of captured images and corresponding analysis of streams of images. For example, in some embodiments, the at least one identity indicator may include tracked lip movements. For example, as shown in FIGS. 3B and 3C, both representation 380 and representation 390 may show that the mouth, or lips, of common meeting participant 360 is closed and/or not moving. The video processing unit may determine that the representations 380, 390 correspond to common meeting participant 360, fully or in part, by tracking the lip movements of common meeting participant 360 across corresponding series of captured images (e.g., a stream of images associated with the output of camera 310b and another stream of images associated with the output of camera 310c). The video processing unit may determine that the lips of common meeting participant 360 are closed and/or not moving in both representations 380, 390, and identify the common meeting participant 360 as a common meeting participant, as opposed to two different meeting participants. Further, the video processing unit may track detected movements of lips or mouths across different streams of images. Correspondence in time between lip and/or mouth movements represented across two or more image streams may indicate representations of a common meeting participant across the two or more image streams. As another example, if a first representation of a meeting participant shows lips moving and a second representation of a meeting participant shows lips that are not moving (or in a position different from the lips of the first representation), the video processing unit may determine that the first representation and the second representation correspond to two different meeting participants.

Techniques other than image analysis may also be useful in identifying common meeting participants across a plurality of camera outputs. For example, in some embodiments, an audio track may be associated with each camera video output stream. The audio track associated with each camera video output stream may be recorded by an audio recording device or audio source, such as a microphone or microphone array, associated with, or of, the camera from which the respective video output stream is output. An audio track may pertain to a stream of recorded sound or audio signals. For example, and referring to FIGS. 3A-3C, a first audio track may be associated with output stream 370a, and a second audio track may be associated with output stream 370b. The video processing unit may be configured to determine whether representations 380, 390 correspond to the common meeting participant 360 based on analysis of the first audio track and second audio track. Such analysis may be based on time sync analysis of audio signals and may also include time sync analysis with tracked lip/mouth movements available from image analysis techniques. Additionally, or alternatively, a single audio track may be associated with meeting environment 300, and the video processing unit may be configured to determine whether representations 380, 390 correspond to the common meeting participant 360 based on analysis of the single audio track in combination with tracked lip/mouth movements.

It is contemplated that the at least one identity indicator may include any combination of the non-limiting examples of identity indicators discussed previously. For example, the at least one identity indicator may include at least one embedding determined for each of the first representation (e.g., representation 380) and second representation (e.g., representation 390) and also at least one color indicator (e.g., hair color, eye color, skin color) associated with each of the first representation and second representation.

It is further contemplated that the video processing unit may determine that a first meeting participant representation and a second meeting participant representation do not correspond to a common meeting participant. For example, using any one or combination of the techniques described above, the video processing unit may determine that a first meeting participant representation and a second meeting participant representation correspond different meeting participants.

With information including which meeting participants are represented in which camera outputs, and which representations in those camera outputs correspond to which participants, the video processing unit can select a particular camera output for use in generating a feature shot of a particular meeting participant (e.g., a preferred or best shot for a particular meeting participant from among available representations from a plurality of cameras). The shot selection may depend on various shot selection criteria. For example, as shown in step 420 of FIG. 4, method 400 may include evaluating a plurality of representations of a common meeting participant relative to one or more predetermined criteria, which may be used in shot selection. The predetermined criteria may include—but are not limited to—a looking direction of the common meeting participant (e.g., head pose) determined relative to each of a first and second video output streams, and/or a face visibility score (e.g., associated with a face visibility level) associated with the common meeting participant determined relative to each of the first and second video output streams, and/or a determination of whether a meeting participant is speaking. It is contemplated that any or all of these criteria may be analyzed relative to any number of video output streams that include a representation of the common meeting participant. Shot selection, for example, may be based on any of these criteria alone or in any combination.

The common meeting participant may be detected as speaking based on an audio track including the voice of (or a voice originating from the direction of) the common meeting participant, and/or tracked lip movements identified from analysis of video output from a camera of the video conferencing system. As used herein, a head pose may pertain to the degree that the head of a meeting participant is angled or turned, and/or the location of the head of the meeting participant relative to other anatomical body parts of the meeting participant (e.g., hand, arm, shoulders). A face visibility level may pertain to the percentage or proportion of the face of the meeting participant that is visible in a particular output stream (e.g., face visibility score).

As an example, and referring to FIGS. 3A-3C, a looking direction of common meeting participant 360 may be determined using the locations of cameras 310b, 310c and the location of common meeting participant 360. The relative distance and angle between cameras 310b, 310c and their stream directions 320b, 320c may be used to calculate the angle that a looking direction or profile of the face of common meeting participant 360 should be represented as in each output stream 370a, 370b. This calculation may be considered a predetermined criterion and may be used to evaluate the representations 380, 390 of common meeting participant 360. It is contemplated that the looking direction of common meeting participant, and/or the angle(s) associated with the looking direction, may be used for any suitable number of representations of common meeting participant 360 included in any number of video output streams from any number of cameras in the multi-camera system. In the examples of FIGS. 3B and 3C, meeting participant 360 has a looking direction of approximately 30 degrees relative to a normal to the capturing camera in FIG. 3B (meaning that the representation 380 of participant 360 is looking leftward of the capturing camera from the subject's frame of reference). In contrast, participant 360 in FIG. 3C has a looking direction of approximately 0 degrees relative to a normal to the capturing camera (meaning the representation 390 of participant 360 is looking directly at the capturing camera). In some cases, a looking direction of 0 degrees may be preferred over other looking directions. In other cases, a head pose providing an indirect gaze, such as the 30 degree head pose of FIG. 3B, may be preferred and may be used as the basis for a shot of participant 360.

Figure 5:
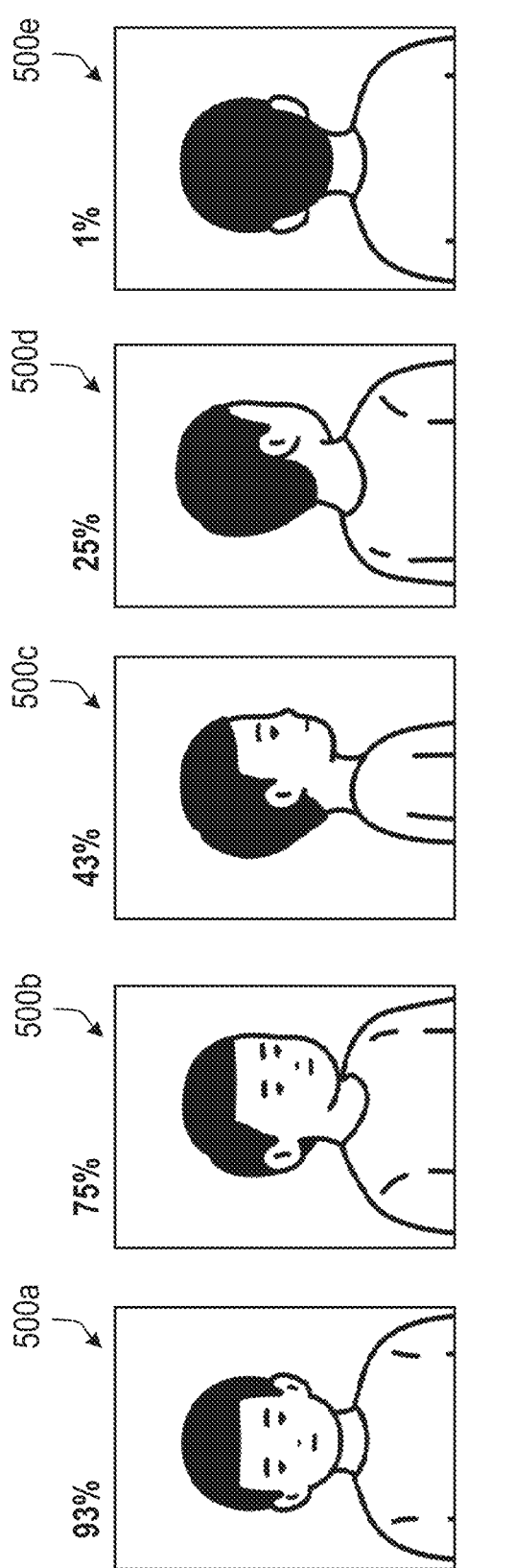
FIG. 5 is a depiction of face visibility scores, consistent with some embodiments of the present disclosure.

As another example, a face visibility score can be used to evaluate representations of a common meeting participant, which in turn, may be used as the basis for shot selection relative to a particular meeting participant. FIG. 5 provides several examples of an individual with varying head poses, resulting in various degrees of face visibility. Face visibility scores, consistent with some embodiments of the present disclosure, may be assigned to each of the different captured image frames. As shown in FIG. 5, a face visibility score may be determined based on the percentage or proportion of the face of a subject, or meeting participant, that can be seen in an output stream or frame. In some embodiments, the representations of the meeting participant may be shown in different output streams 500a-e. In other embodiments, the representations of the meeting participant may be representations of a meeting participant in different frames, or at different times, shown within a single output stream. Embodiments of the present disclosure may provide a face visibility score as a percentage of the face of a subject, or meeting participant, that is visible in a frame or output stream. As shown in FIG. 5, in output stream 500a, 93% of the face of the meeting participant may be visible. In output stream 500b, 75% of the face of the meeting participant may be visible. In output stream 500c, 43% of the face of the meeting participant may be visible. In output stream 500d, 25% of the face of the meeting participant may be visible. In output stream 500e, 1% of the face of the meeting participant may be visible. In some embodiments, the face visibility score may be a score between 0 and 1, or any other indicator useful in conveying an amount of a meeting participant face that is represented in a particular image frame or stream of image frames (e.g., an average face visibility score over a series of images captured from an output of a particular camera).

Evaluation of the shot selection criteria described above may enable the video processing unit to select a camera output from which to produce a desired shot of a particular meeting participant. Returning to FIG. 4, in step 430 method 400 may include selecting an output stream of the plurality of output streams to serve as a source of a framed representation of a common meeting participant represented in a plurality of camera outputs. As used herein, the term "framed representation" of an individual may be understood to mean a video representation of the individual that is framed (e.g. included or featured) within a video stream. In other words, the video stream is framed or cropped so that it features or includes a representation of the individual. Therefore, a framed representation of an individual is a representation that is associated with, or defined by, a video framing or cropping scheme that includes the representation. The selected output stream can then be used as the basis for outputting a primary video stream featuring a framed representation of the common meeting participant (e.g., a desired shot of the common meeting participant). The framed shot of the primary video stream may include just a subregion of an overview video captured as a camera output. In other cases, however, the framed shot of the primary video stream may include the entirety of the overview video. In general, a framed representation of an individual may be derived from a camera output, for example an overview video output stream from a camera of the video conferencing or camera system.

In one example, the video processing unit may be configured to select either a first video output stream or a second video output stream (e.g., from a first camera and a second camera, respectively) as a source of a framed representation of a common meeting participant. The framed representation may include a "close up" shot of the common meeting participant and may be output as a primary video stream. For example, referring to FIGS. 3A-C, the video processing unit may select the output associated with camera 310c and stream direction 320c as a source of a framed representation (e.g., desired shot) of common meeting participant 360. The output of camera 310c may be selected over the output of camera 310b, for example, based on any combination of the shot selection criteria described above. With the selected camera output, the video processing unit may then proceed to generate the framed representation of the common meeting participant as a primary video stream. In the example of FIG. 3C, the framed representation (desired shot) may include a sub-region of the output of camera 310c that features primarily the head/face of meeting participant 360. In other cases, meeting participant 360 may be shown in the primary video stream in combination with representations of one or more other meeting participants and/or one or more objects (e.g., whiteboards, microphones, display screens, etc.).

Figure 6:
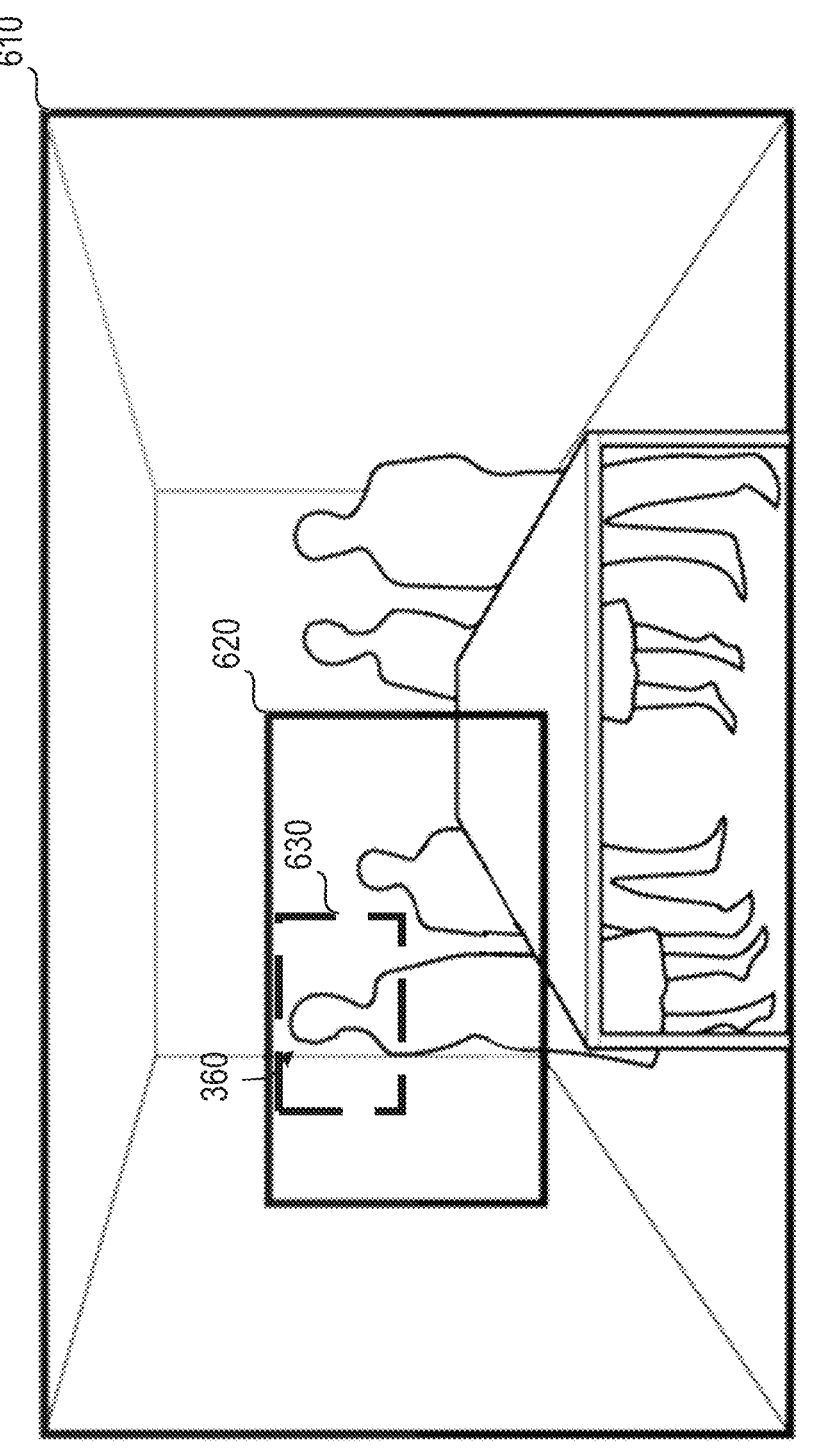
FIG. 6 is an illustration of an overview stream, output stream, and framed representation, consistent with some embodiments of the present disclosure.

FIG. 6 provides a diagrammatic representation of the relationship between an overview video stream and various sub-frame representations that may be output in as one or more primary or focus video streams. For example, FIG. 6 represents an overview stream 610. Based on the overview video, various sub-frame videos may be generated to feature one or more of the meeting participants. A first sub-frame representation includes two meeting participants and may be output by the multi-camera system as primary video stream 620. Alternatively, a second sub-frame representation includes only one meeting participant (i.e., participant 360) and may be output by the multi-camera system as primary video stream 630. As shown in FIG. 6, common meeting participant 360 may be represented in both primary video output stream 620 and in primary video output stream 630. Whether the video processing unit generates primary video output stream 620 or primary video output stream 630 as the output of the camera system may depend on the shot selection criteria described above, the proximity of meeting participant 360 to other meeting participants, detected interactions between meeting participant 360 and other participants, among other factors.

In some embodiments, and referring to the example of FIGS. 3B and 3C, output stream 610 may correspond with an overview output stream obtained from camera 310c. The video processing unit may select output stream 610 from camera 310c based on shot selection criteria, such as a face visibility score, a head pose, whether meeting participant 360 is detected as speaking, etc. Output stream 610 may be selected over other camera outputs, such as the output from cameras 310b or 310a, for example, based on a determination that meeting participant is facing camera 310c (e.g., based on a determination that meeting participant 360 has a higher face visibility score relative to camera 310c versus other cameras, such as cameras 310a or 310b). As a result, a subframe representation as shown in FIG. 3C may be generated as the primary output video 630 in this particular example.

In some embodiments, a camera among the plurality of cameras, may be designated as a preferred camera for a particular meeting participant. For example, a first or second camera associated with a selected first or second video output stream may be designated as a preferred camera associated with a common meeting participant. Referring to FIGS. 3A-3C, camera 310c, associated with output stream 370b, may be designated as the preferred camera associated with common meeting participant 360. Thus, in some embodiments, when common meeting participant 360 is determined to be speaking, actively listening, or moving, output stream 370b may be used as the source of the primary video stream. In some embodiments, the common meeting participant may be centered in an output associated with the preferred camera. In such cases, the preferred camera may be referred to as the "center" camera associated with a particular meeting participant.

As shown in step 440 of FIG. 4, method 400 may include generating, as an output, the primary video stream. For example, the video processing unit may be configured to generate, as an output of the multi-camera system, the primary video stream. In some embodiments, the generated primary video stream may include the framed representation of the common meeting participant. Referring to FIG. 6, the primary video stream may include framed representation 630 of common meeting participant 360, and the primary video stream may be transmitted to or displayed on a display unit (e.g., host computer 140; display unit 216, 236, 246, 256, 266).

In some embodiments, the common meeting participant may be determined to be speaking, listening, or reacting. Such characteristics of the meeting participant may be used in determining whether and when to feature the meeting participant in the primary video output generated by the multi-camera system. The common meeting participant may be determined to be speaking based on, for example, audio track(s) and/or tracked lip movements. In some embodiments, the common meeting participant may be determined to be listening based on, for example, a head pose (e.g., tilted head), a looking direction (e.g., looking at a meeting participant that is speaking), a face visibility score (e.g., percentage associated with looking in the direction of a meeting participant that is speaking), and/or based on a determination that the meeting participant is not speaking. Furthermore, in some embodiments, the common meeting participant may be determined to be reacting based on a detected facial expression associated with an emotion such as, but not limited to, anger, disgust, fear, happiness, neutral, sadness, or surprise. The emotion or facial expression of a meeting participant may be identified using a trained machine learning system, such as a neural network, implemented by a video processing unit. As used herein, a neural network may pertain to a series of algorithms that mimic the operations of an animal brain to recognize relationships between vast amount of data. As an example, a neural network may be trained by providing the neural network with a data set including a plurality of video recordings or captured image frames, wherein the data set includes images representative of emotions of interest. For a particular image, the network may be penalized for generating an output inconsistent with the emotion represented by the particular image (as indicated by a predetermined annotation, for example). Additionally, the network may be rewarded each time it generates an output correctly identifying an emotion represented in an annotated image. In this way, the network can "learn" by iteratively adjusting weights associated with one or models comprising the network. The performance of the trained model may increase with the number of training examples (especially difficult case examples) provided to the network during training. Such an approach is commonly termed "supervised learning".

As noted above, multiple meeting participants may be tracked and correlated across the outputs generated by two or more cameras included in the described multi-camera systems. In some embodiments, a meeting participant may be tracked and identified in each of a first, second, and third video output stream received from first, second, and third cameras, respectively, among a plurality of cameras included in a multi-camera system. In such an example, the video processing unit may be configured to analyze the third video output stream received from the third camera, and based on evaluation of at least one identity indicator (as described above), may determine whether a representation of a meeting participant included in the third video stream corresponds to a common meeting participant represented in the outputs of the first and second cameras. For example, referring to FIGS. 3A-3C, a third representation (not shown) of common meeting participant 360 may be included in a third output stream from camera 310a. The video processing unit may analyze the third output stream and determine that the third representation corresponds to common meeting participant 360. In this way, the described systems may correlate and track a single meeting participant across three or more camera outputs.

Using similar identification techniques, the described systems can track multiple different meeting participants across multiple camera outputs. For example, the describe system may receive an output from a first camera and an output from a second camera where both of the outputs include representations of a first and a second meeting participant. Using disclosed identification techniques, the video processing unit may correlate the first and second representations with the first and second meeting participants. In example the first and second camera outputs may also include representations of one or more other meeting participants (e.g., a third representation of a meeting participant included in the first video output stream from the first camera and a fourth representation of a meeting participant included in the second video output stream from the second camera). The video processing unit may be further configured to analyze the first video output stream and the second video output stream, based on the at least one identity indicator, to determine whether the third representation of a meeting participant and the fourth representation of a meeting participant correspond to another common meeting participant (e.g., a common meeting participant different from both the first and second meeting participants).

Based on a determination that the first and second camera outputs each include representations of three common meeting participants (e.g., meaning that a representation of each of the three common meeting participants appears in both the output from the first camera and the output of the second camera), the video processing unit can select the first camera or second camera as the source of a primary video stream featuring any of the first, second, or third common meeting participants. In other words, the video processing unit may be configured to evaluate the third representation and the fourth representation of another common meeting participant (e.g., the representations of the third common meeting participant included in the outputs of the first and second camera outputs) relative to one or more predetermined shot selection criteria. Based on the shot selection evaluation, the video processing unit may select either the first video output stream or the second output stream as a source of a framed representation of the another common meeting participant (e.g., the third common meeting participant) to be output as an alternative primary video stream. The video processing unit may be configured to generate, as an output of the multi-camera system, the alternative primary video stream including the framed representation of another/third common meeting participant. The alternative primary video stream may be a video stream that is shown in addition to, or alternative to, the first primary video stream. As an example, referring to FIGS. 3A-3C, output stream 370a may be selected as the source of the alternative primary video stream based on the evaluation of the representations (not shown) of the second meeting participant 332 shown in output streams 370a, 370b.

In the example of FIGS. 3B and 3C, only a single meeting participant is shown in the primary video output. In some cases, however, multiple meeting participants may be shown together in a single primary video output. For example, in some conditions, a first common meeting participant and a second common meeting participant may both be shown together in a primary video stream. Such conditions may include whether the first and second meeting participants are determined to both be speaking, actively engaged in a back and forth conversation, looking at each other, etc. In other cases, whether to include both the first and second meeting participant together in the same primary video output stream may depend on other criteria, such as a physical distance between the two meeting participants, a number of interleaving meeting participants located between the first and second meeting participants, etc. For example, if a number of interleaving meeting participants between a first common meeting participant and a second common meeting participant is four or fewer and/or if a distance between the first common meeting participant and the second common meeting participant is less than two meters, then the first and second meeting participants may be shown together in the same primary video output stream. Where more than four meeting participants separate the first and second meeting participants and/or where the first and second meeting participants are separated by more than 2 meters, for example, the first and second meeting participants may be featured alone in respective primary video output streams.

Figure 7A:
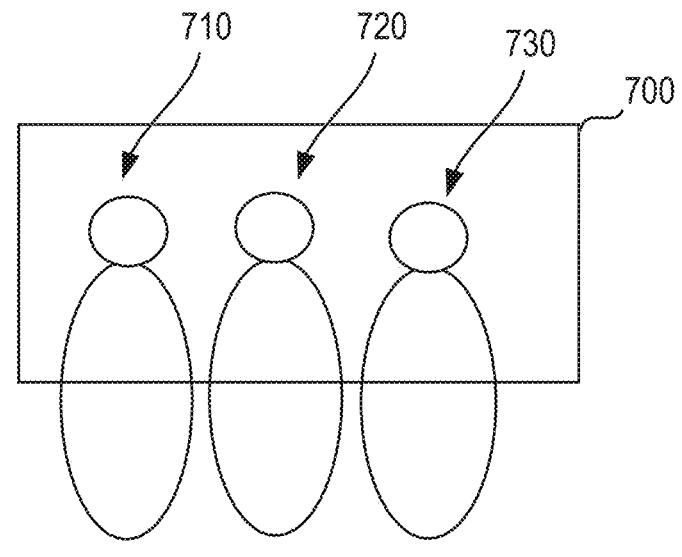
FIGS. 7A and 7B are examples of a primary video stream, consistent with some embodiments of the present disclosure.
Figure 7B:
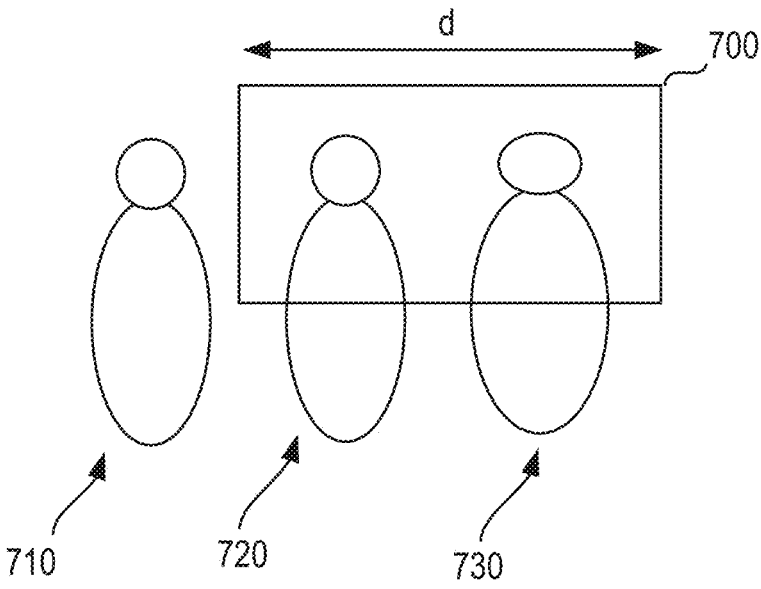

FIGS. 7A and 7B are examples of primary video streams that may be generated as output of the described multi-camera systems. As shown in FIG. 7A, a first common meeting participant 710, a second common meeting participant 720, and a third common meeting participant 730 may all be shown together in a primary video output stream 700. In this example, first common meeting participant 710 and third common meeting participant 730 may be shown together, as the number of interleaving meeting participants between them is four or fewer (or less than another predetermined interleaving participant threshold) and/or because the distance between them is less than 2 meters (or less than another predetermined separation threshold distance). In the example of FIG. 7B, second common meeting participant 720 and third common meeting participant 730 are shown together in primary video stream 700, but first common meeting participant 710 is excluded. Such a framing determination may be based on a determination that first common meeting participant 710 and third common meeting participant 730 are separated by more than a threshold distance d. It should be noted that other shot selection criteria may also be relied upon for featuring participants 720 and 730 together while excluding participant 710. For example, participants 720 and 730 may be determined as speaking to one another, looking at one another, or interacting with one another in other ways, while participant 710 is determined as not speaking or otherwise engaging with participants 720 and 730.

The following sections describe examples of various shot selection scenarios and corresponding primary video outputs. In one example, the video processing unit may be configured to determine whether a first common meeting participant or a second common meeting participant (e.g., a common meeting participant corresponding to a meeting participant featured in two or more camera output video streams) is speaking. Further, the video processing unit may be configured to generate, based on the determination of whether the first or second common meeting participant is speaking, a first primary video stream as an output of the multi-camera system if the first common meeting participant is determined to be speaking and generate a second (alternative) primary video stream as an output of the multi-camera system if the second common meeting participant is determined to be speaking. The first primary video stream may feature the first common meeting participant and the second/alternative primary video stream may feature the second common meeting participant.

Additionally, or alternatively, the video processing unit may also be configured to, based on the speaking participant determination, generate the primary video stream as an output of the multi-camera system if the first common meeting participant is determined to be not speaking and generate the second/alternative primary video stream as an output of the multi-camera system if the second common meeting participant is determined to be not speaking. These options may be useful, for example, for providing listener shots featuring either the first or second common meeting participant. Such video output may enable showing meeting participants that may be actively listening or otherwise reacting to a meeting participant that is speaking.

In some embodiments, the determination of whether the first common meeting participant or the second common meeting participant is speaking may be based on directional audio information received at the video processing unit from one or more directional microphones. As discussed with respect to FIG. 1, DOA/Audio unit 112, 122 may include a directional microphone array that may detect audio signals originating from different locations or directions relative to a camera, e.g., main camera 100 and/or one or more peripheral cameras 120. DOA/Audio unit 112, 122 may use the audio signals from different microphones and determine the angle and/or location that of the sound corresponding to an audio signal (e.g., a voice) originates. The video processing unit(s) may receive directional audio information, e.g. directional audio tracks or signals corresponding to different directions relative to the camera, and may determine whether a featured meeting participant is speaking based, at least in part, on the received directional audio information. For example, the video processing unit may determine that a direction or location associated with a directional audio signal or track that represents speech corresponds to, or correlates with, a determined direction or location of a featured meeting participant, as determined from image analysis of the video output from the camera. In such a case, the video processing unit may determine that the featured meeting participant is a speaker. More generally, the video processing unit may be configured to correlate directions or locations associated with one or more directional audio signals with determined directions or locations of one or more meeting participants featured in a video output stream received from a camera, and to identify one or more meeting participants as speakers based on the correlations. The video processing unit may also be configured to track lip movements of featured meeting participants, and to identify speaking meeting participants based on the tracked lip movements and the directional audio information. For example, if a meeting participant is identified as being associated with tracked lip movements and a directional audio signal, the meeting participant may be identified as a speaker.

Additionally, or alternatively, in some embodiments, the determination of whether the first common meeting participant or the second common meeting participant is speaking may be based on an output of a trained network, such as a neural network, configured to detect voice activity based on input including one or more captured images and/or one or more audio signals, such as directional audio signals. Voice activity may include the location of origin, decibel level, and/or pitch of an audio signal that corresponds to a voice or audio track. In some embodiments, the voice processing unit may be configured to associate a voice or audio track with a particular meeting participant. The association may be based on, for example, a location or direction of origin or a pitch of an audio signal. Furthermore, in some embodiments, the determination of whether the first common meeting participant or the second common meeting participant is speaking may be based on lip movement detection across a plurality of captured image frames.

In some embodiments, the output of the multi-camera system may further include an overview video stream including a representation of the first common meeting participant along with one or more other meeting participants. For example, referring to FIG. 6, the output of the multi-camera system may include overview stream 610, which may include common meeting participant 360 along with one or more other meeting participants. As another example, referring to FIGS. 7A-7B, meeting participant 720 may be shown with meeting participant 710 and meeting participant 730 in an overview shot, as shown in FIG. 7A. Alternatively, meeting participant 720 may be shown with meeting participant 730 but not first meeting participant 710 in another type of overview shot. In some cases, the overview shot output from the camera system may be commensurate with the output of any one of the plurality of cameras included in the camera system.

Multiple outputs of the multi-camera system may be shown together on a single display. For example, in some embodiments, an overview video stream may be output from the camera system along with one or more primary video streams, and the overview video stream and any of the one or more primary video streams may be shown in respective tiles on a display. In yet other embodiments, the output of the multi-camera system may include multiple primary video streams for inclusion in respective tiles to be shown on a display. In one example, the output of the multi-camera system may include an overview video stream captured by a first camera, a first primary video stream captured from a second camera and featuring a meeting participant determined to be speaking, and a second primary video stream captured from a third camera and featuring a meeting participant determined to be listening or otherwise reacting to the speaking meeting participant. The overview video stream, the first primary video stream, and the second primary video stream may all be featured simultaneously in different tiles shown on a display. Any number of additional tiles may be included to feature additional primary video streams. Further, a tile layout and or a timing associated with displayed tiles may be varied such that in some cases, a first primary video output stream is shown on the display together with a second primary video output stream, and in other cases the first primary video output stream may be alternatingly shown on the display relative to the second primary video output stream.

As used herein, a tile may refer to a section of a display unit (e.g., a square, rectangle, or other shaped region) in which a video output stream may be displayed. A plurality of video streams may be displayed on a display unit (e.g., tablet, mobile device, television), where each video stream is included in a respective tile, and the collection of tiles may form a gallery view. As used herein, a gallery view may pertain to the simultaneous display of a plurality of video streams and/or system outputs on a display unit. As an example, a first primary video stream and a second primary video stream may be shown in respective tiles on a display. In another example, a first primary video stream, a second primary video stream, and an overview stream may be shown in respective tiles on a display. In some embodiments, a primary video stream may be generated for each meeting participant in a meeting environment, and the generated primary video streams may be shown in respective tiles on a display (e.g., showing each meeting participant in a tile on the display).

As noted, the timing used to show various video outputs may be varied. In some examples, the output of a multi-camera system may be alternated between a first primary video stream and a second primary video stream. Alternatively, the output of the multi-camera system may include a plurality of video outputs (e.g., one or more overview video outputs and one or more primary video outputs), and the particular outputs selected for showing on a display may be varied (e.g., alternated from one to another). It is contemplated that an output of the system (or video output selection) may be alternated between a first primary video stream and a second primary video stream, between a first primary video stream and any of a second, third, or other primary video stream, between a first primary video stream and an overview video stream, or any other combination of video outputs.

The alternation between the primary video stream and the alternative primary video stream may include any suitable type of transition. In some examples, the transition between video stream outputs may include a hard cut transition or a smooth transition. A hard cut transition may include an immediate (or near immediate) transition from a first video stream to a second video stream. The hard cut transition may involve little to no smoothing between video signals. A smooth transition may include processing to blend, fade, etc. from one video stream to another video stream. In some cases, the smooth transition may involve a non-liner transition (e.g., a transition where the associated frame changes occur slowly at first and accelerate from a frame associated with a first video stream to a frame associated with a second video stream). In some embodiments, the alternation between the primary video stream and the alternative primary video stream may be based on whether the common meeting participant or the another common meeting participant is determined to be speaking (e.g., speaker shot) or listening (e.g., listener shot). That is, the transition from one video stream to another may be based on a determination that a first meeting participant has started speaking (which may be used to initiate a transition to a video output feature the first meeting participant) and/or based on a determination that a second meeting participant has stopped speaking.

The disclosed embodiments may also make use of "over the shoulder" shots. Such shots may be shown in a primary video stream including a representation of a face of a first meeting participant together with a representation of at least a portion of a back of a head of a second meeting participant. Such a shot may be used a contrast from other multi-participant shots, such as the shot of FIG. 7B in which a primary video stream may include a representation of a face of both a first meeting participant and a representation of at least a face of a second meeting participant. While the over the shoulder shot may not show a face of the second participant (or at least not a significant portion of the face), this type of shot can convey a significant amount of information to a viewer. For example, the over the shoulder shot may represent an interaction between two participants engaged in a direct dialogue (and may convey to the viewer precisely who is involved in the conversation), may indicate a reaction by the listener (the second participant) to the speaker (the first participant), and/or may convey other information associated with body language of the participants.

In other examples, a primary video stream may include a group shot where multiple meeting participants are featured together in a single frame. In some cases, two or more of the participants may be facing one another to form an over the shoulder arrangement, while one or more additional participants may be facing in a common direction with other meeting participants. In some examples, a primary video stream may include representations of faces of each of three different common meeting participants (e.g., primary video stream 700 in FIG. 7A).

Figure 8:
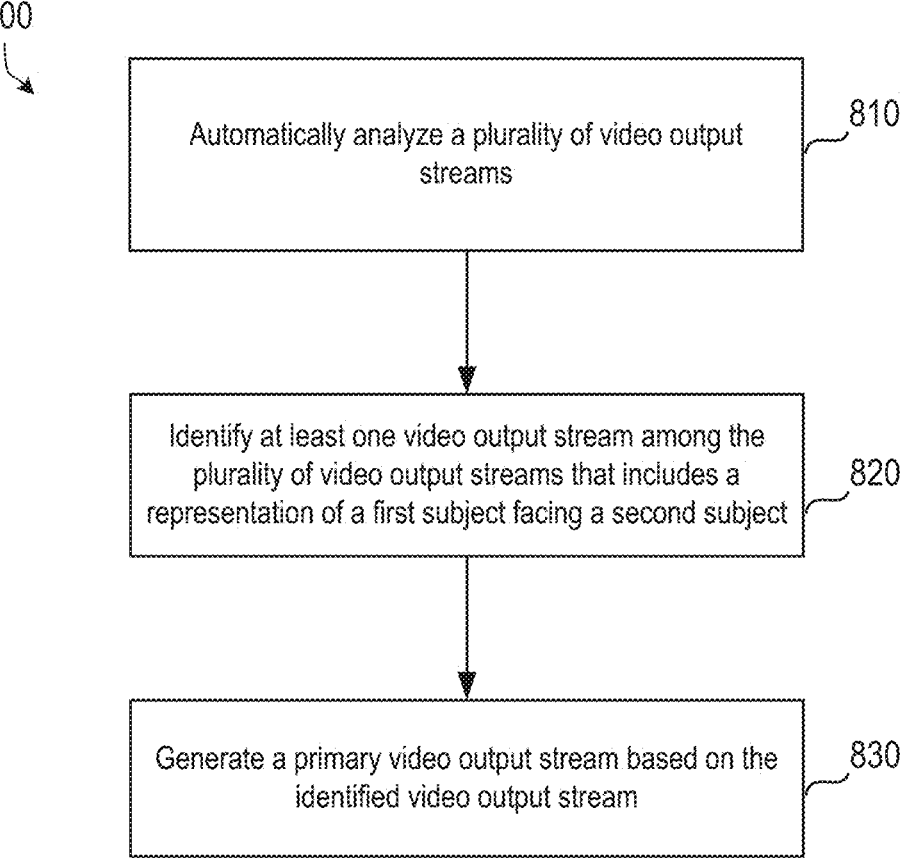
FIG. 8 is a flowchart of another example method of analyzing a plurality of video output streams and generating a primary video stream, consistent with some embodiments of the present disclosure.

FIG. 8 is a flowchart of another example method 800 of analyzing a plurality of video output streams and generating a primary video stream, consistent with some embodiments of the present disclosure. In some embodiments, a video processing unit may be configured to perform method 800.

As shown in step 810 of FIG. 8, method 800 may include automatically analyzing a plurality of video output streams. For example, a video processing unit may be configured to automatically analyze a plurality of video output streams received from the plurality of cameras. Each of the plurality of cameras of the multi-camera system may be configured to generate a video output stream representative of a meeting environment.

As shown in step 820 of FIG. 8, method 800 may further include identifying at least one video output stream among the plurality of video output streams that includes a representation of a first subject facing a second subject. For example, a video processing unit may be configured to, based on the analysis, identify at least one video output stream among the plurality of video output streams that includes a representation of a first subject facing a second subject. In some embodiments, the first subject may be an active speaker or presenter. Additionally, or alternatively, in some embodiments, the face of the first subject may be visible in the identified video output stream. Furthermore, in some embodiments, at least a portion of a back of a shoulder of the second subject may be visible in the identified video output stream. As used herein, an active speaker or speaker may pertain to a subject or meeting participant that is speaking at the time of identification.

As shown in step 830 of FIG. 8, method 800 may include generating a primary video output stream based on the identified video output stream. For example, a video processing unit may be configured to generate a primary video stream based on the identified video output stream. In some embodiments, the primary video stream may include a framed composition including representations of at least the face of the first subject and the at least the portion of the back of the shoulder of the second subject. As used herein, a framed composition may include a subframe of a video output stream that may include more than one subject, meeting participant, or object. In some embodiments, at least a portion of the back of the head of the second subject may also be visible in the identified video output stream.

Figure 9:
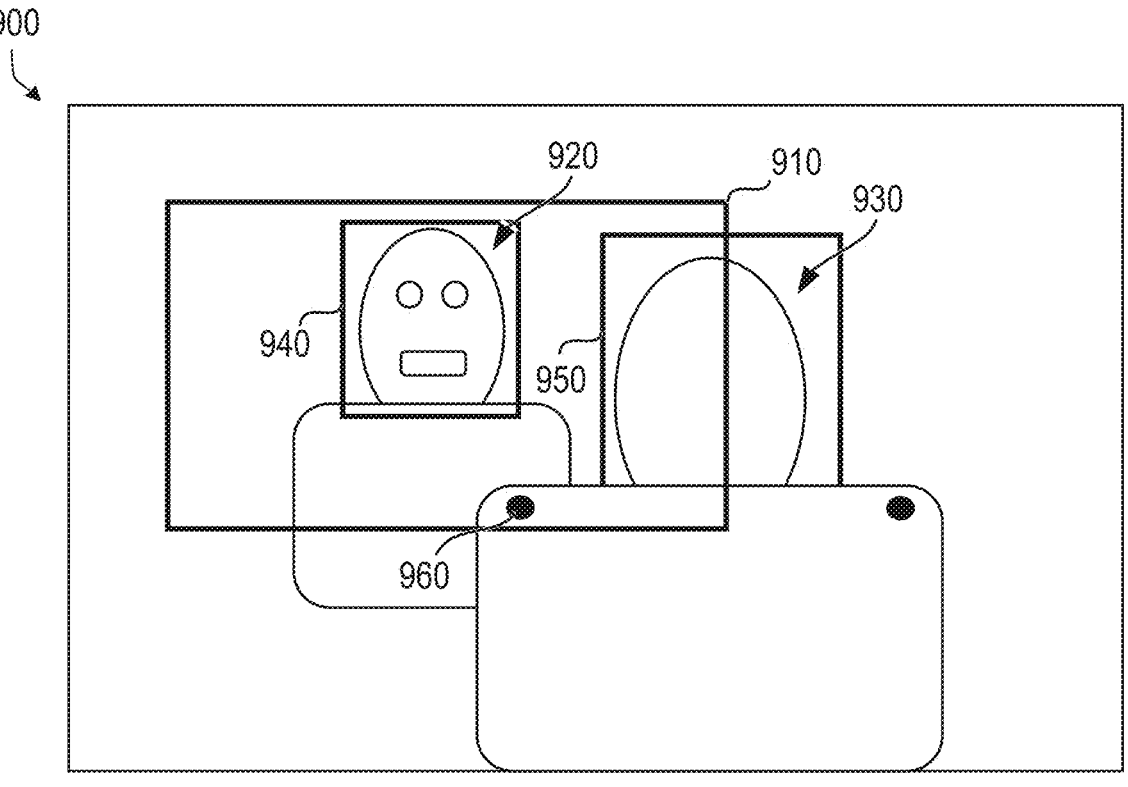
FIG. 9 is an example of a framed composition in an identified video output stream, consistent with some embodiments of the present disclosure.

FIG. 9 is an example of a framed composition 910 in an identified video output stream 900, consistent with some embodiments of the present disclosure. Composition 910 is representative of an over the shoulder shot as described above. For example, framed composition 910 may include a representation of the face of first subject 920 and a portion of the back of the shoulder of second subject 930. Furthermore, as shown in FIG. 9, framed composition 910 may optionally include a representation of a portion of the back of the head of second subject 930. In some embodiments, framed composition 910 may be included in the primary video stream.

In some embodiments the framed composition may be determined based on one or more of a head box, head pose, or shoulder location. As used herein, a head box may refer to a frame or box identifying the head of a subject. Referring to FIG. 9, head boxes 940, 950 of subjects 920, 930 are shown. Additionally, or alternatively, as shown in FIG. 9, a shoulder location 960 of second subject 930 may be used in determining a framed composition 910 associated with an over the shoulder shot.

As noted in the sections above, identification of a video output stream to be featured on a display may be determined based on an evaluation of a plurality of output streams from a plurality of cameras. At least a portion of the plurality of output streams (e.g., two or more of the output streams) may include representations of a first meeting participant. The identified video stream may be selected based on one or more predetermined criteria (e.g., shot selection criteria). Predetermined criteria may include—but are not limited to—a looking direction of the first meeting participant as represented in the plurality of output streams and/or a face visibility score associated with the first meeting participant as represented in the plurality of output streams, etc. Referring to FIG. 9, first subject 920 may be determined to be looking at second subject 930. This may be indicative of a dialogue or conversation taking place between first subject 920 and second subject 930. Furthermore, the representation of first subject 920 in identified output stream 900 may include a face visibility score of 93%, and the representation of second subject 930 in identified output stream 900 may include a face visibility score of 1%. This may indicate that first subject 920 and second subject 930 are facing each other, and that output stream 900 can be used to capture dialogue or a conversation between first subject 920 and second subject 930.

Figure 10:
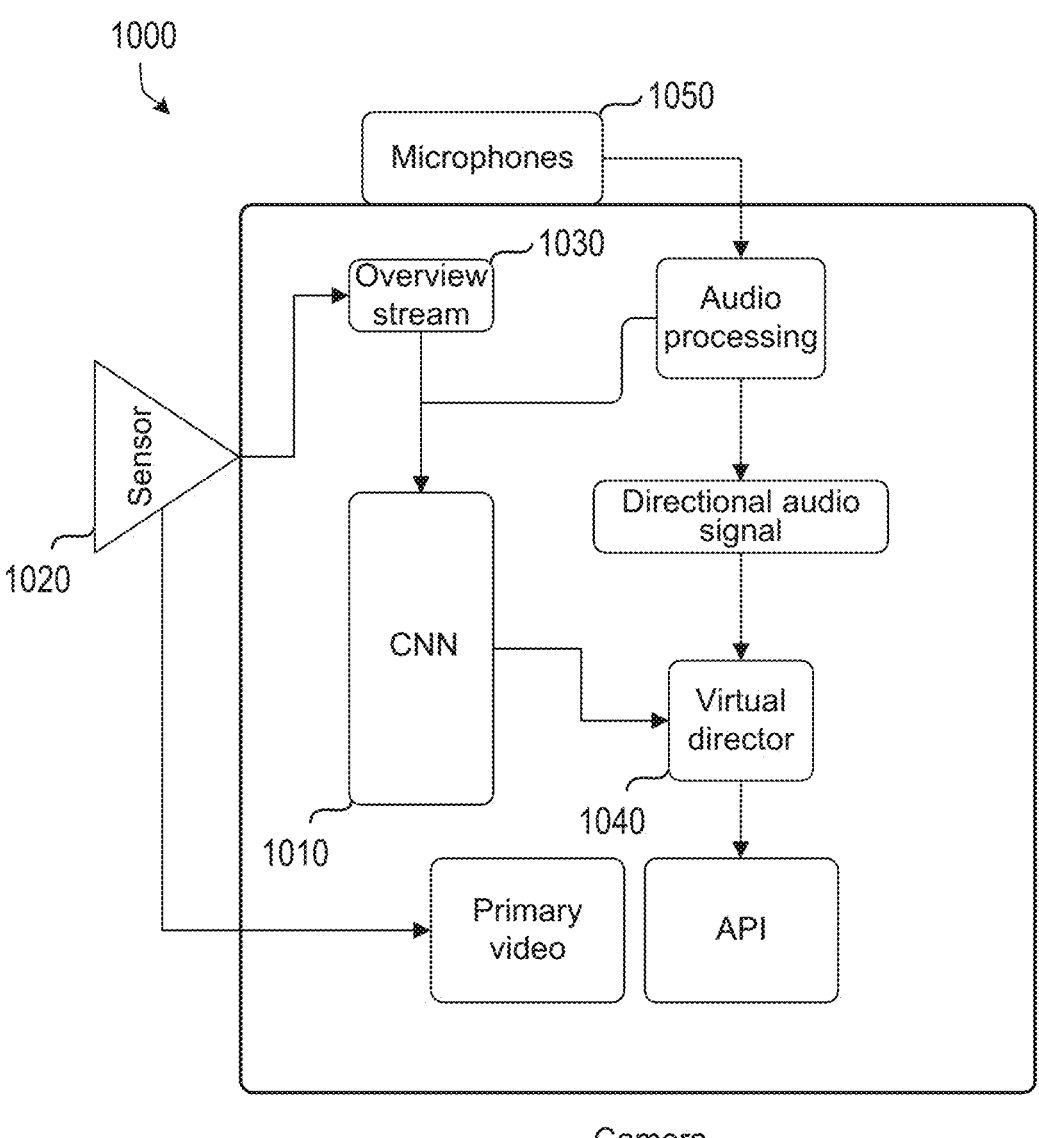
FIG. 10 is a diagrammatic representation of a camera including a video processing unit, consistent with some embodiments of the present disclosure.

FIG. 10 is a diagrammatic representation of a camera 1000 including a video processing unit 1010 (e.g., a virtual director unit). As shown in FIG. 10, a video processing unit 1010 may process the video data from a sensor 1020. Furthermore, video processing unit 1010 may split video streams, or video data, into two streams. These streams may include an overview stream 1030 and an enhanced and zoomed video stream (not shown). Using specialized hardware and software, the camera 1000 may detect the location of meeting participants using a wide-angle lens (not shown) and/or high-resolution sensor, such as sensor 1020. Furthermore, in some embodiments, camera 1000 may determine—based on head direction(s) of meeting participants—who is speaking, detect facial expressions, and determine where attention is centered based on head direction(s). This information may be transmitted to a virtual direction 1040, and the virtual director 1040 may determine an appropriate video settings selection for video stream(s).

Figure 11:
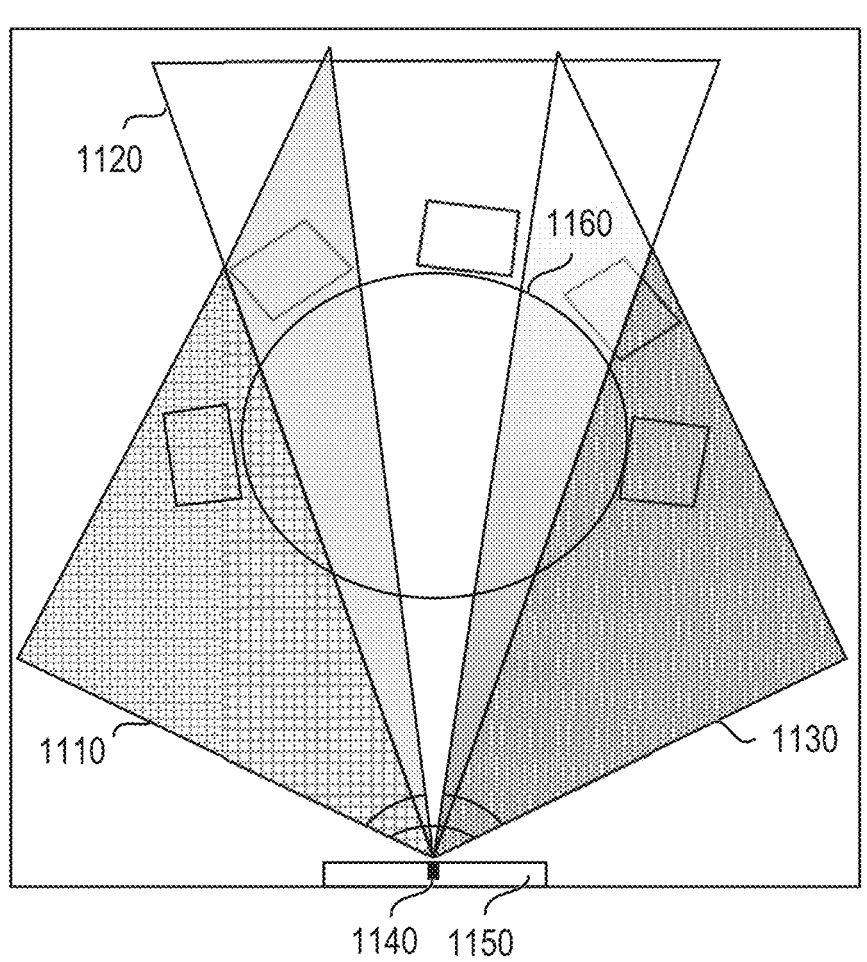
FIG. 11 is a diagrammatic representation of zones in a meeting environment, consistent with some embodiments of the present disclosure.

FIG. 11 is a diagrammatic representation of zones 1110, 1120, 1130 in a meeting environment 1100. As shown in FIG. 11, in some embodiments, a camera 1140 may be located on top of or below a monitor or screen 1150. In some embodiments, camera 1140 may be located at a short end of a table, such as table 1160. Meeting environment 1100 may be divided into zones 1110, 1120, 1130 by camera 1140. In some embodiments, camera 1140 may use zones 1110, 1120, 1130 to determine locations of meeting participants.

In some embodiments, a video camera, or camera with a field of view lens wide enough to capture an entire space of a meeting environment may be provided. The video camera may be equipped with machine learning technology (e.g., learning models/algorithms, trained networks, etc.). The machine learning technology may enable the camera to determine where within the field of view of the camera people are located, who is speaking, who is listening, and in what directions the heads of the people in view of the camera are pointed. The camera may use an algorithm adapted to include a flexible image pipeline to capture the relevant views from the room.

For example, the output of the algorithm may identify a part of the camera's field of view recommended to be shown in a video client. In response, the camera may change video streams or content provided via the host stream. The desired view of the host video stream may be managed by the virtual director, or any other software component.

Such an operation may be used in single or multi-camera systems. In multi-camera systems, for example, the cameras may communicate with each other via defined application program interfaces (APIs) provided over an internal network bus. In some embodiments of the system, the communication may include information about the status of a camera, what the camera currently detects, audio/video streams, potential framings from the virtual director, and camera settings.

In some embodiments, such as when cameras are placed in smaller meeting environments, each camera may have a field of view of approximately 150 degrees field of view. In other embodiments, such as when cameras are placed in larger meeting environments, each camera may have a field of view of approximately 90 degrees field of view. It is contemplated that cameras with a field of view of approximately 150 degrees may be used in larger meeting environments, and cameras with a field of view of approximately 90 degrees may be used in smaller meeting environments. It is further contemplated that any combination of cameras with different fields of view may be used in any meeting environments. Furthermore, cameras with any field of view may be used, and are not limited to the examples provided herein.

In some embodiments, each camera may include an optical lens with an appropriate field of view and a high-resolution image sensor, allowing the camera to zoom in without losing perceived resolution. The cameras may have the ability to process video data from their sensors and, in some embodiments, split the video data into two or more streams. These streams may include one stream that is zoomed out (e.g., overview stream) and at least one other stream that provides an enhanced and zoomed video stream (e.g., primary stream).

Figure 12:
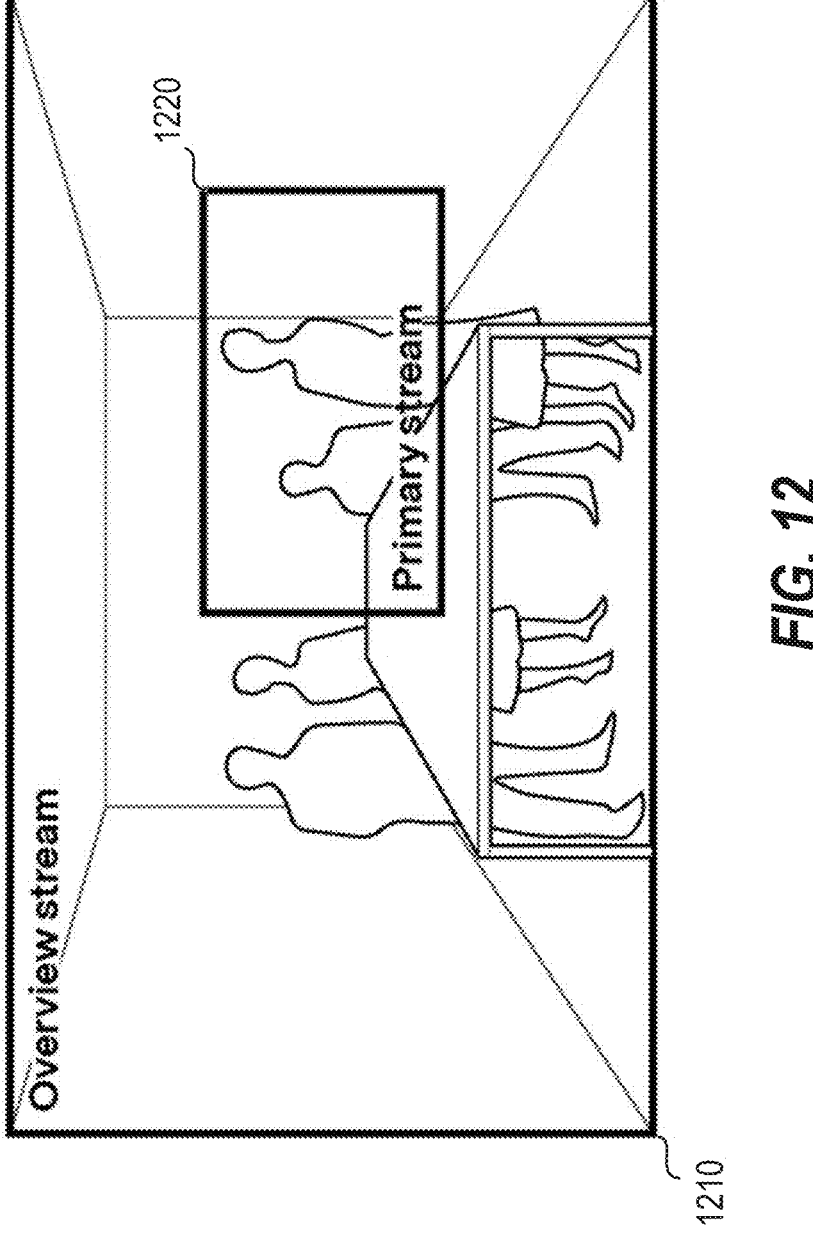
FIG. 12 is an illustration of an overview stream and primary stream, consistent with some embodiments of the present disclosure.

FIG. 12 is an illustration of an overview stream 1210 and primary stream 1220. As shown in FIG. 12, each smart camera in the system may include two video streams internally: one high-resolution stream (e.g., primary stream 1220) where video settings may be applied to zoom and change other video stream properties; and a secondary stream (e.g., overview stream 1210) that captures the entire scene and is consumed by the vision pipelines.

Figure 13:
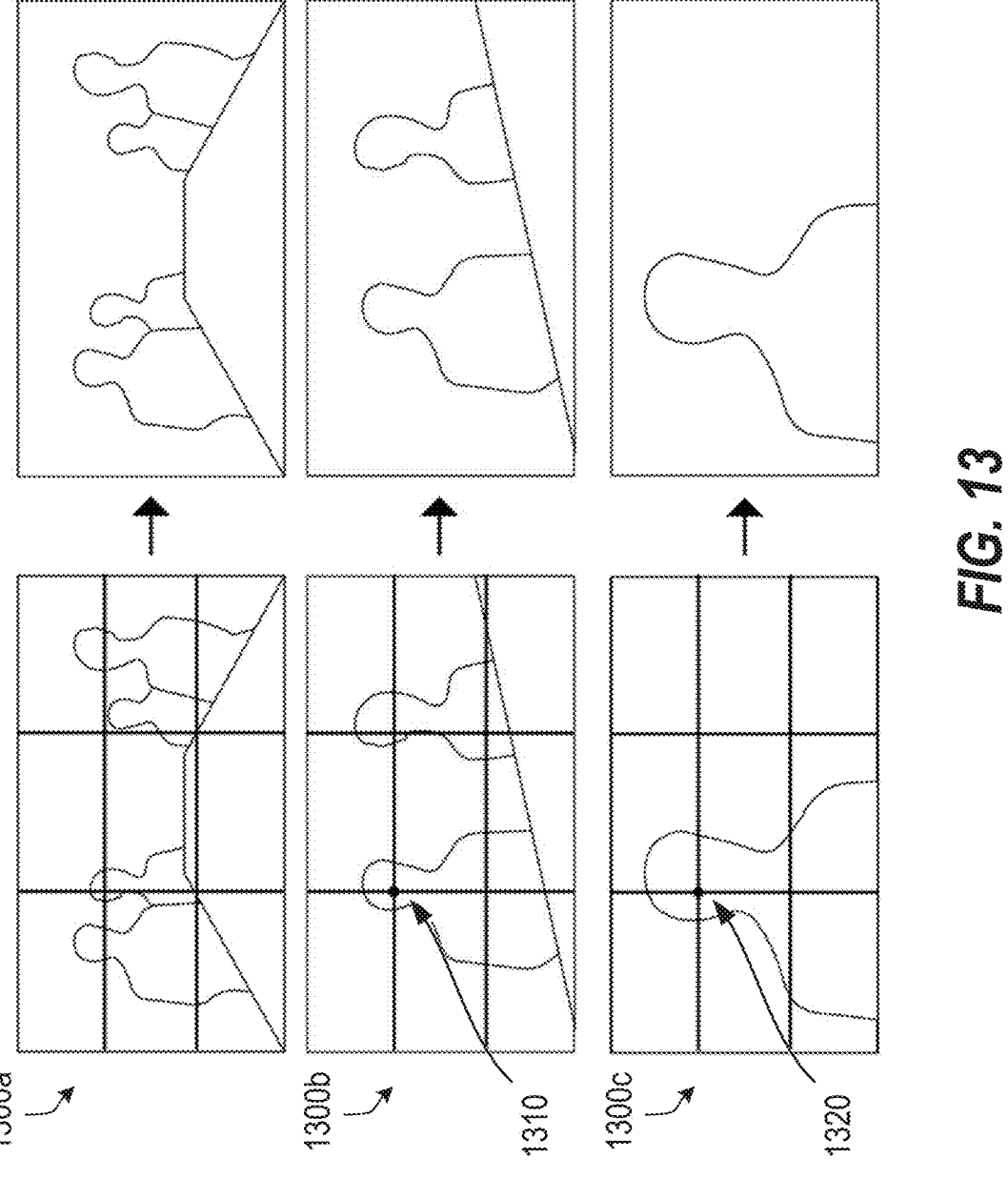
FIG. 13 illustrates an example of a golden rule, consistent with some embodiments of the present disclosure.

FIG. 13 illustrates an example of a rule-based approach to shot determination. As shown in FIG. 13, the eyes 1310, 1320 of one or more persons may be aligned in the top one-third of an image 1300a, 1300b, 1300c.

Embodiments of the present disclosure may include multi-camera systems, and the multi-camera systems may include any suitable number of cameras. In some embodiments, a single camera may be provided. The single camera may be configured to generate an overview video stream representative of a region of an environment. Based on analysis of this overview stream, one or more primary video streams may be generated relative to the overview stream. For example, individual participants, objects, etc. may be detected in the overview stream, and based on those detections one or more primary video streams may be generated, each featuring at least one of the detected participants, objects, etc. The primary video streams may each represent a subset of the overview video stream. Additionally, or alternatively, the primary video streams may have different camera characteristics relative to the overview video stream. For example, each primary video stream may have a pan value, tilt value, and/or zoom value different from pan, tilt, and/or zoom values associated with the overview video stream. A final video display layout may include any combination of the primary video streams (one or more), optionally together with the overview video stream, each featured in a separate tile of the layout. The primary/overview video streams shown in each tile, the number of tiles in the layout, the size of the tiles in the layout, and the orientation of tiles in the layout may be controlled based on analysis of the overview video stream (e.g., using any of the techniques described above).

Disclosed embodiments may include a plurality of cameras. Each of the cameras may generate a corresponding overview video. Similar to the technique described above for the single camera system, in some embodiments, primary video streams may be generated as subsets of overview video streams supplied by any of the plurality of cameras. One or more of these primary video streams may be shown on a display, optionally together with the overview video stream of one or more of the plurality of cameras. For example, the primary video stream(s) and, optionally the overview video stream(s), may be shown in respective tiles of a video tile layout shown on the display. The primary/overview video streams shown in each tile, the number of tiles in the layout, the size of the tiles in the layout, the orientation of tiles in the layout, etc. may be controlled based on analysis of the overview video stream (e.g., using any of the techniques described above).

Moreover, as each camera may be associated with a different field of view, perspective, etc., the multi-camera system may offer more options for primary video streams featuring a particular subject. For example, in a single camera embodiment, in some cases, a subject may be represented in the overview video stream from the side (e.g., side profile). In turn, a primary video stream derived from the overview video stream and featuring the subject (in the single camera case) may also represent the subject from the side or front profile. In the multi-camera embodiment, however, there may be possibility that the subject is captured by more than one camera and, therefore, represented in the overview streams of more than one camera. Based on analysis of one or more of the overview video streams, the system may determine that the subject should be featured in a primary video stream shown in a tile of a video tile layout. Rather than generating the primary video stream based on the sole overview video stream (as in the single camera case), in the multi-camera case, there may be multiple options for generating the primary video stream featuring the particular subject. In some cases, the primary video stream may be derived from an overview video stream in which the subject may be represented as facing toward the camera. In other cases, the primary video stream may be derived from an overview video stream in which the subject is represented as not facing toward the camera, but rather turned to one side or the other. In other embodiments, the primary video stream may be derived from an overview video stream in which the subject is represented as facing away from the camera. Non-limiting examples of criteria for selecting the originating overview video stream may include whether the subject is presenting to an audience, whether the subject is interacting with an active meeting participant, and whether the primary video stream should exclude or include other participants.

Notably, in a multi-camera system, there may also be an ability to actively control one or more of the cameras to acquire source video streams designed to provide desired primary video streams. For example, based on the overview video stream of one or more of the cameras, a particular subject may be identified for featuring in at least one primary video stream. Rather than deriving the primary video stream representing the subject from an overview video stream, however, one or more of the plurality of cameras included in the multi-camera system may be actively controlled to capture a desired shot of the subject. This may include zooming in on the subject using a camera facing the front of the subject, or panning or tilting a camera toward the subject. In this way, the cameras included in the multi-camera system may operate in an overview video mode, in a primary video mode, or in the overview video mode during some time periods and in the primary video mode during other time periods.

Furthermore, disclosed systems and methods may provide several types of video output. In some embodiments, systems may provide a multi-stream, tiled video layout for showing on a display. Additionally, or alternatively, systems may provide multiple video streams (e.g., one or more overview video streams, one or more primary video streams, layout steams etc.) as output. In such a case, another system (e.g., a server, Web-based system, cloud-based system, MS Teams, Zoom, Google Meet, WebEx, etc.) may receive the video streams output like speaker, presenter, overview, person, group, gesture streams and/or layout (like Gallery view) and adaptive layout streams from disclosed embodiments and show some or all of the video streams on a display according to shot selection criteria, for example, specific to the system's platform. Furthermore, in cooperation with other systems (e.g., Microsoft, Google), it can be further ensured that the layouts or streams output to said systems will be shown properly without being cropped and having enough space of the display.

The virtual director unit may take in machine learning (ML) vision/audio and information regarding previous events to decide which image or part of an image (from one or more cameras) should be placed in a composed video stream-whether that includes a composite video (tiled layout) or a multi-stream video output. In some embodiments, the virtual director unit decides on the layout format based on earlier detected events. Some potential benefits of this system may include the use of display real estate in the video stream to better show participants to bring far end participants closer to the meeting (e.g., to blur the border between meeting room and far end participants).

Disclosed embodiments may operate relative to a variety of different environments and settings. Such environments and settings may include, for example, classrooms, boardrooms, meeting spaces, conference rooms, home offices, or any other environment from which a fixed or mobile camera can be used to capture an image of an individual or object.

Referring to FIG. 10, camera 1000 may be equipped with a directional microphone array 1050 that may capture audio signals from different locations and/or directions relative to the camera. By using the signals from different microphones within microphone array 1050, camera 1000 may determine the angle or direction a voice is coming from (e.g., direction of audio/direction of arrival, or DOA). Additionally, in some embodiments, based on input from the microphone array 1050, camera 100 may be equipped with systems for distinguishing between situations where someone is speaking and other situations where there is silence. This information may be communicated to a convolutional neural network (CNN) pipeline 1010 and the virtual director 1040.

Camera 1000 may include one or more hardware accelerated programmable convolutional neural networks, such as CNN pipeline 1010. In some embodiments, CNN pipeline 1010 may implement one or more machine learning models that may use the overview stream as an input to allow the associated hardware to provide information about people, such as meeting participants, that are in view of the camera. The CNN pipeline 1010 may look at the overview stream 1030 and detect where in the view of the camera 1000 people are detected. It may also provide information about people in view of the camera 1000 such as—but not limited to—whether they are speaking or not, facial expressions, how much of the person is visible, and a head pose. It may also track each person over time, to determine where each person was previously in the field of view and if they are in motion. The advantage of using CNN pipeline 1010 and machine learning to detect people in the overview stream 1030 may include that the machine learning model running on CNN can be trained to not be biased on parameters such as—but not limited to—gender, age and race. In some embodiments, the CNN pipeline 1010 may also be able to understand a partial view of a person and people viewed from different angles (e.g., from behind). This may create a robust video conferencing experience. CNN hardware may run these detections multiple times in one second, allowing the camera 1000 to react to changes in view of the camera 1000 at an appropriate time.

In some embodiments of the system, the audio signals from microphone array 1050 may be aggregated and processed by the CNN pipeline 1010, and the CNN pipeline 1010 may distinguish between voices during a meeting in a meeting environment. Based on this distinguishing, the CNN pipeline 1010 can combine voice characteristics classification with other information, such as the angle, where in the room the person is, and/or other related detections. Voices that do not belong to any meeting participant may be classified as artificial sound sources, such as loudspeakers.

Virtual director 1040 may be a software component that takes input from the CNN pipeline 1010 and determines which area of the camera view that should be shown to the host (e.g., host computer 140). In some embodiments, virtual director 1040 may create an automated experience that resembles that of television (TV) talk show production. Virtual director 1040 may use rules similar to those of TV productions and adapt said rules for interactive video calls and/or to select a framing option to be applied to the camera stream that will be relayed to the host stream.

The virtual director 1040 may perform its functions by evaluating possible framing angles in the room and by monitoring ongoing events and event history associated with the room. For example, for each participant, the virtual director 1040 may evaluate different crops of the image (e.g., frames) including the person to find a preferred frame for a particular situation. The properties that may be evaluated may include: whether a person is speaking, the duration of time a person has been speaking or has spoken, where a person is looking, how much of a person is visible in the frame, the reactions and body language the person is showing, and/or what other persons are visible in the frame. The person visible in the frame may be placed in a framed composition that is natural regarding a direction of attention, a golden rule for viewer comfort, and nearby people, to avoid unflattering, unnatural, or cluttered frames. Based on this evaluation, a frame may be selected when something changes in the meeting environment, or based on previous events in the meeting environment. Examples of such changes include, but are not limited to: a second person begins to speak, someone moves, someone stands up, someone changes the direction they are looking in (e.g., change in looking direction), someone has a reaction, someone shows an object, and/or someone has spoken for a long time, among other detected events. In some embodiments, a person speaking for an extended period of time may suggest a lack of reactions.

Virtual director 1040 may determine the video settings needed to change the camera's primary stream to the selected frame, and then apply the video settings to the selected camera's primary stream. In some embodiments, additional input may be provided to the virtual director unit by smart sensors, such as placement and movement of meeting participants in the meeting environment, the number of meeting participants in the meeting environment, physiological properties of the meeting participants in the meeting environment, and other physical properties of the meeting environment.

The frame applied with the video settings may be selected from the full wide-angle field of view image that each camera captures. This may be based on principles from TV production. In some embodiments, the system may operate with different shot types such as, but not limited to, close shot (e.g., framing a person's head and shoulders), medium shot (e.g., framing one or more persons, showing their upper body), and a total shot (e.g., showing one or more person fully, or showing a table in its entirety). Each frame may be positioned based on photographic principles, where a person may be placed according to a golden rule that includes leaving one-third space from the center of their head to the top of the image, leaving space horizontally in the direction they are looking, and leaving space around the subject in the frame. It is contemplated that parameters may be adjusted in the system.

In some embodiments, the virtual director 1040 may start with showing a fully zoomed out frame to create an understanding of the context, the meeting environment (e.g., room) and the visual relationship between meeting participants (e.g., people) in the room. After a predefined time, virtual director 1040 may switch to the zone (e.g., zone 1110, 1120, 1130) with the best view where a group of meeting participants in the room can be seen. In some embodiments, the zone with the best view may be on the left and/or right side of a table (e.g., table 1160). Virtual director 1040 may continue to frame the person who is speaking. If the speaking person talks for longer than a predetermined time, virtual director 1040 may switch to framing other people in the room that are listening. If no one is speaking or the virtual director 1040 determines that the voice is coming from an artificial sound source (e.g., a loudspeaker), virtual director 1040 may switch to framing everyone in the room.

Other embodiments of the system may use more of the information detected by cameras to frame other activities. For example, when a meeting participant holds up or otherwise interacts with an object, the camera may switch to framing both the person and object. The object may be, for example, a whiteboard, such as an interactive or smart whiteboard. The interaction between the meeting participant and the object may include the participant touching the object, holding the object, writing or drawing on the object, gesturing relative to the object (e.g. pointing towards the object), looking towards the object, or any other form of interaction with an object. The video processing unit may, in such circumstances, generate and output a focus video stream to be shown on a display that includes representations of both the meeting participant and the object. The focus video stream may include or feature at least a partial representation of the meeting participant (e.g. a head and upper body shot) and a complete representation of the object, for example a representation of the whole of the visible whiteboard. In other words, the focus video stream may be framed to include a cropped or uncropped representation of the meeting participant, and an uncropped representation of the object, such that no portion of the object that is visible to, or within the field of view of, the camera is excluded from the focus stream. In some embodiments, the video processing unit may identify a portion of an object with which the meeting participant interacts. For example, the video processing unit may identify a portion of a whiteboard that the meeting participant is drawing or writing on. In such cases, the portion of the object is treated as the "object", as described above. Thus, when a meeting participant is determined by the video processing unit to be drawing or writing on only a portion of a whiteboard, the focus video output stream may feature a representation of the meeting participant and the portion of the whiteboard with which the meeting participant is interacting, optionally excluding those portions of the whiteboard that the meeting participant is not interacting with. When more than one person gazes in the same direction, the system may change to frame the persons that are looking and or switch to the person they are looking at, using framing principles described above.

Virtual director 1040 may switch between frames at a rhythm to maintain engagement of far end participants (e.g., people watching the video stream from the host computer 140), where active speakers and content will get more time than listeners. Live TV production can switch rapidly with frames lasting less than a second, but for an interactive video call each frame may be required to last longer than what is common practice in TV productions to allow opportunities for far end participants to speak.

Figure 14:
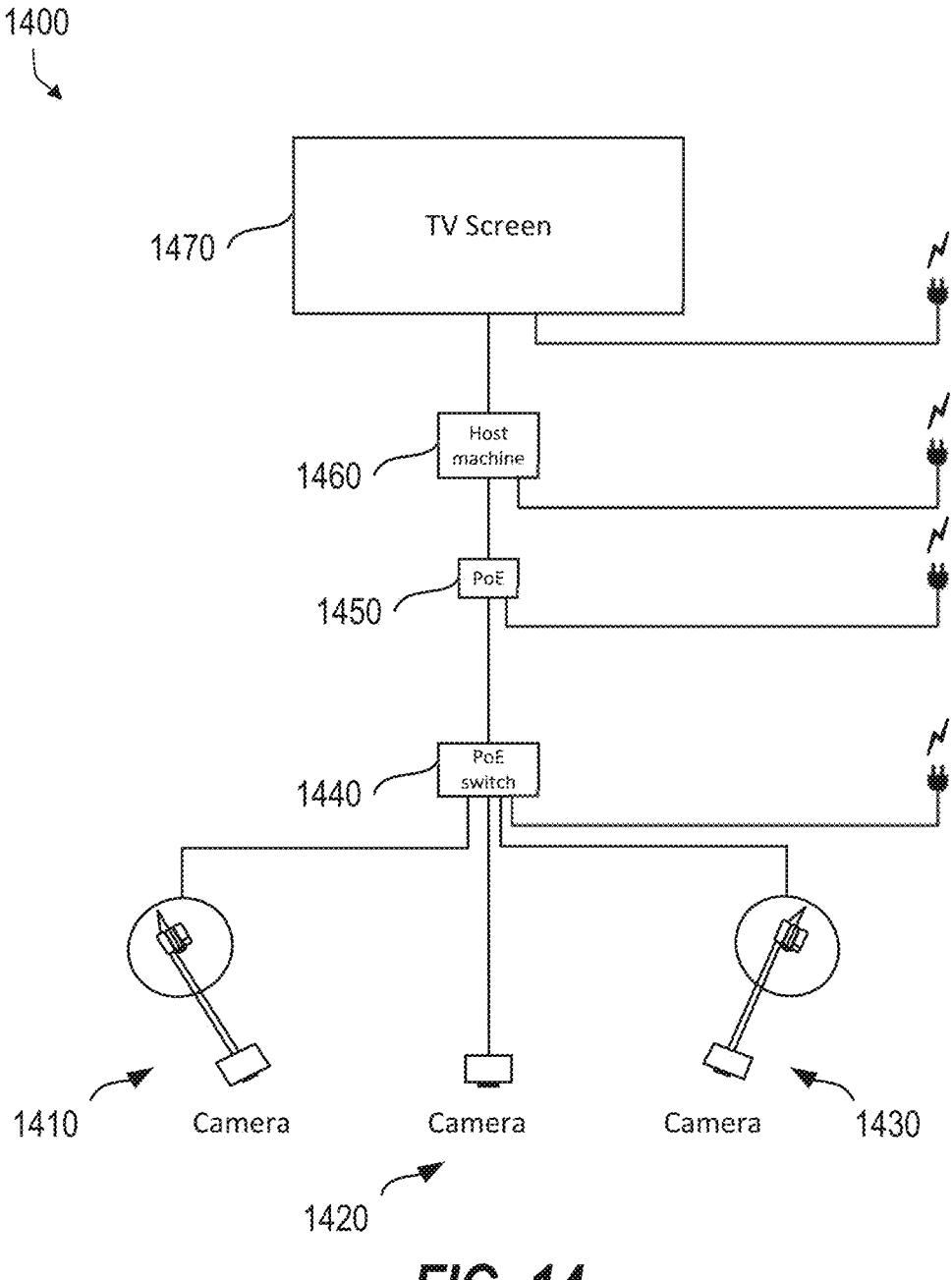
FIG. 14 is a diagrammatic representation of components and connections of an example multi-camera system, consistent with some embodiments of the present disclosure.

FIG. 14 is a diagrammatic representation of components and connections of an example multi-camera system 1400 in a video conferencing environment. As shown in FIG. 14, a multi-camera system may include a plurality of cameras 1410, 1420, 1430 connected to a power-over-ethernet (PoE) switch 1440. PoE switch 1440 may be connected to PoE 1450, which may be connected to host machine 1460. Host machine 1460 may be connected to a display, such as TV screen 1470. Connections between components of multi-camera system 1400 are not limited to what is shown in FIG. 14 and may include, for example, wired connections, wireless connections, or any combination thereof.

In some embodiments, a plurality of smart cameras that can understand the dynamics of the meeting room participants using artificial intelligence (AI) and that can work together to provide an engaging experience to far end participants based on knowledge about how many people are in the room, who is speaking, who is listening, and where attendees are focusing their attention may be provided. This may make it easier to pick up social cues and increase engagement.

In some embodiments, one or more smart sensors, such as a wide field of view camera that can see the whole room with dedicated hardware to run a vision pipeline that can detect what is happening in the room, may be connected together and sense what is happening in the room. This information may be provided to a software component that evaluates the provided information from the room and makes a decision on the best camera angle and frame to show from the room. The virtual director unit may control the main video stream that is consumed by the connected host computer, this information may also be available through an application programming interface (API) that can be used to adjust the system.

Referring to FIG. 14, the cameras 1410, 1420, 1430 in the multi-camera system 1440 may be connected together via ethernet through a PoE switch 1440 and the cameras 1410, 1420, 1430 may be able to communicate with each other. In some embodiments, the system 1400 may be connected to a host machine 1460 (e.g., computer, mobile device) that consumes the video stream (e.g., host stream) created by the camera system 1400. The video stream may be consumed by a video application on host machine 1460.

Host machine 1460 may consume multiple streams, and each stream of the multiple streams may frame a particular meeting participant of the meeting participants in a meeting environment. If content cameras are connected, the content may also be displayed in a dedicated stream when the content is determined to be relevant. This may allow the video clients to mix video streams into their layout, allowing (for example) one square (or tile) per person, that shows the most interesting shot and camera angle of that person.

In some embodiments, main camera 1420 may be directly connected to a network that is attached to the Internet. Main camera 1420 may detect that it has access to the Internet, and establish a connection to a cloud service that may relay the video stream to the selected video content analysis (VCA). This may be through a cloud-to-cloud connection where the camera talks to a cloud, and the cloud may relay the video service to the chosen video conferencing provider. In other embodiments, the cloud connection may relay the video stream to a local application running on a connected computer that may present the relayed video as a camera.

The cameras may communicate with each other through messages via defined APIs that may be sent over the internal network bus. These messages may include information about the status of the camera, if the camera is connected, the type of software the camera is running, current health status, etc. It may also communicate what it detects in the image, such as where in the image a person or item is detected, where in the room they are placed, and other information detected by the vision pipeline. Additionally, the messages may communicate the video setting that has been applied to the primary stream, such as image properties, color/brightness, and/or white balance. In some embodiments, the messages may communicate the virtual director unit parameters, which may allow the system to automatically adjust the virtual director unit experience and/or allow users of the system to control/personalize the virtual director unit experience based on their preferences.

The camera may typically have a field of view of approximately 150 degrees field of view in smaller conference rooms and approximately 90 degrees field of view in larger conference rooms. Furthermore, the camera may include an optical lens with an appropriate field of view and a large resolution image sensor, allowing the camera to zoom in on the video without losing perceived resolution. The camera may have the ability to process the video data from the sensor, including splitting the video data into two streams: an overview stream and a primary stream.

In some embodiments, one or more of cameras may have a smaller field of view but the ability to zoom the primary stream up to 10 times (10×). These cameras may be able to frame presenters or participants that are located further away from the camera (e.g., a presenter in a classroom where the camera is placed far away from the board/presenter).

Furthermore, in some embodiments, the system may have a special camera to capture content or whiteboards/walls. This camera may have adapted optics, image processing, and mounting to capture content on a whiteboard/wall as best as possible. Content/object cameras may be smaller and easy to handle, and may be mounted in the ceiling or held by a person, to capture content/objects that the participants in the meeting are working with, holding, or presenting.

A computational device may be attached to the system. The computational device may connect to the ethernet switch and provide additional services to the system. For example, the computational device may have one or more high performance central processing units (CPUs), which may run parts of the vision pipeline of the cameras connected to the system. This may enable the vision pipelines to run faster and do additional tasks.

In some embodiments, smart sensors may be connected to the system (e.g., via wireless of Wi-Fi, or directly to the wired network). Smart sensors may provide additional input to the virtual director unit for decision making. For example, a smart sensor may include a smart phone that provides data input from various sensors, such as movement, position, audio signal, etc. Non-limiting examples of additional input may include other types of room occupation information, such as who booked the room for how long, etc. All these inputs may be provided to the virtual director unit through the API.

In some embodiments, one of the cameras in the system may be selected as the primary camera, and may be responsible for controlling the host stream. The primary camera may consume each camera's primary video streams and relay the selected primary stream to the host stream, based on input from the virtual director unit.

A camera may be equipped with a microphone array that takes in audio from different locations on top of the camera. By using the signal from different microphones, the camera can determine at what angle a voice is coming from (e.g., direction of audio or DOA). Additionally, in some embodiments, the camera or the multi-camera system may be able to distinguish between when someone is speaking, the difference between person A/B, and when there is silence, based on input from the microphones. This information may be communicated to the vision pipeline and the virtual director unit.

Disclosed embodiments may include a vision pipeline. For example, each camera may include one or more hardware accelerated programmable convolutional neural networks with pretrained weight that are able to detect different properties from video and/or audio (e.g., vision pipeline model). In some embodiments, the vision pipeline models may analyze the overview stream and detect where, in the view of the camera, people are. The vision pipeline model(s) may also provide information about people in view of the camera such as—but not limited to—if they are speaking or not, facial expressions, how much of the person is visible, the position of the person, and head pose. The vision pipeline model(s) may also track each person over time to determine where each person was previously in the field of view, if they're in motion or not, and in what direction they're heading.

One advantage that may be realized using convolutional neural networks and machine learning to detect people in the overview stream may include a vision pipeline model that can be trained to not be biased on parameters like gender, age and race, scene, light, and size. This may allow for a robust experience. The vision pipeline hardware can be a CPU or special purpose chip with hardware accelerators for different mathematical operations used in the convolutional neural network architecture in the vision pipeline model(s). This may allow the vision pipeline model(s) to run these detections multiple times within one second, allowing the camera to react to changes in view of the camera at an appropriate time.

Embodiments of the present disclosure may include vision pipeline model training. Vision pipeline models, as discussed above, may operate by taking in an overview image and/or audio signal from a camera and run the overview image and/or audio signal through pre-trained convolutional neural networks (CNNs). The vision pipeline models may be trained by running thousands of images and videos relevant to the scene and the objective of the task. During the training of the vision pipeline model, the model may be evaluated with a loss function that measures how well it can perform the task. The feedback from the loss function may be used to adjust the parameters and weights of the vision pipeline model until it can perform its task satisfactorily. These methods and others may include well known machine learning tools and best practices which may be applied to train convolutional neural networks. The trained vision pipeline models may then be converted from the chosen training tools (such as tensorflow), and optimized for the chipset of the vision pipeline hardware (HW) using the chipset manufacturing conversion tools to utilize hardware (HW) accelerated blocks. The trained vision pipeline may be bundled with the camera software. In some embodiments, the bundled vision pipeline model may be fine-tuned for a specific use case. For example, if the system is to be used in a classroom, the vision pipeline models may be fine-tuned based on a training set with images, audio, and video that represents a classroom scenario.

For some of the vision pipeline models, it may be necessary to adapt the convolutional neural network architecture to fit the hardware chipset of the vision pipeline best. This may be performed by removing or replacing mathematical operations in the vision pipeline convolutional neural network architecture with equivalent mathematical operations supported by the chipset.

Consistent with embodiments of the present disclosure, a camera system comprising at least one camera and a plurality of audio sources is provided. As used herein, an audio source may pertain to a device or mechanism for generating audio output signals representative of sensed sound. For example, an audio source may capture sound or audio signals, which may be stored on a recording medium for preservation and reproduction. Audio sources may alternatively be referred to as audio capture devices, sound sensors or audio sensors. An audio source may comprise one or more microphones configured to convert sensed sound into an audio signal output. Audio sources may be distributed through an environment, such as a meeting environment, to capture sound (in the form of audio signals) from various locations within the environment. For example, audio sources may be placed at particular locations within the meeting environment such that at least one audio source may capture sound originating from any location within the meeting environment. As another example, audio sources may be placed at particular locations within the meeting environment corresponding to locations of participants. In some embodiments, at least one of the audio sources may be continuously capturing sound or audio signals. In other embodiments, at least one of the audio sources may be configured to capture and record sound or audio signals in response to a user input, a detected motion, or a detected proximity of a sound (e.g., a sound that is higher than a decibel threshold).

The video processing unit (or video director unit) may be configured to analyze video from at least one camera from the camera system and aggregate audio signals from the audio sources based on one or more detected features of a meeting participant represented in the video. The detected features may be associated with or indicative of speech. The video processing unit may aggregate the audio signals to generate an aggregated audio output corresponding to the meeting participant, e.g. representing speech by the meeting participant. For example, the video processing unit may analyze video from at least one camera from the camera system and, based on detected mouth movements performed by a meeting participant, aggregate audio signals by featuring (e.g., including in the aggregated audio output) audio signals determined to be associated with speech by the meeting participant and at least partially filtering (e.g., at least partially exclude from the aggregated audio signals) audio signals that are not associated with speech by the meeting participant. Thus, the video processing unit may aggregate and generate audio based on the audio signals associated with speech by the meeting participant, ignoring audio signals that may be associated with environmental noise (e.g., white noise, background discussion/speech, music, the sound of an object moving). In some embodiments, the meeting participant may be a presenter.

As another example, the video processing unit may detect mouth or lip movements performed by a first meeting participant and a second meeting participant in the video. The video processing unit may determine the first meeting participant to be a presenter and the second meeting participant to be a non-presenter. In the aggregation of the audio signals, the video processing unit may accordingly feature audio signals associated with speech by the presenter and at least partially filter, ignore, or exclude audio signals associated with speech by the non-presenter. In some embodiments, the determination of a meeting participant to be a presenter or a non-presenter may be based on one or more of user settings, the location of a meeting participant in a meeting environment (or relative to objects or interest), and the duration of time the meeting participant has spent speaking throughout the meeting (in some embodiments, relative to the duration of time other meeting participants have spent speaking).

Non-limiting examples of detected features include gestures, a head direction, a looking direction, a posture (e.g., whether a meeting participant is standing or sitting), or mouth movements determined to be consistent with corresponding audio signals or any recognizable characteristic of a subject that has a relationship with encountered audio. For example, in some cases, the one or more detected features may include mouth movements of a subject, especially where those mouth movements sync with, or are otherwise consistent with, a received audio signal. Audio signals that sync with or are otherwise consistent with detected mouth movements of a subject may be featured or included in the aggregated audio signal output for that subject, and those that do not may be at least partially filtered or excluded. As another example, the system may detect whether a subject's mouth movements are consistent with a voice audio stream representative of speech. Other detected features may also be relied upon to aggregate audio signals. Such features may include gestures of subjects, audio signatures known to be associated with certain individuals, etc.

In some embodiments, the disclosed systems may include a video processing unit implemented to include one or more microprocessors onboard a camera and/or one or more microprocessors remotely located relative to a camera (e.g., in a server system, cloud-based system, etc.). The video processing unit may be configured to analyze video from at least one camera and aggregate audio signals from a plurality of audio sources (e.g., microphones included on one or more cameras, distributed about an environment, etc.). The aggregation of the audio signals may include selection of certain audio signals to feature and/or filtering of one or more audio signals (e.g., background noise, voices of non-presenters, voices of side conversation participants, voices reproduced via a loudspeaker, etc.). The aggregation of the audio signals may be based on one or more detected features of at least one subject represented in a video captured by a camera.

In some cases, the selection of audio signals for inclusion in the aggregated audio output for a subject from corresponding audio sources may depend on proximity of the subjects to the audio sources. For example, in a conference room setting where each participant can be paired or associated with a nearest audio source, a participant's voice signal may be featured in the aggregated audio when it is received from the nearest audio source to that participant. In other cases, however, audio signals from audio sources more distant relative to a particular participant may be featured in the aggregated audio. For example, where a first participant is speaking in the direction of a second participant, the voice signal of the first participant may be selected for the aggregated audio even if it is received primarily from an audio source nearest to the second participant, but not nearest relative to the first participant. In some embodiments, a machine learning vision/audio pipeline can detect people, object speech, movement, posture, or canvas enhancement, document detection and depth.

In some embodiments, the selection of audio signals for inclusion in the aggregated audio output for a subject from corresponding audio sources may be based on a direction of audio, or direction of arrival associated with the audio signals. The video processing unit may receive directional audio information, e.g. directional audio signals corresponding to different directions relative to the camera (e.g. from a directional microphone array), and may determine which audio signals to include or exclude from the aggregated audio output for a meeting participant based on a determined direction of the meeting participant relative to the camera (e.g. as determined from an analysis of video output from the camera) and a direction of audio/arrival (DOA) associated with each audio signal. For example, the video processing unit may include audio signals that have a DOA that corresponds to, or correlates with, a determined direction or location of a meeting participant, and may at least partially exclude audio signals that have a DOA that does not corresponds to, or correlate with, the determined direction or location of the meeting participant.

One camera system according to the invention, consisting of one or more cameras with an overview video stream that sees the whole FOV from the camera, and one or more microphones. The microphones may be part of the cameras but can also be separate.

In some embodiments, the video processing unit may use audio signals to distinguish voices of various meeting participants in a meeting environment. As discussed above, the audio signals from the microphones may be aggregated and processed by the vision pipeline models. The vision pipeline model(s) may be able to distinguish the voices during the meeting and if they're raising their voice or lowering depending on what happens in the room. In some embodiments, the vision pipeline model(s) may be able to classify what the topic of a conversation is. Based on this, the vision pipeline models may combine voice characteristics classification with other information, such as the angle, where in the room the person is, and other related detections. Voices that do not belong to a person may be classified as artificial sound sources, such as loudspeakers. This information may be provided to the virtual director unit, and the virtual director unit may use this information to select the best shot from the room.

Embodiments of the present disclosure may include features and techniques for identifying and including auxiliary items in a stream. In some embodiments, the vision pipeline models may determine objects of interest in the room. The determination may be based on the input of where the participants are looking, and items that are being held or pointed to. The input may be generated by using vision pipeline models that can determine gestures such as pointing, head postures, object classification, and temporal maps of where people are looking. By knowing where the head is from different angles and by having the head position, the depth may be available. From there, a two-dimensional (2D) overview space may be created to project and find the space where the angles cross (e.g., corresponding to where persons/participants are looking).

In some embodiments, the vision pipeline models may be able to determine that someone is drawing on an auxiliary item such as, but not limited to, a non-digital whiteboard. The determination may be based on the input that someone is standing in front of a non-digital whiteboard. The input may be generated by a vision pipeline model that may determine a person's motion patterns and gestures in front of a non-digital whiteboard.

Embodiments of the present disclosure may implement principles from TV production. For example, the frame applied with the video settings may be selected from the full wide-angle field of view image that each camera captures. This may be based on principles from TV-production.

Disclosed embodiments may include features and techniques for providing adaptive layout and gallery view(s). Disclosed embodiments may include AI-powered features that may create a more engaging and democratic video meeting experience. During operation, the one or more cameras of the system may dynamically adjust projected views based on what they see and/or hear in a room or other environment.

In a static environment, such as video, it may be difficult to interpret non-verbal communication like gestures, body language, and facial expressions. Embodiments of the present disclosure may automatically detect and capture these non-verbal details, and while focusing on the person speaking, these systems may also bring attention to reactions and events in the room. This may provide remote participants with information naturally ascertained as an actual meeting participant (e.g., meeting participant present in the physical meeting environment), but which may be more difficult to receive through traditional video-based solutions. The disclosed systems may employ principles of live TV productions (e.g., different types of camera shots, etc.) that may be used to make the video experience more engaging and inclusive for all meeting participants.

The sections below describe various features, capabilities, and configurations of the disclosed video systems, including, but not limited to: Genius Framing, Speaker Framing, Gallery View, Adaptive Layout Engine, Framing Transitions, and Platform Configurations. Although these features and capabilities are referred to by these terms for convenience and practicality, it should be understood that it is the functionalities and capabilities of these features that is important, and these features and capabilities may be described independently of these terms.

Genius framing may pertain to a framing methodology in which detected subjects can be featured in a video stream (e.g., by actually or effectively zooming in, panning, tilting, etc., to provide a desired shot of a subject of interest). Genius framing may refer to a feature that, among other things, can generate smooth zooming and frame transitions to capture meeting participants or other objects of interest (e.g., a whiteboard, table, etc.) in a room or environment. Machine learning may enable detection of the number of people that are present and where people are located within the room/environment. Genius framing may smoothly zoom in on particular meeting participants and frame them. If people leave the room, or more people enter, the camera may zoom in or out to capture the new group of people.

The disclosed systems may also respond to various types of meeting participants. For example, the systems may feature active participants in one or more video frames. An active participant, or engaged listener, may include any individual engaged in at least one detectable action or displaying at least one characteristic (e.g., detectable through video or audio analysis) indicative of engagement with the meeting or a speaker. Such characteristics may be termed "engaged listener", "engaged participant", "active listener", or "active participant" characteristics. Such actions may include, for example, speaking, moving one or more parts of the body (e.g., mouth movement, hand raising, head nodding or shaking, changes in facial expressions), exhaling, generating non-speech audible sounds, and/or moving into or out of an environment. As described above, the system may also feature non-active participants in one or more video frames. A non-active participant may include any individual not currently engaged in a detectable (or detected) action. Such a non-active participant may be, for example, sitting or standing quietly in an environment without engaging in detectable (or detected) motion, speaking, or sound generation.

Speaker Framing may pertain to a technique in which a detected speaker can be featured in a video stream. For example, upon detection that a person is speaking, that person may be featured in a video frame output for presenting on a display as a framed speaker shot. In some embodiments, Speaker Framing may involve using artificial intelligence to detect a speaker in the environment (or meeting environment). To provide an overview for far end participants and to track reactions in the environment, Speaker Framing may also use overview, group, and listener shots. The overview shot may show all participants in the room, while the listener shot may show the non-verbal reactions of at least one participant in the room that is not currently speaking. A video processing unit (e.g., a virtual director unit) may determine a best possible shot or sequence corresponding to the meeting environment and/or meeting activities. The video processing unit may use artificial intelligence to perform the determination.

In some embodiments, a speaker assigner filter logic may be employed to identify a speaker in a meeting. Factors that are considered may include a determination of the meeting participant that has spoken the most in past iterations (e.g., from the start of the meeting). The filter may consider iterations (or durations of time) with silence and iterations with different speakers from the candidate (potential) speaker. The filter may manage recurrent meeting situations where different participants may participate for short periods of time while the current speaker is talking. In some embodiments, the filter may consider small frames or durations of time in which people stop talking. People often take small breaks when speaking. The filter may recognize these scenarios and determine who the current speaker is based on these scenarios. The speaker filtering may be used in the Layout Engine (discussed further below), and the algorithm may determine what position the speaker is located in the meeting environment.

Gallery View may pertain to an ability of disclosed systems and methods to generate a plurality of video streams for showing together on a display (e.g., in a tiled layout).

Adaptive Layout Engine may pertain to a software-based system component that controls aspects of a Gallery View tiled layout based, for example, on detection of various conditions and/or events associated with a meeting environment.

Framing Transitions may pertain to an ability of disclosed systems and methods to employ various frame transition techniques from one shot to the next. Platform Configurations may pertain to the disclosed systems and methods being implemented as a single camera system, a multi-camera system, a fully integrated onsite video solution, a distributed or cloud-based system, and/or a system that cooperates with and/or generates video output for various video conferencing platforms.

Video shot generation and selection may pertain to different shot types that can be used to make the video experience more engaging. Shot selection may ensure that everyone in the room (e.g., meeting environment) is getting screen time, which can make meetings more inclusive for participants.

Disclosed embodiments may reference 5 types of shots: speaker shots, listening shots, group shots, reaction shots and context shots (e.g., overview shots). Speaker shots may provide a closer view of the speaker, making it easy to follow the conversation. Listening shots may be intended to provide variety and capture the reactions of non-speaking participants. They may ensure that everyone is visually present in the conversation, even when they are not speaking. Using context shots (e.g., overview shots), remote participants may get a complete picture of what is happening in the room. The overview shots may convey information regarding the physical meeting environment, such as movements and reactions of meeting participants and who is entering/leaving the meeting environment, for example. Group shots may provide a view of a group/cluster of meeting participants that are located close together or in close proximity with one another. Reaction shots may provide a closer view of one or more meeting participants displaying a reaction (e.g., smile, nod, frown, or other facial expression or body language) in response to a speaker or event in the meeting environment. In other words, a reaction shot may feature, or may include a framed representation of, a meeting participant determined to be displaying a reaction, which may be either verbal or non-verbal. A context shot (e.g., overview shot) may be shown or displayed when remote participants are speaking or when there is a lot of movement in the room.

In some embodiments, the camera may use directional microphones to determine where sound originates within a room or environment. Machine learning may enable the camera to detect the number of people that are present and where they are located. Combining these two types of data, disclosed embodiments may accurately identify who is speaking and who is listening, and may use this information to provide a video experience that represents all participants in a natural way.

Embodiments of the present disclosure may pertain to speaker framing methodologies. Speaker Framing may be implemented as an AI feature that is aware of what is happening in the room and may dynamically adapt the view based on the understanding of what the camera sees and hears. It may provide a good view of the person speaking while at the same time giving the context needed to feel comfortable participating and being a part of the conversation.

Figures 35A, 35B, 35C:
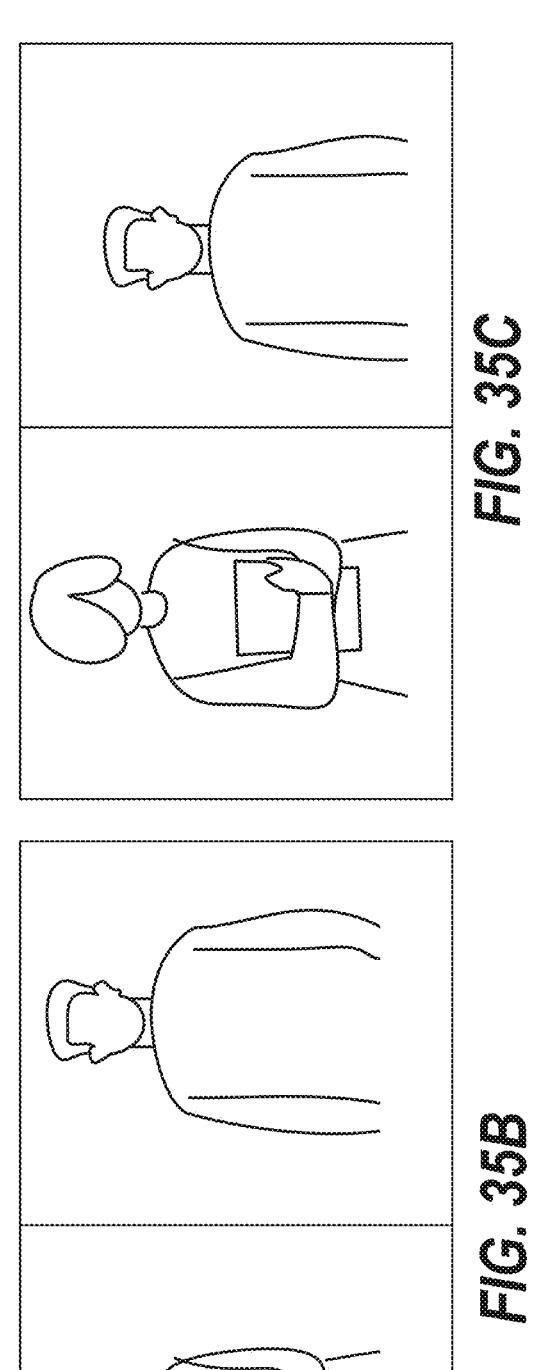
FIGS. 35A-35C illustrate examples of output tiled views, consistent with some embodiments of the present disclosure.

Gallery view may refer to a video stream viewing methodology aimed at providing an overview of meeting participants in addition to equity amongst participants in a video meeting. For example, FIG. 35A illustrates an example meeting environment including two meeting participants. As shown in FIG. 35B, each meeting participant may be represented in a sub-frame, video frames, or streams within a tile of a layout. In FIG. 35B, the two meeting participants shown in FIG. 35A are displayed side-by-side horizontally (in a row). The sub-frames, video frames, or streams may be adjusted such that each meeting participant is a similar size, horizontally aligned, and showing both the head and the upper body. This may promote equity amongst meeting participants in a video meeting. Gallery view may include a video frame divided into two or more video tiles, each of the video tiles being associated with a corresponding video stream featuring one or more objects and/or meeting participants. The relative sizes, orientations, and positions of the tiles may be used to highlight various objects or meeting participants. In some embodiments, a tile may include a video stream of a presenter or other active participant, and that tile may be highlighted relative to one or more other tiles. Furthermore, in some embodiments, tiles may feature non-active participants or may provide an overview of some or all of the meeting participants in a particular environment. Tiles may be oriented, sized, and positioned to highlight video streams of certain participants (either active or non-active) and to show relationships between participants (e.g., speaker-listener relationships, spatial relationships between participants, etc.). For example, FIG. 35C illustrates a Gallery View or tiled layout of the meeting participants of FIG. 35A, where the meeting participants are not aligned. As shown in FIG. 35C, a meeting participant on the left may be shown as larger, positioned higher, or more of their upper body may be shown (compared to the other meeting participant on the right) to indicate that the meeting participant on the left is of interest (for example, a speaker or an active listener).

Figure 22:
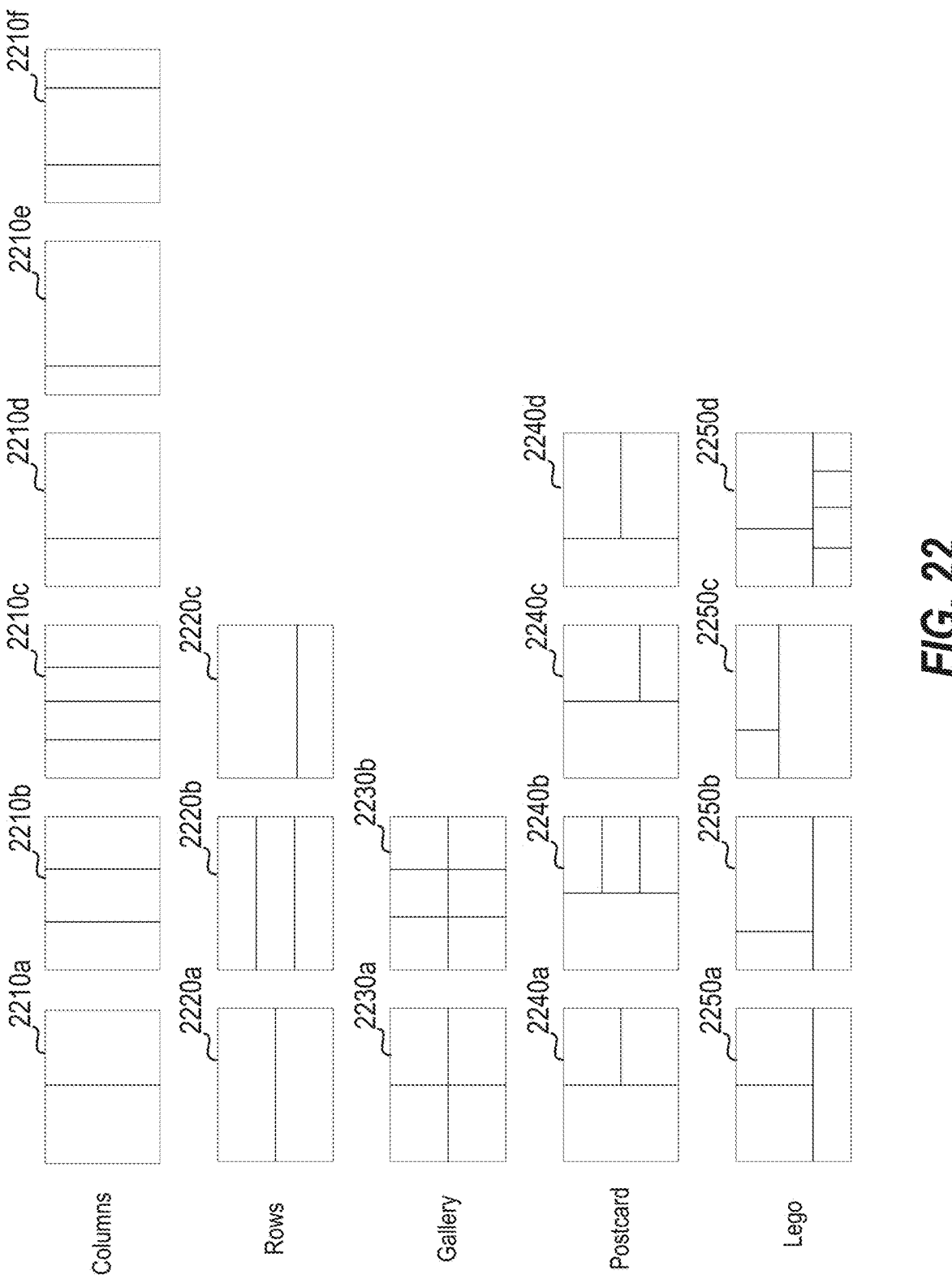
FIG. 22 provides examples of tile layouts, consistent with some embodiments of the present disclosure.

FIG. 22 illustrates examples of tile layouts. As shown in FIG. 22, example tile layouts may include column layouts 2210*a-f*, row layouts 2220*a-c*, gallery layouts 2230*a-b*, postcard layouts 2240*a-d*, and lego layouts 2250*a-d*. It is contemplated that any arrangement of tiles may be formed on a display, and tile layouts are not limited to the examples shown herein. Furthermore, the example layouts provided are given names and/or categories for explanatory purposes and are not limited to the names and/or categories provided herein.

Figure 36:
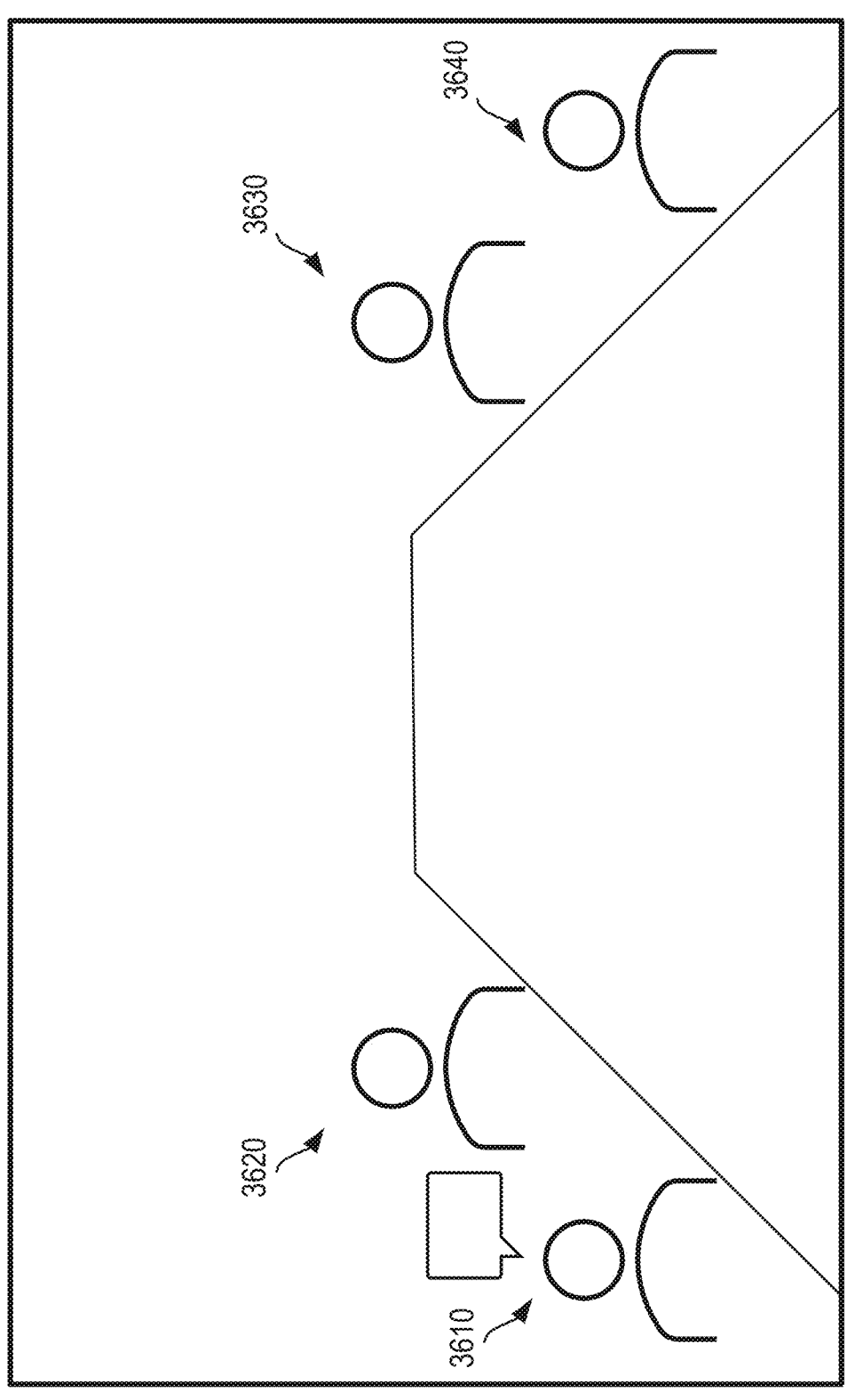
FIG. 36 illustrates an example meeting environment with meeting participants, consistent with some embodiments of the present disclosure.

FIGS. 36-44 illustrate various non-limiting examples of tile layouts. As shown in FIG. 36, a meeting environment may include four meeting participants 3610, 3620, 3630, 3640. Furthermore, one of the meeting participants may be determined to be a speaker 3610. The meeting participants 3610, 3620, 3630, 3640 may be seated at a table, as shown in FIG. 36. Although four meeting participants are shown by example in FIG. 36, it is contemplated that a meeting environment may include any number of meeting participants who may be seated in any order or combination.

Figure 37A:
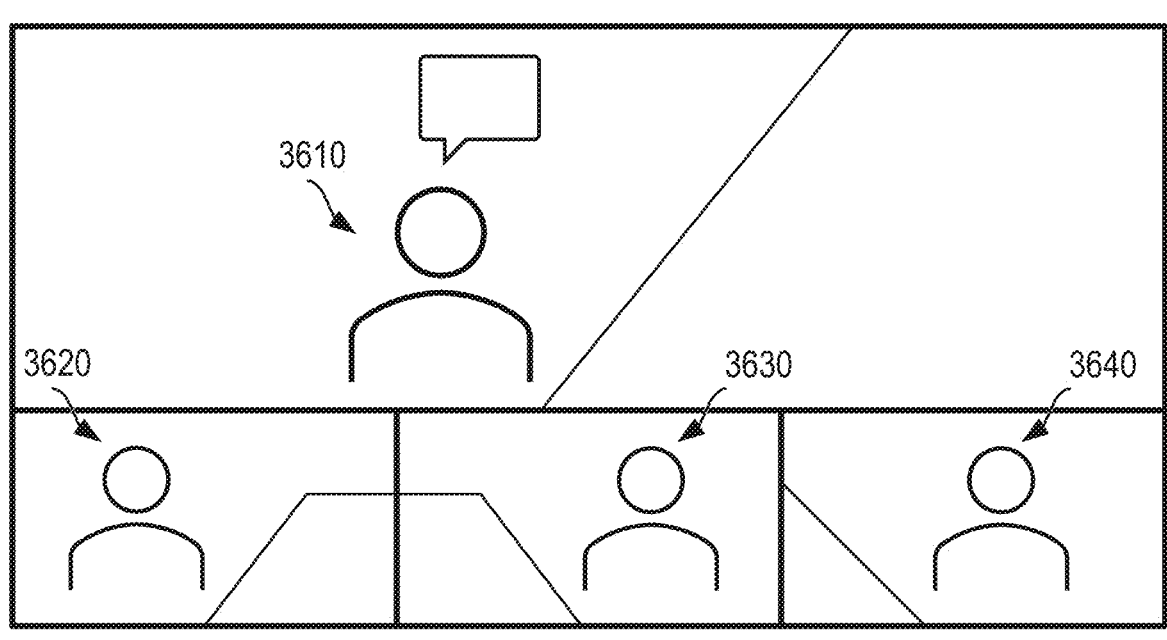
FIGS. 37A-37Y illustrate various example layouts based on the example meeting environment shown in FIG. 36, consistent with some embodiments of the present disclosure.
Figure 37B:
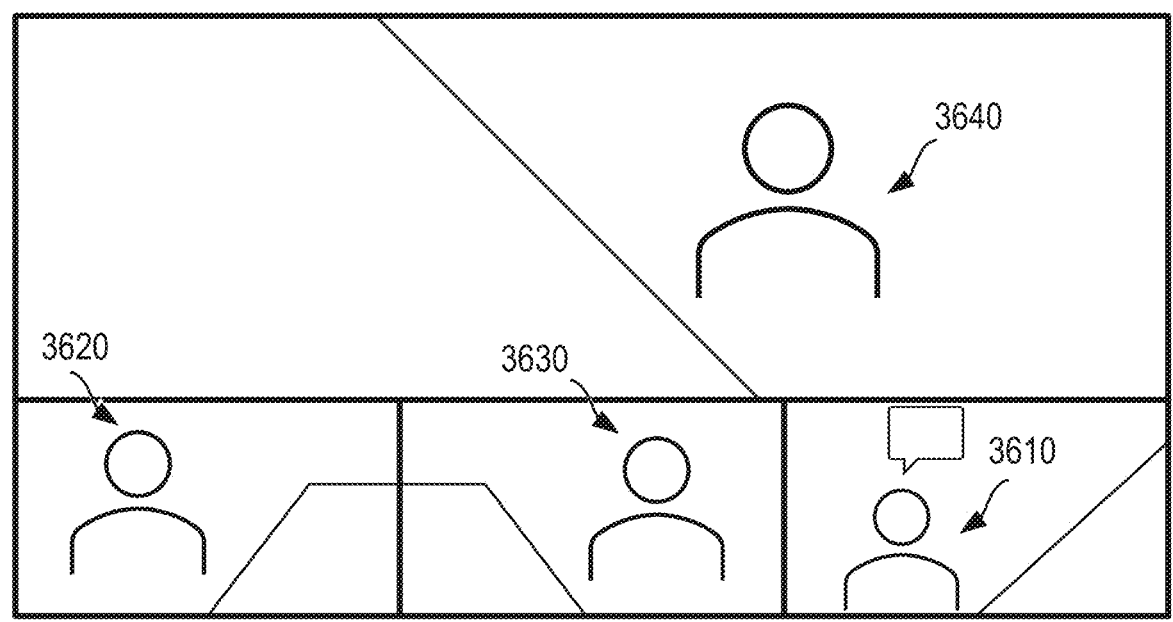
Figure 37C:
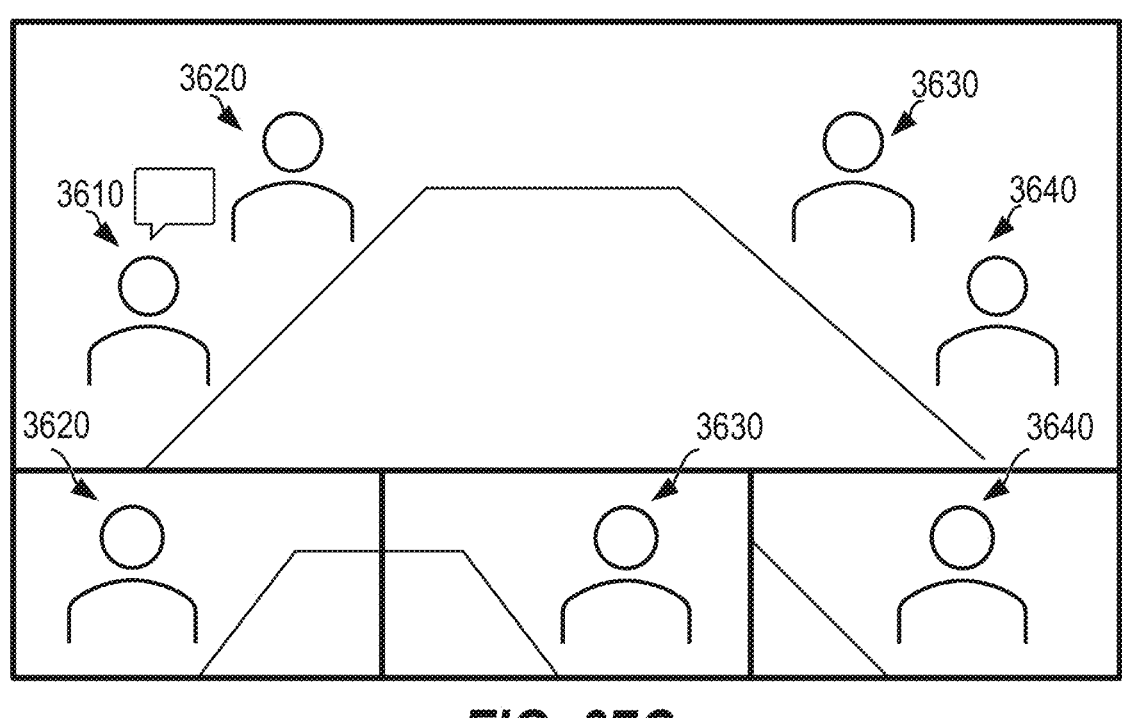
Figure 37D:
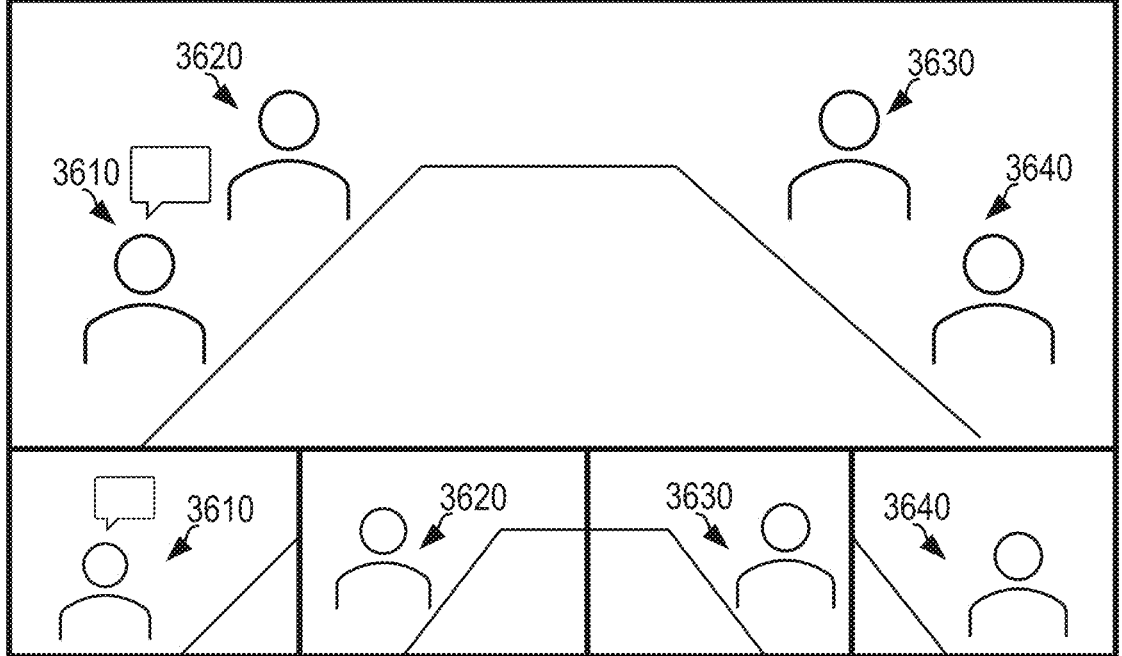
Figure 37E:
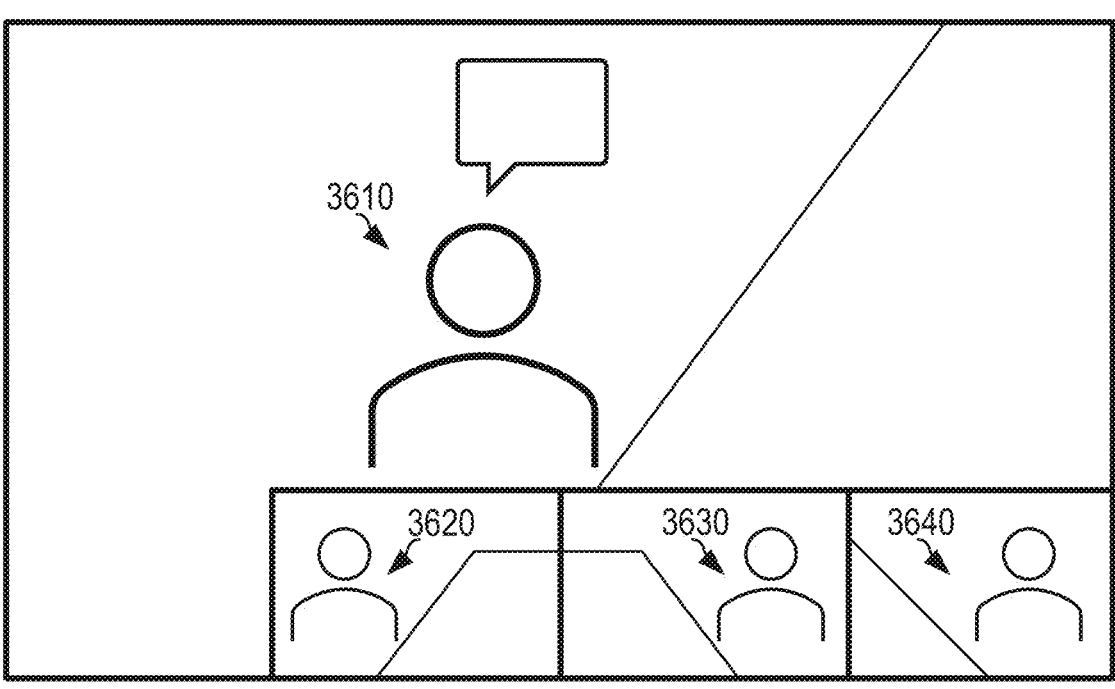
Figure 37F:
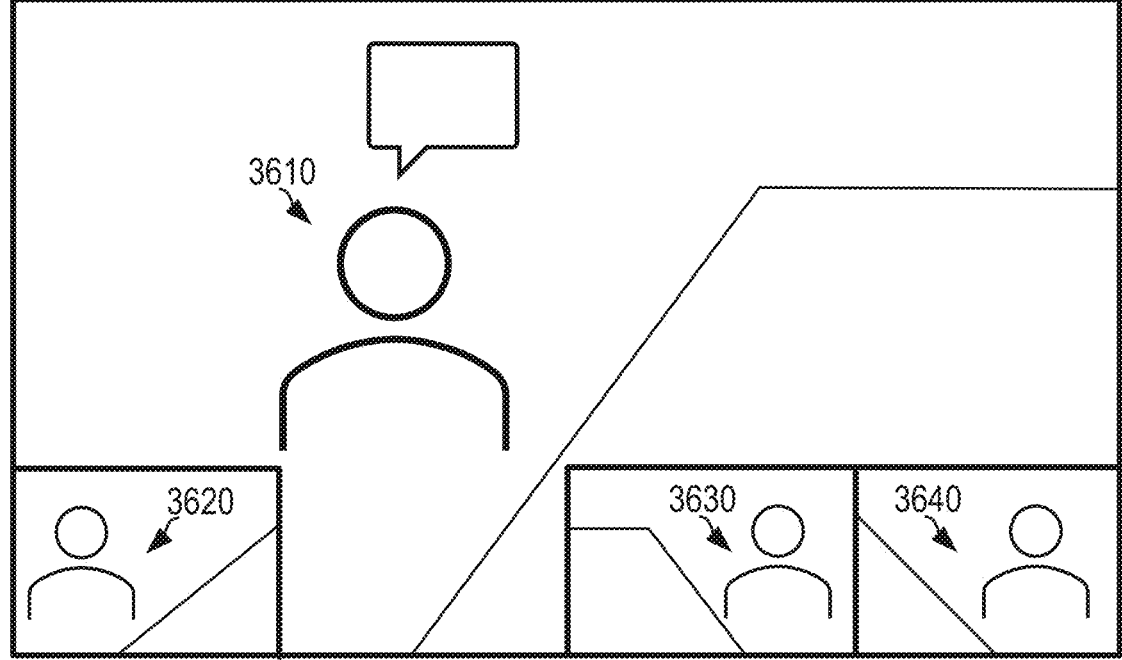
Figure 37G:
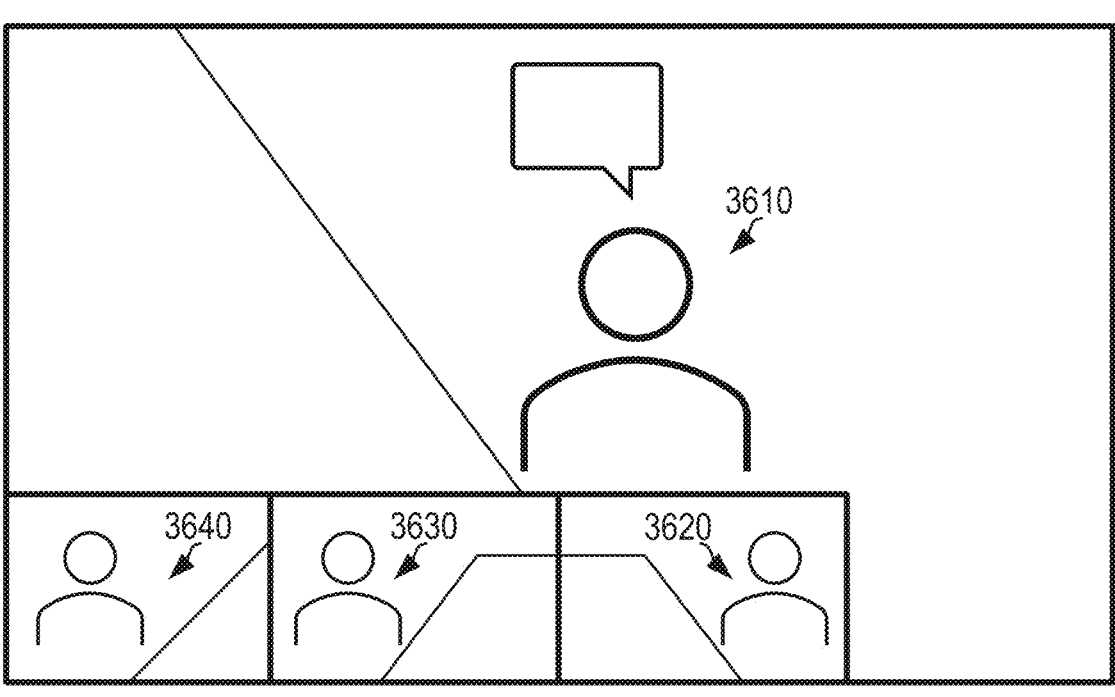
Figure 37H:
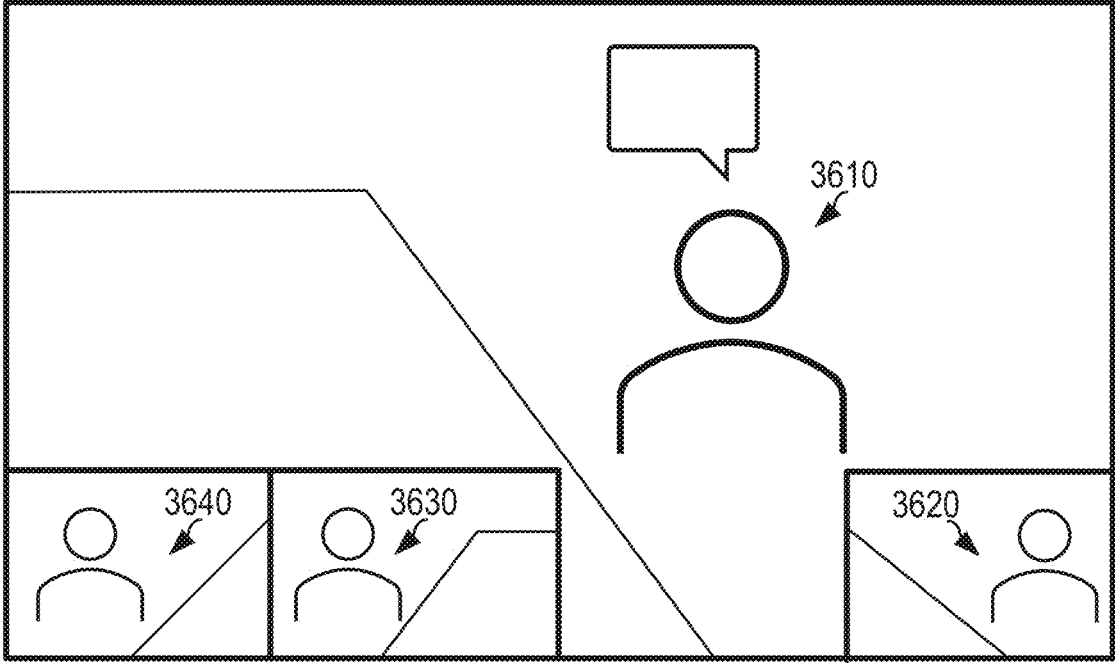
Figure 37I:
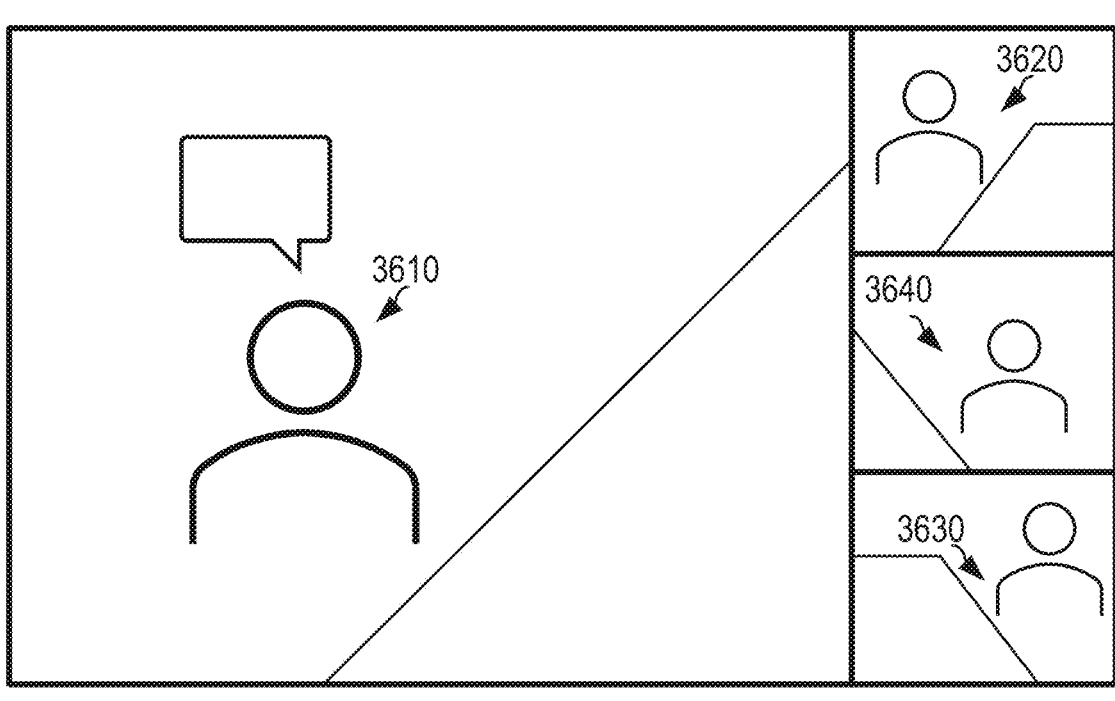
Figure 37J:
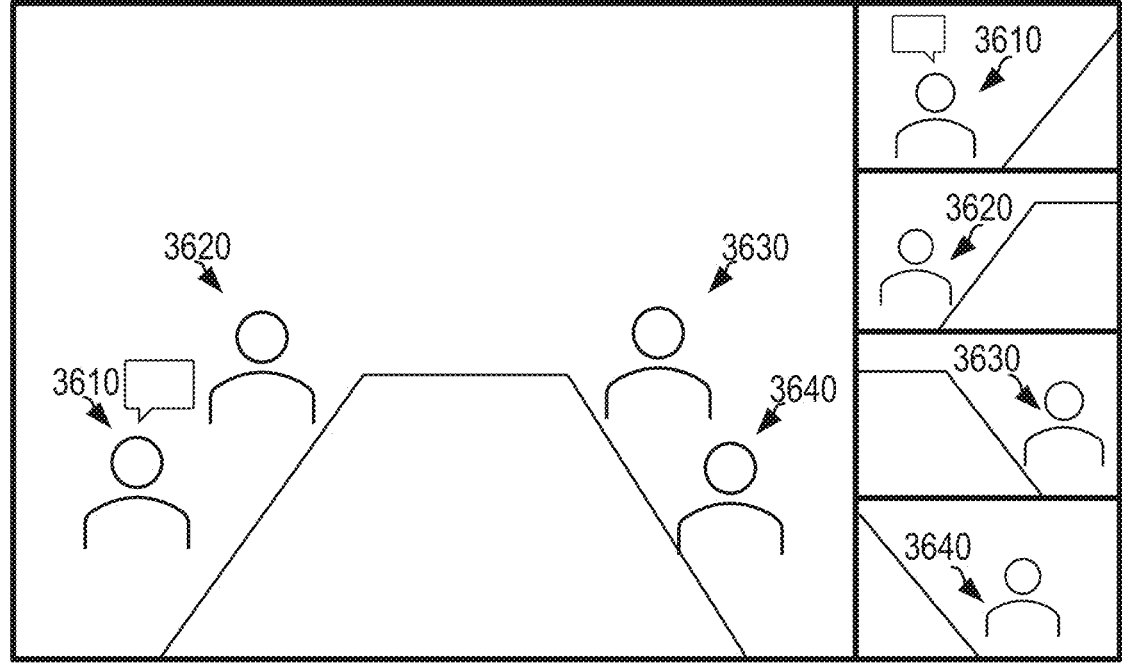
Figure 37K:
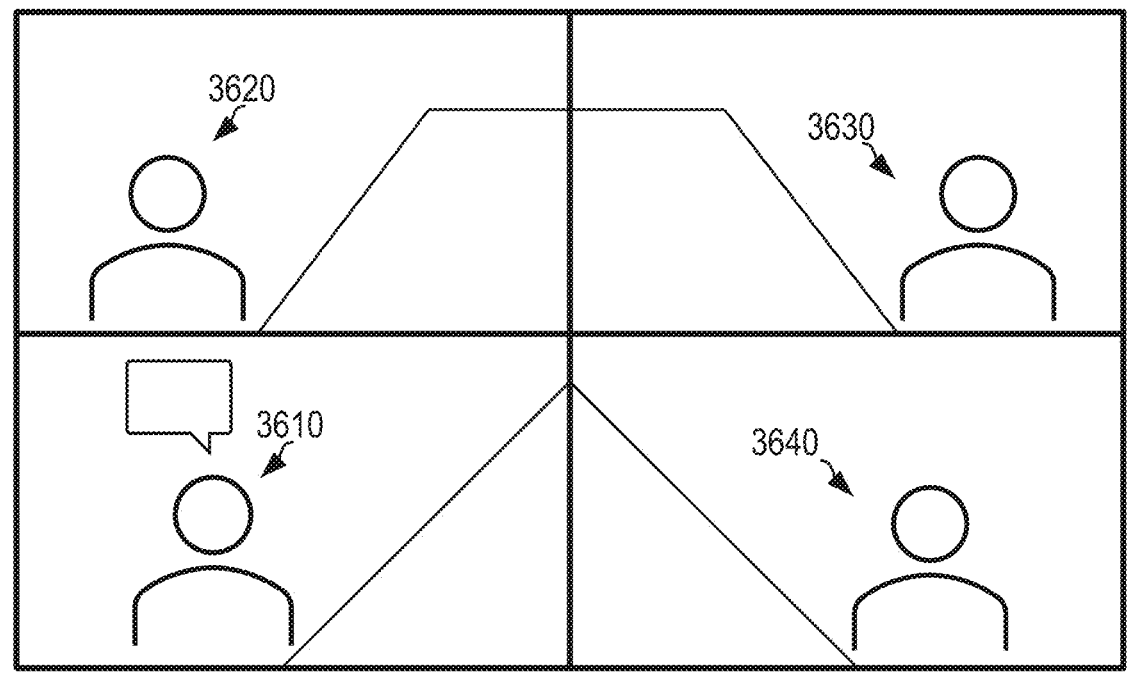
Figure 37L:
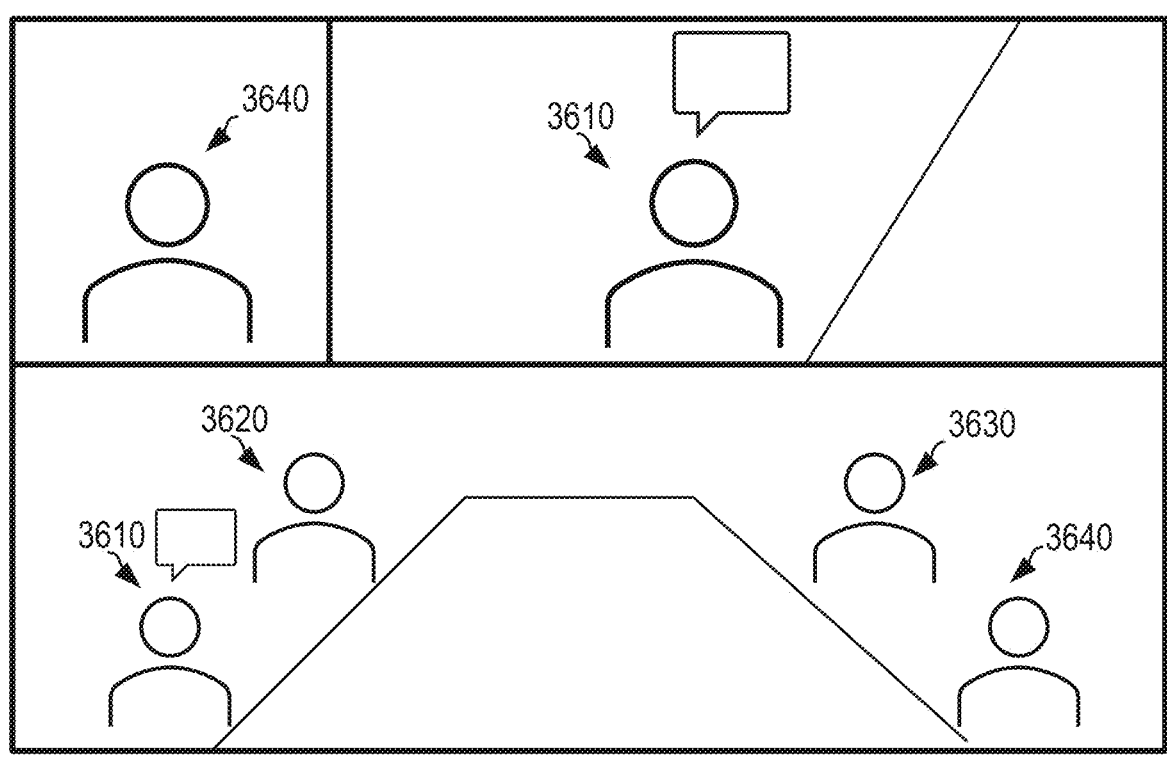
Figure 37M:
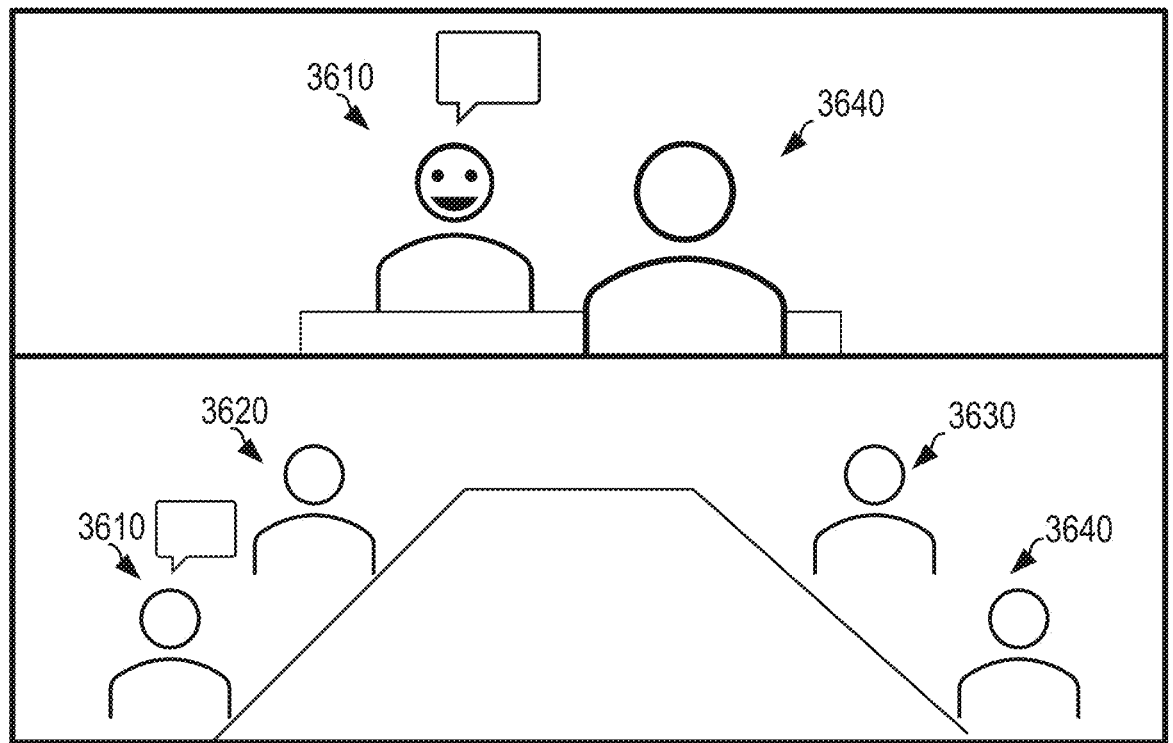
Figure 37N:
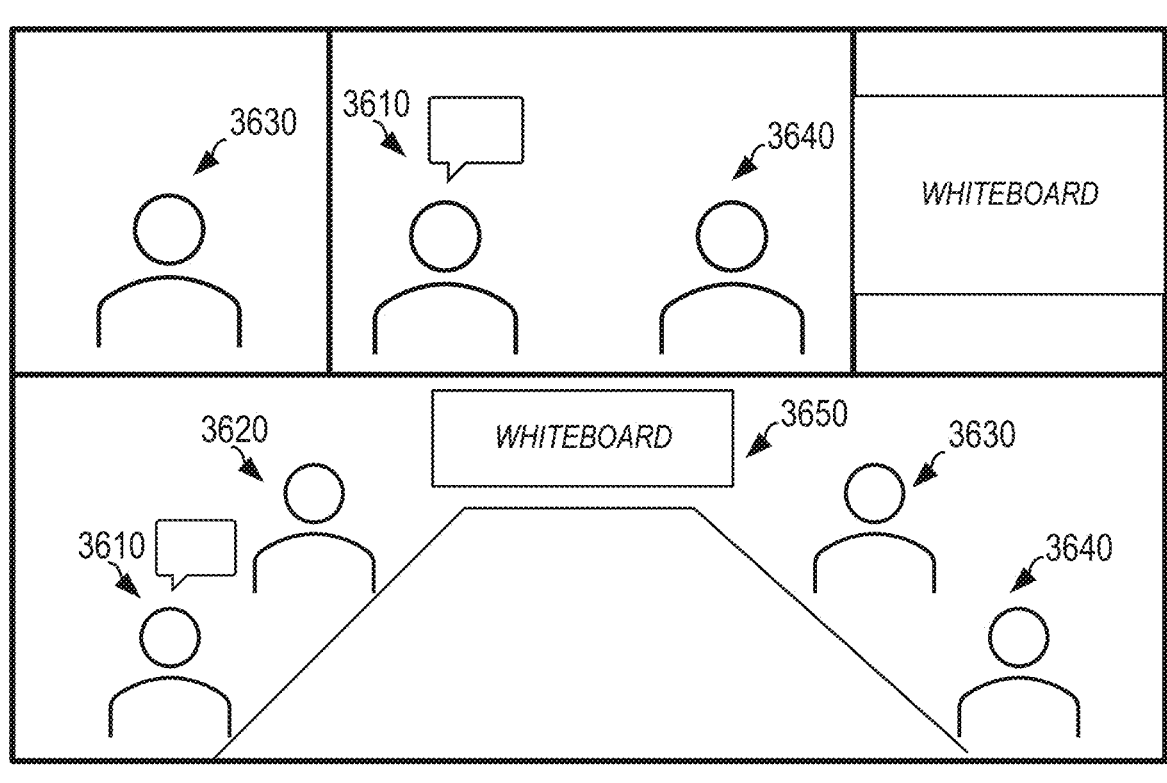
Figure 37O:
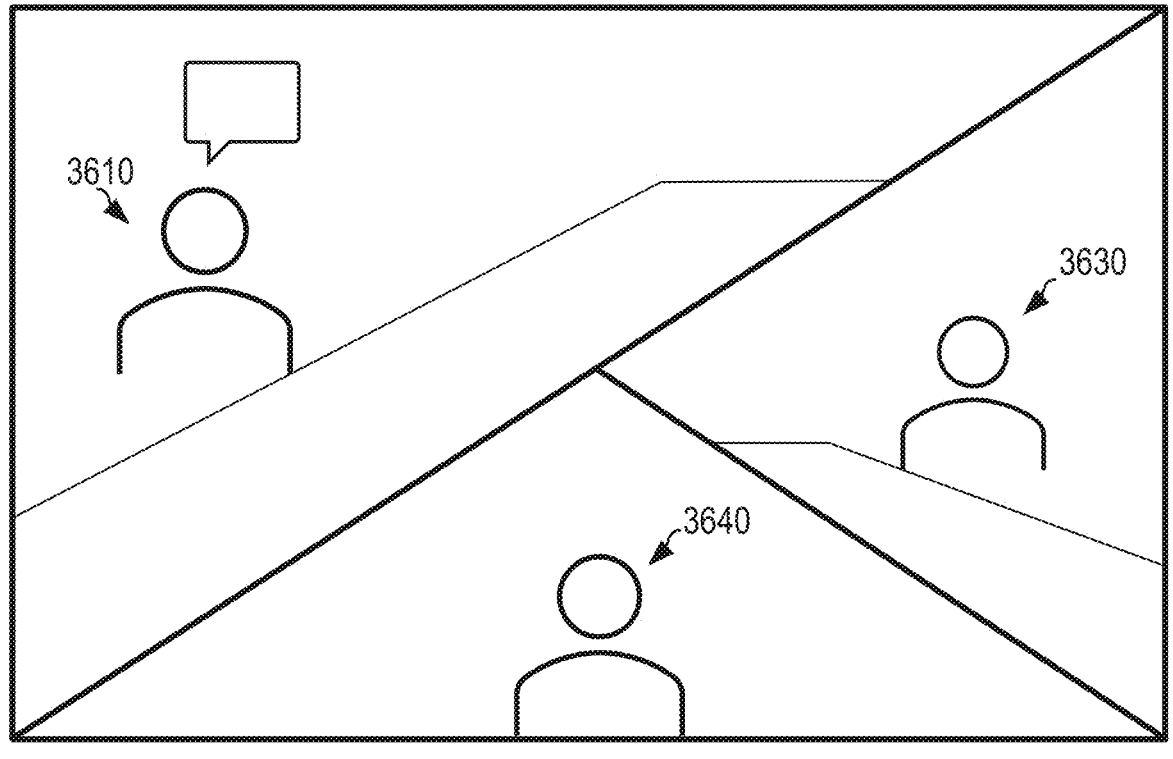
Figure 37P:
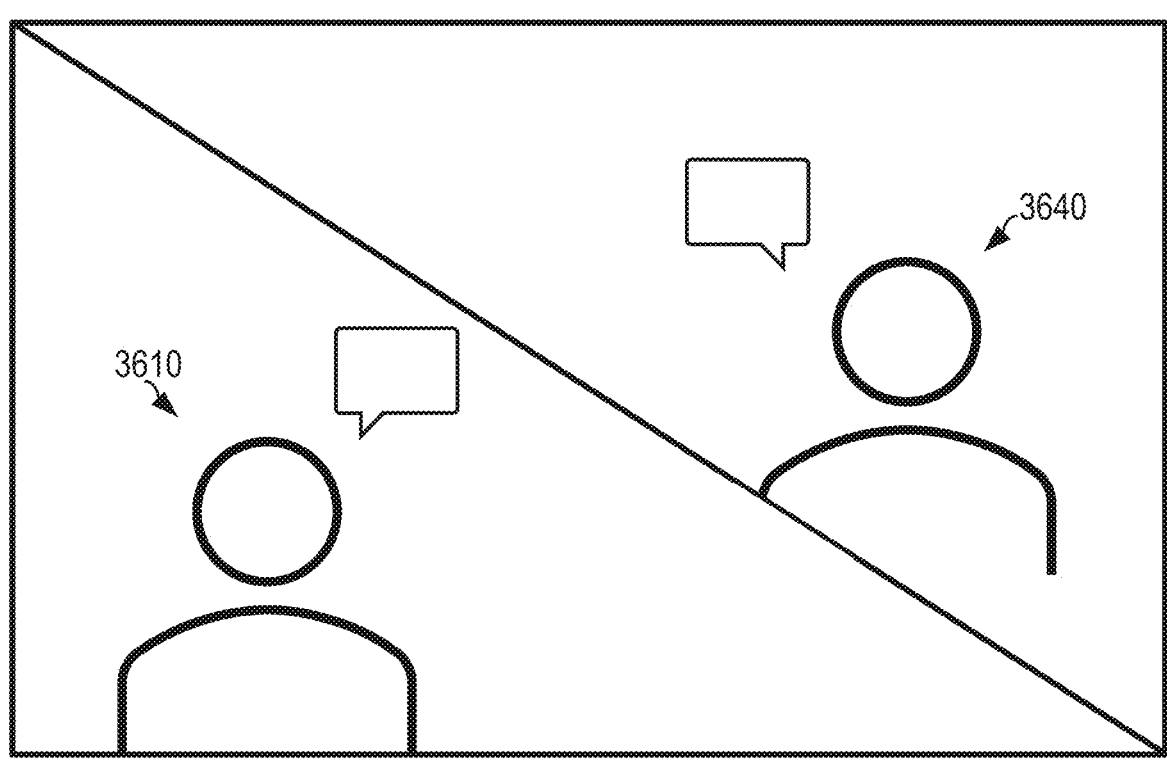
Figure 37Q:
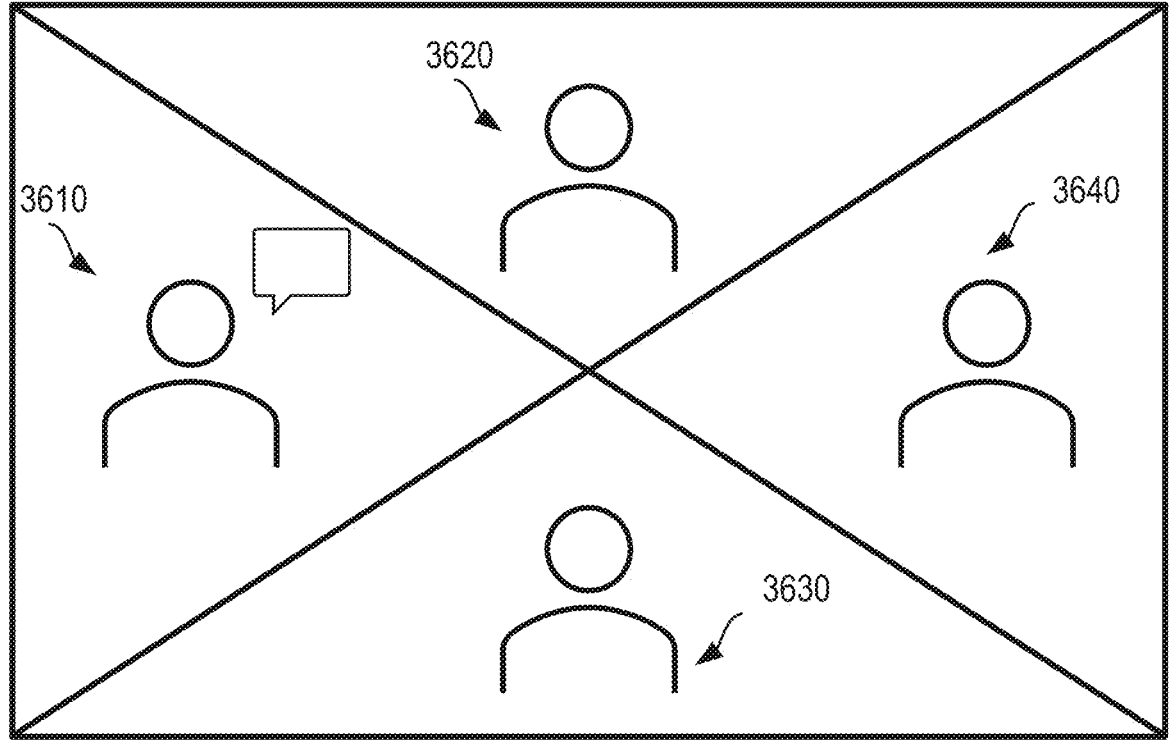
Figure 37R:
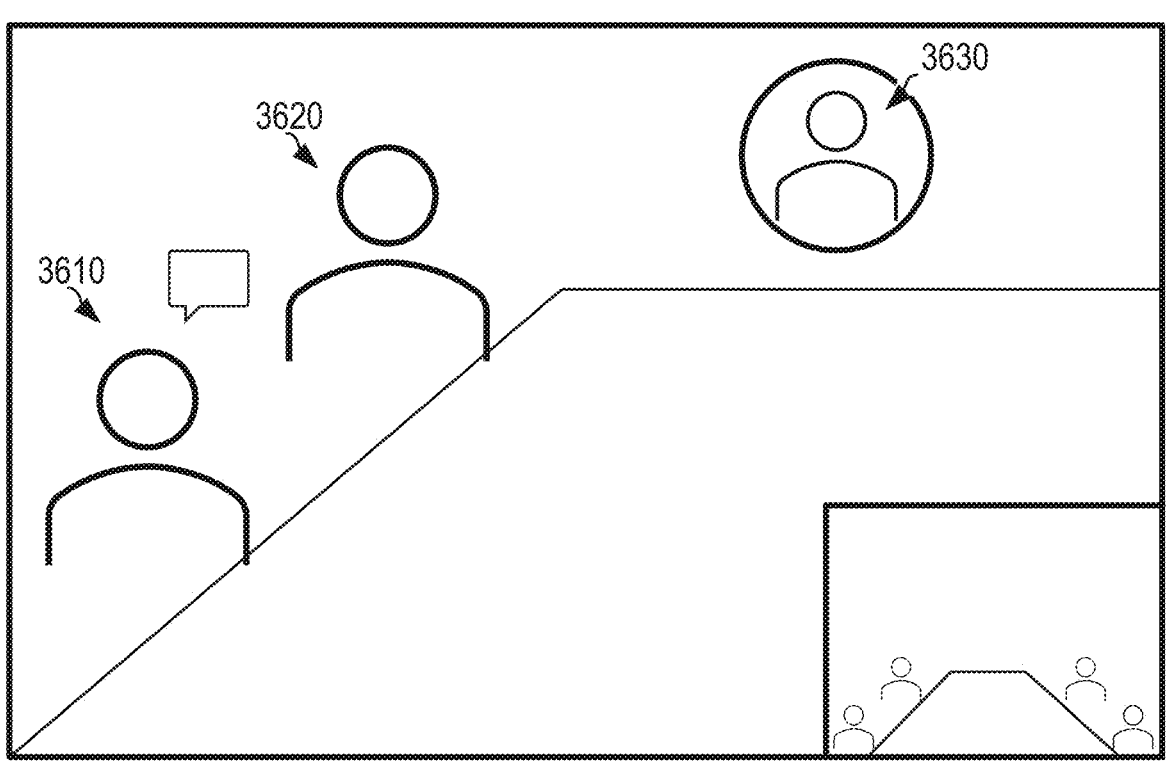
Figure 37S:
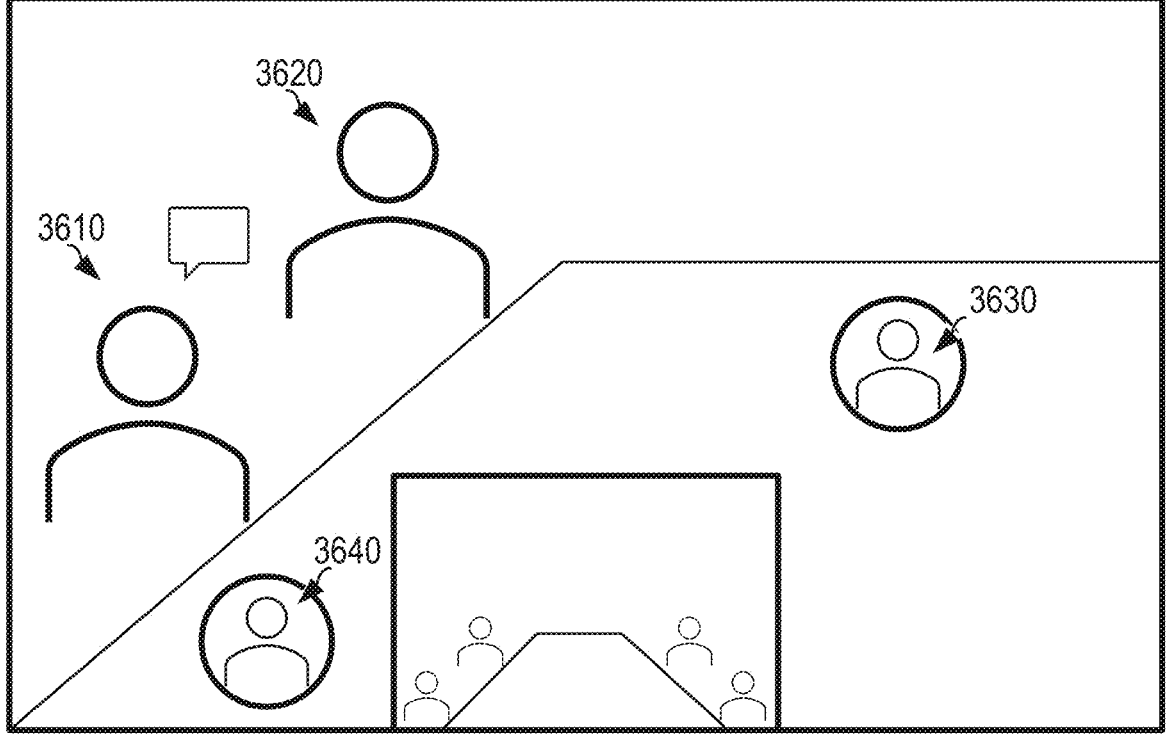
Figure 37T:
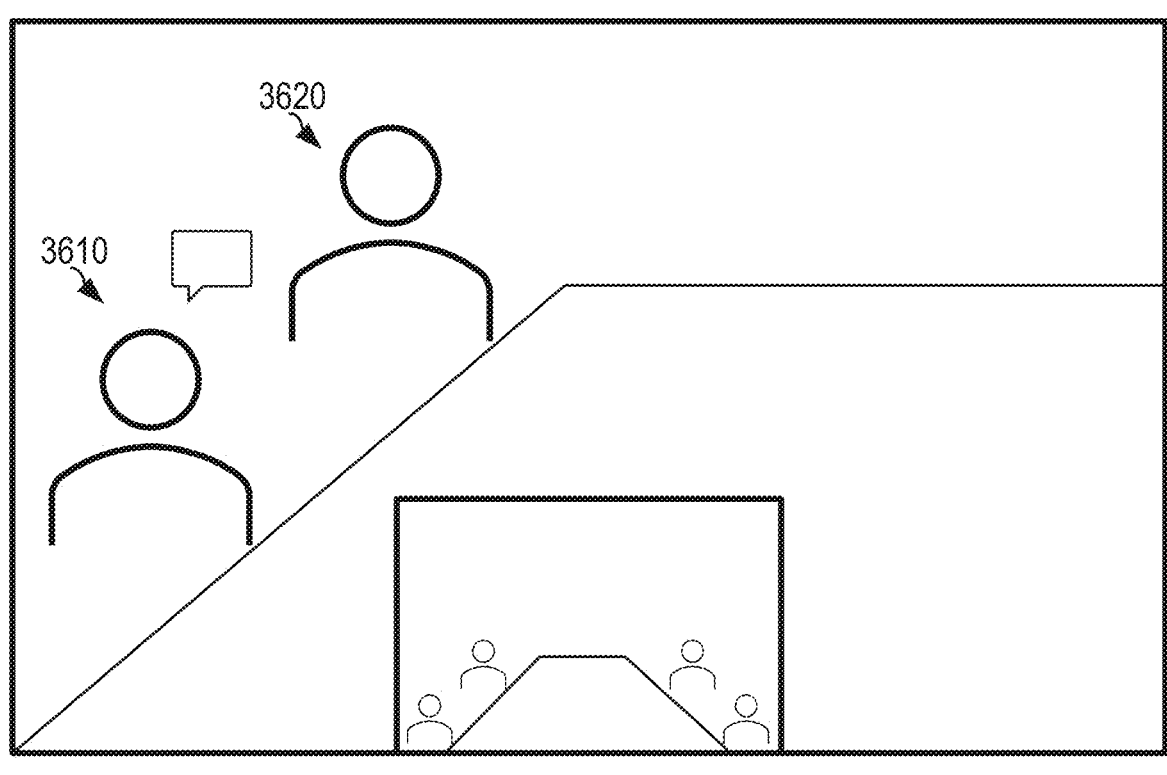
Figure 37U:
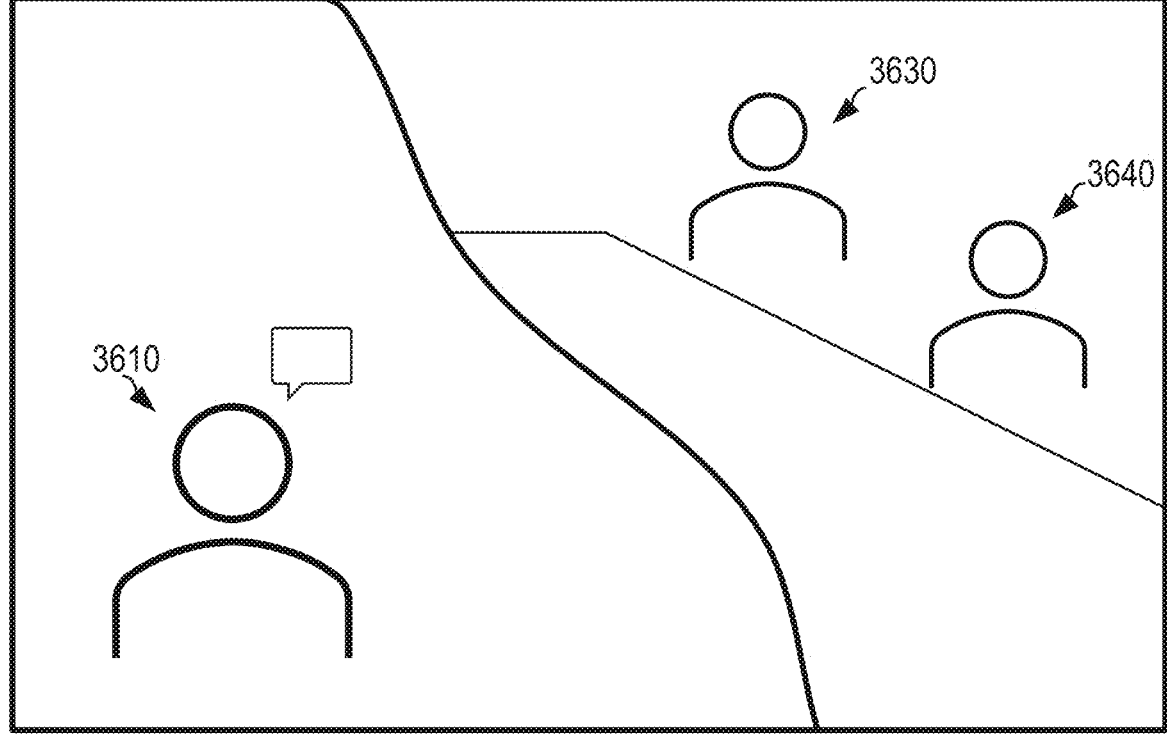
Figure 37V:
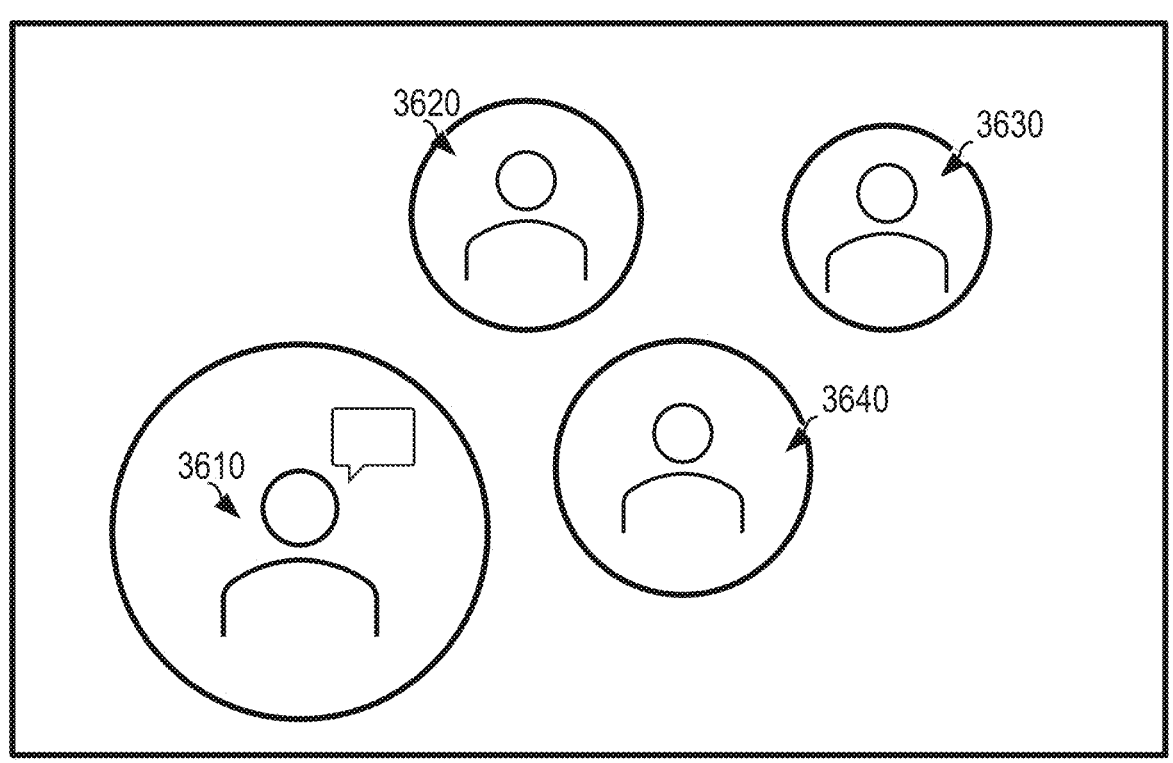
Figure 37W:
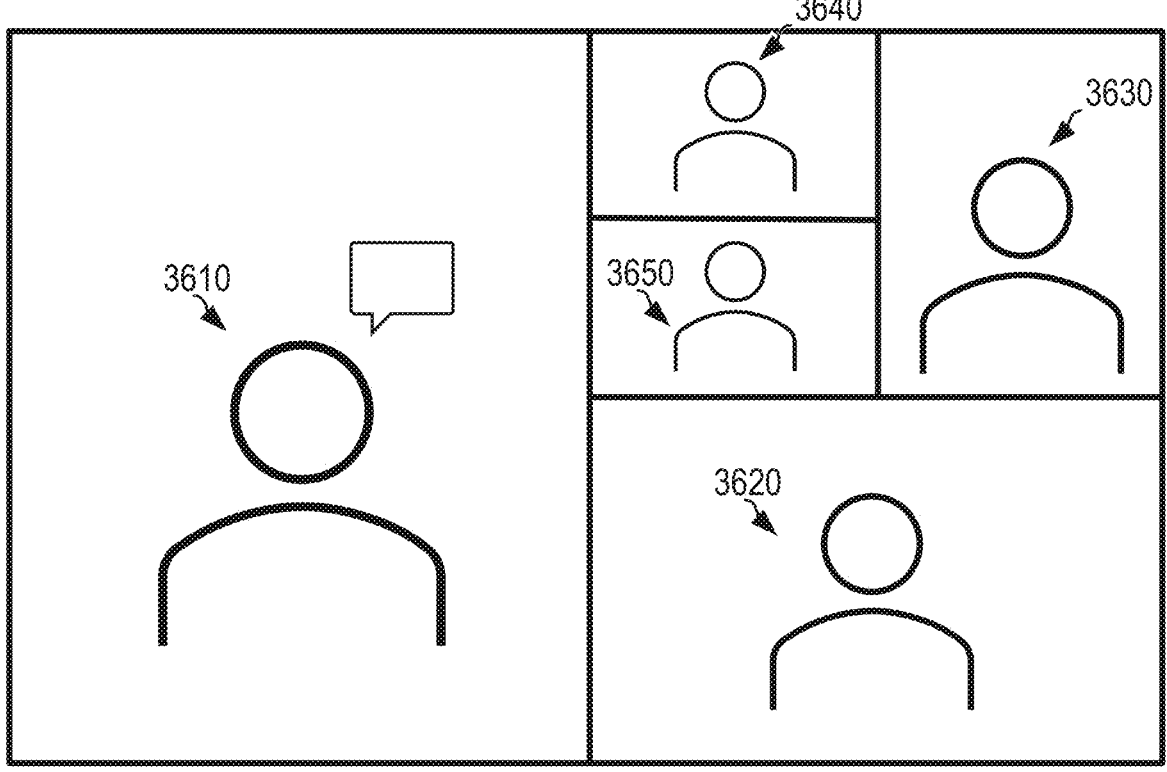
Figure 37X:
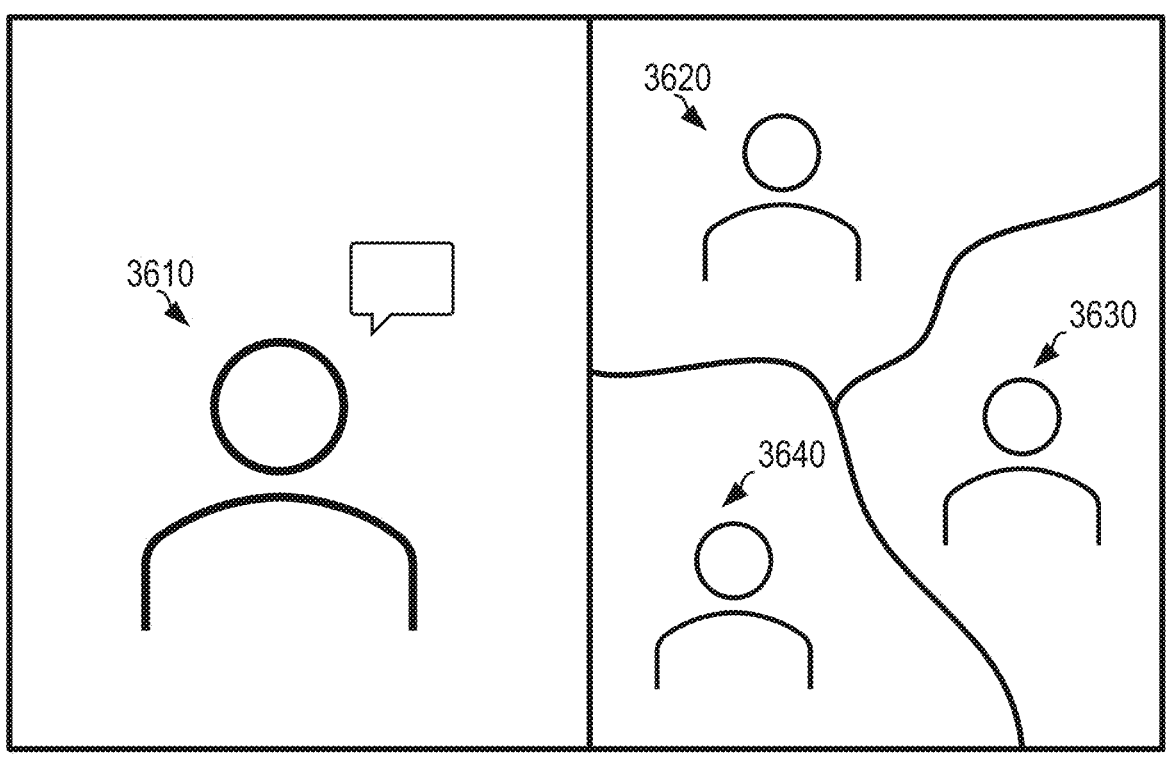
Figure 37Y:
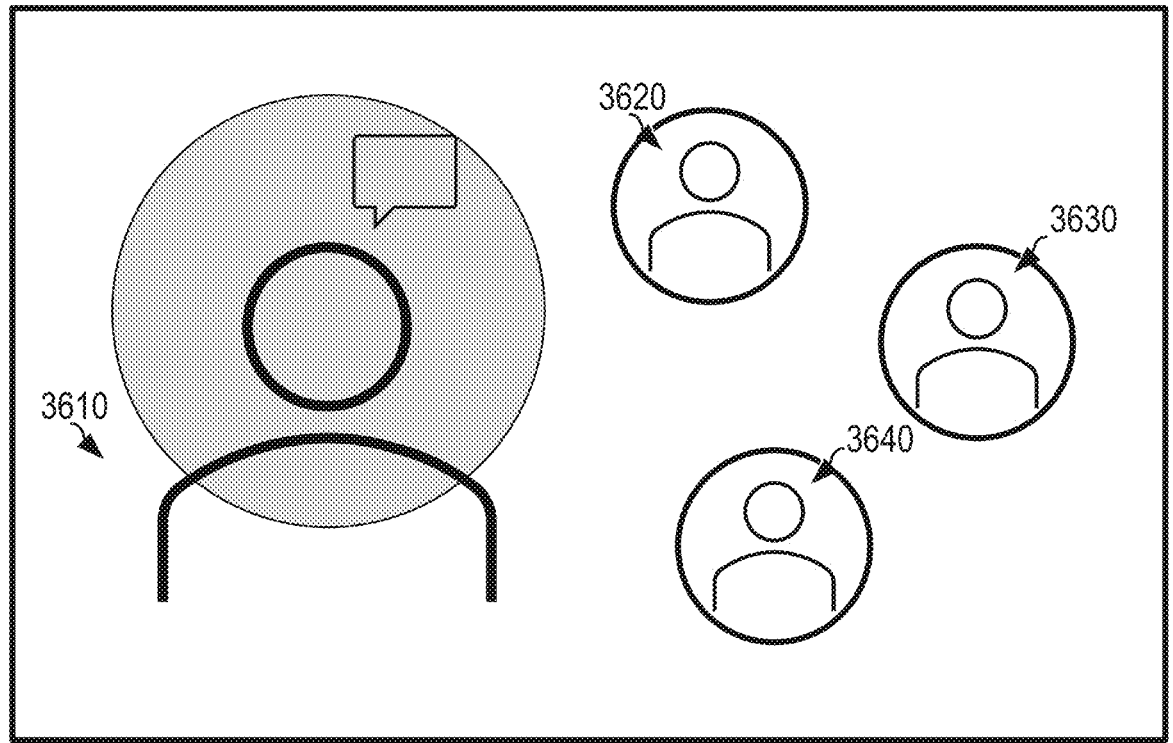

FIGS. 37A-37Y illustrate various tile layouts based on the meeting environment shown in FIG. 36. As shown in FIG. 37A, a 3×3 matrix may be displayed. A video stream corresponding to speaker 3610 may occupy the first two rows of tiles (e.g., a total of six tiles). Video streams of each remaining meeting participant 3620, 3630, 3640 may occupy a tile in the bottom row of the matrix. Additionally, or alternatively, as shown in FIG. 37B, a video stream corresponding to a meeting participant 3640 may occupy the first two rows of tiles (e.g., a total of six tiles) in a 3×3 matrix. It is contemplated that meeting participant 3640, in this context, may be an active participant, a listener, or show a reaction. Video streams of each remaining meeting participant 3610, 3620, 3630 (including speaker 3610) may occupy a tile in the bottom row of the matrix. FIG. 37C illustrates a 3×3 matrix display, where an overview shot of the meeting environment occupies the first (top) two rows of the matrix (e.g., six tiles). Video streams corresponding to meeting participants 3620, 3630, 3640 that are not the speaker 3610 may occupy a tile on the bottom row of the matrix. FIG. 37D illustrates a 4×3 matrix, where an overview shot of the meeting environment occupies the first (top) two rows of the matrix (e.g., eight tiles). Video streams corresponding to each meeting participant 3610, 3620. 3630, 3640 may occupy a tile in the bottom row of the matrix. FIGS. 37E-37H illustrate various 4×3 matrix displays, where a video stream corresponding to speaker 3610 occupies the first (top) two rows of the matrix display and an additional tile in the bottom row. Video streams of each remaining meeting participant 3620, 3630. 3640 may occupy a remaining bottom row tile in the matrix. FIG. 37I illustrates a 4×3 matrix display, where a video stream corresponding to speaker 3610 occupies the left three columns of the matrix display. Video streams of each remaining meeting participant 3620, 3630, 3640 may occupy a tile in the remaining right column of the matrix display. FIG. 37J illustrates a 4×4 matrix display, where an overview shot of the meeting environment is shown in the left three columns of tiles. Video streams of each meeting participant 3610, 3620, 3630, 3640 may be shown in a tile in the remaining right column of the matrix display. FIG. 37K illustrates a 2×2 matrix display, where a video stream corresponding to each meeting participant 3610, 3620, 3630, 3640 is shown in a tile. It is contemplated that the arrangement of the video streams in the tile displays in any of the displays discussed herein and may correspond to the location of the corresponding meeting participant(s) within the meeting environment. FIG. 37L illustrates a 3×2 matrix display, where an overview shot occupies the bottom row of the matrix display, a speaker shot of speaker/meeting participant 3610 occupies the right two columns of the top row, and a reaction shot of meeting participant 3640 occupies the left column of the top row. FIG. 37M illustrates a 1×2 matrix display, where an overview shot occupies the bottom row and an over-the-shoulder shot—consistent with embodiments discussed herein—occupies the top row. In some embodiments, a whiteboard 3650 may be included in a meeting environment, as shown in FIG. 37N. FIG. 37N illustrates a 3×2 matrix display, where an overview shot occupies the bottom row of the matrix display, a reaction shot of meeting participant 3630 occupies the left column of the top row, a group shot including speaker/meeting participant 3610 and meeting participant 3640 occupies the center column of the top row, and a video stream of whiteboard 3650 occupies the right column of the top row. Although a whiteboard is discussed, it is contemplated that any object or item of interest/importance may be included in a meeting environment and may be displayed in a video stream and/or tile on the display. FIG. 37O illustrates an example layout with diagonal (or triangular) tiles, where the diagonal lines of the tiles may follow one or more table angles. As shown in FIG. 37O, the layout may include three diagonal (or triangular) tiles, each tile corresponding to a meeting participant 3610, 3630, 3640. FIG. 37P illustrates another example layout with diagonal (or triangular) tiles. As shown in FIG. 37P, the layout may include two diagonal (or triangular) tiles, each corresponding to a meeting participant 3610, 3640. Each meeting participant 3610, 3640 shown may be speaking and, in some embodiments, the layout of FIG. 37P may show dialogue between meeting participants 3610, 3640. FIG. 37Q illustrates a third example layout with four diagonal (or triangular) tiles. As shown in FIG. 37Q, each diagonal (or triangular) tile may correspond to a representation of a meeting participant 3610, 3620, 3630, 3640. FIG. 37R illustrates an example layout including a group shot showing meeting participants 3610, 3620; an overview shot in a tile at the bottom corner of the layout; and a floating round tile showing meeting participant 3630. The group shot showing meeting participants 3610, 3620 may be a speaker shot. FIG. 37S illustrates an example layout including a group shot showing meeting participants 3610, 3620; an overview shot in a tile at the bottom center of the layout; and two floating round tiles showing meeting participants 3630, 3640. As discussed above with respect to FIG. 37R, the group shot showing meeting participants 3610, 3620 may be a speaker shot. FIG. 37T illustrates an example layout showing meeting participants 3610, 3620 and an overview shot at the bottom center of the display. As discussed above with respect to FIGS. 37R-S, the group shot showing meeting participants 3610, 3620 may be a speaker shot. FIG. 37U illustrates an example organic tile layout, where the tiles are generally amorphous in shape, as shown by the curved line. The layout of FIG. 37U may include a speaker shot of meeting participant 3610 (shown in the tile on the left of the display) and a group shot of meeting participants 3630, 3640 (shown in the tile on the right of the display). FIG. 37V illustrates a layout with round tiles of varying sizes, each tile corresponding to a representation of a meeting participant 3610, 3620, 3630, 3640. As discussed herein, the round tiles may be the same size or varying sizes, and the size of the tile(s) may be determined by various factors including—but not limited to—who is speaking, who previously spoke, an object of importance, a reaction shot, a group shot, etc. For example, as shown in FIG. 37V, a tile including a speaker shot of speaker 3610 may be larger than tiles including shots of other meeting participants 3620, 3630, 3640 determined to be not speaking. FIG. 37W illustrates an example of a geometric layout, including tiles of various sizes displaying meeting participants 3610, 3620, 3630, 3640, 3650. Meeting participant 3650 may be a remote (or far-end) meeting participant. FIG. 37X illustrates a layout combining a geometric layout and organic layout, where a speaker 3610 may occupy a geometric layout tile and other meeting participants 3620, 3630, 3640 may occupy organic layout tiles. FIG. 37Y illustrates an example layout showing a speaker 3610 and three floating round tiles displaying meeting participants 3620, 3630, 3640. In some embodiments, as shown in FIG. 37Y, a speaker silhouette may be used to highlight, for example, the head of meeting participant (speaker) 3610. Although FIGS. 36 and 37A-37Y illustrate examples with a particular number of meeting participants and particular matrix displays, it is to be understood that matrix display and tile layouts may incorporate any combination of number of meeting participants, number of rows, number of columns, and manner of determining the number of tiles in a matrix that each video stream occupies. The number of tiles/cells in a matrix that each video stream occupies may be determined based on importance. For example, a video stream corresponding to a speaker, an active participant, a listener, a meeting participant showing a reaction, and/or an object of interest may occupy more tiles in a matrix than other meeting participants or objects in the meeting environment.

Figure 38A:
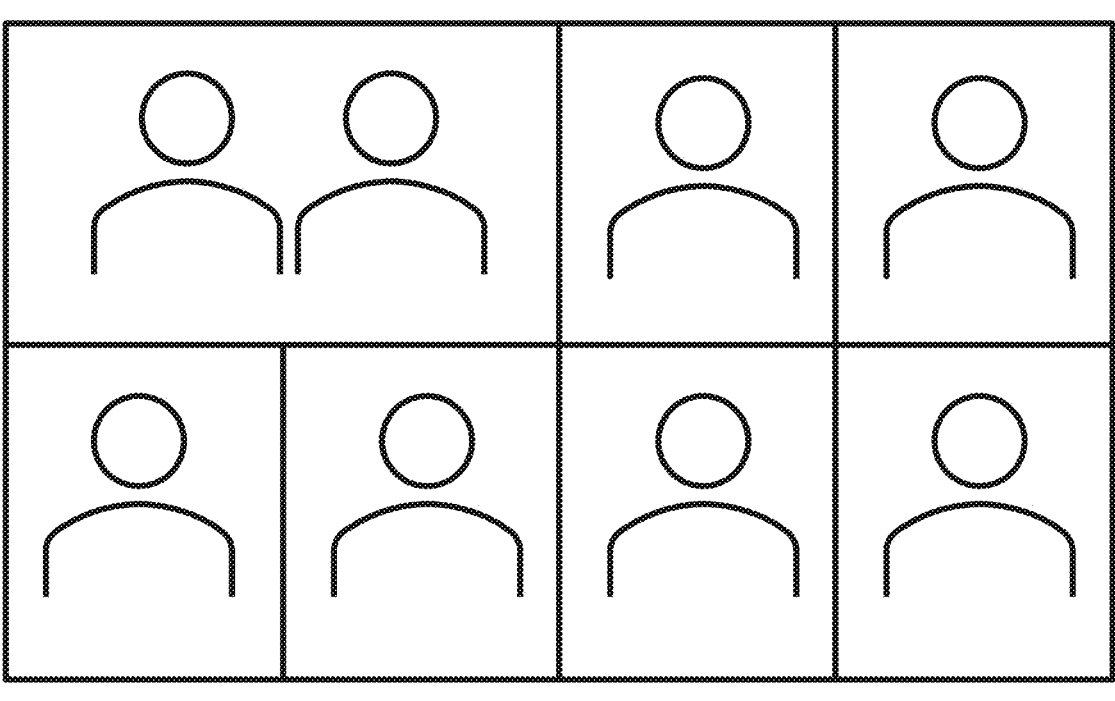
FIGS. 38A-38D illustrate various example layouts involving clustering and group shots, consistent with some embodiments of the present disclosure.
Figure 38B:
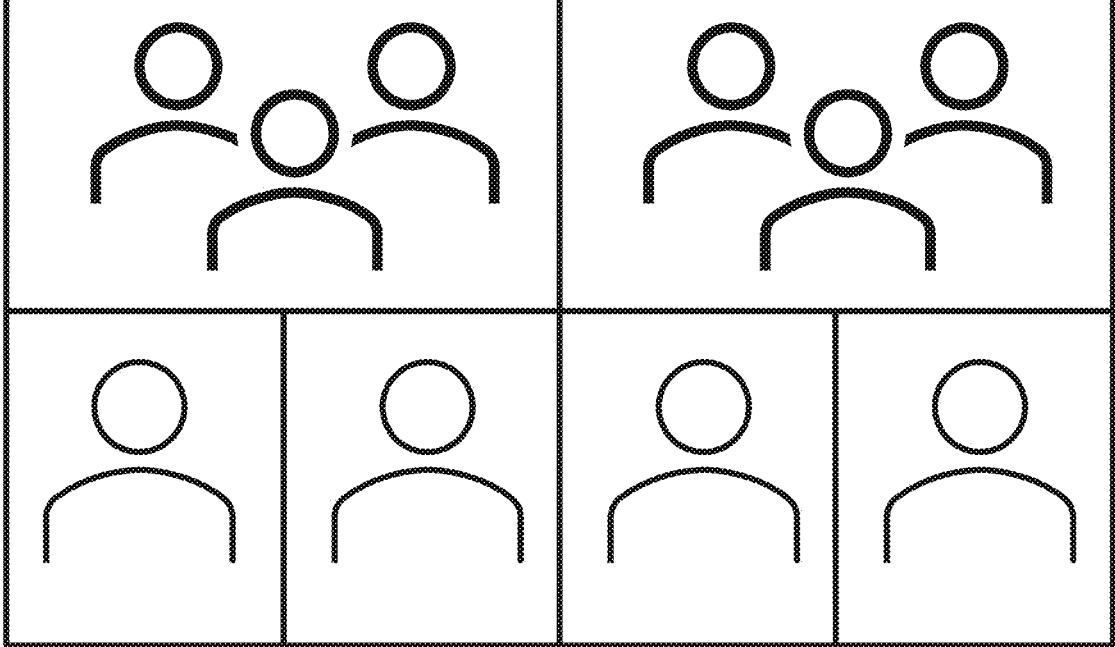
Figure 38C:
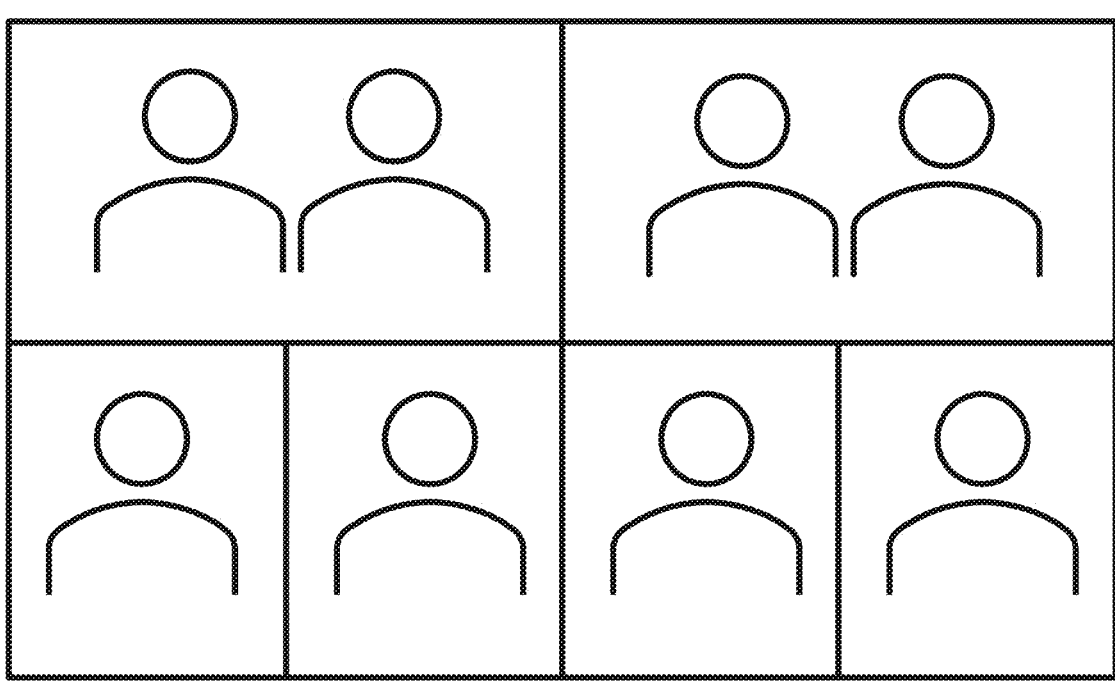
Figure 38D:
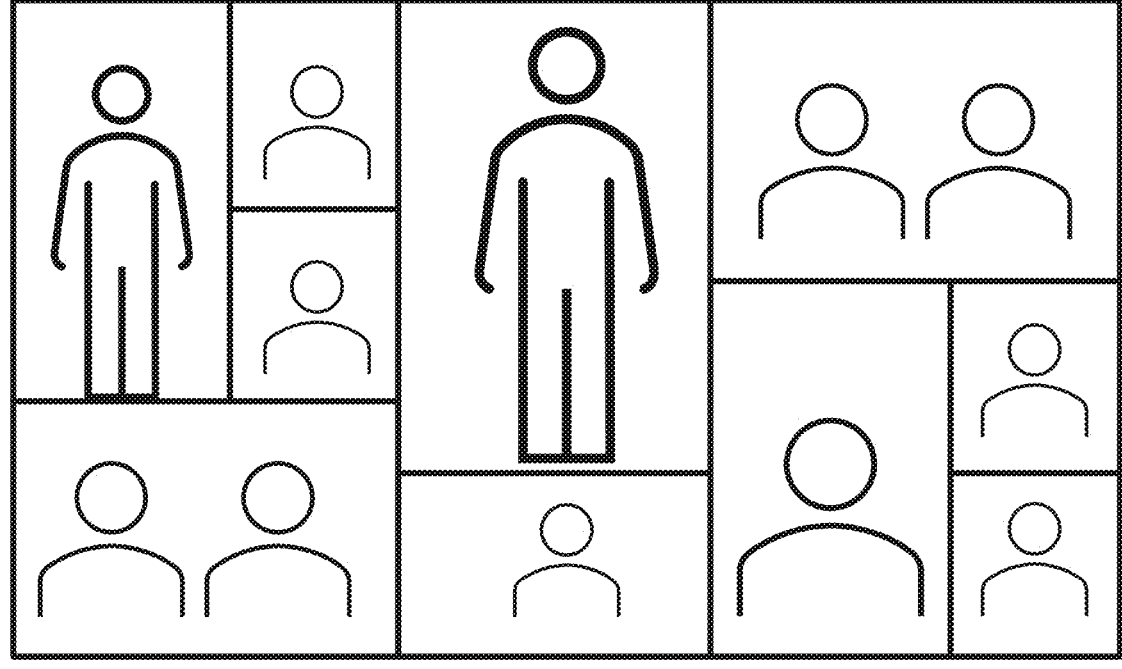

FIGS. 38A-38D illustrate various examples of tile layouts involving clustering and group shots. For example, FIG. 38A illustrates a display involving a 4×2 matrix display, where a cluster/group shot of two meeting participants occupies two cells/tiles in the top-left of the display. A single shot may occupy each of the remaining tiles. FIG. 38B illustrates a display involving a 4×2 matrix, where a cluster/group shot of three meeting participants occupies two cells/tiles in the top-left of the display and another cluster/group shot of three meeting participants occupies two cells/tiles in the top-right of the display. A single shot may occupy each of the remaining tiles. FIG. 38C illustrates a display involving a 4×2 matrix, where a cluster/group shot of two meeting participants occupies two cells/tiles in the top-left of the display and another cluster/group shot of two meeting participants occupies two cells/tiles in the top-right of the display. A single shot may occupy each of the remaining tiles. FIG. 38D illustrates a display involving tiles of various size and location. As shown in FIG. 38D, the display may include various cluster/group shots and single shots. Furthermore, the display may involve full body shots.

Figure 39:
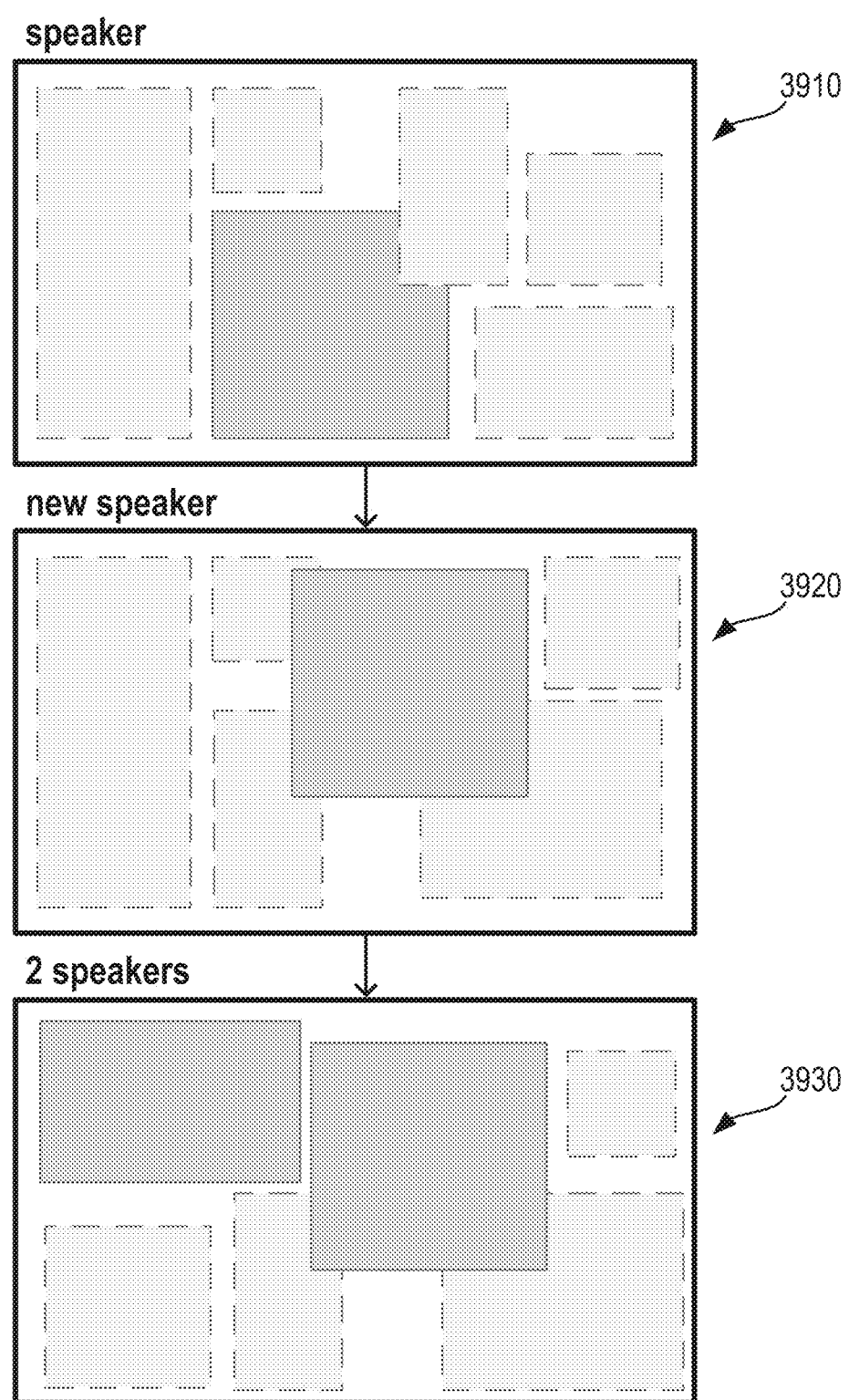
FIG. 39 illustrates various example floating tile layouts, consistent with some embodiments of the present disclosure.
Figure 40:
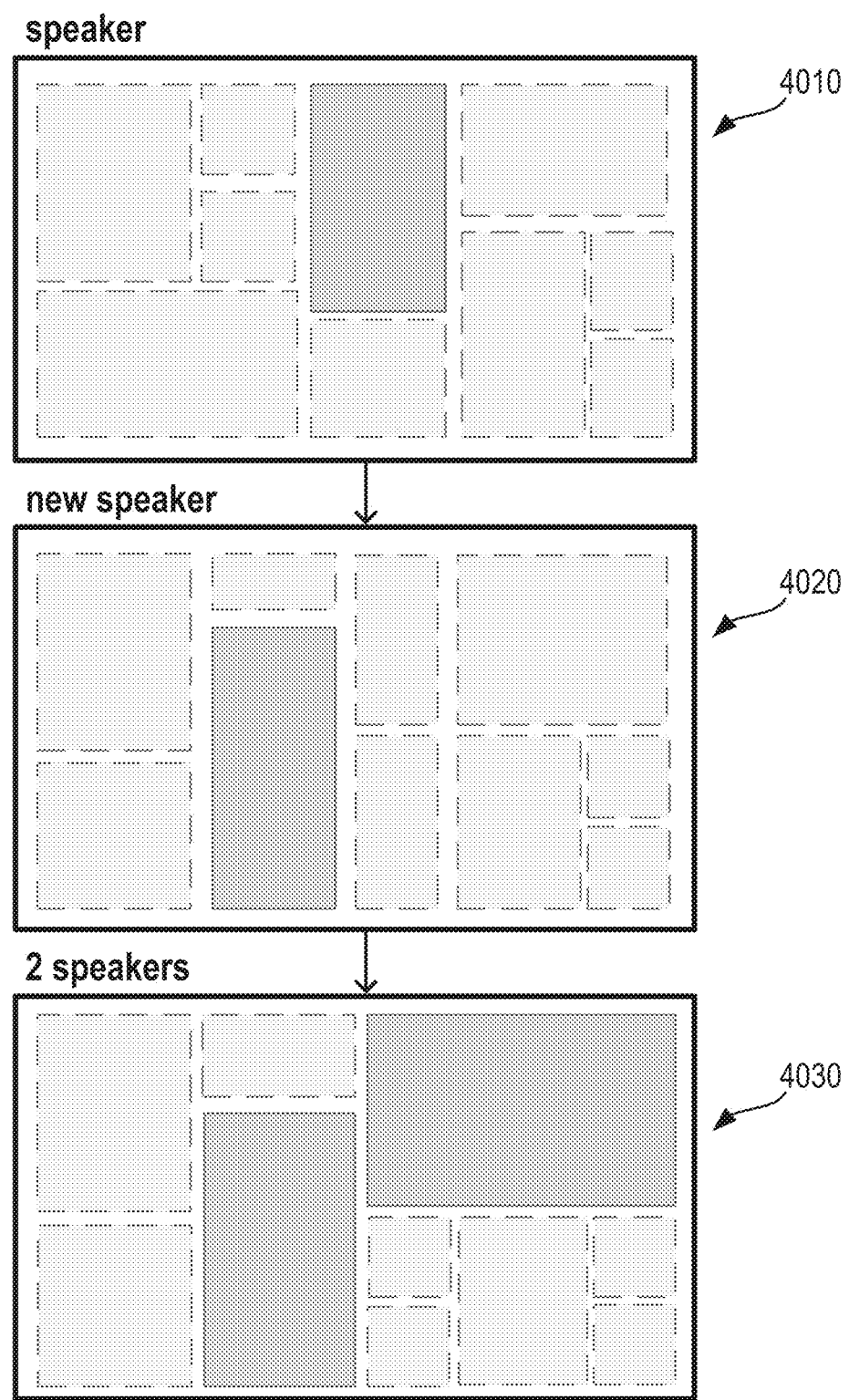
FIG. 40 illustrates various example adjusting grid layouts, consistent with some embodiments of the present disclosure.
Figure 41:
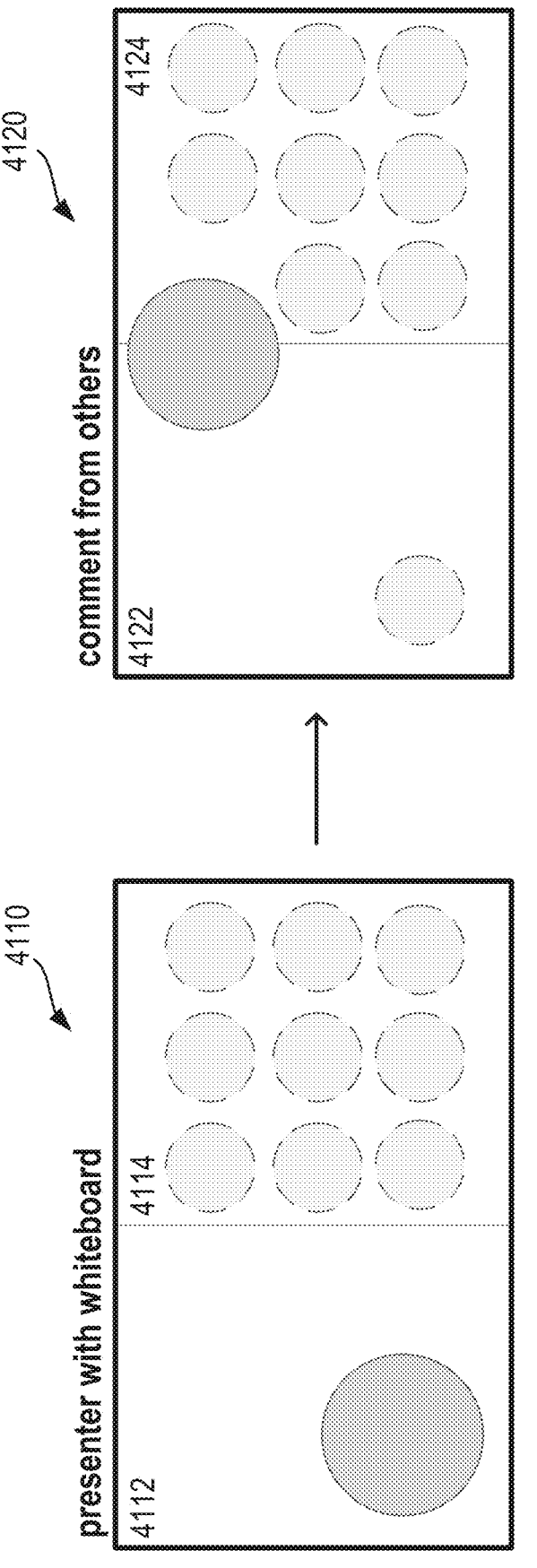
FIG. 41 illustrates various example geometric layouts, consistent with some embodiments of the present disclosure.
Figure 42:
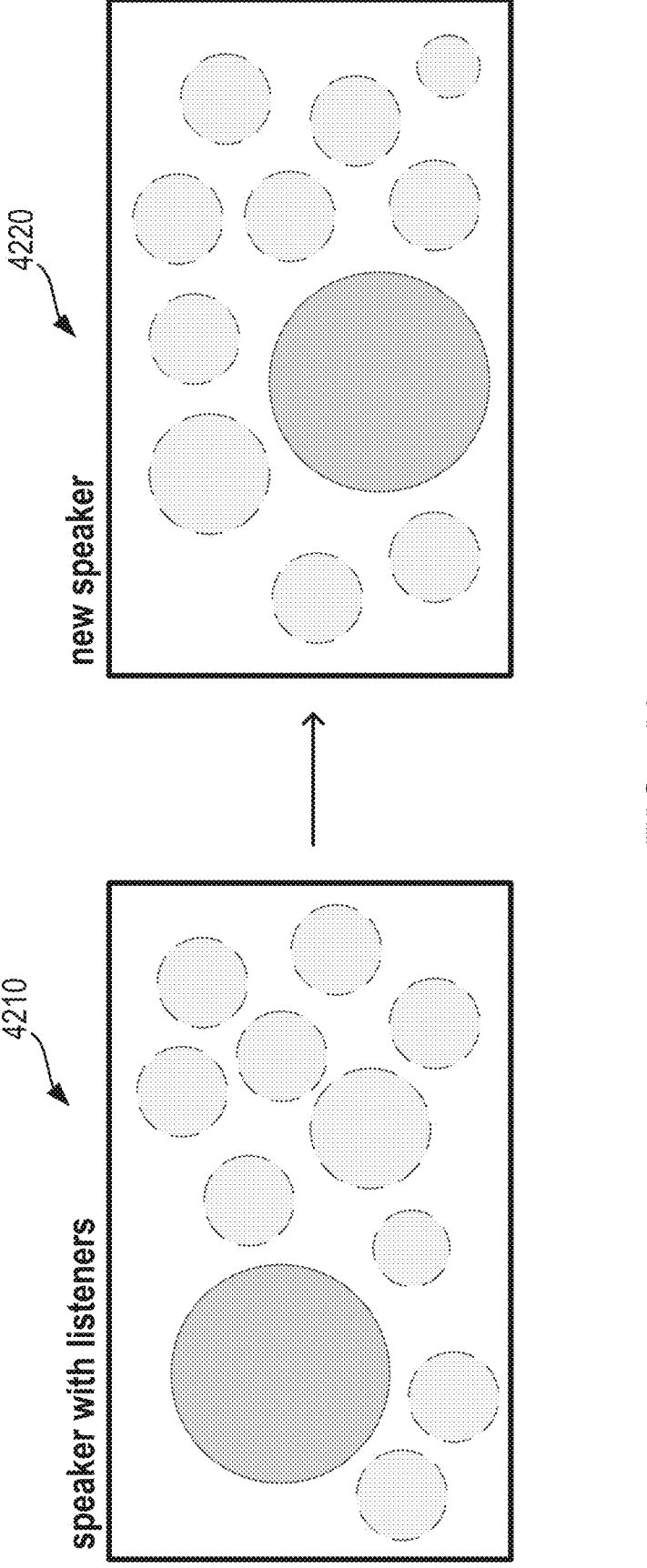
FIG. 42 illustrates various example round tile layouts, consistent with some embodiments of the present disclosure.
Figure 43:
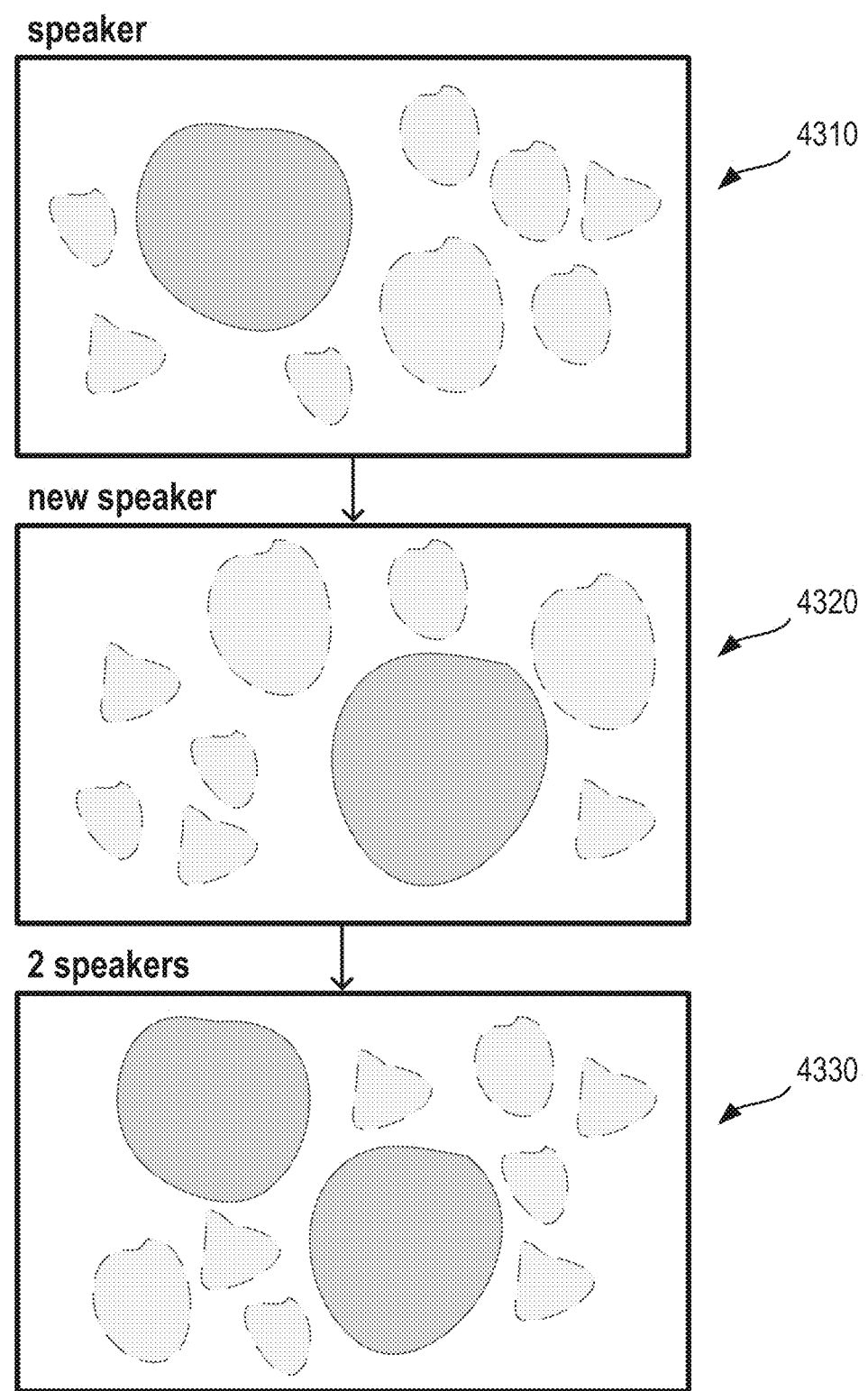
FIG. 43 illustrates various example soft rock tile layouts, consistent with some embodiments of the present disclosure.

FIGS. 39-44 illustrate various example of tile layouts. As shown in FIGS. 39-43, tiles representing speakers, active participants, or other meeting participants/objects of interest are shown as tiles with solid line borders. Tiles representing other meeting participants are shown as tiles with dashed line borders. FIG. 39 illustrates various examples of floating tile layouts, where the tiles shown on the display may be of various sizes, located in various locations, be of various orientations, and/or overlap with one another. Tile layout 3910 illustrates a floating tile layout with a single speaker, tile layout 3920 illustrates a floating tile layout with a transition to a new speaker, and tile layout 3930 illustrates a floating tile layout with two speakers. FIG. 40 illustrates various examples of adjusting grid layouts, where the tiles shown on the display may be in a grid shape, but be of various sizes. Tile layout 4010 illustrates an adjusting grid layout with a single speaker, tile layout 4020 illustrates an adjusting grid layout with a transition to a new speaker, and tile layout 4030 illustrates an adjusting grid layout with two speakers. FIG. 41 illustrates various examples of geometric layouts, where the tiles shown on the display may be of different shapes (e.g., circular, as shown in FIG. 41). As shown in geometric layout 4110, a presenter by a whiteboard 4112 may be identified as a speaker and the corresponding tile may be adjusted in size such that it is larger than the tiles of other meeting participants 4114. In some embodiments, as shown in geometric layout 4120, a meeting participant (e.g., audience member) may begin speaking or provide a comment 4124. The tile corresponding to the meeting participant may be adjusted in size such that it is larger than the tiles of the other meeting participants and the former speaker 4122. FIG. 42 illustrates various examples of round tile layouts, where the tiles shown may be round (or circular) in shape. Although shown as circular or round in FIG. 42, it is contemplated that tiles may be in any shape such as—but not limited to—square, rectangular, triangular, pentagonal, hexagonal, etc. Furthermore, it is contemplated that tiles within a display may be different shapes. As shown in round tile layout 4210, a speaker may be identified by a corresponding tile that is larger than the tiles corresponding to other meeting participants. As shown in round tile layout 4220, a new speaker may begin to speak and the tile corresponding to the new speaker may increase in size while the tile corresponding to the previous speaker may decrease in size. FIG. 43 illustrates various examples of soft rock tile layouts. As used herein, soft rock tile layouts may pertain to tiles that are generally amorphous and/or have no designated shape. Tile layout 4310 illustrates a soft rock tile layout with a single speaker, tile layout 4320 illustrates a soft rock tile layout with a transition to a new speaker, and tile layout 4330 illustrates a soft rock tile layout with two speakers.

FIG. 44 illustrates various examples of organic layouts. Tiles in organic layouts may be generally amorphous and, in some embodiments, may be shaped based on general outlines of the meeting participants or objects represented in their corresponding video streams. As shown in organic layout 4410, some single camera systems may capture meeting participants and display them in various clusters within tiles. As shown in organic layout 4420, multi-camera systems may capture meeting participants and objects of interest (e.g., a whiteboard) and display them in various tiles.

Gallery view may show or display certain meeting participants in more than one tile to highlight those participants and to provide context for how those participants relate to others in a group. For example, a gallery view may include two or more tiles. In some embodiments, at least one active participant may be featured alone in a first tile and may also be shown together with one or more other participants in a second tile. The terms "first" and "second" do not specify any particular ordering, orientation, etc. of the tiles on display. Rather, the first and second tiles may designate any tiles in a gallery view of two or more tiles.

In some embodiments, Gallery View may be implemented using AI techniques and may provide an individual view of every person in a room/environment. The camera may detect the people in the room and create a split view based on the detections.

By using machine learning, the number of people in a room and the location(s) of people in a room may be detected and/or determined. These detections may be used with a ruleset/training methodology on how people should be framed to create a split view with selected framing for meeting participants.

In some embodiments, Gallery View may pertain to an artificial intelligence-powered framing experience that may ensure meeting equity in various sized meeting environments (e.g., small meeting spaces, medium meeting spaces). Gallery View may involve a split-screen layout that automatically adjusts zoom levels to give every participant equal representation. In some embodiments, Gallery View may remove (unnecessary) empty space from a video stream (e.g., overview video stream, primary video stream), permitting the focus of a speaker or active meeting participant. Additionally, or alternatively, the framing may adjust when an individual enters or leaves the room to ensure that all meeting participants are visible during the meeting. In some embodiments, Gallery View may use overview and group layouts to show all participants in a meeting environment. For example, when people are located close together, Gallery View may place them as a group in a common tile. As another example, when there is frequent movement (of participants) within a meeting environment, people entering or leaving the meeting environment, or poor framing situations, Gallery View may use overview to frame all participants without splitting the layout.

Figures 23A, 23B:
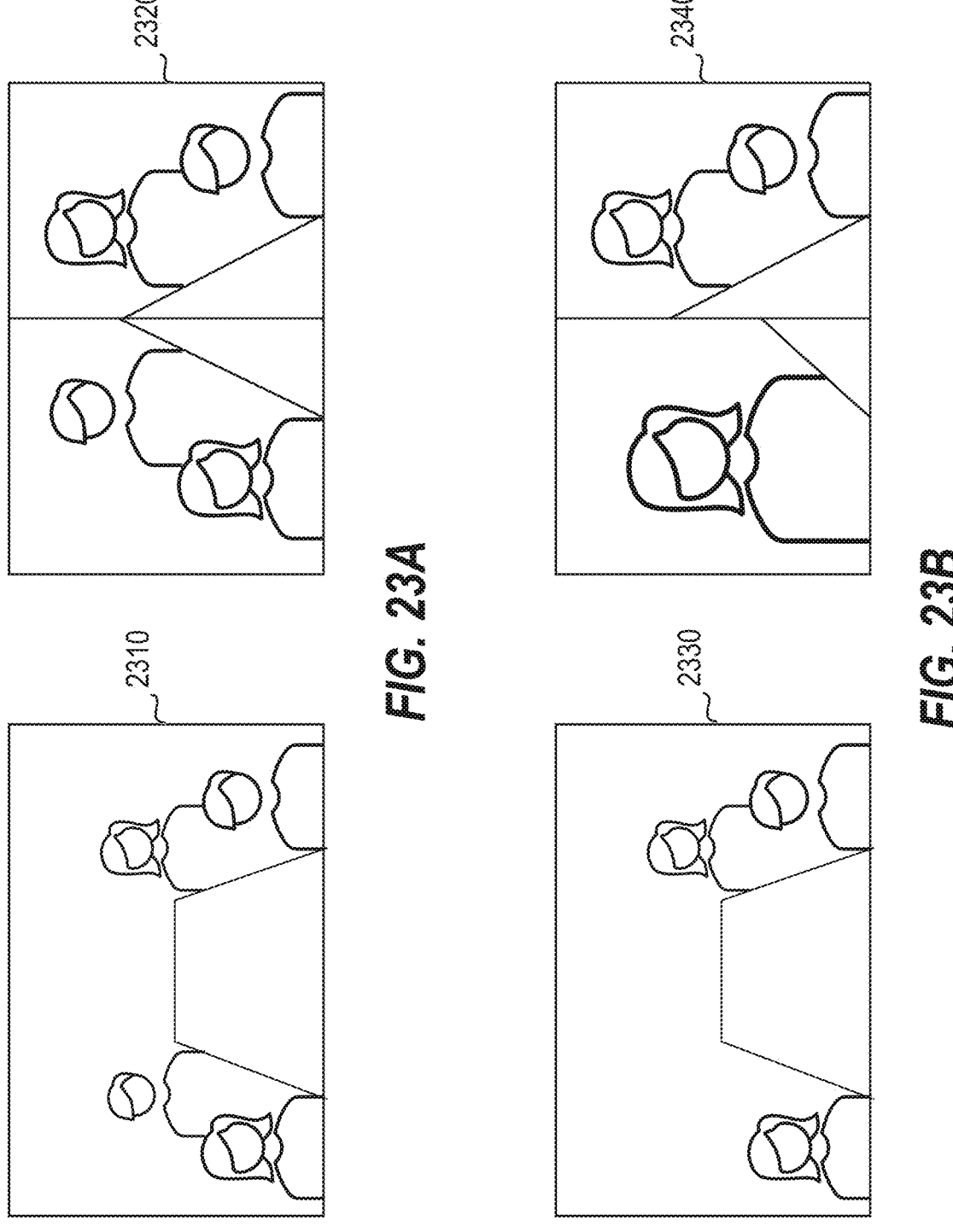
FIGS. 23A-23B illustrate examples of composition layouts/group shots, consistent with some embodiments of the present disclosure.

FIGS. 23A-23B illustrate examples of composition layouts/group shots. As shown in FIG. 23A, four meeting participants represented in overview stream 2310. A composition layout 2320 may be selected, determined, and output, grouping meeting participants together and presenting the group shots as tiles in a gallery view. As shown in FIG. 23B, three meeting participants may represented in overview stream 2330. A composition layout 2340 may be selected, determined, and output, grouping meeting participants together and presenting the group shot(s) as tiles in a gallery view.

At the start of a new stream (or meeting, e.g., video conference), the Gallery View feature may show an overview with the camera's full field of view. This may provide remote (or far end) participants with an orientation of the scene in the meeting environment, conveying information regarding the physical meeting environment, such as who is present in the meeting environment and where they are located. Showing an overview shot at the start of a new stream may also provide the artificial intelligence model time to accurately detect the participants in the meeting environment (or room). After a duration of time (e.g., one minute, five minutes, ten minutes, thirty minutes, one hour), the Gallery View feature may transition to a split-view layout if required conditions are met. In some embodiments, if one or more conditions are not met, the Gallery View feature may continue to present the overview and reframe for the best possible frame. The Gallery View feature may eventually transition to a split-view layout once all conditions are met.

Consistent with disclosed embodiments, zoom levels of a split view layout may be automatically adjusted to show meeting participants with equal equity. The zoom level may be limited to a maximum zoom (e.g., 500%) to avoid reduction in quality of the video stream or image. Furthermore, in some embodiments, Gallery View may aim to frame all meeting participants in a manner such that they are centered in their respective frames, and aligned horizontally with respect to each other. Each frame of each meeting participant may show each meeting participant's upper body to capture body language. Furthermore, based on their position in the room, meeting participants may be shown in order from left to right (or right to left). If a meeting participant moves or switches positions, Gallery View may adapt and adjust the split view layout once the meeting participant stops moving.

Figure 25:
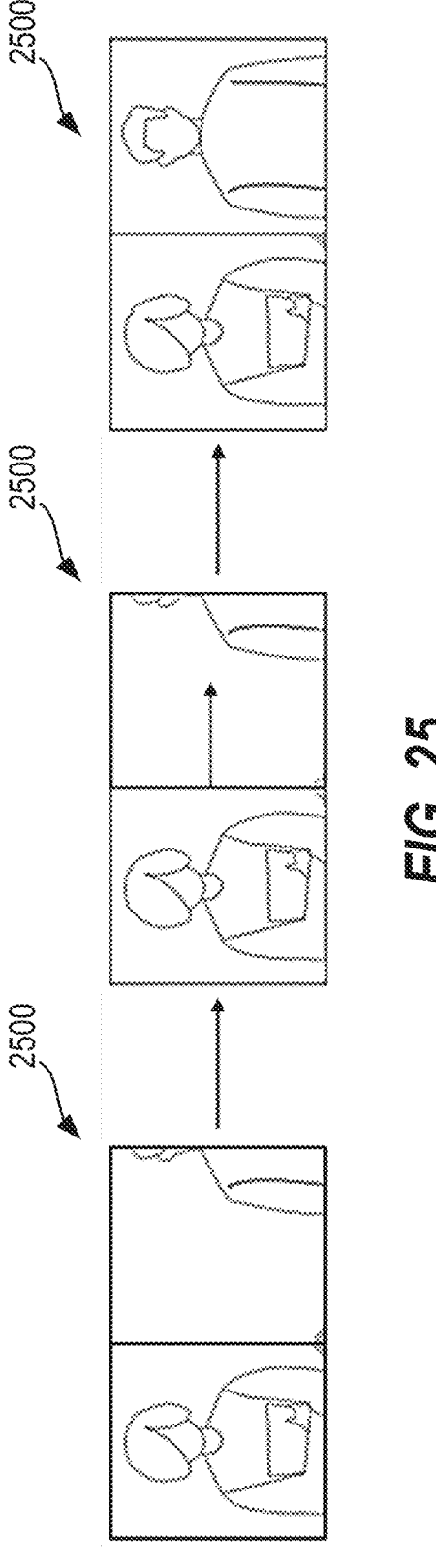
FIG. 25 illustrates an example of reframing, consistent with some embodiments of the present disclosure.

In some embodiments, Gallery View may reframe when meeting participants move. As shown in FIG. 25, meeting participant 2500 may move slightly out of frame, and Gallery View may adjust to reframe meeting participant 2500. Although shown in split view in FIG. 25, it is contemplated that Gallery View may reframe an overview view type.

Figure 24A:
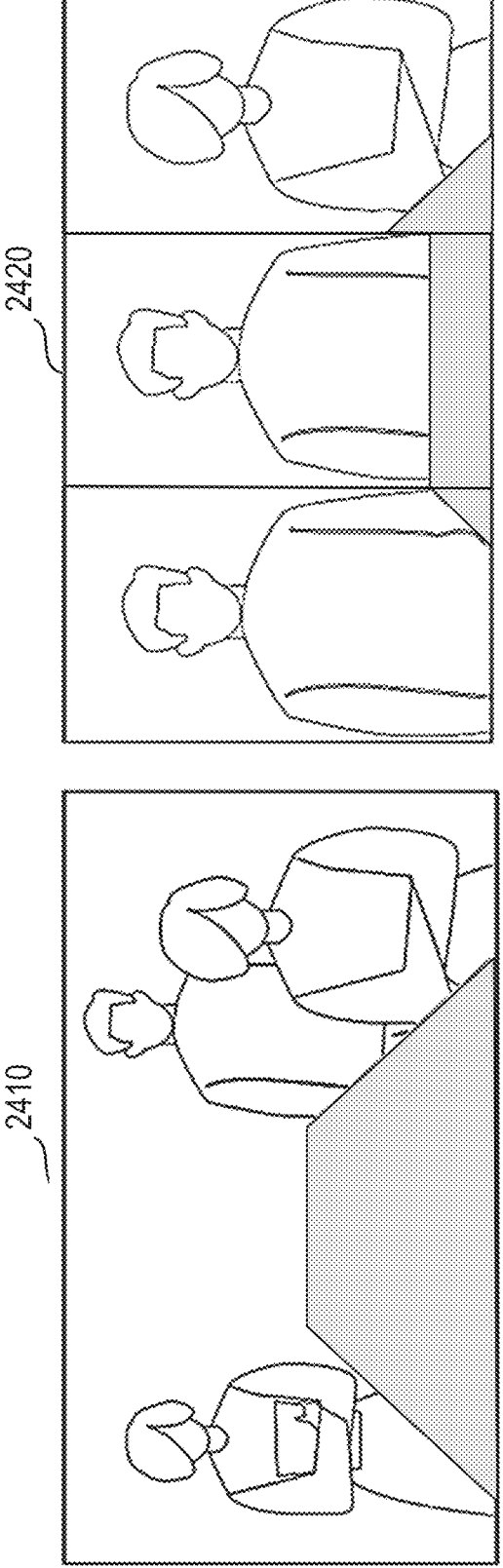
FIG. 24A illustrates examples of Gallery view types, consistent with some embodiments of the present disclosure.
Figure 24B:
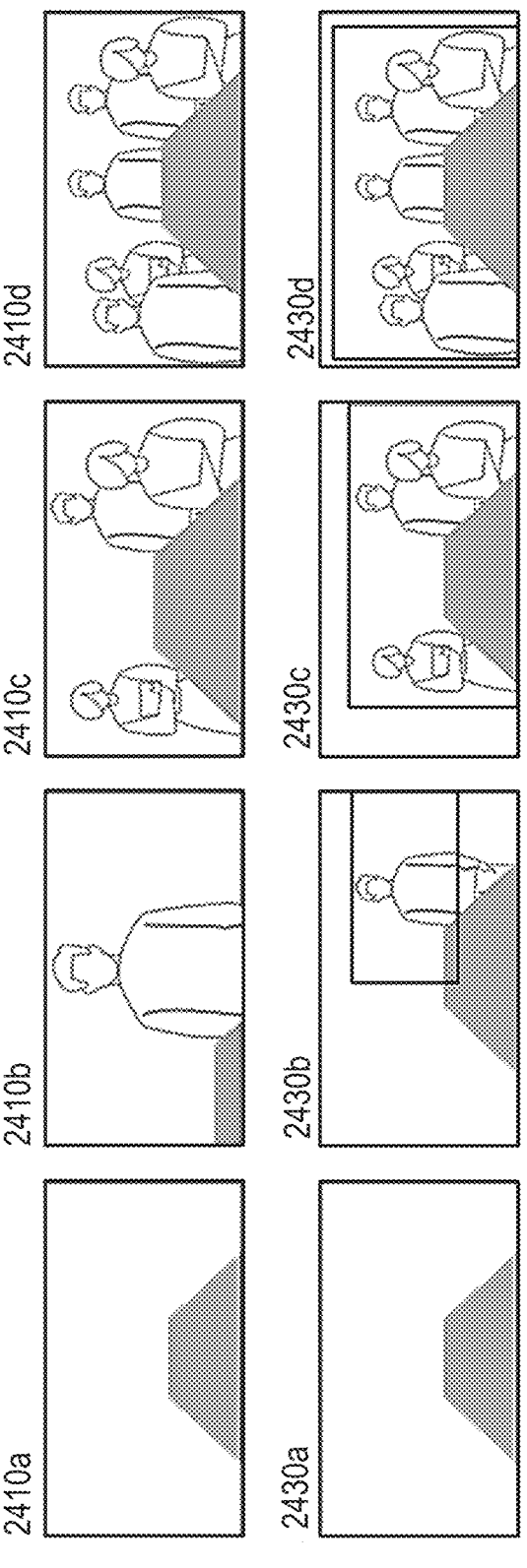
FIG. 24B illustrates examples of different overview view layouts, consistent with some embodiments of the present disclosure.
Figure 24C:
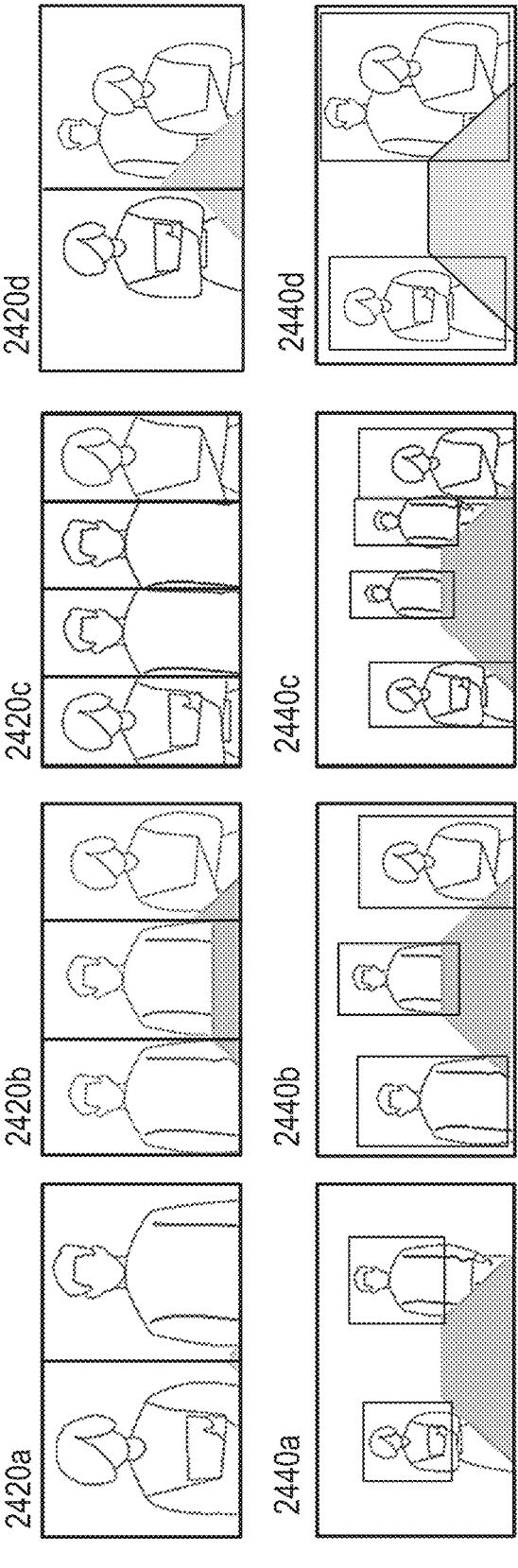
FIG. 24C illustrates examples of different split view layouts, consistent with some embodiments of the present disclosure.

As shown in FIG. 24A, Gallery View may include two general view types: an overview 2410 and a split-view layout 2420. Overview 2410 may frame all meeting participants in a best possible manner and may include different layouts. Non-limiting examples of overview layouts 2410a, 2410b, 2410c, 2410d, based on framing of meeting environments 2430a, 2430b, 2430c, and 2430d, are shown in FIG. 24B. Split view layout 2420 may include different layouts. Non-limiting examples of split view layouts 2420a, 2420b, 2420c, 2420d based on framing of meeting environments 2440a, 2440b, 2440c, 2440d are shown in FIG. 24C. As shown in split view layout 2420d, group shots of uneven number of meeting participants may be generated and displayed based on, for example, and odd number of individuals in meeting environment 2440d. Disclosed embodiments may receive visual input from an artificial intelligence model that detects people. Using this input together with a set of rules on composition and timing, Gallery View may frame the people in the meeting room with view types as shown in FIGS. 24A-24C.

Figure 30:
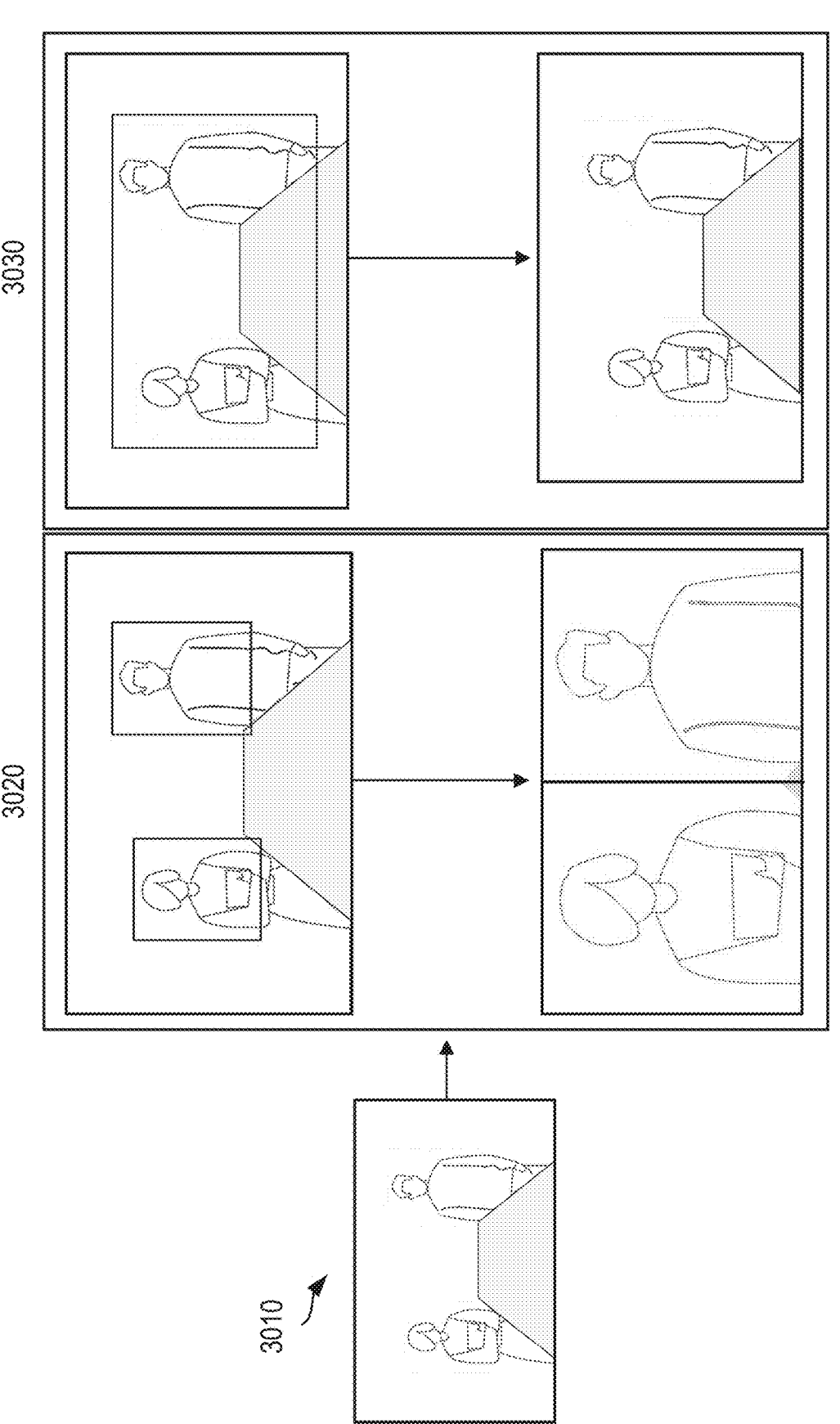
FIG. 30 illustrates examples of two types of modes within Gallery View, consistent with some embodiments of the present disclosure.

Additionally, as shown by example in FIG. 30, Gallery View may include two general modes: an individual framing mode 3020 and an overview mode 3030. A meeting environment may include two meeting participants in a 120 degree field of view shot 3010. In individual framing mode 3020, person framers may identify representations of meeting participants and display each representation of each meeting participant in a tile. For example, as shown in individual framing mode 3020, each representation of each meeting participant may be shown in a tile, and the tiles may be side-by-side in a horizontal manner. It is contemplated that the tiles may be in any layout or arrangement, including—but not limited to—a vertical column, a horizontal row, or an N×M matrix (where N may represent the number of columns and M may represent the number of rows in a matrix). It is also contemplated that the tiles may be different sizes and that meeting participants or objects of interest may be shown in larger tiles than other meeting participants or objects. Furthermore, as shown in individual framing mode 3020, frames corresponding to each meeting participant may be adjusted such that the meeting participants are displayed with equal equity (as discussed herein). In some embodiments, overview mode 3030 may provide a best possible framing of all participants when, for example, a gallery mode (or individual framing mode or split view mode) cannot be achieved. As shown in overview mode 3030, meeting participants (and, in some embodiments, objects of interest) may be framed together and displayed in a tile or on a display.

Figure 31:
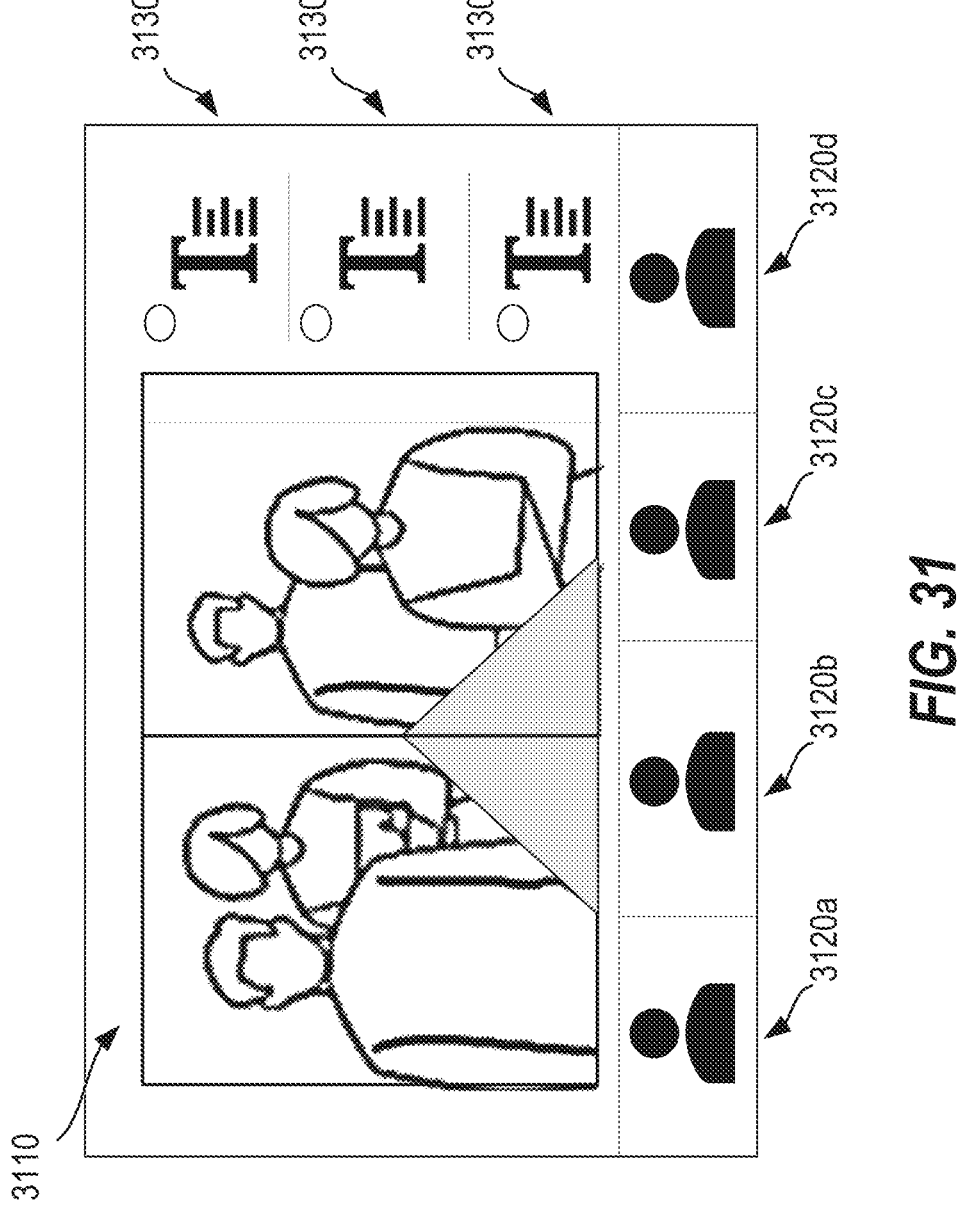
FIG. 31 illustrates an example of Gallery View within an example video conferencing platform, consistent with some embodiments of the present disclosure.

In some embodiments, as discussed herein, the display may be included in a video conferencing system (e.g., Microsoft Teams, Zoom, Google Meet, Skype), as shown in FIG. 31. The display of FIG. 31 may include a Gallery View tiled layout (or composition layout) 3110 of a meeting environment; additional video streams 3120*a*, 3120*b*, 3120*c*, 3120*d* of remote meeting participants; and a chat window including chat bubbles 3130*a*, 3130*b*, 3130*c*. As shown, in some embodiments, multiple meeting participants may be displayed in each tile based on a detection of the overlapping of representations of meeting participants. As used herein, the terms "overlap" or "overlapping" may be understood to mean that the representations of the individuals, e.g. meeting participants, overlap spatially in a video stream. It is contemplated that the display included in a video conferencing system may include any combination of the features of displays discussed herein including, but not limited to, the layouts discussed herein. For example, in some embodiments, video conferencing systems (or streaming platforms) may design (via user input or video conferencing system requirements) layouts from the various shot types discussed herein. As another example, layouts discussed herein may be streamed directly to and shown on displays within a video conferencing system.

In some embodiments, Gallery View may implement a transition between overview and split view layouts. The transition may occur when particular conditions are met, and the particular conditions may include that the number of people must be supported for a spit view layout; all people in the room must be detected reliable, there are no major movements in the scene, there is sufficient space between people, and a particular time period has occurred since the last transition. If the number of people has changed, but the number is still supported by split view, Gallery View may directly transition from a split view layout to another split view layout. If the number of people has changed, but the number is not supported by split view, Gallery View may transition from a split view layout to an overview layout. If people move such that it is not possible to frame them without people (or heads) overlapping into adjacent tiles, Gallery View may transition from a split view layout to an overview layout.

Embodiments of the present disclosure may combine Speaker Framing and Gallery View such that an overview of a meeting environment is provided while a currently selected shot (or primary stream that is of importance due to, for example, a speaker, a listener, or active participant being captured by it) gets a prioritization in space. A prioritization in space may include, but is not limited to, the tile in which the prioritized shot is displayed being larger (e.g., in area) than the other tiles displayed (e.g., double the size of other tiles displayed. Thus, it is possible to view participants of interest (e.g., speaker, listener, active participant) and all participants in the meeting environment simultaneously. Furthermore, roles (e.g., speaker, presenter) and relationships (e.g., speaker and listener, presenter and audience) within the meeting environment may be understood and portrayed to far end or remote participants.

Figure 26B:
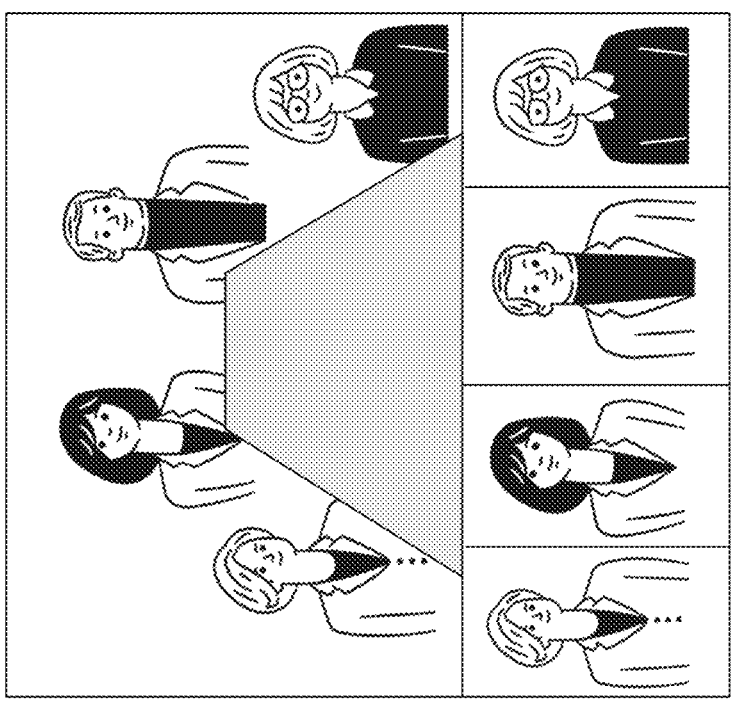
FIGS. 26A-26B illustrate an example of an overview layout configuration, consistent with some embodiments of the present disclosure.
Figure 26A:
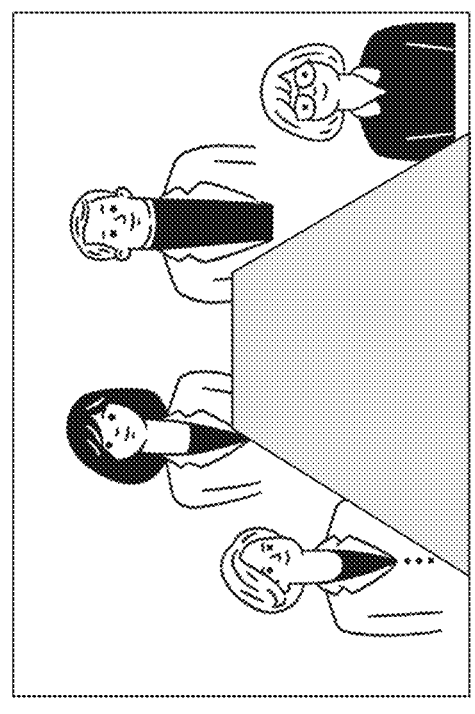
Figures 26C, 26D, 26E, 26F:
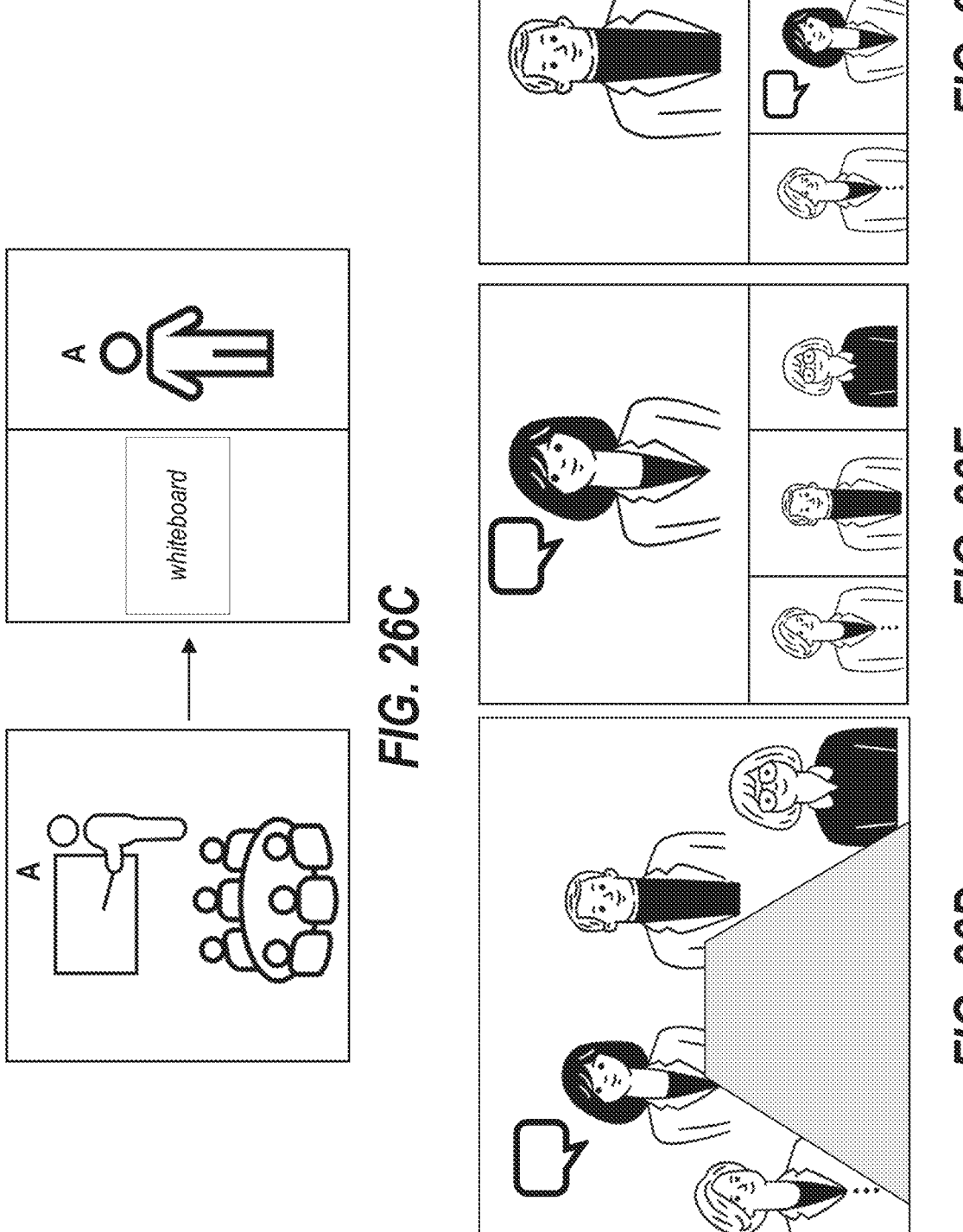
FIG. 26C illustrates an example of a layout configuration with an object of interest, consistent with some embodiments of the present disclosure.
FIGS. 26D-26F illustrate examples of split view layout configurations, consistent with some embodiments of the present disclosure.

FIGS. 26A-26F illustrate various examples of layout configurations. FIG. 26A illustrates an example video stream of a meeting environment. FIG. 26B illustrates an example layout including an overview stream and four primary streams (each corresponding to each meeting participant). FIG. 26C illustrates an example presenter shot with an object of interest, such as a whiteboard. In detection of an object of interest, embodiments of the present disclosure may run neural networks or engines to process detection of meeting participants and character detection (e.g., of writing, drawings, or other characters written on, for example, a whiteboard) simultaneously. FIG. 26D illustrates an example video stream of a meeting environment, where a meeting participant is actively speaking (e.g., the presenter). FIG. 26E illustrates an example split view stream, where the display of the presenter occupies two rows and three columns of tiles. FIG. 26F illustrates an example split view stream, where the display of a listener occupies two rows and three columns of tiles.

As shown by example in FIG. 26E, the speaker in the priority tile may not be shown again in a smaller tile. Furthermore, some embodiments of the present disclosure may involve switching between speaker view (e.g., FIG. 26E) and listener view (e.g., 26F). In some embodiments, the speaker may occupy the small tile of the listener while the listener is in the priority tile, and vice versa.

The layout configurations may be described by specifying the position and the dimension of each tile. Furthermore, two corner points may be specified to further specify any possible layout consisting of tiles (e.g., rectangles), and this information may be sent to a layout engine (discussed below), to compose the output stream.

Some embodiments of the present disclosure may allow user input to manually select a meeting participant to give priority in the layout. The selected meeting participant may be a presenter or any person of importance. In some embodiments, a user interface (e.g., through a camera application (app)) may allow a user to manually select a meeting participant by, for example, selecting a bounding box associated with the meeting participant.

The camera may run a neural network that detects people, a Kalman-filter, and a matching algorithm for tracking people or meeting participants. Each meeting participant may be assigned an identification (ID). Non-limiting examples of IDs include a numerical value, a text value, a symbol, a combination of symbols, a vector, or any other value that may differentiate people. The IDs may be shared between the camera and, for example, the camera app. The ID may be used to select a person in the camera app and forward the information to the camera. The camera may then prioritize the selected person as long as they are in the stream. Once the person leaves the room, the ID may be deleted or otherwise no longer exist, and the feature may be reset to, for example, automatic speaker detection or equal equity, until a new person is manually selected.

In some embodiments, Gallery View may receive tracks representing the meeting participants. Gallery View may group these tracks depending on if they can be framed together and yield a list of the groupings. The list may contain single person clusters and/or group clusters. A single person cluster may be obtained when a person in a meeting environment is at a sufficient distance from the rest of the participants such that the meeting participant can be framed by themselves. A group cluster may comprise a set of meeting participants that are close enough such that they can be framed together (or put together in a frame).

In some embodiments, meeting participants can be grouped based on head height. By approximating that the width of a person's shoulder is approximately two times the height of their head, the head height may be used to determine the distance in pixels from the center of a person's head that is required to frame them based on the Gallery View principles discussed herein. The determination may be calculated as shown below, where A represents the factor that the shoulders width needs to be multiplied by to include body language.

$$distance_{lr} = \frac{(head\ height \times 2 \times \lambda)}{2}$$

Body language may be a significant component of communication, and by framing people with a focus on the face and upper body, a space for connection and understanding may be created. As mentioned above, Gallery View may aim to reduce empty space and frame each meeting participant equally. Thus, the participants in a meeting may be framed such that their body expressions or body language may be captured by their respective primary video streams and/or tiles. Furthermore, in some embodiments, meeting participants may occupy a similar portion of the screen. In some embodiments, when there are no speakers, Gallery View may be used to dictate the layout. In other embodiments, when there are multiple speakers or too many speakers to determine which require priority, Gallery View may be used to dictate the layout.

Gallery view may make everyone in the room appear similar in size, and keep peoples' heads aligned on the screen. For example, if someone appears bigger or higher up in the image, they seem more important, and this may create an unnecessary sense of a power balance between the participants that might not actually be present.

If a person moves so that they are cropped or no longer visible in their frame, the camera may adjust the framing to capture their new position. Potential benefits may include any of the following: to create a sense of equity between all meeting participants; to make sure remote participants get a closer view of everyone in the meeting room; and/or to remove empty space in a room (walls, ceiling, floor, etc.) from the image.

Gallery view may also assist by: helping remote participants keep a full overview of every person in the meeting room; ensuring everyone gets the same amount of space and time on the screen; framing meeting participants more closely (and, in some embodiments, without interference or overlapping with other meeting participants).

The technical implementation of Gallery View may include a machine learning (ML) vision pipeline that may detect persons (head and body) in an image. By using ML and filtering techniques (e.g., Kalman-filter) it is possible to create person tracks from these detections. These tracks may not only be based on the current input detection, but may also be based on input history and contain additional information (e.g., if a person is moving). The tracks may provide input data for the virtual director unit. The virtual director unit (which may be implemented as a finite state machine)

may determine the layout as well as the framing commands for each tile based on the input data and its own state.

Figures 27A, 27B:
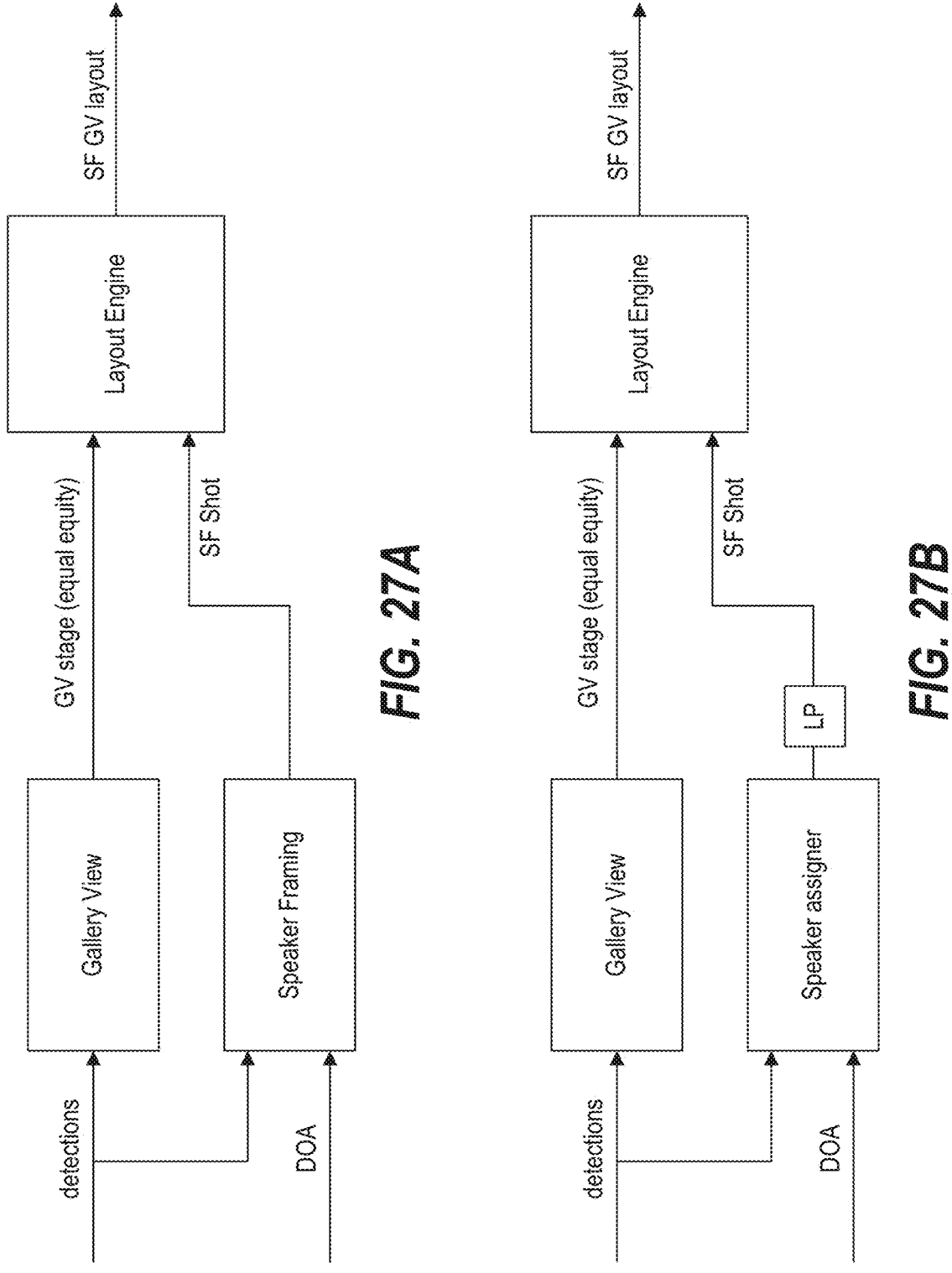
FIGS. 27A-27B are flowchart representations of example Layout Engine processes, consistent with some embodiments of the present disclosure.

As discussed above, a Layout Engine Director may implement a combination of Speaker Framing and Gallery View features. Speaker Framing (SF) and Gallery View (GV) may run in parallel, as shown in FIG. 27A, and forward their respective outputs in the form of a state information into the Layout Engine. The Layout Engine may consider both the base state from Gallery View to determine what base layout to create and then add the state of Speaker Framing on top (e.g., superimpose) to create a priority Gallery View. In some embodiments, Speaker Framing may be replaced with an assigned speaker (as discussed above) and a low pass filter, as shown in FIG. 27B. In such embodiments, the system may involve tracking only the speaker and giving priority to active speakers only in the gallery.

Figure 28:
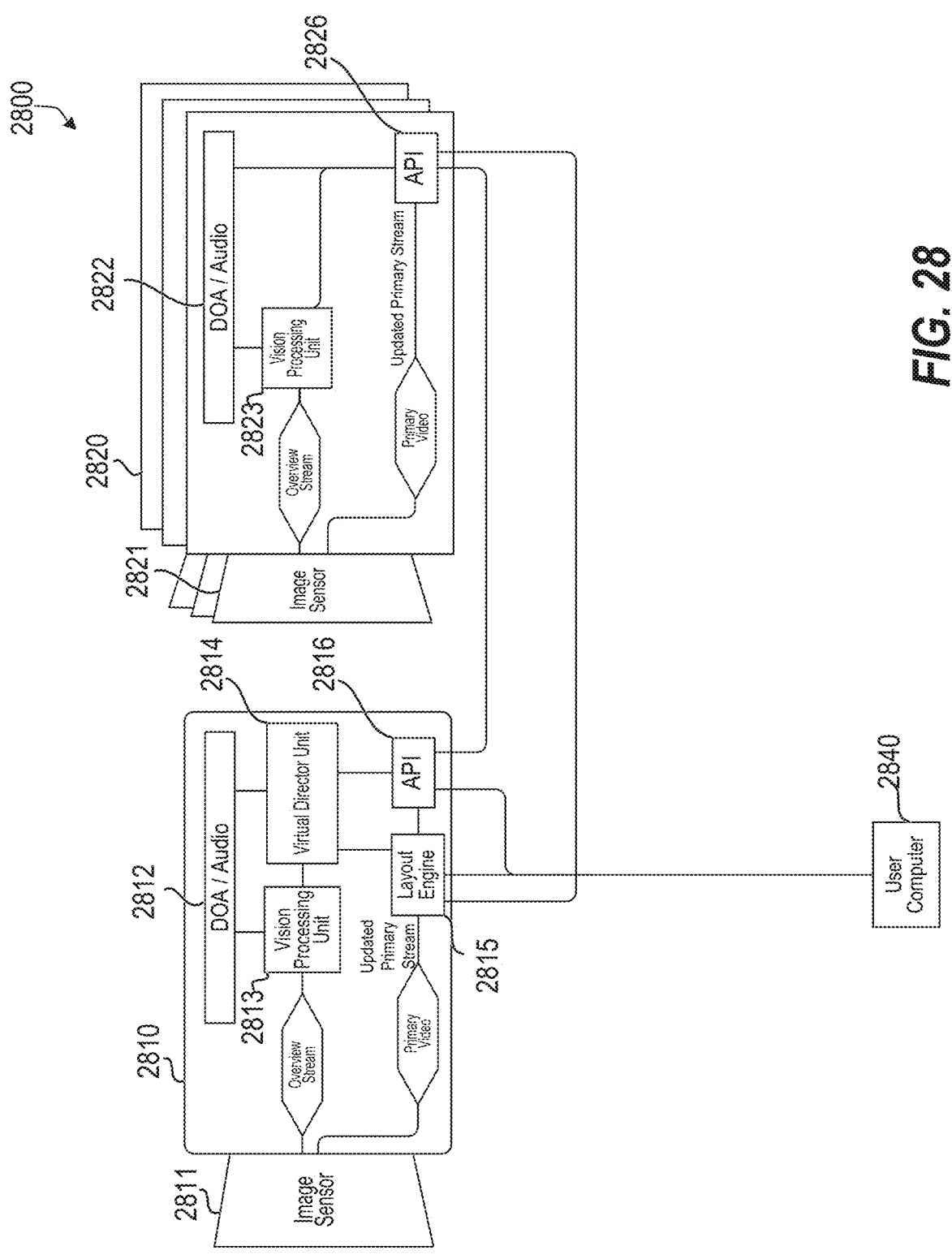
FIG. 28 is a diagrammatic representation of an example of a multi-camera system implementing a Layout Engine, consistent with some embodiments of the present disclosure.

In some embodiments, as discussed herein, a Layout Engine Director may be implemented in a multi-camera system, as shown by example in FIG. 28. Consistent with some embodiments of the present disclosure, multi-camera system 2800 may include a primary camera 2810 (or main camera), one or more secondary cameras 2820 (or one or more peripheral cameras), and a user computer 2840 (or host computer). In some embodiments, primary camera 2810 and one or more secondary camera 2820 may be of the same camera type such as, but not limited to, the examples of cameras discussed herein. Furthermore, in some embodiments, primary camera 2810 and one or more secondary cameras 2820 may be interchangeable, such that primary camera 2810 and the one or more secondary cameras 2820 may be located together in a meeting environment, and any of the cameras may be selected to serve as a primary camera. Such selection may be based on various factors such as, but not limited to, the location of a speaker, the layout of the meeting environment, a location of an auxiliary item or item of interest (e.g., whiteboard, presentation screen, television), etc. In some cases, the primary camera and the secondary cameras may operate in a master-slave arrangement. For example, the primary camera may include most or all of the components used for video processing associated with the multiple outputs of the various cameras included in the multi-camera system. In other cases, the system may include a more distributed arrangement in which video processing components (and tasks) are more equally distributed across the various cameras of the multi-camera system.

As shown in FIG. 28, multi-camera system 2800 may include similar components to multi-camera system 100 including—but not limited to—image sensors 2811, 2821; DOA/Audio units 2812, 2822; vision processing units 2813, 2823, virtual director unit 2814; layout engine 2815, and APIs 2816, 2826. These components may perform similar functions herein. Additionally, or alternatively, as shown in FIG. 28, primary camera 2810 may include different components from the one or more secondary cameras 2820. For example, multi-camera system 2800 may include Layout Engine 2815, which may incorporate any and all of the features discussed herein with respect to the Layout Engine Director, Layout engine, and Adaptive Layouts.

A speaker, or speaker group, can be located at the left, right, or middle of the image with respect to other participants in the room. In some embodiments, once the position of the speaker in the room with respect to the camera is determined, the position of each layout may be mapped based on other participants. As an example, if a current speaker if to the left of the image, the Layout Engine algorithm may determine what is to the left of the speaker. The remaining clusters may be used to map each scenario, taking into consideration that each cluster can consist of either a single framed person or a framed group.

In some embodiments, a set of rules may be employed to determine the potential location of clusters. For example, if a speaker or group of speaker's position is left, it may have up to three clusters to its left. As another example, if a speaker or group of speaker's position is right, it may have up to three clusters to its right. As yet another example, if a speaker or group of speaker's position is middle, there may be up to two clusters to its left and up to two clusters to its right. A subject or meeting participant may have from zero to three clusters to its left, and each cluster may include any possible combination of single person clusters and group clusters. Such rules may be determined based on a size of most meeting rooms (e.g., average size of meeting rooms) or the size of a particular meeting room.

Embodiments of the present disclosure may include state logic, or a portion of an algorithm that may decide if a current layout (e.g., layout currently being displayed) should be changes. To do this, it may keep track of information provided by the Layout Engine. The state logic may be dependent on the assumption that all the previous components provide consistent information to make a decision. The current layout may be updated if either (i) a candidate layout is approved, or (ii) it is not possible to determine what layout should be displayed.

In some embodiments, to approve a candidate layout, the state logic must verify that the layout engine has returned to the same candidate layout for a certain number of consecutive iterations. To do this, state logic may keep count of the number of times the same candidate layout has been repeated consecutively but also that the candidate clusters are also the same. As discussed above, a cluster may consist of an undefined number of persons/subjects, and there may exist a case where the Layout Engine may return the same layout but the members of the clusters have changed. This may result in framing people/subjects in an undesired or incorrect order. Once both the layout and cluster have been repeated for a particular number of times, the state logic may update the state and send the necessary information to the image pipeline to update the layout.

In some embodiments, the state logic may be unable to map a scenario to a particular layout. In these cases, a new approach may be adopted to either (i) update to an overview shot (e.g., if nobody is speaking), or (ii) frame only the speaker (e.g., if someone is speaking). This new approach may be triggered if the layout engine has returned different candidate layouts during several iterations. This may occur when people/subjects move around the room and switch positions for an extended period of time and there is a clustering scenario that has not been mapped to a layout. In some cases, there may be several people/subjects speaking at the same time for an extended period of time, or there may be a far end speaker. The algorithm, consistent with disclosed embodiments, may resort to a Gallery View layout.

Figure 29:
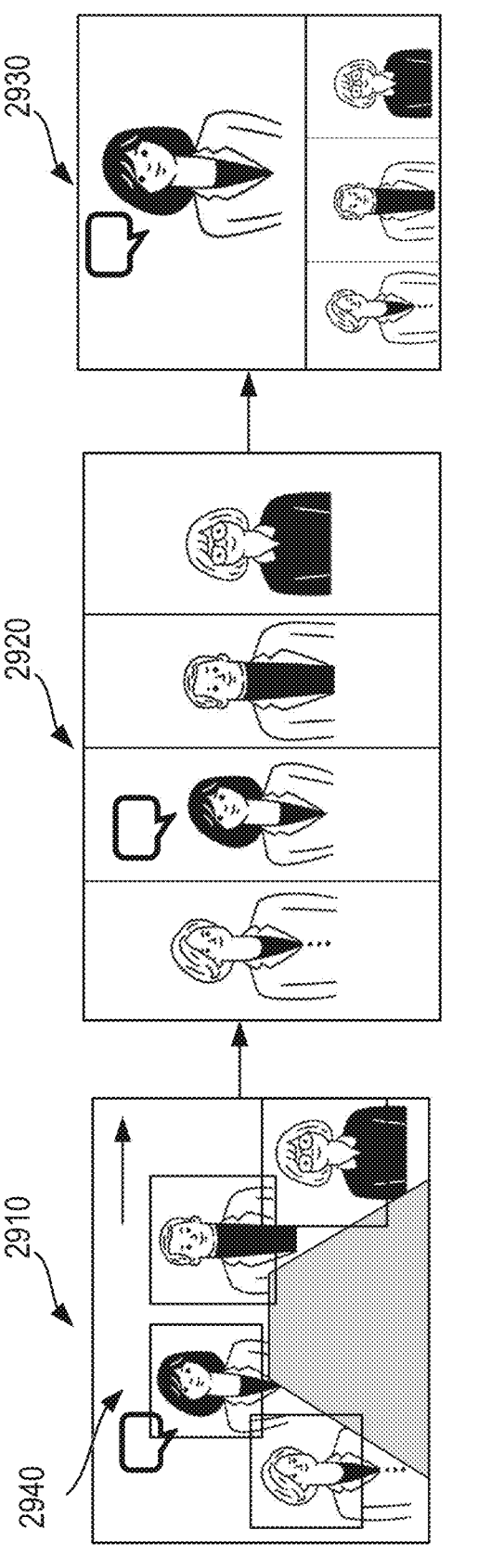
FIG. 29 is a diagrammatic representation of an example Layout Engine process, consistent with some embodiments of the present disclosure.

FIG. 29 illustrates a process of the Layout Engine, consistent with some embodiments of the present disclosure. As shown in step 2910, a camera (or a plurality of cameras) may first detect four people in a meeting environment. The Gallery View feature may decide on a four split view base layout (e.g., based on equal equity), as shown in step 2920. The Layout Engine may combine the information from Gallery View with speaker information (e.g., via Speaker Framing or an assigned speaker) and modify the base layout accordingly, to give priority to a speaker 2940, as shown in step 2930. As shown in FIG. 29, the final layout may be a combination of both inputs from Gallery View and Speaker Framing. The Layout Engine may be part of an algorithm, and the Layout Engine may decide which layout is more suitable for a particular situation based on current speaker and current participant clusters (for example, if the speaker is included in a cluster, the cluster may be displayed as priority). Through this information, the Layout Engine may provide a candidate arrangement for each iteration. This information may later be used by the framer logic to device if it should change to a new state/layout.

In some embodiments, a layout engine may be configured to implement a stream with up to 4 different tiles. The layout engine may be configured to implement several different layout variants such as, but not limited to, a 1×2 split, then 2×2, and 4×4, where each tile can be associated with a separate video stream. Any numbers of tiles can also be combined and used by one stream, so one stream can, in some embodiments, take up 2 columns and 2 rows. To switch from the default overview (all participants in one tile) to a multi-tile layout, several conditions may be required to be met: the correct number of person tracks (e.g., for the respective layout); all tracks need to be valid (e.g., person needs to be detected for a specified time such as 5 seconds); people are not moving in the image; including a waiting time (e.g., 5 seconds) after a layout switch preventing the layout from switching before it can switch again to reduce visual noise.

Additionally, if people overlap in the image, this may result in their respective tiles being merged.

In order to frame all participants, the virtual director unit may have at least three different types of framers at its disposal: overview framer, group framer, and person framer.

Figure 32A:
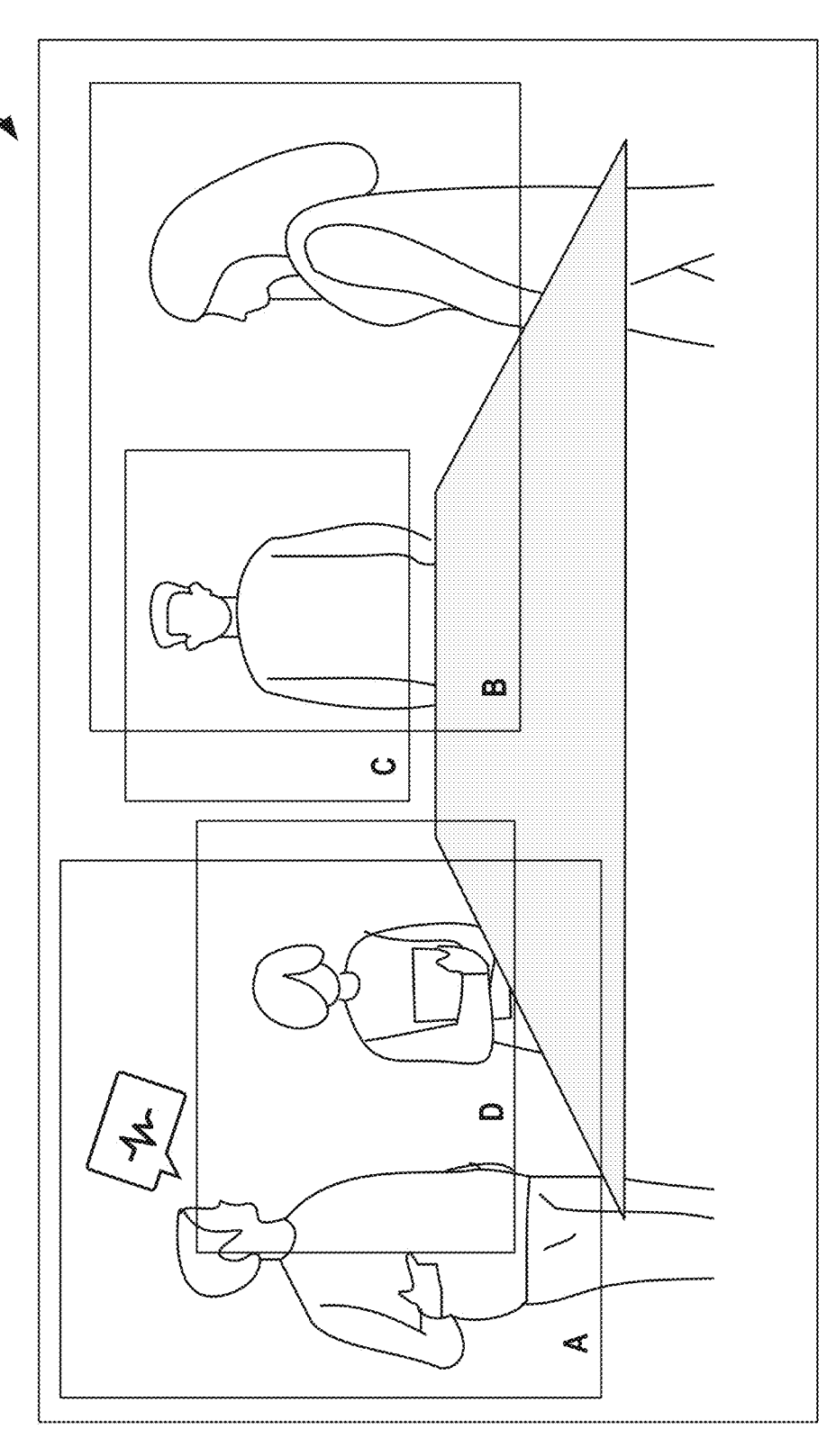
FIG. 32A-32D illustrate examples of person framers corresponding to participants in a meeting environment, consistent with some embodiments of the present disclosure.
Figures 32B, 32C, 32D:
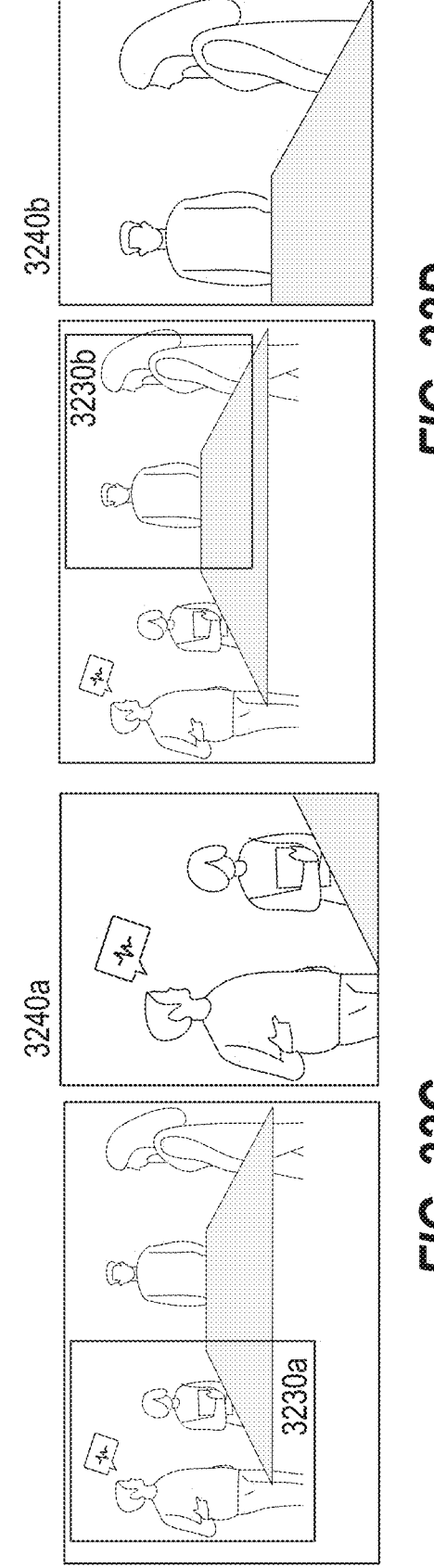

The overview framer may frame all participants in the image, and the person framer and group framer may be attached to, or correspond to, specific persons and groups of persons respectively. For example, as shown in FIG. 32A, meeting environment 3210 may include four (4) meeting participants. Each meeting participant may have a corresponding person framer A, B, C, D. In some embodiments, and as shown in FIG. 32A, the person framers A, B, C, D, may overlap. Thus, as shown in FIG. 32B, sub-streams 3220a, 3220b, 3220c, 3220d created based on person framers A, B, C, D (from FIG. 32A) may include cropped subjects, which may be distracting or unpleasant to a user or viewer of the framed video stream.

Thus, in some embodiments, disclosed systems and methods may generate framed shots according to an approach in which participants (e.g., participants that sit close together in a meeting) are grouped together to produce shots/framing that focus on particular participants of interest while including adjacent participants. This may produce a visually pleasing shot. For example, as shown in FIG. 32C-32D, sub-streams 3240a, 3240b may be displayed based on person framers 3230a, 3230b, respectively. Person framers 3230a, 3230b and sub-streams 3240a, 3240b may avoid the cropping of subjects by grouping together participants or focusing on particular participants of interest while including adjacent participants.

Person framers may be bound to the lifetime of their corresponding person track (and the same may be true for group framers with selected groups of persons). The virtual director unit may be responsible for supplying each framer it created with the correct subset of tracks it receives, as well as delegating and arranging the framer outputs (e.g., framing commands) in the correct way and order (e.g., according to the active layout).

In some embodiments, the virtual director unit may (i) manage the layout selection, and (ii) manage the framers who provide the individual framing commands for each tile. The virtual director unit may forward the layout information (e.g., the number of tiles, a tile arrangement, any tiles that should be merged) and the framing commands for each tile (e.g., as pan-tilt-zoom values with additional information regarding when to reframe) to the layout engine. In some embodiments, Gallery View may use hard cut transitions for layout switch and Bezier interpolation for reframing within tiles. Furthermore, the virtual directory unit may continuously evaluate the input from the vision pipeline to instruct the layout and the framing that is sent to a layout engine.

The prioritized criteria/detection may be dependent on the scenario/activity in the room or meeting environment. The virtual director unit may ensure that the speaker is in focus in the layout, and may ensure that if the speaker moves or changes position in the room, the layout will adapt accordingly. In some embodiments, the virtual director may ensure that the camera where the person is seen most from the front is used in their corresponding tile. As a meeting goes on, it may be necessary to change the layout either to give one person more space, or give each person the same size.

The virtual director unit account for the duration of time a person talks for and who talked last. For example, in a discussion, the virtual director unit may give each person the same amount of space in the layout, and ensure that their relative position is kept in the layout. As another example, if Person A is looking to the left to look at Person B, who has to look to the right to look at Person A, Person A may be placed to the right of person B in the layout. In some embodiments, gestures or body pose may also be used by the virtual director unit to control the layout. For example, if a person stands up and begins a presentation, the vision pipeline may detect this and that their whole body is in view. The virtual director unit may take this into account and instruct the layout engine that this person should take up a full column, to give them enough space.

In some embodiments, when a gesture is detected by the vision pipeline, such as a hand raise, the virtual director may take this into account and adjust the layout accordingly. For example, a person who has raised their hand may get the same tile size as the person talking in the meeting.

In some embodiments, the virtual director unit may include a software component that may take input from the vision pipeline component and determine the layout composition and what part of the primary video stream image should be used in each part of the layout. The properties that may be evaluated may include, but are not limited to: whether this person is speaking or not; for how long they have spoken; if someone is having a discussion or shorter dialogue where who is speaking changing (e.g., each person speaks for less than one minute at a time); if someone is presenting or leading a meeting (e.g., one person talking for the majority of the meeting or greater than one minute total); where they are looking; how much of the person is visible in the frame; what reactions and body language they're showing (e.g., If they're looking away, or at one person, if they're smiling or laughing, if a person is showing signs of drowsiness or closing their eyes); what other persons are visible in the frame; where individuals are moving and/or where they have been; what activity they're doing (e.g., writing on a whiteboard or drawing on a document); position and orientation; timing (e.g., avoiding frequent switching between layouts or reframing).

Embodiments of the present disclosure may include additional features and techniques including an adaptive layout engine. The adaptive layout engine may be implemented by one or more microprocessors associated with the disclosed systems and methods (e.g., one or more microprocessors associated with the video processing unit of a camera or server or cloud-based system). Among other operational capabilities, the adaptive layout engine may analyze one or more overview video streams (or any other video stream, audio stream, and/or peripheral sensor output) to detect various conditions, events, movements, and/or sounds in an environment. Based on such detections, the adaptive layout engine may determine a gallery view video layout to be shown on a display. Aspects of Gallery View controllable by the adaptive layout engine may include—but are not limited to—a number of tiles to include; tile orientation; relative size of included tiles; relative positioning of tiles; video streams selected, generated and/or designated for each tile; transitions between frames associated with one or more tiles; framing of an individual or object within a tile (e.g., Genius Framing, Speaker Framing, etc.); selection of individuals or groups of individuals to feature within Gallery View tiles (based on detected actions, total accumulated screen time, screen time equity, etc.); selection of time durations to maintain a particular shot; any other aspects and combinations thereof.

In some embodiments, the layout engine may operate by receiving instructions from the virtual director unit and composing a new video stream according to the layout instructions with a part of one or more of the primary video streams in each tile. The layout engine may also support different transitions, where the layout may be changed smoothly, or change in size depending on instructions from the virtual director unit.

Furthermore, disclosed systems and methods may use different types of transitions such as, but not limited to: hard cut, interpolated transition, and/or fading transition. Hard cut transitions may pertain to replacing a previous image or layout directly with a new image or layout from one frame to another. Interpolated transitions may pertain to transitions between a previous framing location and a new framing location in the image (e.g., in the form of a Bezier curve or other non-linear change in camera parameter value). The framing may not change its location directly within one frame transition. Instead, it may follow a calculated trajectory between the start and end framing position in the course of time (e.g., no more than 1-2 seconds). Fading transitions may pertain to putting a new image over a previous image and gradually increasing the intensity of the new image while gradually decreasing the intensity of the previous image.

For transitions on merging or splitting grid layouts, a hard cut or fading transition may be used, as interpolated transitions may add unnecessary visual noise and it may not always be possible to find the corresponding framing locations in the previous (old) and new layouts. For transitions within the cell when a person moves, an interpolated (or smooth) transition, similar to one performed for genius framing, may be used.

In some embodiments, the layout engine may provide multiple streams in addition to composing the video in one mainstream, and each of the streams may correspond to one tile in the layout. These streams may be provided to the host/computer/client so each video stream can be treated and adapt the overall layout in the video client.

The virtual director may also be instructed by the video client with preferences/requirements on which layouts should be provided. In some embodiments, the client may only support one output stream. The client can provide this requirement to the virtual director and the virtual director may instruct the layout engine to only provide layouts with one output stream. In other scenarios the client might have preferences on which types of layouts it wants to display. As discussed herein, disclosed embodiments may provide technical or technological improvements over traditional systems and methods by providing an adaptive layout engine instructed by machine language (or artificial intelligence) such that the layout of a video conference may be changed based on the determined best layout (in view of, for example, speakers, active listeners, reactions, etc.). Traditional systems and methods simply are not equipped to perform such optimal layout determinations based on the variety of factors discussed herein.

Potential scenarios or situations captured by disclosed systems and methods may include: meeting in normal room, someone talking for long time; discussions; brainstorming; standup; presentation; security/surveillance; collaboration drawing on canvas, or multiple canvases can be stitched together; or any of the scenarios previously listed but with multiple cameras in the room, with and without canvas.

In some embodiments, for example in a big collaborative room, a multi-camera system may include 6 cameras: 3 cameras pointing to 3 whiteboards attached to a wall, and three cameras on the opposite side facing the whiteboard to frame participants using the whiteboard. As the vision pipeline detects a person or movement/changes to a whiteboard and a person in front of the whiteboard, the virtual director unit may create a layout accordingly. For example, a professor may have a lecture using all three whiteboards and may move back and forth between them as they present. The vision pipeline may detect this and on which whiteboard there is activity. The vision pipeline may then instruct the layout engine to frame the area of the whiteboard where there is currently activity in one cell, while keeping the section where there previously was activity in the other cell, while keeping the professor presenting continuously in a third cell. Always using the camera feed and perspective that best shows the section of the whiteboard and the professor.

The virtual director unit may serve multiple roles. It may manage layout selection and manage the framers (e.g., software components) that may provide the individual framing commands for each tile. The virtual director unit may forward the layout information (e.g., number of tiles, tile arrangement, tiles that should be merged) and the framing commands for each tile (e.g., as pan-tilt-zoom values with an additional information when to reframe) to the layout engine. As an example, Gallery View may use hard cut transitions for layout switches and Bezier interpolation transitions for reframing within tiles.

Furthermore, examples of the adaptive layout engine relative to a video conferencing scenario are provided herein. The multi-camera system may be installed in medium or large meeting rooms (e.g., a meeting room that fits about 8-12 people). The multi-camera system (e.g. a Huddly® Crew system featuring appropriate software) may include three cameras placed in front of the room, one camera placed underneath the TV, one camera of the left side of the meeting room, one camera on the right side of the meeting room, and optionally one camera attached to a whiteboard on a back wall. Furthermore, in some embodiments, the multi-camera systems disclosed herein may include 5, 6, or 9 cameras. The cameras may be numbered and/or placed such that over-the-shoulder shots may be captured/generated/displayed, as discussed herein. An over-the-shoulder shot When the room is not in a meeting, the system may be inactive. Four people may enter the room and two people may sit on the right side of the table and two other people may sit on the left side of the table. The people may interact with the video client and start a video conferencing meeting. The video client may begin consuming a video stream from the system as the system starts.

The vision pipeline may detect that there are four people in the room and may detect the distance between each person. Then, the virtual director unit may pick an overview shot from the center most camera to give the far end participants an overview of the room.

Figure 45:
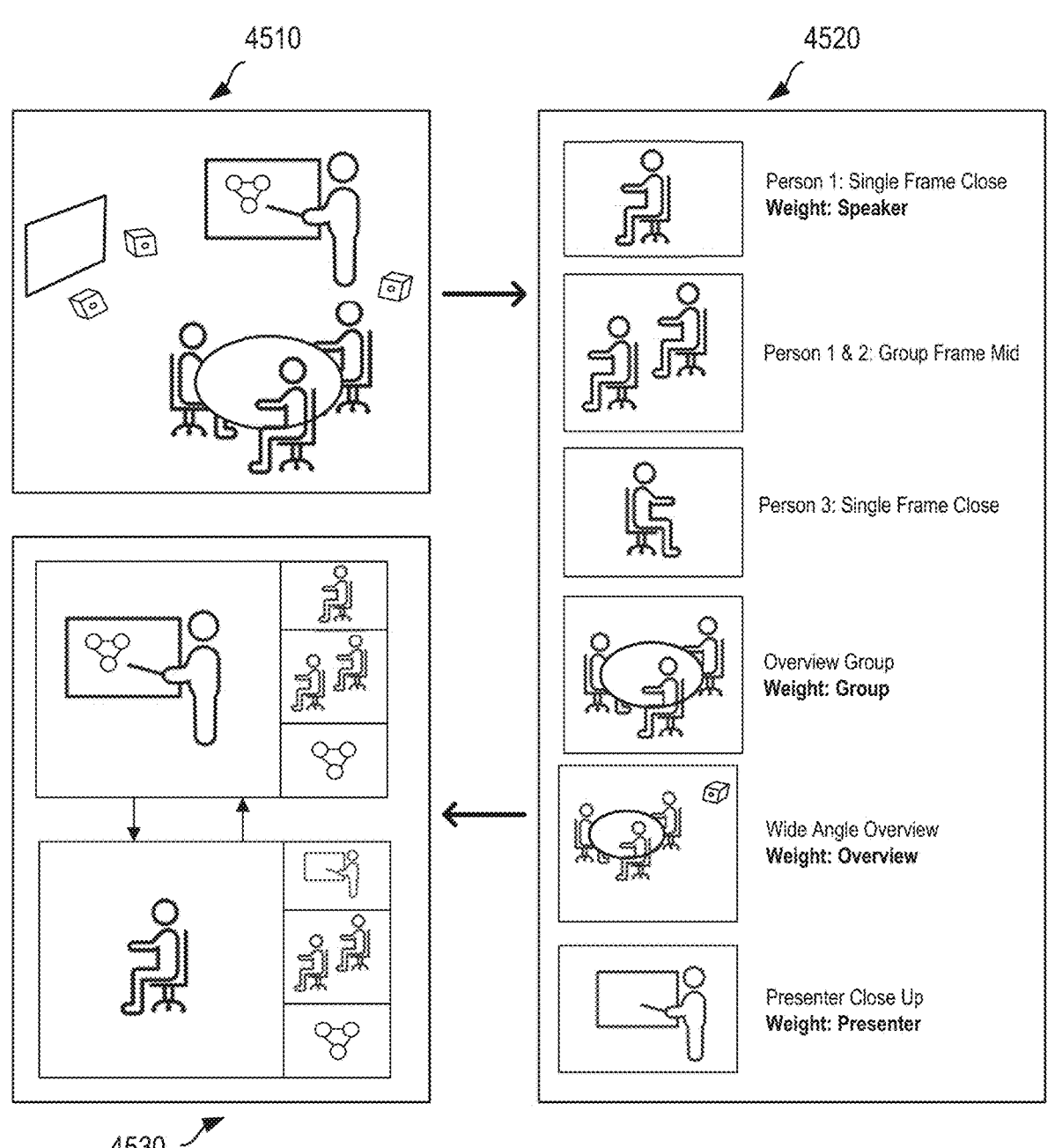
FIG. 45 illustrates an example determination of layouts to be displayed, consistent with some embodiments of the present disclosure.
Figure 46:
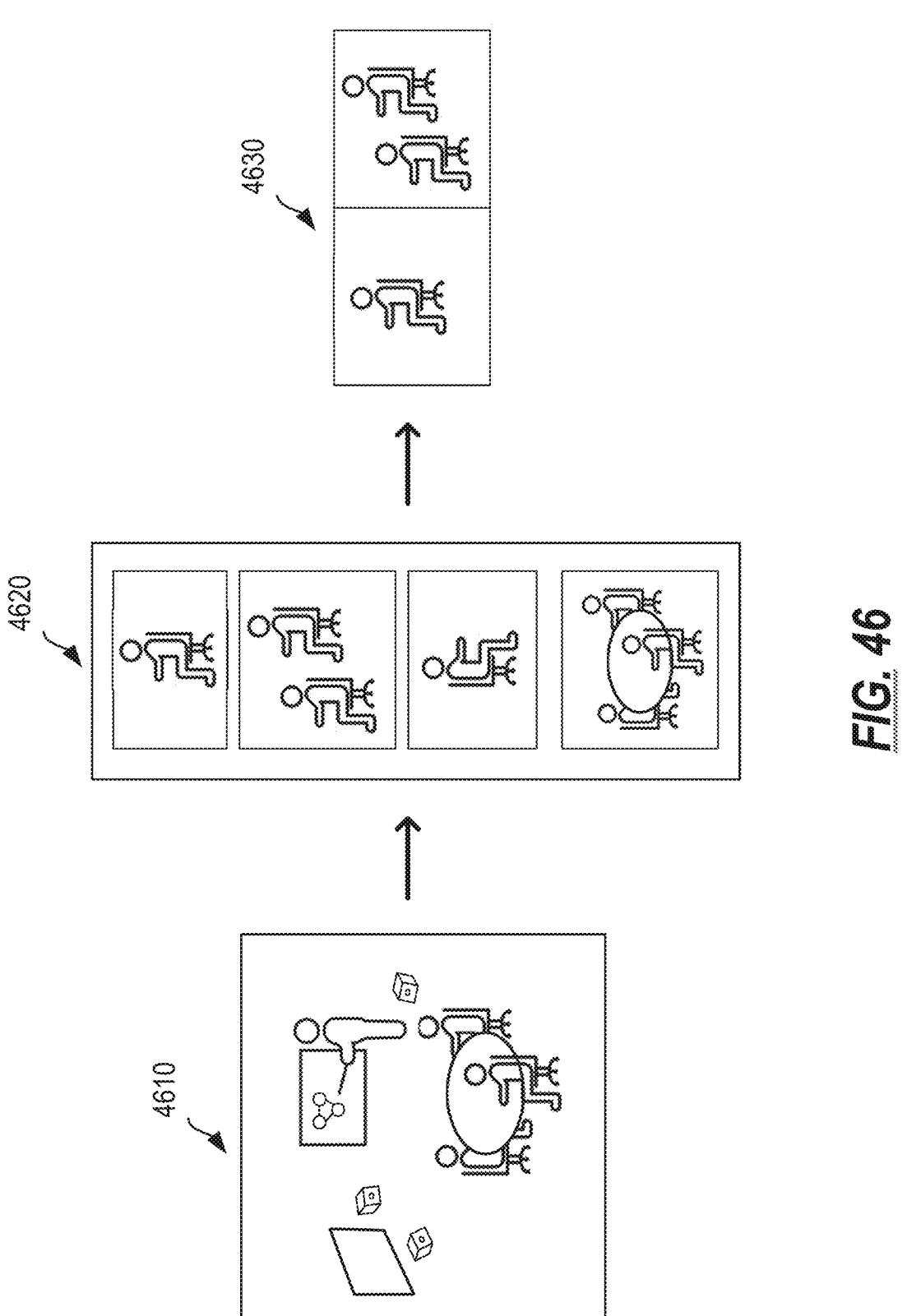
FIG. 46 illustrates an example determination of a layout to be displayed, consistent with some embodiments of the present disclosure.

FIGS. 45 and 46 illustrate various step-by-step determinations of (tile) layouts based on various shots of a meeting environment. For example, as shown in FIG. 45, a meeting environment 4510 may include three cameras, a presenter at a whiteboard, and three meeting participants at a table. Various shots or frames 4520 may be generated based on the meeting environment. Shots or frames of importance may be given more weight and may be selected to be shown on the display or given more importance (e.g., larger size/tile) when shown on the display. Non-limiting examples of shots that are given more weight may include speaker shots, group shots, overview shots, and presenter shots. Various layouts 4530 may be selected to be shown on a display, and the display may switch between various layouts 4530 depending on, for example, changing speakers, movement, and reactions (e.g., nodding, smiling, clapping). As another example, as shown in FIG. 46, a meeting environment 4610 may include three cameras, a presenter at a whiteboard, and three meeting participants at a table. Consistent with embodiments of the present disclosure, various shots or frames 4620 may be generated, including speaker shots, group shots, and overview shots. Furthermore, as shown in FIG. 46, two shots or frames 4620 may be selected to be shown on a tile layout on a display 4630. It is contemplated that the selected layouts may be output or streamed to various video-conferencing services (such as Microsoft Teams, Google Meet, and Zoom) for display, as discussed herein.

The following sections discuss various examples of Adaptive Layout/Layout Engine concepts implemented in example video conferencing situations and meeting environments. Although discussed with particular numbers of people (meeting participants) in each example, it is to be understand that the particular numbers of people (meeting participants) discussed are exemplary and each example may be expanded to include more people or reduced to include less people.

The first example may pertain to a vision pipeline detecting various speakers and implemented various layouts. When the meeting begins, everyone in the room may introduce themselves. As the first participant starts talking in the room, the vision pipeline may detect that the first participant is talking, and the virtual director unit may check how far apart the participants are. As an example, the virtual director unit may determine that each participant is far enough apart that each person can be given their own tile. The virtual director unit may instruct the layout engine to transition to a 3×3 layout, and the frame coordinates of the person speaking may take up the first two rows in all 3 columns. And each of the non-speaking participants may take up one column in the last row.

At the same time, the vision pipeline may detect each person's gaze, head, and body position. The vision pipeline may select a camera where most of the person's face is visible, for each person. For the participants on the left side of the table that are looking at the person talking on the right side of the table it may be the right side camera. The vision pipeline may detect their position, and the virtual director may find a fitting frame based on their gaze, previous movements, and body size. The virtual director may then instruct the layout engine to frame the corresponding streams from the different picked camera. In this case the two persons on the left side may be framed using a stream from the right camera, while the two persons on the right from left. Each framing may represent each person in the same size. This may occur before any change may be applied by the virtual director in the next steps, and continuously between each step. If the virtual director determines that one person is looking in a different direction than in the selected camera frame and enough time has passed since the previous change, it may change the camera feed in the corresponding persons tile (or cell) to the camera feed where most of that person's face can be seen.

When the next person starts talking the vision pipeline may detect this, and after a designated duration of time has passed, it may switch to this person taking up the first two rows in all the columns. The previous speaker may then transition to be in a tile at the bottom row.

When everyone in the room has introduced themselves, the people participating on the far end may introduce themselves. The vision pipeline may detects that no one in the room is speaking, but the system may be playing audio from the far end. The virtual director may then transition to showing an 2×2 layout where each participant takes up one 1 cell, and where each person is taking up the same size in their cell.

After the introduction, the group may begin to discuss a topic. The second person on the left side may introduce the topic. As the vision pipeline detects the speaker, the virtual director may instruct the layout engine to go to a 3×3 layout where the speaker may take up the first two rows in each of the columns, and the other participants in the bottom row.

After the topic has been introduced, the first person on the right side may speak, and the system may again transition to this person taking up the largest cell.

After a short time, the second person on the right side may say something. The vision pipeline may detect this and the virtual director, taking previous actions into account, may transition to a dialog setup, and instruct the layout engine to transition to a 2×1 grid where the people on the right side take up one cell and the people on the left side takes up one cell. The virtual director may take their gaze and head position, and may ensure that the framing is equal size. Spacing may be added asymmetrically in front of where a person is looking.

After a short discussion in the room, one of the far end position participants may speak, and as the vision pipeline detects that a far end participant is talking it may maintain the previous layout. However, as each person is now looking at the screen, the vision pipeline may continue to evaluate each person's gaze. For example, if they are all looking at the screen above the center camera, it will transition to showing framing from the center camera stream in the two cells.

The discussion may go back to the room, and one participant may want to present their idea and walk up to the whiteboard in the back of the room. As the vision pipeline detects that the person is moving by seeing the speed of the track associated with the person, the virtual director may follow the person, and a cell may be dedicated to follow the person. The virtual director may instruct the layout engine to display a 2×2 grid, where each person takes up one cell.

When the person arrives at the whiteboard they may begin writing on the whiteboard. The vision pipeline may detect activity on the whiteboard, and the virtual director may instruct the layout engine to change to a 3×3 layout where the streams from the canvas/whiteboard camera may take up the first two rows of the two first columns, and the person writing on the whiteboard may be framed by the camera that best captures their face in the first two rows of the last columns. Each of the other participants may take up one cell in the bottom column, using the camera that best sees their face.

The person on the whiteboard may have been talking for several minutes presenting their idea, and the first person on the right side may have a comment. They then raise their hand to not interrupt the person at the whiteboard. As the vision pipeline detects that they may have raised their hand, the virtual director may keep the same framing until a designated duration of time has passed. Once the threshold has been reached, the virtual director unit may instruct the layout engine that the person raising their hand should take up the two cells in the two first rows in the last column while the person on the whiteboard moves down to the bottom row.

When the group starts discussing the comment being presented, the person on the whiteboard may stop writing. When the vision pipeline detects no more changes to the whiteboard and a designated duration of time has elapsed, the virtual director may instruct the layout engine to go back to a 2×2 layout where the person on the whiteboard and the one person on the left side may take up one cell each in the first column. The two people still sitting on the right side may share the second column, as they may have moved closer to see the whiteboard better.

When the discussion is over, the meeting may adjourn, and the vision pipeline may detect that people are getting up or waving. The vision pipeline unit may provide instructions to return to an overview framing from the center, showing all the people in the room and them waving goodbye.

The second example may pertain to an instance in a meeting room with three people (or meeting participants) sitting around a table (Person A, B, and C). The position of each person may be detected by the vision pipeline and sent to the virtual director unit. If no one is speaking, the virtual director unit may determine that a three-column layout where each person is roughly of the same size is the best (ideal) layout. The virtual director unit may then instruct the layout engine to create a three-column layout (such as layout 2210b in FIG. 22) accordingly and provide the coordinates of which part of the primary stream should be in each column. The coordinates of each column may correspond to the position and size of each person. A representation of Person A may be displayed in the first column, a representation of Person B may be displayed in the second column, and a representation of Person C may be displayed in the third column. Then, when Person B begins speaking, the virtual director unit may determine that the representation of Person B should take up a bigger part of the display. The virtual director unit may then instruct the layout engine to change the layout accordingly. Examples of the changed layout may include—but are not limited to—increasing the size of the column corresponding to Person B (such as layout 2210f in FIG. 22); transitioning to a three column layout with two rows, where the representation of Person B occupies the first two columns, the representation of Person A occupies the top row of the last column, and the representation of Person C occupies the bottom row of the last column (such as layout 2240a in FIG. 22); and/or decreasing the size of the columns corresponding to Person A and Person C (such as layout 2210f in FIG. 22).

The third example may pertain to a scenario with three people (or meeting participants)—Person A, Person B, and Person C—in a small meeting room sitting around a table. Similar to the second example discussed above, the vision pipeline may detect each person and the virtual director unit may instruct the layout engine to distribute the participants into three equally sized columns (such as layout 2210*b* in FIG. 22). Two people (Person A and Person B) may move closer to each other (for example, to read a document together). As a result of the movement, a representation of each person (Person A and Person B) in their corresponding columns may appear "cut in half" or otherwise obstructed. This may negatively impact the experience for far-end participants, as it may add visual noise and be confusing. As used herein, far-end participants may pertain to participants located at a far end of the meeting environment such that they may have difficulty viewing the participants of the room directly or participants joining a video conference call remotely. Thus, to avoid this, the vision pipeline may monitor the overlapping area of detected persons with respect to each other and once a defined limit is reached, may decide to merge their respective columns. In this example, Person A and Person B may be framed jointly as a group (such as layout 2210*d* in FIG. 22) until they move sufficiently far away from each other to go back to the initial layout.

The fourth example may pertain to a scenario where 6-8 people are sitting around a table in a meeting room. The dynamic portion of the meeting (e.g., speaking, interaction, active participants, reactions) may be centered around two individuals. For example, the two individuals may be main speakers that lead the conversation. It is contemplated that the two individuals may stand up and move around in the meeting room. Thus, an initial situation in this scenario may include an overview framing where all participants are framed together as one group. Once the virtual director unit identifies the individuals leading the conversation (e.g., by speech and/or frequency of movement), the virtual director unit may instruct the layout engine to frame these individuals in separate tiles in additional to a group framing with the remaining seated participants. Furthermore, particular room geometry may result in different layout options. For example, in some embodiments, based on the particular geometry of the meeting room, the two individuals may still be part of the group frame in addition to having their representations displayed in their own tiles.

The fifth example may pertain to a scenario where 4-6 people (or meeting participants) are sitting in a room around a table. Multiple cameras (in a multi-camera system) may detect and frame the participants appropriately following the rules mentioned in the previous examples. In particular, in this example, a Person A may stand up, walk to a whiteboard, and begin drawing. A camera with a specific vision pipeline pointing toward the whiteboard may detect that someone is drawing on the whiteboard and send this information to the virtual director unit. A new stream with whiteboard content may be made available for a video client (e.g., Microsoft Teams, Google Meet, Skype, Zoom), as shown by example in FIG. 26C. The video director unit may also combine streams from multiple cameras showing Person A writing on the whiteboard and the content of the whiteboard in a variety of layout, not limited to those shown in FIG. 22.

Continuing the fifth example, in some embodiments, the scenario may require multiple cameras pointed at the whiteboard(s) to capture all the content. The virtual director unit can combine streams from multiple whiteboard cameras and present them as one whiteboard stream. Using the vision pipeline, the virtual director unit may determine which region of the whiteboard(s) is actively being drawn on or interacted with and combine the input streams to one whiteboard stream showing the active area.

The sixth example may pertain to a video client or other consumer of the output from the virtual director unit having particular preferences for the types of streams they require or desire. For example, a video client may have over 25 video streams and may want to show a small profile picture of every participant in the meeting. The consumer may request "profile picture" streams of all the participants from the virtual director unit. Using the vision pipeline, the virtual director unit can detect all participants and select the best camera streams for each person (meeting participant) and select the best camera stream for each person. The virtual director unit may further send multiple streams or one combined stream with a "profile picture" view of all participants to the client.

The seventh example may pertain to a meeting environment including four people in a room (Person A, Person B, Person C, and Person D). Representations of Person A and Person B may each be displayed in a separate stream. Representations of Person C and Person D may be displayed in a combined stream due to, for example, close proximity. Additionally, or alternatively, the layout engine may provide a fourth stream that is an overview shot where representations of Person A, B, C, and D are all in the overview shot. The video client (or other consumer) may select which of the streams will be presented to far-end participants.

The eighth example may pertain to a multi-camera system installed in a meeting room that fits 8 people. The multi-camera system may include seven cameras: three cameras placed in the front of the room, one camera placed underneath the television (TV), one camera placed on the left side of the room, one camera placed on the right side of the room, and one camera attached to a whiteboard on a back wall. When the room is not in a meeting, the multi-camera system may remain inactive. However, four people may enter the room, two sitting on the right side of the table and two sitting on the left side of the client. The meeting participants may interact with the video client and start the meeting. The video client may then start consuming a video stream from the system and the system may begin. First, the vision pipeline may detect that there are four people in the room and their distance from each other. Then, the virtual director unit may pick an overview shot from the center most camera to five the far-end participants an overview of the room. When the meeting starts, everyone in the room may introduce themselves. As a first participant (located on the right side of the table) begins speaking, the vision pipeline may detect that one person is talking and the virtual director unit may check how far apart the participants are. In this particular example, the virtual director unit may determine that each participant is may have their own respective tile. The virtual director unit may then instruct the layout engine to transition to a 3×3 layout, and the speaker (meeting participant that is speaking) may occupy the first two rows in all three columns. Each of the non-speaking participants may occupy one column each in the last row.

Continuing the example, the vision pipeline may also detect each meeting participant's gaze, head position, and body position. Furthermore, the vision pipeline may select the camera where most of each person's face is visible. For participants on the left side of the table who are looking at the person speaking, the right camera may capture a stream where most of their faces are visible. The vision pipeline may detect their position and the virtual director may find a fitting frame based on their gaze, previous movements, and body size. The virtual director unit may then instruct the layout engine to frame the corresponding streams from different cameras. In this example, the two persons on the left side may be framed using a stream from the right camera and the two persons on the right side may be framed using a stream from the left camera. Each framing may represent each person in the same size. This framing may occur before any change is applied by the virtual director. If the virtual director unit determines that one person is looking in a different direction than in the selected camera frame and enough time has passed since the previous change, the virtual director unit may change the camera feed in the corresponding person's tile to the camera feed where most of the person's face can be seen (is visible).

The vision pipeline may then detect a second person that begins speaking. After a designated duration of time has passed (e.g., 5 seconds, 10 seconds, 30 seconds, 1 minute), the vision pipeline and virtual director unit may implement a change in the layout such that the second person who is speaking takes up the first two rows in all the columns and the previous speaker transitions to be in a tile at the bottom row. After all meeting participants have introduced themselves, the people participating on the far-end may introduce themselves. The vision pipeline may detect that no one in the room is speaking, but the system may be playing audio from the far-end. The virtual director may then transition to showing a 2×2 layout, where each meeting participant occupies one cell. Representations of each meeting participant may occupy the same size in each cell.

The group may then begin to discuss a topic. A meeting participant may introduce the topic. The vision pipeline may detect the meeting participant as speaking and may instruct the layout engine to go to a 3×3 layout, where a representation of the speaker occupies the first two rows in each of the columns, and each representation of the other meeting participants is displayed in a bottom tile. After the topic has been introduced, a second meeting participant may begin speaking. Disclosed multi-camera systems may transition to display a representation of the second meeting participant as occupying the largest tile on the display. The vision pipeline may then detect a third person as speaking, and the virtual director may (taking previous actions into account) transition into a dialogue setup, instructing the layout engine to transition to a 2×1 grid where people on the right side of the table occupy one tile and people on the left side of the table occupy the other tile. In some embodiments, the representations of people on the right side of the table may occupy the right tile, and the representations of people on the left side of the table may occupy the left tile. The virtual director unit may analyze the gaze and detect the heads of meeting participants and provide spacing in the tiles such that the framing in each tile is equal in size (equal equity framer, as discussed further below). Spacing may be added asymmetrically in front of the gaze of meeting participants in the direction of their gaze (e.g., direction that they are looking).

Continuing the example, after a short discussion in the room, one of the far-end (e.g., remote/virtual) participants may begin speaking. The vision pipeline may detect that the far-end participant is speaking and maintain the previous layout. As each (in-person) meeting participant looks at the screen, the vision pipeline may continue to evaluate each meeting participant's gaze. As an example, if all meeting participants are looking at the screen above the center camera, the layout may transition to show framing from the center camera stream in the two tiles.

The discussion may then return to the (physical) room, and a meeting participant may walk to a whiteboard in the back of the room. The vision pipeline may detect movement of the meeting participant by detecting a speed of a track associated with the meeting participant. The virtual director unit may follow the meeting participant. A tile corresponding to the meeting participant may follow the meeting participant's movements. Furthermore, the virtual director unit may instruct the layout engine to a 2×2 grid, where each representation of each meeting participant is displayed on a corresponding tile. The meeting participant may arrive at the whiteboard and begin writing on said whiteboard. The vision pipeline may detect activity on the whiteboard, and the virtual director unit may instruct the layout engine to change to a 3×3 layout where the streams from the whiteboard camera occupy the first two rows of the first columns. The meeting participant that is writing on the whiteboard may be framed by the camera that best captures their face, and the representation of the meeting participant may be displayed in the first two rows of the last column. Representations of each of the other meeting participants may occupy a tile in the bottom column using a camera that best captures their face.

The meeting participant at the whiteboard may speak for several minutes, presenting an idea. A second meeting participant may speak to discuss their comment. The second meeting participant may raise their hand such that they do not interrupt the first meeting participant. The vision pipeline may detect that the second meeting participant has raised their hand, and the virtual director unit may maintain the same framing until a specified/particular duration of time has elapsed (e.g., 1 second, 5 seconds, 10 seconds, 30 seconds, 1 minute). Once the duration of time has elapsed (or the time threshold has been reached), the virtual director unit may instruct the layout engine such that the second meeting participant (raising their hand) is displayed over two tiles in the first two rows in the last column, while the representation of the first meeting participant is displayed in the bottom row.

The group of meeting participants may then begin discussing the comment(s) being presented, and the first meeting participant at the whiteboard may stop writing. When the vision pipeline detects that there are no more changes to the whiteboard after a specified/particular duration of time has elapsed, the virtual director unit may instruct the layout engine to return to displaying a 2×2 layout. Representations of the first meeting participant at the whiteboard and another meeting participant on the left side of the table may occupy one tile each in the first column. Representations of the two other meeting participants sitting on the right side of the table may be displayed together in the second column based on proximity.

Continuing the example, when the discussion has ended, the vision pipeline may detect that meeting participants are leaving, getting up, or waving. The vision pipeline may return to an overview framing from the center camera, showing all meeting participants in the room and them waving goodbye.

Embodiments of the present disclosure may include features and techniques for providing an Equal Equity Framer. Equal Equity Framers may provide experiences where everyone can contribute and participate on the same level in a meeting. This may be achieved by including everyone visually in the conversation.

In scenarios where there is one or few people carrying most of the conversation, it may be desirable to provide remote participants with context they need to follow along with the conversation and know what is happening in the room. To foster collaboration, it may be important for all meeting participants to feel connected and have the same opportunity to contribute. This may be easier if participants (remote and in-person) can see reactions and engagement from everyone.

For example, if there are people present in a meeting room that would be seen by remote participants if they were also in the physical meeting room, the remote participants should be able to see them via video conferencing as well. Switching occasionally from the speaker to the listeners may improve the video conferencing experience, making it more engaging for the remote participant. Furthermore, in some embodiments, meeting participants that react to the speaker or events occurring in the meeting environment may be captured in, for example, a reaction shot. Non-limiting examples of indicators of reactions include smiling, frowning, nodding, laughing, clapping, pointing, and raising one's hand. It is contemplated that views, displays, tiles, and other displayed streams may switch between speakers, listeners, and people who are reacting in any order/combination.

Rules and/or machine learning (ML) system training may dictate when it is appropriate to switch from a speaker shot to a listening shot. If there are more people than two in a room, there may also be several possibilities for a listening shot. An equal equity measure may be obtained, the equal equity measure may include a score of the equity to determine what will be the next listening shot.

The equity score may be rated from 0-1. An equity score closer to 1 may indicate a more even distribution of screen time to everyone in the room. The Equal Equity Framer may choose the next listening shot based on who has had the least amount of screen time.

Embodiments of the present disclosure may pertain to framing using multi-camera systems. For framing people (e.g., meeting participants), rules designed to produce well-framed shots of the participants may be used. A larger number of people present in a room may contribute to greater difficulty in composing good individual shots. In some embodiments, disclosed systems and methods may focus on the head and upper body when composing the shots to capture body language and create space for connection and understanding.

When a person is alone in a room or does not sit within a predetermined distance near other participants, the camera may frame them individually. The head of the person may appear in the top third of the image to give the person as much space as possible and reduce the amount of unnecessary space on the screen. By positioning the head closer to the top of the image, disclosed systems and methods may emphasize each person's visibility and presence and may ensure that each person has enough space to move and behave naturally.

If two or more people are seated within a predetermined distance to each other, the two or more people may appear in the same shot, independently of any of them being the speaker or listeners. Group framing may ensure that the people in one group are shown in the best way, such as by including all the participants' heads and upper bodies to create the shot. The group framing displayed during a conversation may change if people move. As an example, if people are seated so that there is only one group in the room, the shot shown or displayed may include the one group, unless somebody moves.

Embodiments of the present disclosure may pertain to methods of group framing in single and multi-camera systems. In scenarios where participants are sitting close to each other in a meeting, a challenge to find a suitable framing of a single speaker or listener may arise. For example, a user's experience may be diminished if a framed view of a subject is cropped. Even where a framed shot includes one or more suitable framed subjects, but also includes one or more cropped subjects, a user's experience can be negatively impacted. Embodiments of the present disclosure generate framed shots of subjects that omit cropped subjects.

In some embodiments, an identification of potential subjects for framing may be performed based on analysis of an original captured video frame (original frame). One or more sub-frames may be generated based on the original frame, and each sub-frame may include one or more subjects. For example, a subject framer may generate a frame A that includes two subjects, a frame B that includes one subject, and a frame C that includes one subject. The subject framer may avoid selection and/or generation of a frame D, where frame D may include two subjects where one of the subjects is cropped at the edge of frame D.

Embodiments of the present disclosure may generate framed shots according to an approach in which participants (e.g., participants that sit close together in a meeting) are grouped together to produce shots/framing that focus on particular participants of interest while including adjacent participants in a visually pleasant shot.

For example, in some embodiments, a subject framing system may capture video frames, detect subjects represented in the video frames, and generate a bounding box or other potential frame indicator for each detected subject. In some embodiments, the bounding box or frame indicator may be shaped as a rectangle centered about the head of the detected subject (e.g., horizontally centered in the frame, vertically centered, or both). The bounding box or frame indicator may also include a representation of at least a portion of each detected subject's body. It is contemplated that the subject framing system may perform the operations discussed above in any order. As an example, the subject framing system may detect subjects starting from the left side of a meeting environment or room and comparing the detected subject(s) to the nearest subject to the right. The process may continue to the right. In other embodiments, the detection of subjects may begin from the ride side of a meeting environment or room.

Detected subjects that do not overlap in a potential framed shot may be shown alone in a framed shot. In other embodiments, detected subjects that at least partially overlap (especially within a potential framed shot) may be grouped together in the same framed shot. As an example, two subjects (people) may be grouped if they visually overlap relative to a camera point of view (e.g., one subject/person sits slightly behind another subject/person). As another example, a subject (person) that is visible in another subject's (person's) Person Framer (e.g., potential subject frame), the two subjects may still be grouped together even if they do not overlap. Such a grouped frame may be selected, for example, where separation of the non-overlapping subjects into individual frames may result in an undesirable frame representation of at least one of the subjects. Non-limiting examples of such an undesirable representation may include when a head box located at the maximum vertical and horizontal edges of the subject's head has a height greater than a predetermined percentage of the vertical dimension of the video frame.

In some embodiments, certain situations may be encountered where two subjects do not overlap in an overview frame and separate sub-frames may be placed relative to each subject such that neither sub-frame shows a cropped subject. A subject shown in one or more of said sub-frames may still provide an undesirable frame representation. For example, a location or relative size of one or more of the subjects in the respective sub-frame may appear unbalanced, lacking in sufficient buffer space around the subject, overly zoomed in, and the like. In the presence of the conditions described above and other undesirable frame representation conditions, embodiments of the present disclosure may group non-overlapping subjects together in a single sub-frame. This situation may occur, for example, in a meeting room including two or more people.

Some embodiments of the present disclosure may employ exceptions to the approach outlined above. For example, in cases of disparate head sizes (for example, when one subject sits further away from a camera relative to another subject), the system may separate subject into more than one frame. This approach to separating subjects into individual frames may be based on a predetermined threshold relative to head sizes, shoulder widths, distance to a camera, or other spatial metrics. As an example, if a system determines that a first generated head box associated with a first subject is at least three times the width of a second head box generated relative to the second subject, then the first and second subjects may be separated into different frame shots. Separating subjects in this manner may enable a closer view of a subject located further from the camera, which can significantly improve user experience (compared to a frame where both the near and far subjects are shown together in a common frame). In some embodiments, representations of a first meeting participant and a second meeting participant in first and second focus video streams, respectively, may be sized by the video processing unit such that a corresponding size or dimension associated with the representation of the first and second meeting participants in the first and second focus video streams meet a size similarity condition. For example, the size may be a head size (e.g. a head diameter), and the similarity condition may be a head size similarity condition (e.g. the head sizes must be within a predetermined proportion or ratio). In other words, the video processing unit may adjust the zoom level for the two focus video streams to reduce a difference in size between the representations of the first and second meeting participants, which may be caused by the meeting participants being seated at different distances from the camera. In other embodiments, the video processing unit may analyze the video output stream from a camera to determine a distance from the camera associated with a first meeting participant and a second meeting participant. The video processing unit may then generate, and cause a display to show, in corresponding display tiles, a focus stream a first focus video stream featuring a representation of the first meeting participant and a second focus video stream featuring a representation of the second meeting participant, in which the representations of the meeting participants are sized to at least partially compensate for a difference in distance from the camera of the first and second meeting participants. The above-described re-sizing has the effect that a remote meeting participant may be provided with the same or a similar level of detail and information regarding each meeting participant present in the meeting environment.

Various systems may require a transition from a frame in which one subject is shown alone to a frame in which two (or more) subjects are shown together. For example, as shown in FIG. 33, a first subject (e.g., a speaker on the left of main frame 3310a, 3320a, 3330a) may be featured alone in a sub-frame, as shown in sub-frame 3310b. If a second subject moves closer to the first subject, disclosed embodiments may generate a new sub-frame in which both the first and second subjects are represented together. Examples of a transition sub-frame when the second subject is moving closer to the first subject is shown as sub-frame 3320b derived from main frame 3320a. New sub-frame 3330b may be generated and displayed, showing both the first subject and second subject, and sub-frame 3330b may be derived from main frame 3330a.

Similarly, in some embodiments, disclosed systems and methods may transition from a sub-frame including two or more subjects to a sub-frame including one (a single) subject. Non-limiting examples of such situations may include when subjects move away from one another or when one subject moves closer to a camera relative to another subject. In some embodiments, transitions from one sub-frame shot to another sub-frame shot may be associated with a dwell time (e.g., 2.5 seconds) such that at least the dwell time must elapse before transitioning to a new sub-frame shot. In cases where subject motion may necessitate a new sub-frame shot, dwell time constraints may be altered/changed or disregarded.

Figure 34:
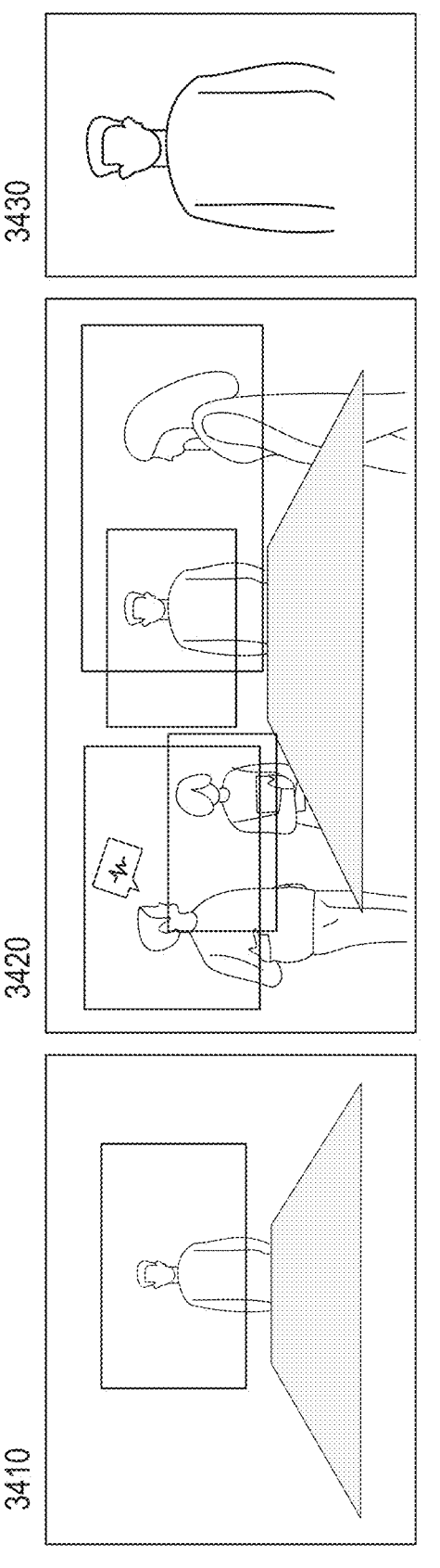
FIG. 34 illustrates another example of transitions between frames or sub-frames, consistent with some embodiments of the present disclosure.

As discussed above, a person framer may pertain to a framer (or frame) that focuses on one person (or meeting participant). A person framer may be created for each person detected inside a camera's (or a plurality of camera's) field of view. As shown in FIG. 34, a meeting room with one person framer is disclosed, as shown in output 3410. Furthermore, in some embodiments, a meeting room may include four meeting participants and each meeting participant may correspond to (or have) a person framer, as shown in output 3420. Consistent with disclosed embodiments, a person framer output 3430 may be generated and displayed on a display within, for example, a tile in a layout.

Furthermore, in some embodiments, most or all the people in the room may be framed in a single shot (e.g., overview framing). For example, when remote participants are speaking, all participants in the physical meeting environment may displayed so they are all visible and can be seen in context.

Furthermore, in some embodiments, a stream may begin with 20 seconds (or any other suitable duration of time) of overview shot. This may ensure that remote participants can orient themselves in the scene, see everyone in the meeting, and receive context. If there is any large movement inside the camera's field of view, such as someone entering the room, or someone getting up from their chair and/or walking around, the virtual director may select an overview shot as the next shot. This may occur regardless of any other framing choice (e.g., if someone else is still speaking or it is time for a listening shot). This may ensure that remote participants receive context regarding the meeting environment.

If no one inside a camera's field of view is speaking (e.g., if one of the remote participants is speaking) the system may output an overview shot for display. This may allow remote participants to keep track of everyone that they are talking to and see the faces and reactions of participants who are listening. This makes provide a more comfortable setting for the remote participants to speak. In some embodiments, an overview shot includes every person inside the camera's field of view.

Full framing may pertain to a shot that utilizes the camera's entire field of view, and may be used to establish context when there is a lot of movement. This may ensure that remote participants can follow what is happening in the room when someone enters or gets up from their chair.

More generally, the system may be configured to display an overview shot of the meeting environment in response to detection of an overview triggering event. The overview shot may be shown for at least a predetermined time interval, such as 5 to 30 seconds, 10 to 30 seconds or about 20 seconds. As described above, the overview triggering event may be the initiation of a video conference performed using the video conferencing system. This provides remote participants with context on the physical meeting environment. Similarly, the overview triggering event may be a meeting participant remotely located relative to the meeting environment (i.e. a remote meeting participant) joining a video conference performed using the video conferencing system. In such cases, the overview shot may be shown on a display used by the remotely located meeting participant to participate in the video conference, e.g. a display screen on a user device used by the remote meeting participant to participate in the video conference. The overview triggering event may be speaking by at least one meeting participant remotely located relative to the meeting environment. For example, if the system determines that a remote meeting participant is a speaker, based, for example, on audio signals from a microphone associated with the remote meeting participant, an overview shot may be shown on a display used by the remotely located meeting participant to participate in the video conference so the remote meeting participant can understand the context and reactions of all meeting participants present in the meeting environment.

The overview triggering event may, in some embodiments, be a movement trigger event associated with movement of at least one individual (e.g., meeting participant) present in the meeting environment. Triggering the display of an overview shot when a certain movement condition is met ensures that remote meeting participants are provided with important information regarding the physical meeting environment and the physical movements of the meeting participants present in the meeting environment. The movement trigger event may be an individual within the meeting environment moving from one location within the meeting environment to another location within the meeting environment, transitioning between a sitting posture and a standing posture, entering or leaving the meeting environment. Alternatively, the movement trigger event may be a measured aggregated movement level, score or value associated with a plurality of individuals present in the meeting environment exceeding a predetermined movement threshold. Again, the overview shot may be shown on a display used by the remotely located meeting participant to participate in the video conference, e.g. a display screen on a user device used by the remote meeting participant to participate in the video conference. Indeed, in general throughout this disclosure, the display on which the various video outputs are shown may be a display used by a remote meeting participant to participate in the video conference. The overview video stream preferably features the individuals whose movement the triggering event is associated so that the remote participant can observe the movements.

The video processing unit may therefore be configured to analyze the video output from one or more video conferencing cameras to determine whether an overview triggering event occurs. In other words, the video processing unit may be configured to analyze the video output from one or more video conferencing cameras to identify such a triggering event, and to then show an overview shot if such a triggering event is detected.

The rules for when Speaker Framing cuts from one shot to another may be based on several goals such as, but not limited to, wanting to capture the flow of the conversation while simultaneously creating an engaging experience for remote participants and ensuring that the in-room experience is as inclusive as possible. Speaker Framing may select the best shot type based on different conditions.

For example, whenever Speaker Framing is confident that a person is speaking, that person may be considered a speaker and may be framed either individually or as part of a group. This may apply in any scenario where there is a new or existing speaker.

If one person has spoken for more than a given number of seconds (e.g., about 7-15 seconds), a listening shot may be shown or displayed. The next listening shot may be directed to someone who has been given the least amount of screen time. If no one is speaking, the camera may output a context shot (e.g., overview shot).

Furthermore, in some embodiments, Speaker Framing may deliver a more dynamic meeting experience that feels closer to being in the same room together to allow remote participants to see who is speaking and feel more included, to help remote participants follow along with the conversation and know what is occurring in the meeting environment, to make it easier for remote participants to be an active part of the conversation by providing a better view of speaker and listeners for a greater sense of context, to make a more inclusive experience by ensuring that everyone in the room is visually present in the conversation regardless of whether they are speaking.

In some embodiments, when a person begins speaking, and the virtual director has enough confidence in it being the speaker, the person may be framed as a speaker. Additionally, or alternatively, the person may be considered to be the speaker for as long as they continue to speak. A speaker shot may include be 3 seconds long at a minimum, to allow the virtual director enough time to have enough confidence that someone else (another person) is a new speaker and to provide a more stable and enjoyable experience for any remote participant(s). A speaker shot may include a person, i.e. a speaker, or a group of people including the speaker.

In some embodiments, frames may be updated three times per second. The virtual director may check the audio input, detections, and rules for which frame it should choose as the next shot. This information may be stored over time and create a history to base future decisions on. A reframe lock may pertain to the minimum duration of time a frame may be displayed or shown. For example, a reframe lock may be 2.5 seconds, meaning any new frame must be displayed for 2.5 seconds. The virtual director may also check for movement of the head and body of participants.

In some embodiments, if one speaker has spoken for more than a given number of seconds (e.g., 8, 9, or 10 seconds), the virtual director may look for the next listening shot. The next listening shot may include the person who has gotten the least amount of screentime, to ensure that everyone is visually included, and create an understanding of reactions for the remote participants. A listening shot may include one or more people who are not speaking. In some embodiments, a listening shot may be displayed for 3 seconds.

Embodiments of the present disclosure may include features and techniques for improving transitions and framing methodologies in video conferencing systems. Framing methodologies (e.g., speaker framing, listener framing, etc.) may use two or more types of transitions between shots: smooth transitions and hard cuts. The type of transition used may depend on how different the shots to be transitions to and from are. If there are only minor differences between the two shots, smooth transitions may be used. In some embodiments, smooth transitions may be used when transitioning toward an overview shot. Hard cuts may be used when there are significant differences between shots, such as when the view switches from one side of the table to the other.

Additionally, or alternatively, various types of transition types may be employed when transitioning from an initial frame (e.g., any of a speaker frame, a Genius framed object/subject, a gallery view framed video tile, etc.) to a target frame.

For example, abrupt changes between an initial frame and a target frame separated by large differences in camera parameter values may be distracting to users. In some embodiments, multi-camera systems may provide a smooth transition from an initial frame to a target frame by non-linearly changing at least one camera parameter value (e.g., zoom, pan, etc.) over three or more frames (e.g., of a primary video stream as framing is adjusted to feature a speaker, object, etc.).

The number of frames (e.g., transition time) included between the initial frame and the target frame may vary based on characteristics of the initial and target frames. For example, the transition time may vary based on the direction of a planned camera parameter change (e.g., zooming out vs. zooming in) or based on the magnitude of a planned change (e.g., small changes may be associated with longer transition times).

Disclosed embodiments may identify a new target frame prior to completion of an ongoing transition (e.g., in response to a newly detected condition or target frame trigger, such as a person entering a room, etc.). Rather than completing the ongoing transition before transitioning to the new target frame, the ongoing transition may be altered or adjusted. For example, a deceleration phase of a current transition may be omitted, an acceleration phase of a next transition may be omitted, and/or a current transition rate of an ongoing transition may be matched to an initial rate of transition of a planned transition.

Some features described above have been described relative to single camera systems for explanatory systems. It should be noted, however, that the same principles may also be applied to multi-camera systems and setups. For example, any of the framing methodologies, transition methodologies, speaker views, gallery views, overview shots, group shots and other features and techniques discussed herein may be employed in a multi-camera system. Furthermore, any of the framing methodologies, transition methodologies, speaker views, gallery views, overview shots, group shots and other features and techniques described relative to multi-camera systems may be employed in a single camera system.

Additionally, or alternatively, the group framing/group shot can be executed with or without speaker framing/AI. For example, in some embodiments, the speaker framing techniques described above may be employed by systems including two, three, or more cameras. Additionally, it can be shown in a hard cut presentation, gallery view, or in a dynamic layout like speaker framing. Thus, it is possible on both single camera and in multi-camera setups.

As an example, a subject/person framing step may be executed by two or more of the cameras included in a multi-camera group. Because each camera may have a unique field of view, pointing direction, zoom level, and/or focal length, a sub-frame of a particular subject generated or enabled based on the output of a first camera may be more preferred than a sub-frame of the same subject generated or enabled by a second camera. Due to differences in the field of view between two cameras, a subject may be framed alone based on the output of a first camera, while the same subject is framed together with a second subject based on the output of a second camera. In some embodiments, the frame showing the single subject may be preferred over a frame showing multiple subjects (e.g., where the single subject is determined to be speaking or where there is a desire to focus on or highlight the single subject without showing other subjects). In some embodiments, such as where there are conversations occurring between subjects, it may be preferable to show multiple subjects together rather than splitting the subjects among sub-frames.

Furthermore, in some embodiments, disclosed embodiments may transition between a sub-frame from a first camera showing a single, first subject to a sub-frame from a second camera showing the first subject together with at least one other subject (and vice versa).

The disclosed systems and methods may also transition between a sub-frame from a first camera showing a single, first subject to a sub-frame from a second camera showing a single, second subject (and vice versa). Such a system may be useful where the first camera cannot capture the face of the second subject and/or where the second camera cannot capture the face of the first subject.

In some embodiments, a multi-camera system may include dedicated cameras for each seating location in a venue (e.g., together with a dedicated microphone), where each dedicated camera may be used to generate sub-frames representing a single subject. These dedicated cameras may be combined with one or more overview cameras capable of generating sub-frames showing multiple subjects together.

Figure 15:
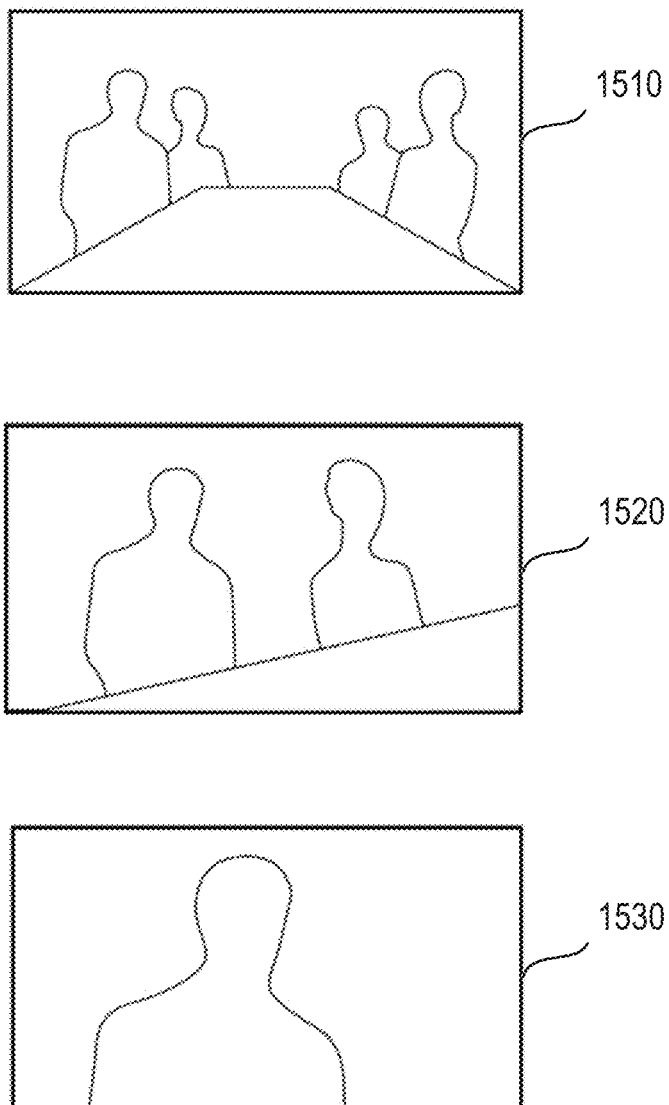
FIG. 15 illustrates examples of different shot types, consistent with some embodiments of the present disclosure.

FIG. 15 provides examples of different shot types. As shown in FIG. 15, total shot frame 1510 may include most or all of the meeting participants and most of the room. Total shot frame 1510 may provide context of the scene (e.g., meeting environment) and understanding of the room and where people and items are positioned. The shot may frame most of the participants' heads in the top third of the shot, and add equal amounts of space between the edge of the frame to the left most and right most person to fit the requested aspect ratio from the video stream, to give enough visual space, and fit to the aspect ratio of the video stream.

Medium shot frame 1520 may include representations of two to three participants and focus on one participant. Medium shot frames 1520 may be used when focusing on a dialogue, conversation, or a speaker. The system may frame the person speaking typically in the foreground of the shot, and align the speaker's head and the other participants heads in the top third of the shot. Padding may be added in the direction the speaker is looking, bringing the shot to the correct aspect ratio and providing adequate visual space.

Close shot frames 1530 may frame only one person. Close shot frames 1530 may be used to focus on one participant talking over a long period or duration of time. Close shot frames 1530 may be employed after a medium shot frame 1520, where the same person is included in both shot frames 1520, 1530. In a close shot frame 1530, the participant's eyes may align with the top one-third line, and the close shot frame 1530 may show the participant's upper body shoulder/chest. In some embodiments, the participant may not be framed in the center of the frame, but be framed slightly off-center based on a looking direction. For example, a person that looks to the right may be placed off center to the left of the close shot frame 1530. Additional space may be added in the direction the person is looking and the area behind the person, to bring the frame to an ideal aspect ratio.

Figure 16A:
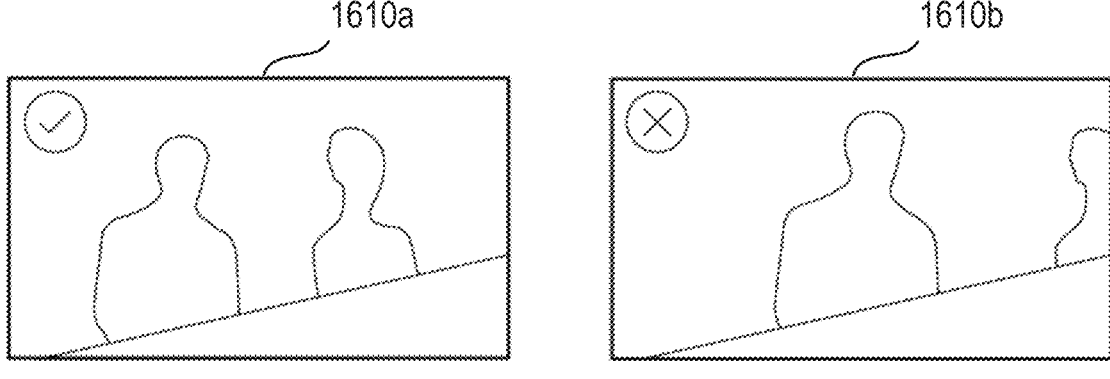
FIGS. 16A-16B illustrate examples of shot frames including other meeting participants and auxiliary items, consistent with some embodiments of the present disclosure.
Figure 16B:
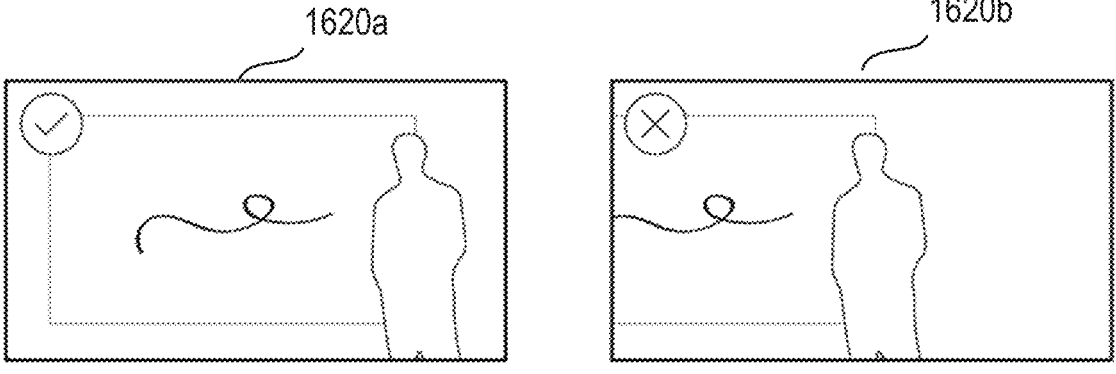

FIGS. 16A-16B provide examples of shot frames including other meeting participants and auxiliary items. The virtual director unit may continuously evaluate all the shots possible of each participant and selects clean shots. The selection may be determined by a set of rules, including not selecting a shot where a person is partially visible, as shown in FIG. 16A. As shown in FIG. 16A, the virtual director unit may prioritize a clean medium shot 1610*a*, where person A and B is fully visible, rather than a close up shot 1610*b* of person A, where person B is partially visible. In some embodiments, the virtual director unit may add additional padding in the direction a person is looking, providing the representation of the participant space to look into. This may also be the case for medium shots and total shots, where there may not be enough participants to fill the shot completely. As shown in FIG. 16B, in some embodiments, items of interest (such as a whiteboard), may also be considered in the evaluation. As shown in FIG. 15B, the virtual director unit may prioritize a shot 1620*a* including the entire auxiliary item (e.g., whiteboard) over a shot 1620*b* that includes a portion of the auxiliary item.

Disclosed embodiments may include interest shot frames. An interest shot frame may include an item or person that the vision pipeline determines is interesting in the context of the scene. This could be an item/person that everyone is looking at, or a classified item that is recognized from sound and video. This item may be framed following any of the principles disclosed herein. Furthermore, in some embodiments, a close shot may be used to frame this item/person.

Disclosed embodiments may include listening shots. Listening shots may include a shot framing one or more of the participants that are not speaking. This type of shot may be a medium shot or a close shot, depending if one or more participants is to be framed. The system may use these shots in different situations, such as when the active speaker has spoken for a predetermined time or duration. Furthermore, in some embodiments, the shot may switch to a listening shot if the vision pipeline determines that someone is looking away, looking bored, looking at the table, or has not been framed for a long time. This may give participants watching the video stream from the room an equal opportunity as participants in the room to understand the engagement of the other participants in the meeting room.

Listener shots may be shown alongside one or more speaker shot video streams (and also gallery shots and/or overview video streams) so that remote meeting participants are provided with information regarding the reactions of non-speaking (listening) meeting participants to a speaker. Selection of a non-speaking meeting participant for inclusion in a listener shot video stream may be based on one or more engaged listener characteristics of the non-speaking meeting participant, as determined from analysis of video and/or audio output streams provided to the video processing unit by the video processing unit. The engaged listener characteristics may be as described previously, and may include one or more of: a reaction to the speaking meeting participant, a posture change, a gaze direction (e.g. a gaze direction towards the speaking meeting participant), a facial expression or a change in facial expression, a head movement (e.g. nodding or shaking of the head), applause, or a raised arm or hand. Other body movements may also be used as an engaged listener characteristic.

Listener shot video streams featuring non-speaking meeting participants may be displayed alongside, or simultaneously with, one or more speaker shot video streams, for example with each video stream displayed in a corresponding display tile. Alternatively, listener shots and speaker shots may be shown at different times, for example listener shots may be shown in alternation with one or more speaker shot video streams. Speaker shots may be displayed for longer durations than listener shots. For example, a speaker shot may be shown for a duration of about 7-10 seconds and a listener shot may be shown for a duration of about 1-3 seconds. Featuring non-speaking meeting participants according to these characteristics provides the remote meeting participant with information regarding the pertinent reactions of listeners that they would otherwise lack.

Disclosed embodiments may include presenter shots. Presenter shots may focus on a presenter and optionally one or more objects with which the presenter interacts, such as a classroom presenter or a presenter in board room meeting scenarios. Presenter shots may feature the presenter, and no other meeting participants, i.e. only the presenter. For example, in some embodiments, where one participant is talking for the majority of the meeting, the system may add presenter shots and listening shots. These shots may be variations of a close shot or medium shot, only showing the presenter, but using different camera angles and compositions to give variation in the video and prevent it from feeling static.

Embodiments of the present disclosure may relate to features and techniques for providing different types of user experience based on the type of meeting environment. For example, in a meeting room, the virtual director unit may use a total shot of the center most camera in the beginning of the stream to create an understanding of the context, the room, and the visual relationship between people in the room. After a predefined time, the virtual director unit may switch to a camera with the best view showing a group of the persons in the room (using a medium shot). In some embodiments, the best view may include the left and/or right side of a table. The virtual director unit may then frame the person who is speaking through the camera that can see the speaker best from the front of their face (using a medium shot). If the speaking person talks for longer than a predetermined time, the virtual director unit may switch to framing other people in the room that are listening (using a listening shot) or reacting (using a reaction shot), using the camera that can see the selected listening or reacting person best from the front of their face. If no one is speaking or the virtual director unit determines that the voice is coming from an artificial sound source (e.g., loudspeaker), the virtual director unit may switch to framing most or all participants in the room using the camera that can see all of them best from the front (using a total shot).

As another example, in a classroom, the parameters in the virtual director unit and vision pipeline may be adapted for a presenter scene. The presenter scene may be employed in a classroom or lecture meeting environment, where one person talks for most of the meeting (e.g., more than half of the meeting duration) and an audience listens and partially participates. In some embodiments, the virtual director unit may start with showing the presenter and the audience in the room, and then transition to framing the presenter (using a presenter shot). After the presenter has spoken for a determined amount of time, the virtual director unit may then frame the audience in medium shots, switch to presenter shots in between different medium shots. If the presenter stands up or moves in the room, the virtual director unit may use a medium shot, leaving the presenter space in the direction they are moving and follow the movement of the presenter.

As yet another example, the virtual director unit parameters and the vision pipeline may be adopted for use in workshops. In this variation, the virtual director unit may start with showing all the participants in the workshop with a total shot, and then transition to use a medium shot of the person talking, and then transition to capturing someone who moves or is moving. In a workshop meeting environment, the system may be equipped with cameras that can capture content on whiteboard and/or walls. The vision pipeline may be able to detect if one person adds something to the wall/whiteboard and accordingly switch to a camera and shot that frames the person performing an action associated with the change in addition to framing what has been added. The virtual director unit may follow principles described herein, such as—but not limited to—switching to a listening shot when someone speaks for a long time, switching to a total shot from the center camera when someone that is participating remotely is speaking. In some embodiments, such as meeting environments including dialogue or conversation, the virtual director unit may follow modified principles, such as—but not limited to—allowing switching back and forth between speakers without using a frequent or predefined time interval for a listening shot.

Furthermore, embodiments of the system that include content cameras or whiteboard cameras may have a virtual director unit adapted to this scenario. If someone stands up to draw on a whiteboard, the virtual director unit may switch or alter the framing to a center camera showing an overview of everyone during movement. After a person has arrived at the whiteboard, the virtual director unit may switch or alter to a frame or shot that includes the whiteboard and the person in the frame, to establish a context. When context is established, it may keep in line with principles described herein, including displaying content on a whiteboard when everyone is looking toward the whiteboard.

Some embodiments of the present disclosure may provide flexibility in various scenarios. For example, some embodiments will use information detected by cameras to frame other activities. For example, when someone holds up an object, the camera may switch to framing both the person and object. As another example, when more than one person gazes in the same direction, the system may change frames to use the camera that frames them best from the front of their face, and/or switch to the person they are looking at, using any framing principles, alone or in combination, described herein.

The virtual director unit may switch between frames using a rhythm to keep engagement on the far end (e.g., the people watching the video stream from the host computer 140), where active speakers and content may get more time than listeners. For example, live TV production can switch quite fast with frames lasting less than a second, but for an interactive video call each frame may be required to last longer to allow for opportunities to speak up on the far end.

Embodiments of the present disclosure may include features or techniques involving virtual director unit parameters. In some embodiments, the virtual director unit may be parametrized, which may govern how the system selects a shot and how a camera can be adapted and changed, either by the user or automatically. Non-limiting examples of parameters that may be changed include: where space is added around a person in the shot; how a person is placed in the shot; how input from the vision pipeline is weighted in order to determine what shot is selected; the order shots are used; what determines how which camera in the system is used; how long the virtual director unit frames the active speaker before switching; how long should there be activity on a whiteboard before the shot is selected; how long a listening shot is held; and how much movement is necessary before the virtual director unit frames the person moved or transitions from a medium shot including the moving person to a close shot only framing the speaking person; a rhythm of cutting based on detections of what is happening in the room (tone of voice, activity, mood, etc.) or a manual setting.

The parameters may be automatically adapted depending on, for example, the smart sensors connected to the system and/or the virtual director unit. This may allow the users of the system to adjust some parameters to their preference.

Embodiments of the present disclosure may include features, functions, and techniques directed toward discovery updates from one or more cameras. In some embodiments, a discovery function may be provided. The discovery function may use the a discovery protocol. The client side in each camera may receive discovery updates from other cameras in the network. When the client detects a new camera, the discovery information for a camera may change. Alternatively, when a camera is removed from the network, the camera may evaluate its main director status.

The discovery process for a camera may include comparing the camera's own information with that of other cameras, or every other camera, on the network. If another camera reports that it is the main director, the camera may not become the main director. If no other camera is main director, the camera with the highest serial number may become the main director. Each camera may compare its own serial number with that of every other discovered camera to find out if it will become the main director.

Figure 17:
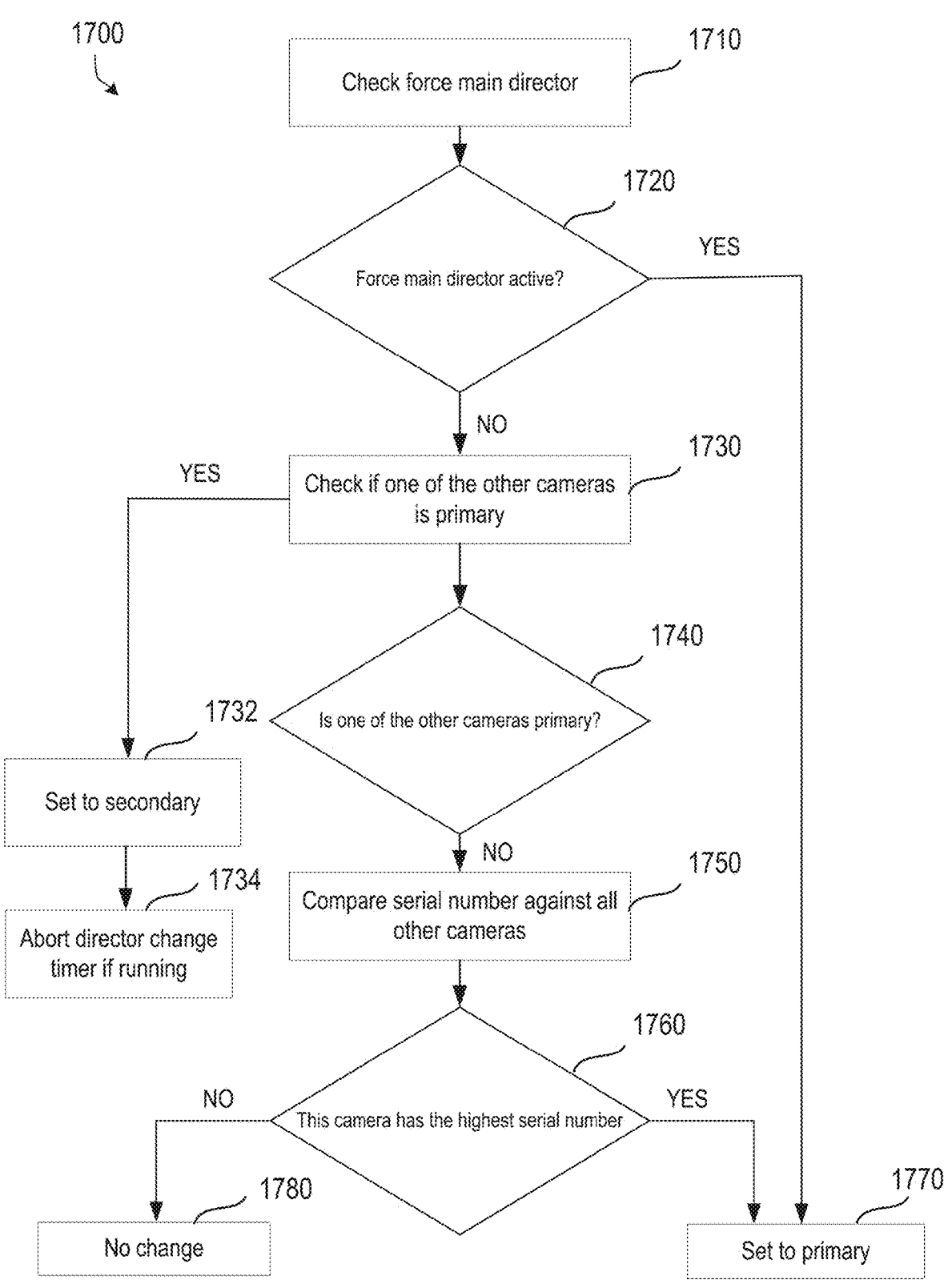
FIG. 17 is a diagrammatic flowchart illustrating a discovery process, consistent with some embodiments of the present disclosure.

FIG. 17 is a diagrammatic flowchart illustrating a discovery process 1700. As shown in step 1710 of FIG. 17, discovery process 1700 may include checking for if a first camera has been force selected, or identified, as the main director. The method may include checking if the force main director is active, as shown in step 1720. If the force main director is active (1720), the first camera associated with the force main director may be set to be the primary camera 1770. If the force main director is not active (1720), the method may include checking if one of the other cameras is a primary camera, as shown in step 1730. As shown in step 1732, 1734 of FIG. 17, if one of the other cameras is a primary camera (1740), the first camera may be set to be a secondary camera and a director change may be aborted if a timer is running. If one of the other cameras is not a primary camera (1740), the serial number of the first camera may be compared to the serial number of all other cameras in a system, as shown in step 1750. If the first camera has the highest serial number (step 1760), the first camera may be set to primary, as shown in step 1770. If the first camera does not have the highest serial number, no change in setting of a camera as primary may be performed, as shown in step 1780.

In some embodiments, a "mode" field in a discovery message may be used to show director status. If mode=0, the camera is may be a non-camera. If mode=1, the camera may be a non-director camera. If mode=2 the camera may be a director camera.

Furthermore, if the main director camera disappears from the network, other cameras may wait for 30 seconds before assuming the main director role. This may avoid the changing of the main director camera when cameras reboot during software upgrades.

In some embodiments, external discovery using the Web Service Discovery host and client daemon (WSDD) and Avahi discovery services may be run from the main director camera only, to ensure that this camera is the only one discoverable by connected personal computers (PCs).

As discussed above, embodiments of the present disclosure may include features, techniques, and processes for directing and framing. In some embodiments, directing (e.g., deciding which camera to use) and framing (e.g., deciding which cut or shot to use) may be delegated to a new independent process termed "DirectorWits". The process may include receiving detection events and sound observations from each camera and making decisions based on these events and observations roughly once every second.

The algorithm, or process, may implement a fuzzy state machine looping over a set of rules for directing. At regular intervals, each rule may be asked to bid on what should happen next given a bag of recent events. The rule that wins the auction may decide the next shot and for how long it should be held. Some rules may preempt the decided shot time. The rule set may include: Default (e.g., nothing is happening, revert to an overview shot); Speaker (e.g., human speech is detected in the room, frame the speaker if they can be located); Listener (e.g., human shape is detected in the room and is not speaking, frame the listener along with optional other people sitting close by); Entropy (e.g., humans are moving about in the room, frame all people from a well-placed camera); Interruption of current framing (e.g., someone is leaving or entering the room); Alternate (e.g., irrespective of activities, frame something for a camera ensuring all cameras are used in sequence); Presenter (e.g., on nominated cameras, frame a person and a target (e.g., screen, painting, whiteboard) to the left or right of the presenter, may require minimal camera placement); Sequencer (e.g., prime the state machine with combinations of the other rules and parametrization). Each set may be active for a specified time, and may loop from the beginning after all sets are complete (e.g., performed).

Rules may implement the virtual methods declared in a core class. The following declarations may be used in implementing disclosed embodiments.

ComputeScore from and EventCollection may make a bid for the current auction, where values are in the range 0.0 to 1.0. If the rule wants to participate it may return the (configurable) value termed Importance; otherwise it may return the value 0.0. A special score of 1.0 may override all other bids and even hijack the current framing.

ApplyDecisons may be called if the rule wins the auction. It may decide which camera to present data from and what kind of shot.

FrameTime may define the number of seconds the shot will be held before the next framing. For example, when framing a speaker, the shot may be held for at least 4 seconds. In some embodiments, the speaker shot may be held for about 8-10 seconds. Note that there may be auctions held before the time has expired. One reason is that the framing can be preempted in special cases, for example, when people are leaving or entering the room.

Delay may include a self-imposed quarantine time for when the rule can be applied again. For example, if there was a listener shot, that rule may not be used again in the next 60 seconds. Delay and FrameTime may be tweaked to reflect the intended pace of the meeting (room and situation).

Incoming events may be captured by the core class, and outgoing events may be termed framing events. Events may be passed around in collections or clusters when there is a spatial relationship between them.

A core rule may define the common contract for bidding on the next shot and executing it when winning the auction. The derived rules may evaluate different features of an event collection and may choose a suitable shot type for a particular situation.

A state machine may orchestrate the overall DirectorWits behavior. It may implement the auction that is held every second or so, and may give control to the rule with the highest bid.

Figure 18:
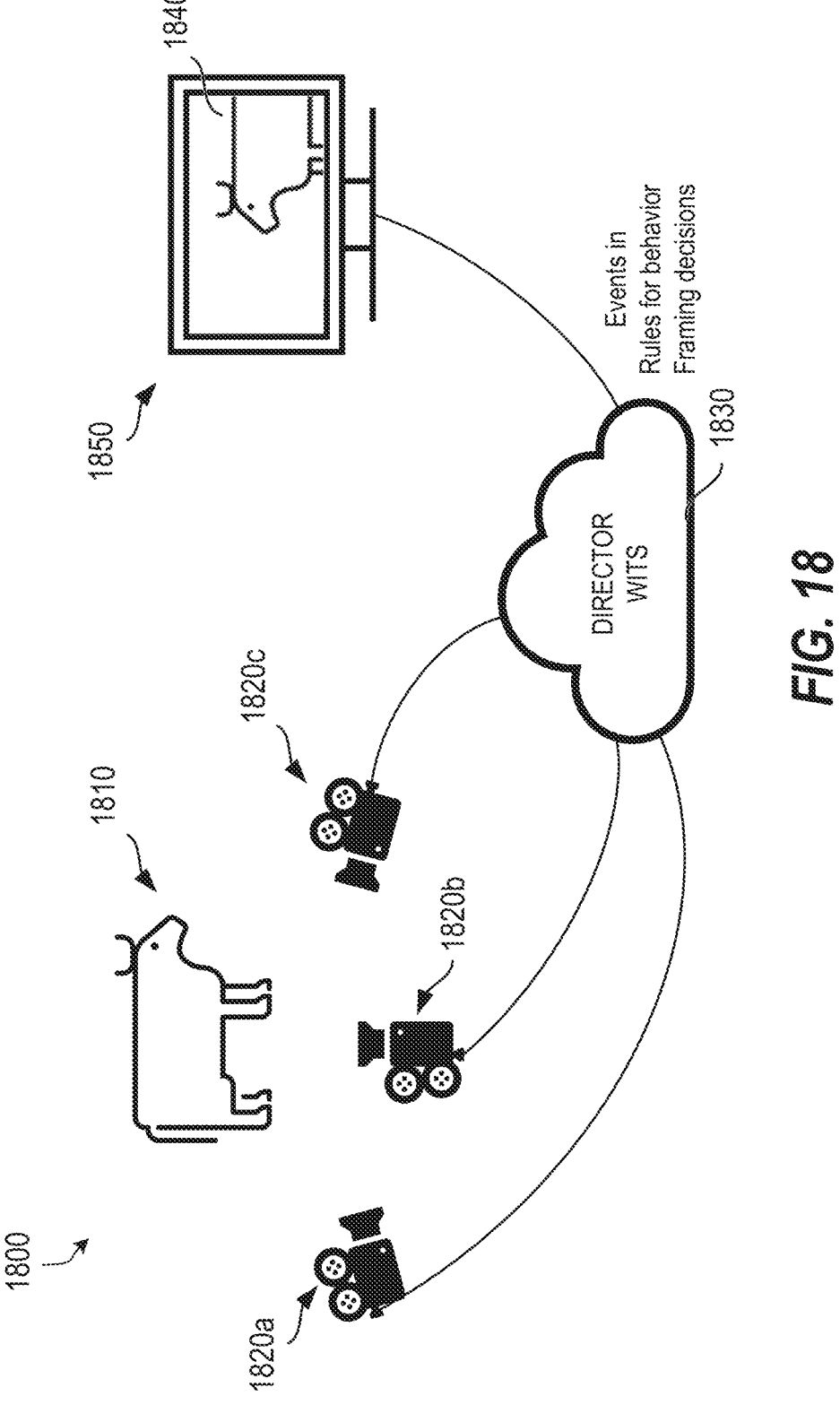
FIG. 18 is a diagrammatic representation of an example DirectorWits architecture, consistent with some embodiments of the present disclosure.

FIG. 18 is a diagrammatic representation of an example DirectorWits architecture 1800. As shown in FIG. 18, subject 1810 may be recorded or filmed by cameras 1820*a-c*. The DirectorWits process 1830 may make decisions based on received detection events and sound observations from each camera, and output a stream 1840 to display unit 1850.

In some embodiments, the DirectorWits (wits) may implement an autonomous world, one that does not depend directly on other parts of the multi camera parts, to reduce coupling and improve cohesion. There may a bridge implementation in place to achieve this, an example of which as follows:

1. EventGenerator may receive person and head detections as well as sound estimates to be formulated as wits events. This information may be sent into wits through the DirEventBridge class.

2. EventExecutor receives framing commands from wits and passes them on to the process for controlling the video stream sent to the consumer.

Figure 19:
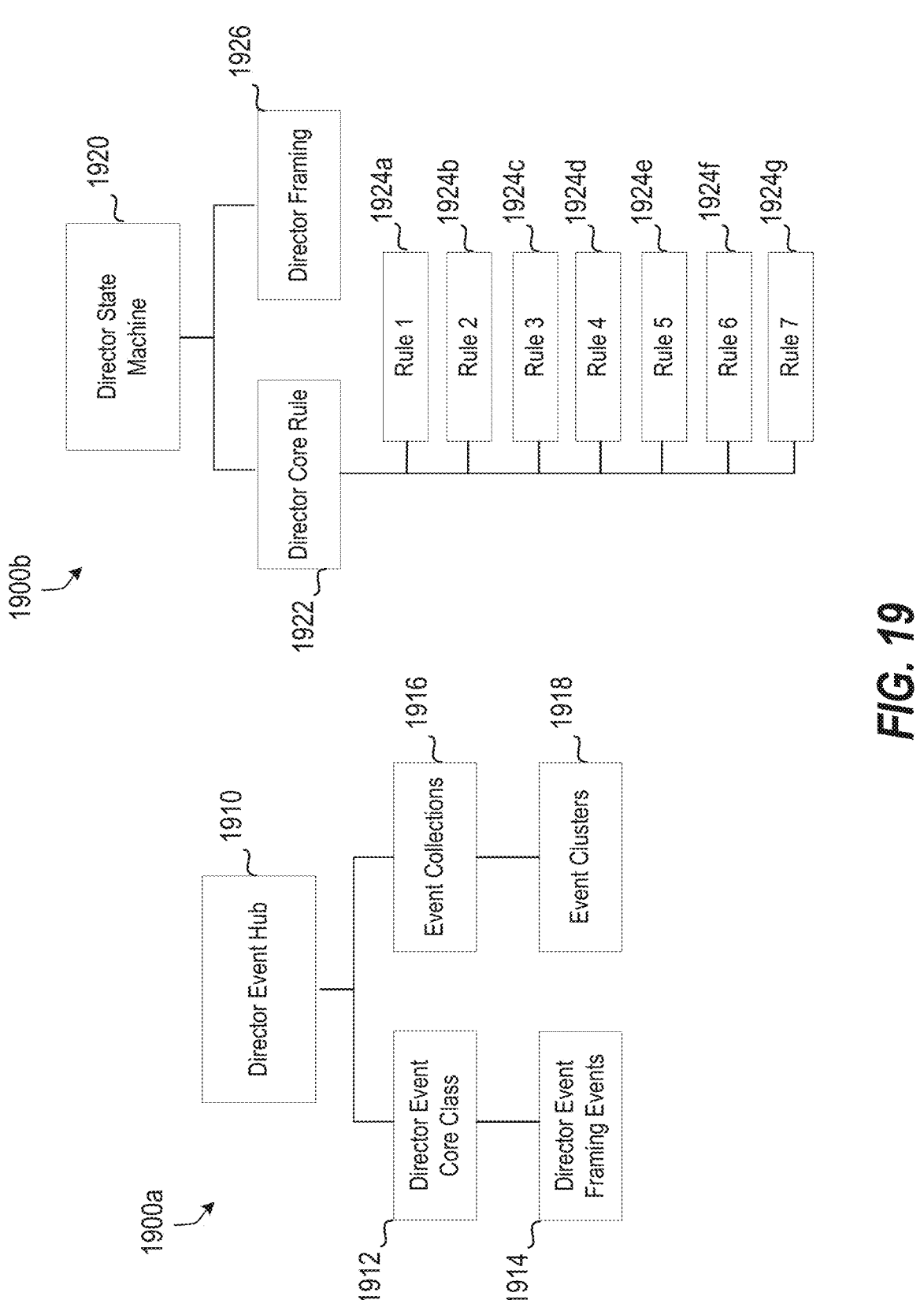
FIG. 19 is a flowchart illustrating main concepts and relations in an example of DirectorsWits, consistent with some embodiments of the present disclosure.

FIG. 19 is a flowchart illustrating main concepts and relations in an example of DirectorsWits. As shown in FIG. 19, incoming events may be processed through an incoming event process 1900*a*. Incoming events in the Director Event Hub 1910 may be captured by the core class 1912 and outgoing events may be considered framing events 1914. Events may be passed around in collections 1916 or clusters. The director state machine process 1900*b* using Director State Machine 1920 may include a core rule 1922 that defines the common contract for bidding on the next shot and executing the next shot when winning the auction. Rules 1924*a-g* may evaluate different features of an event collection and may choose a suitable shot type for a particular situation or event. The director may direct a frame 1926, or shot, accordingly.

The following sections introduce additional features, description, and techniques related to the multi-camera systems and/or to the various features described above. Any of these additional features, techniques, and/or structures may be used together in combination with any of the multi-camera systems or features of the multi-camera systems discussed in the sections above.

Embodiments of the present disclosure may include features and techniques for finding, or discovering, direction of arrival (DOA). To know which participants are talking and when, an understanding relative to generated audio signals may be important. Direction of Arrival (DOA) algorithms may indicate the direction of the speaker while Voice Activity Detection (VAD) may provide information about when someone talks.

DOA of a sound source may be determined based on at least two synchronized microphones. The Steered Response Power with Phase Transform (SRP-PHAT) is a simple and robust DOA algorithm, and may estimate the time delay between two microphones by calculating the phase difference of the Fourier transform of simultaneous short sound segments from the two microphones. A set of search angles may be defined (e.g., every 1°) and for each angle, a steering angle may be applied to calculate the response value (e.g., power) for each frequency. After summing over all frequencies, the max peak of this power may be the estimated DOA.

Detecting whether a signal contains speech has been solved in different ways. The simplest may be the so-called "energy VAD", which may calculate the energy of the signal for each short time segment and then establish an energy value for the general noise floor. Sounds with significantly higher energy (e.g., sounds that are above a certain threshold relative to the floor) may be considered to be not background noise and, in some embodiments, assumed to be speech. The noise level may be slowly adapted to the general energy level between bursts of higher energy. This may work well because speech is continuously varying and thus does not increase the general noise floor level even if someone speaks continuously for a long time.

A more robust approach may account for certain speech characteristics. Such approaches may consider the frequency spectrum of speech. For example, deep neural network models may be used to recognize whether certain audio signals are representative of speech. In some cases, neural network approaches may be combined with the energy VAD described above.

Embodiments of the present disclosure may include features and techniques including a virtual audio director unit. A virtual audio director may include a software component that takes input from the vision pipeline component and determines what microphone/audio signal it should use. Properties that may be evaluated include: whether a person is speaking or not, and if they are speaking, for how long they have spoken and where they are looking.

As an example, a room with one smart camera placed underneath the TV, and one smart canvas camera attached to a whiteboard, with four people in the room sitting around a table in front of the TV may be provide. Person A may be presenting and may begin talking. The virtual audio director may consider the position of Person A and direction of the audio signal to only relay the audio signal from the direction of Person A. When Person A gets up to draw something on the whiteboard the virtual director may use the information from the vision pipeline to see that Person A is now underneath the smart canvas camera, and is looking away from the smart camera placed underneath the TV. The virtual audio director may switch over to use the audio signal from the microphones on the smart canvas camera. When Person B, who is still sitting by the table, begins discussing (e.g., speaking) with Person A standing by the whiteboard, the virtual audio director may combine the audio signal from the smart canvas camera and the smart camera underneath the TV to only pick up audio from Person A and Person B.

Embodiments of the present disclosure may include features and techniques for image processing. Image signal processing may be a core part of a digital camera and may constitute one or more camera image processing pipelines. The camera image processing pipelines may process a raw sensor input and its associated control function blocks, which in combination may act to produce higher quality images suitable for various use cases.

The control functions may optimize the settings for image pipelines in addition to the settings of any image sensors or image actuators in the camera. The optimization may be based on image statistics which are most often calculated as part of the image pipelines. Additionally, or alternatively, the control functions may receive external input in the form of user settings or decisions and analytics from computer vision algorithms in a camera system.

Figure 20:
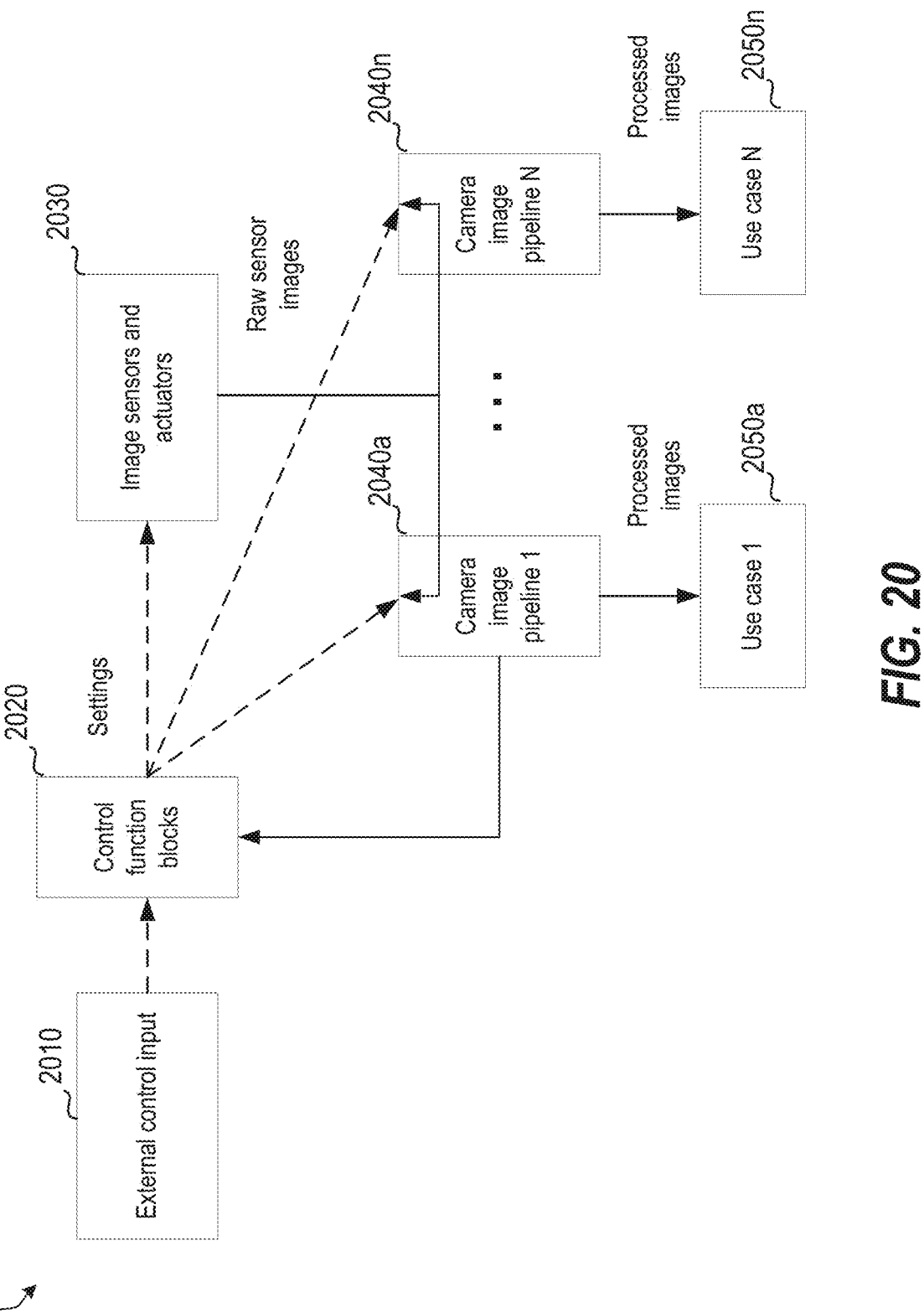
FIG. 20 is a diagrammatic representation of an image processing technique, consistent with some embodiments of the present disclosure.

FIG. 20 is a diagrammatic representation of an image processing technique 2000. An abbreviation for the control function blocks 2020 may include AAA, for Auto-focus, Auto-exposure and Auto-white balance. However, the settings controlled in a modern camera are not limited to these three image properties. For example, control of zoom level and crop region may be used in the realization of digital pan-tilt-zoom. The level of automation by the control function block 2020 may also be variable. For example, a setting for exposure may be determined entirely by an external user setting (e.g., external control input 2010), or fully determined by a control function block, such as control function block 2020.

While the distinction between a control function block 2020 and image pipeline 2040a-n may be beneficial to understand the system, the two can also be physically and logically implemented together, for instance in the context of a convolutional neural network framework.

The purpose of a camera image processing pipeline may be to produce a high-quality video stream from a raw color image sensor input. The optimum quality for the resulting video stream may depend on the use case. For example, a video stream that may be used for image analysis may be evaluated by different criteria than a video stream which may be viewed directly on a screen by a user. The video stream may be encoded for transmission or storage, where the final use case may be more open-ended. Additionally, or alternatively, the image pipeline settings may be optimized to the type and level of compression used to get the lowest possible distortion for a given bit rate.

Because of the differing requirements it can be an advantage to have multiple image pipelines in the camera, either by different configuration of the same pipeline structure (that may be time multiplexed) or by physically distinct pipelines that can operate in parallel. The end result may be that the processing from sensor to output can be optimized for different means.

For example, in applications where continuous scene analysis is performed, like video meetings or surveillance, it may be important that the image analysis can work on the full field of view seen by the image sensor 2030. The user or operator may simultaneously be shown a part of the image which is to be enhanced specifically at the highest resolution possible with the sensor. This may be more economical in terms of resource usage with independent image pipelines for the detail and the overview, because processing the entire image at the highest level of detail may be costly and irrelevant for the analysis.

For screen viewing and encoding, it may be important that the video stream from the image pipeline 2040a-n adheres to particular standards for the digital format. The standard may specify aspects like color space, quantization, defined intensity levels, etc., so that it may be possible to build an end-to-end video system with components from multiple vendors with predictable behavior. Thus format conversion may be the last stage of a camera image processing pipeline, but other aspects of the image pipeline may also be optimized to give the best general quality within the bounds of the standard.

Figure 21:
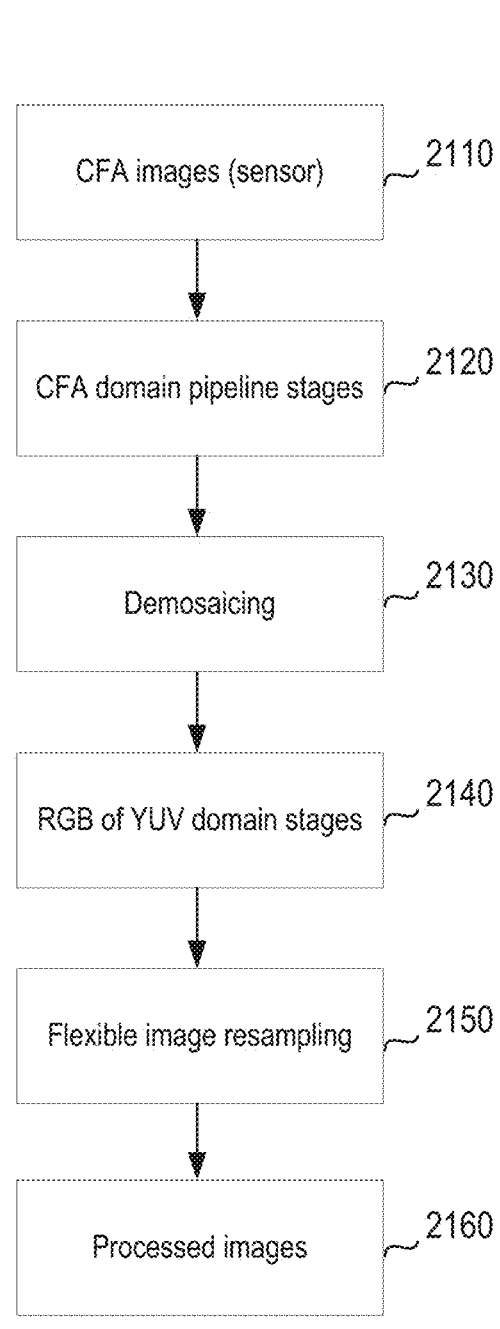
FIG. 21 provides a flowchart describing an example image processing pipeline, consistent with some embodiments of the present disclosure.

FIG. 21 illustrates a flowchart describing an example image processing pipeline 2100. The raw image from most modern image sensors may have a special mosaic format, because only one color may be captured per pixel location of the imager array. The bare sensor pixels may be covered with a color filter array (CFA) which may only transmit certain wavelengths for each pixel. The most common CFA pattern may include the Bayer filter mosaic, but other types may also be in common use. The CFA images may be received by the camera image pipeline 2100, as shown in step 2110 of FIG. 21.

A central operation for a camera image pipeline may include converting from a specialized CFA format to a more common format with 3 color channels per pixel. This operation may include demosaicing 2130, or de-bayering if used on a Bayer mosaic. While demosaicing may be important, it may not be required as the first stage in a multi-stage image pipeline. CFA formats may have fewer bytes per pixel than a full color image, and it may be economical to perform certain operations before demosaicing, if possible, to reduce the amount of calculations per pixel and the bandwidth used through the pipeline. Additionally, or alternatively, algorithms for demosaicing may perform better on higher signal to noise ratios and on images without sensor defects, so some form of noise reduction and sensor defect elimination may be performed prior to demosaicing. In some embodiments, demosaicing and noise reduction may be implemented simultaneously.

Other stages that may be performed before demosaicing, such as CFA domain pipeline stages shown in step 2120, may include operations that act globally or have a smooth variation across the image. Non-limiting examples of such stages include black level subtraction, color shading correction, and white balancing. Multi frame exposure fusion to reconstruct higher dynamic range may also be performed in CFA format before demosaicing.

Raw sensor images may have a numerical black point that is not equal to zero due to the distribution of read-out noise sensors being bipolar. In some embodiments, it may be necessary to remove some noise before the black level can be subtracted, to avoid noise-induced bias in dark areas. By delegating this work to the image processing pipeline (as opposed to doing it on the sensor with a simple operation like clipping), better low light performance and detail in dark areas may be achieved.

Color shading and vignetting can have multiple causes, both from the lens used and interactions between the lens and image sensor. Both may be corrected by calibrated correction maps.

The white balance stage may include correction of color cast in the image, which may have been brought about due to image sensor sensitivity deviations or illumination in the scene that deviates from some target illumination color. Color may be partially or fully corrected in the CFA domain, as in traditional systems, it may be performed as a global operator.

Noise reduction may be included in the camera processing pipeline. One can make a coarse distinction between filters operating in the spatial dimension and filters acting in the temporal dimension. The filtering may be carried out in a color space with good separation between chrominance and luminance. Because human vision is less sensitive to detail in the chrominance, a more aggressive filtering can be done in this component.

The color sensitivity curves for color image sensors may not exactly match color sensitivity curves of a typical human individual, which may be the goal for standardized sensitivity curves like the CIE XYZ used in color management. The sensor sensitivity may include a combination of what is possible with current sensor materials and maximizing the number of absorbed photons. There may be a need to correct colors due to mismatch, as shown in RGB of YUV domain stages 2140, which may be performed with various machinery ranging from 3×3 correction matrices to three-dimensional (3D) look up tables. In addition to correcting the sensor towards a standard, this stage can also be a stage to introduce color styles which deviate from a neutral capturing of color.

To correct for various lighting conditions and make the image pleasing to look at, various tone mapping operators may be applied to the image. The tone mapping defined by the image format standard targeted may be considered, which often is a gamma curve.

Lenses may have deviations from ideal geometric projections, such as rectilinear or fisheye projections. Such deviations may have consequences for the aesthetic appearance of the image and prevent use of computer vision techniques that measure and reconstruct objects in the scene (e.g., by stereo photogrammetry).

Many image processing pipelines may include a flexible image resampling stage 2150 that can locally warp the geometry of the image. It may be used both to correct the geometric projection of the lens and to change to other projections that may be more suitable for the use case. For example, a cylindrical projection may be preferable to a rectilinear projection for wide-angle views to reduce the perceived deformation of persons sitting in the outer parts of the image field.

Changing the parameters of a rendered projection used in the flexible resampling stage may be performed. For example, if camera placement is high and tilted downwards, changing the perspective angle may provide a rendering that may be perceptually better for a wide angle view by avoiding converging vertical lines that may look unstable on the side of the image.

The flexible image resampling 2150 may be useful when realizing pan-tilt-zoom, by changing the projection angle to simulate a physical pan-tilt camera. This may provide an advantage compared to realizing pan-tilt-zoom by simply changing the cropped region in an image which otherwise has a fixed projection. As shown in step 2160, processed images may be output.

Referring back to FIG. 20, embodiments of the present disclosure may include control function blocks 2020. Control function blocks may adapt the image processing pipelines to changing conditions and use cases, both of which may be based on continuous image statistics and features calculated by the image processing pipelines themselves, user settings, and/or external analysis giving more high level information about the scene.

Image processing pipeline stages may include parameters that may be adapted by control functions. The adaptation of white balance and color correction may be particularly important regarding user experience. Color may be a global image aspect in the changes to color may be visible at a glance without looking at local details. Some embodiments may use a gray world algorithm for white point estimation and a fixed color correction.

In some embodiments, important image aspects may include exposure and tone mapping. This may be adapted both through settings on the image sensors and image pipelines, and may strike a balance between bringing out details and maintaining contrast while keeping a natural look without artifacts. Newer image sensors may include a wider dynamic range than most image formats for transmission and storage support, and it may be the role of the tone mapping control function to map the wider dynamic range into a narrower one. Some embodiments may adjust the sensor gain in a feedback until the average image intensity is 18% (or any suitable amount), which may be the approximate average reflectance of natural scenes.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. While certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

In some embodiments, operations and functions performed by a disclosed system, or by a video processing unit of a disclosed multi-camera system, may additionally or alternatively be implemented as steps of a method or process. In some embodiments, the steps of methods disclosed herein may be performed by features of disclosed systems (e.g., by a video processing unit of a multi-camera system disclosed herein).

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Throughout this application, various embodiments of the present disclosure may be presented in a range format. It should be understood that the description in range format is merely for convenience and brevity and should not be construed as an inflexible limitation on the scope of the present disclosure. Accordingly, the description of a range should be considered to have specifically disclosed all the possible subranges as well as individual numeric values within that range. For example, description of a range such as from 1 to 6 should be considered to include subranges such as from 1 to 3, from 1 to 4, from 1 to 5, from 2 to 4, from 2 to 6, from 3 to 6, and so forth, as well as individual numbers within that range, for example, 1, 2, 3, 4, 5, and 6. This applies regardless of the breadth of the range.

Other embodiments will be apparent from consideration of the specification and practice of the embodiments disclosed herein. It is intended that the specification and examples be considered as example only, with a true scope and spirit of the disclosed embodiments being indicated by the following claims.

For example, disclosed embodiments may include: a multi-camera system, comprising: a plurality of cameras each configured to generate a video output stream representative of a meeting environment, wherein a first representation of a meeting participant is included in a first video output stream from a first camera included in the plurality of cameras, and wherein a second representation of a meeting participant is included in a second video output stream from a second camera included in the plurality of cameras; and a video processing unit configured to: automatically analyze the first video output stream and the second video output stream, based on at least one identity indicator, to determine whether the first representation of the meeting participant and the second representation of the meeting participant correspond to a common meeting participant; evaluate the first representation and the second representation of the common meeting participant relative to one or more predetermined criteria; select, based on the evaluation, either the first video output stream or the second video output stream as a source of a framed representation of the common meeting participant to be output as a primary video stream; and generate, as an output of the multi-camera system, the primary video stream including the framed representation of the common meeting participant.

In the multi-camera system, a third representation of a meeting participant is included in the first video output stream from the first camera included in the plurality of cameras, and wherein a fourth representation of a meeting participant is included in the second video output stream from the second camera included in the plurality of cameras, and wherein the video processing unit is further configured to analyze the first video output stream and the second video output stream, based on the at least one identity indicator, to determine whether the third representation of the meeting participant and the fourth representation of the meeting participant correspond to another common meeting participant.

In the multi-camera system, the video processing unit is further configured to: evaluate the third representation and the fourth representation of the another common meeting participant relative to one or more predetermined criteria; select, based on the evaluation, either the first video output stream or the second video output stream as a source of a framed representation of the another common meeting participant to be output as an alternative primary video stream; and generate, as an output of the multi-camera system, the alternative primary video stream including the framed representation of the another common meeting participant.

In the multi-camera system, the common meeting participant and the another common meeting participant are shown together in the alternative primary video stream if a number of interleaving meeting participants between the common meeting participant and the another common meeting participant is four or less.

In the multi-camera system, the video processing unit is further configured to determine whether the common meeting participant or the another common meeting participant is speaking and, based on the determination, generate the primary video stream as an output of the multi-camera system if the common meeting participant is determined to be speaking and generate the alternative primary video stream as an output of the multi-camera system if the another common meeting participant is determined to be speaking.

In the multi-camera system, the determination of whether the common meeting participant or the another common meeting participant is speaking is based on directional audio information received at the video processing unit from one or more directional microphones.

In the multi-camera system, the determination of whether the common meeting participant or the another common meeting participant is speaking is based on output of a trained network configured to detect voice activity based on input including one or more captured images or one or more audio signals.

In the multi-camera system, the determination of whether the common meeting participant or the another common meeting participant is speaking is based on lip movement detection across a plurality of captured image frames.

In the multi-camera system, the video processing unit is further configured to determine whether the common meeting participant or the another common meeting participant is speaking and, based on the determination, generate the primary video stream as an output of the multi-camera system if the common meeting participant is determined to be not speaking and generate the alternative primary video stream as an output of the multi-camera system if the another common meeting participant is determined to be not speaking.

In the multi-camera system, the output of the multi-camera system includes both the primary video stream and the alternative primary video stream for inclusion in respective tiles to be shown on a display.

In the multi-camera system, the output of the multi-camera system includes one or more additional primary video streams for inclusion in additional respective tiles to be shown on the display.

In the multi-camera system, the output of the multi-camera system is alternated between the primary video stream and the alternative primary video stream.

In the multi-camera system, the alternation between the primary video stream and the alternative primary video stream includes a hard cut transition between the primary video stream and the alternative primary video stream.

In the multi-camera system, the alternation between the primary video stream and the alternative primary video stream includes a smooth transition between the primary video stream and the alternative primary video stream.

In the multi-camera system, the alternation between the primary video stream and the alternative primary video stream is based on whether the common meeting participant or the another common meeting participant is determined to be speaking.

In the multi-camera system, a transition between the primary video stream and the alternative video stream occurs after a delay of at least 8 seconds.

In the multi-camera system, the alternation between the primary video stream and the alternative primary video stream is based on whether the common meeting participant or the another common meeting participant is determined to be listening.

In the multi-camera system, a transition between the primary video stream and the alternative video stream occurs after a delay of at least 3 seconds.

In the multi-camera system, the alternative primary video stream includes a representation of a face of the another common meeting participant and a representation of at least a portion of a back of a head of the common meeting participant.

In the multi-camera system, the alternative primary video stream includes a representation of a face of the another common meeting participant and a representation of at least a face of the common meeting participant.

In the multi-camera system, the alternative primary video stream includes a representation of a face of the another common meeting participant, a representation of at least a face of the common meeting participant, and a representation of a face of at least one interleaving meeting participant.

In the multi-camera system, the one or more predetermined criteria includes a looking direction of the common meeting participant determined relative to each of the first and second video output streams.

In the multi-camera system, the one or more predetermined criteria includes a face visibility score associated with the common meeting participant determined relative to each of the first and second video output streams.

In the multi-camera system, the common meeting participant is determined to be speaking, listening, or reacting.

In the multi-camera system, the first or second camera associated with the selected first or second video output stream is designated as a preferred camera associated with the common meeting participant.

In the multi-camera system, the common meeting participant is centered in an output associated with the preferred camera.

In the multi-camera system, the meeting environment includes at least one of a board room, classroom, lecture hall, videoconference space, or office space.

Further, in other embodiments, a multi-camera system comprises: a plurality of cameras each configured to generate a video output stream representative of a meeting environment, wherein a first representation of a meeting participant is included in a first video output stream from a first camera included in the plurality of cameras, and wherein a second representation of a meeting participant is included in a second video output stream from a second camera included in the plurality of cameras; and a video processing unit configured to: automatically analyze the first video output stream and the second video output stream, based on at least one identity indicator, to determine whether the first representation of the meeting participant and the second representation of the meeting participant correspond to a common meeting participant, wherein the at least one identity indicator includes a feature vector embedding determined relative to the first representation of the meeting participant and the second representation of the meeting participant; evaluate the first representation and the second representation of the common meeting participant relative to one or more predetermined criteria, wherein the one or more predetermined criteria include a combination of: whether the common meeting participant is detected as speaking, a head pose of the common meeting participant, and a face visibility level associated with the common meeting participant; select, based on the evaluation, either the first video output stream or the second video output stream as a source of a framed representation of the common meeting participant to be output as a primary video stream; and generate, as an output of the multi-camera system, the primary video stream including the framed representation of the common meeting participant.

In the multi-camera system, the meeting environment includes at least one of a board room, classroom, lecture hall, videoconference space, or office space.

Disclosed embodiments further include a multi-camera videoconferencing system, comprising: two or more cameras, wherein each camera of the multi-camera videoconferencing system includes an image sensor configured to capture an overview video stream; and at least one video processing unit configured to: cause an overview video stream from a first camera to be shown on a display during a first time period; and cause a focus video stream, derived from an overview video stream associated with a second camera different from the first camera, to be shown on the display during a second time period; wherein the focus video stream derived from the overview video stream associated with the second camera features an object that is also represented in the overview video stream of the first camera.

Disclosed embodiments further include a camera system, comprising: at least one image sensor configured to capture an overview video stream; and a video processing unit configured to: select a portion of the overview video stream to output as a focus video stream, wherein the focus video stream is selected based on one or more detected characteristics of a non-speaking participant in a videoconference; and cause the focus video stream to be shown on a display; wherein the one or more detected characteristics include a posture change or gaze direction associated with the non-speaking participant. The focus video stream may include frame space padding in the gaze direction of the non-speaking participant. The focus video stream may include a representation of an object of the gaze of the non-speaking participant.

Disclosed embodiments further include a camera system, comprising: at least one image sensor configured to capture an overview video stream; and a video processing unit configured to: automatically detect a videoconference participant and one or more objects with which the videoconference participant interacts; select a portion of the overview video stream to output as a focus video stream, wherein the focus video stream is selected based on the detected videoconference participant and the one or more objects with which the videoconference participant interacts, wherein the focus video stream is framed to feature both the videoconference participant and the one or more objects with which the videoconference participant interacts; and cause the focus video stream to be shown on a display.

Although many of the disclosed embodiments are described in the context of a camera system, a video conferencing system or the like, it should be understood that the present disclosure specifically contemplates, in relation to all disclosed embodiments, corresponding methods. More specifically methods corresponding to the actions, steps or operations performed by the video processing unit(s), as described herein, are disclosed. Thus, the present disclosure discloses video processing methods performed by at least one video processing unit, including any or all of the steps or operations performed by a video processing unit as disclosed herein. Furthermore, disclosed herein is at least one (or one or more) video processing units. Thus, it is specifically contemplated that at least one video processing unit may be claimed in any configuration as disclosed herein. The video processing unit(s) may be defined separately and independently of the camera(s) or other hardware components of the video conferencing system. Also disclosed herein is one or more computer readable media storing instructions that, when executed by one or more video processing units, cause the one or more video processing units to perform a method in accordance with the present disclosure (e.g., any or all of the steps or operations performed by a video processing unit, as described herein).

As noted above, the disclosed camera systems, whether a single camera system or a multi-camera system, may be deployed in various types of meeting environments. Such environments may include at least one of a board room, classroom, lecture hall, videoconference space, office space, court room, medical setting (e.g. hospital, surgical theatre), among many others. Further, as noted above, any of the disclosed camera systems described above may be configured to detect, track, determine, and/or infer various characteristics associated with meeting participants based on analysis of the video output stream(s) output by the one or more cameras and, consistent with the discussion included in the sections below, use those characteristics to determine relative framing priorities among meeting participants. Such characteristics, as will be discussed further in the sections below, may include a type of role determined or predicted relative to one or more meeting participants, a level of engagement of one or more meeting participants, a detected property or action associated with one or more meeting participants, etc. The role and property/characteristic prediction/inference functionality discussed in the sections below may also be combined with embodiments configured to track and correlate meeting participant identities across video outputs of two or more cameras, as discussed in the sections above.

In general, in the disclosed camera systems, detected or determined characteristics associated with representations of individuals (e.g., meeting participants) included in one or more captured video frames/video streams from a camera may be used to assign role designations to the individuals identified in the video frames/streams. The characteristics used to assign the role designations may be determined based on analysis of video output generated by the camera(s) of the video conferencing system, e.g. based on analysis of one or more overview video output streams. Further, various properties and/or actions of associated with the represented individuals may also be automatically detected or determined based on analysis of the video frames/streams output by the camera(s) of the video conferencing system. Based on the assigned roles and/or the various properties and/or actions associated with the individuals, framing selection hierarchies can be determined for generating one or more primary, or focus, video output streams featuring framed representations of one or more of the individuals derived from the overview video output stream(s) from one or more camera(s) of the system. Such framing selection hierarchies can then be used, for example, by the disclosed video processing units to determine which identified individual(s) to feature in an output stream of the camera system, the relative durations that different individuals feature in the output stream, or the relative prioritization (e.g. size of the framed representation) given to framed representations of different individuals in the output stream. In this way, the determined framing selection hierarchies can be used to determine how the video output framing functions throughout a meeting, which in turn, affects the video experience of system users and the relevance of the information conveyed by the video experience. The roles/properties/actions information, however, may also be used in various other types of applications (e.g., in correlating and tracking meeting participants across multiple camera outputs, etc.).

In a hybrid meeting environment where some meeting participants are present in a meeting room or other meeting environment (e.g. office space, classroom, lecture hall, etc.) and other participants participate from locations remote from the meeting environment, the disclosed camera systems may use AI (e.g., one or more trained networks) to infer or determine characteristics associated with individuals captured by the camera systems. Such characteristics (e.g., inferred roles, observed properties, observed actions/behaviors, etc.) may be used to assign framing priorities to detected individuals. In this way, the system can use the understanding of peoples' roles/properties/actions, etc. to determine which individuals should be featured in video output provided to the remote participants and/or to the conference room participants at any given time during a videoconference meeting. Examples of such assigned roles/properties/actions may include "Speaker, serious, sitting down", "Contributor, curious, hand raised", "Audience, happy, clapping," etc.

Using such techniques, the disclosed camera system may determine or infer the role that people play when participating in a videoconference using video collaboration technology. This information can be used to create new video experiences from the meeting rooms. For example, by identifying the roles that people have in video collaboration meetings, a network of intelligent cameras can use the understanding of roles to make video framing decisions, determine which participants to feature in a primary video stream output, distribute video representation time across meeting participants in a way that aligns with the roles that people have in the meeting, etc.

In the disclosed camera systems, one or more cameras are able to see or capture an overview of a room and detect or identify individuals featured in the overview video stream, where they are looking, who is talking, across all cameras in the system. A video processing unit may track, determine, or infer participant roles, properties/characteristics, and/or action components. These participant roles, properties/characteristics, and/or action components can be used by the video processing unit in the vision pipeline to make video framing and/or video formatting decisions. This can be accomplished using one or more machine learning models that take the previous detections as input, and/or one or more statistical/mathematical models, or a new output on the existing vision pipeline machine learning model.

The presently disclosed camera systems may include at least one camera configured to generate an overview video output stream representative of a meeting environment. The disclosed systems may also include one or more video processing units configured to automatically analyze the overview video output stream(s) to identify at least a first meeting participant and a second meeting participant (among any number of two or more meeting participants) represented or featured in the overview video output stream. The video processing unit(s) may be included in a single camera or components associated with the video processing unit may be distributed across two or more cameras or may be included partially or fully within a stand-alone computing device (e.g., a local video server, a networked video server, a cloud-based video server, etc.). An example of a multi-camera system in which the video processing units are distributed across two or more cameras is the Huddly® Crew™ system, which may be updated to include the presently described functionalities.

Figure 47:
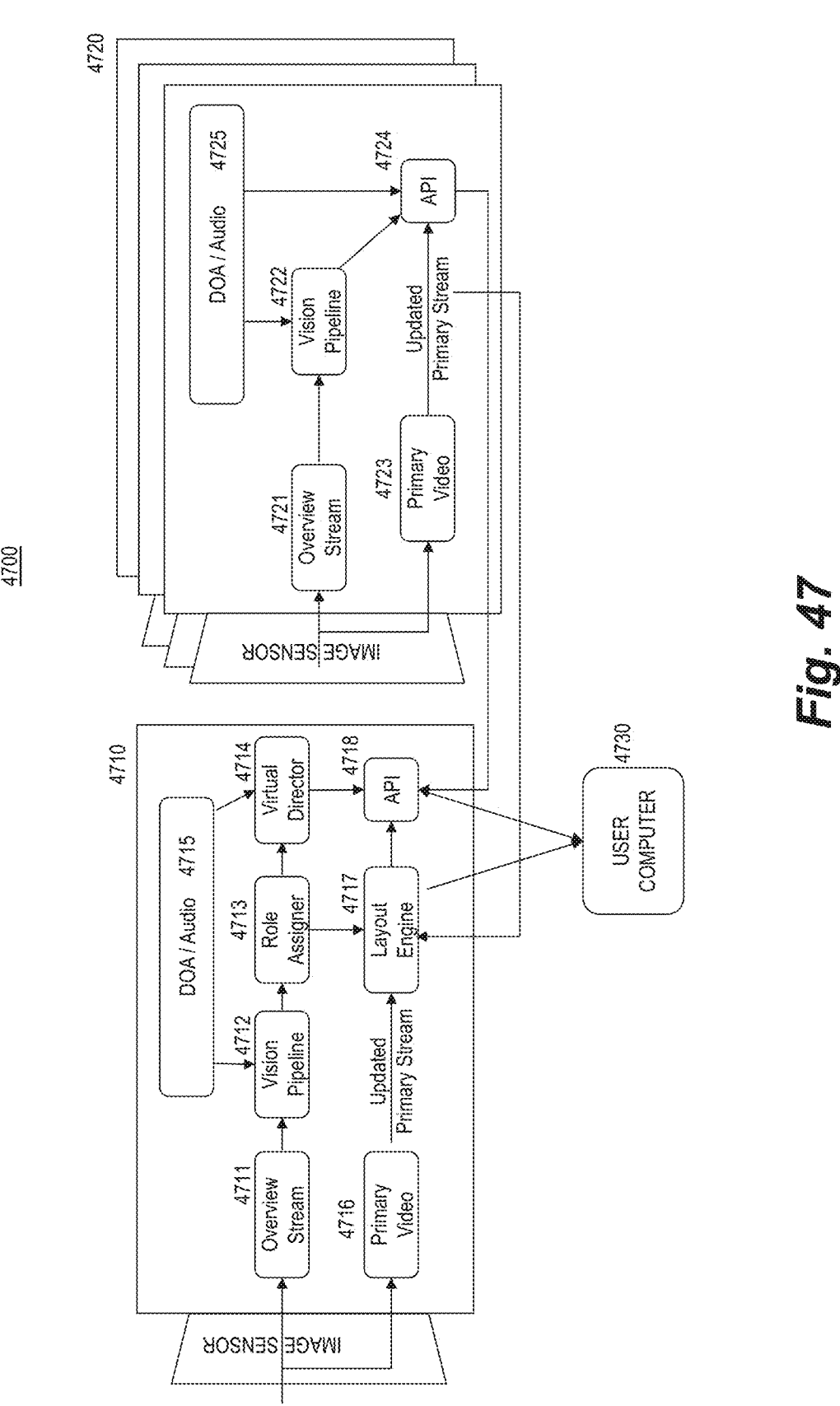
FIG. 47 is a diagrammatic representation of an example of a multi-camera system implemented a Roles assignment feature, consistent with some embodiments of the present disclosure.

Referring to FIG. 47, a camera system 4700 consistent with presently disclosed embodiments may include at least one camera, such as a primary camera 4710. The disclosed camera system, however, may include any number of additional cameras, such as a secondary camera 4720. The cameras may communicate with a user computer 2830 and each other via an application programming interface (API) 4718, 4724, etc.

Each camera in FIG. 47 may generate an overview video stream 4711, 4721 that may be passed on to a vision pipeline 4712, 4722, which may include vision processing units (e.g., vision processing units 2813, 2823, etc. as shown in FIG. 28). The vision pipelines may also receive information from DOA/Audio unit 4715, 4725 to combine both audio and visual streams available, as described above. For example, as described above. For example, DOA/Audio unit 4715/4725 may include a directional microphone array configured to detect audio signals originating from different locations or directions relative to a camera, DOA/Audio unit 4715/4725 may use the audio signals from different microphones and determine the angle and/or location that of the sound corresponding to an audio signal (e.g., a voice) originates. The video processing unit(s) may receive directional audio information, e.g. directional audio tracks or signals corresponding to different directions relative to the camera, and may determine whether a featured meeting participant is speaking based, at least In part, on the received directional audio information. For example, the video processing unit may determine that a direction or location associated with a directional audio signal or track that represents speech corresponds to, or correlates with, a determined direction or location of a featured meeting participant, as determined from image analysis of the video output from the camera. In such a case, the video processing unit may determine that the featured meeting participant is a speaker. More generally, the video processing unit may be configured to correlate directions or locations associated with one or more directional audio signals with determined directions or locations of one or more meeting participants featured in a video output stream received from a camera, and to identify one or more meeting participants as speakers based on the correlations. The video processing unit may also be configured to track lip movements of featured meeting participants, and to identify speaking meeting participants based on the tracked lip movements and the directional audio information. For example, if a meeting participant is identified as being associated with tracked lip movements and a directional audio signal, the meeting participant may be identified as a speaker.

In the example of FIG. 47, each camera may include its own vision pipeline and associated vision processing unit. In some cases, such as in the example of FIG. 47, a role assigner 4713 of primary camera 4710 may function as a master unit for determining roles/properties/actions of all individuals represented by the overview streams of all available cameras. Role assigner 4713 may receive overview video from one or more secondary cameras via API 4725, etc. In other cases, role assigners may be included on two or more cameras in a multi-camera system, and roles/properties/actions associated with detected individuals may be determined based on coordinated analysis by multiple role assigner units.

The vision pipeline(s) may then determine the location of individual participants within the meeting environment, whether a participant is speaking, facial expressions of participants etc. Vision pipelines analyze the overview video stream multiple times every second to swiftly respond to changes in the observed meeting environment. In addition, depending on the intended application, vision pipeline models can be fine-tuned to further excel in audiovisual processing of information relating to a specific meeting environment by providing them with specific training images and sound samples representative of such meeting environment. The role assigner may be responsible for designation of at least one of roles, properties and actions based on the output of machine learning models, trained neural networks, and/or algorithms included in vision pipelines.

In parallel, the overview streams 4711, 4721 are used for generation of the primary, or focus, video streams 4716, 4723 based on vision pipeline (and video processing unit) analyses of respective output streams from the cameras of system 4700. The role assigner 4713 as well as a virtual director 4714 both communicate with the layout engine 4717 to pass on visual information. The role of virtual director 4714 may include a camera selection and frame selection to be passed on to the layout engine 4717. Virtual director 4714 may use additional input from DOA/Audio unit 4715, 4725 for selection of a suitable camera stream and framing of one or more participants. Layout engine 4717 determines a particular layout based on various predetermined conditions, which can then be output as a matrix of tiles showing selected camera angles and frames on the user computer 4730. Layout engine 4717 may be capable of generating adaptive layout and gallery view(s), and may therefore be an adaptive layout engine, as discussed above in further detail. Adaptive layout engine may be capable of implementing the adaptive layout features described previously, such as speaker views, gallery views, overview shots, floating tiles, etc.

In some embodiments the camera system may comprise at least one camera configured to generate an overview video output stream representative of a meeting environment and a video processing unit configured to automatically analyze the overview video output stream to identify at least a first meeting participant and a second meeting participant represented in the video output stream. Here, at least one camera may indicate a system of cameras, which includes two or more cameras.

The video processing unit associated with vision pipeline 4712, for example, may include one or more microprocessors onboard a camera and/or one or more microprocessors remotely located relative to a camera. The camera system may also include at least one smart sensor (e.g., DOA/audio sensors 4715, 4725, or other types of sensors). As defined above, a smart sensor may include a device that receives input from a physical environment and uses built-in or associated computing resources to perform predefined functions or other analysis relative to the received input. Examples of smart sensors include, but are not limited to touchpads, microphones, smartphones, GPS trackers, echolocation sensors, thermometers, humidity sensors, and biometric sensors.

In addition, as shown in FIG. 47, at least one of the cameras of the camera system 4700 may include a directional audio unit or one or more directional audio units may be associated with camera system 4700 as standalone components separate from included cameras. Directional audio units may include a microphone array that may detect audio signals from different locations relative to its position, as described in further detail above. The output of a directional audio unit may be used to distinguish speech received from different meeting participants that are speaking and/or distinguish speech from other sounds, such as traffic, based on a direction of audio associated with the audio signal, e.g. by correlating the direction of audio with the locations of meeting participants, as determined, for example, from analysis of the overview video output stream(s) from the camera(s). Such information can be used supplement visual information determined based on analysis of the overview video streams by the vision pipeline 4712.

In the disclosed camera systems, at least one camera may capture an overview video stream. Based on analysis of available overview video streams, e.g., by vision pipeline 4712 and role assigner 4713, individual meeting participants may be detected/identified, and various characteristics associated with the detected meeting participants may also be automatically determined. Such characteristics may include the locations of the meeting participants, where the participants are looking (e.g., a looking direction), whether the participants are speaking, etc. The camera system, and specifically the role assigner 4713, may use this information to assign roles to each of the detected individuals. In some cases, the assigned roles may be the same for more than one meeting participant. In other cases, the assigned roles may be different for each of the detected meeting participants.

Various types of roles designations may be assigned based on the detected characteristics associated with the meeting participants. Identified individuals may be assigned a meeting participant or a meeting non-participant designation.

Meeting participant designations may be determined based on detected locations (e.g., in a conference room, near a conference table, etc.) associated with individuals represented in an overview video stream; based on detected interactions between individuals; based on facing directions of individuals; etc. A non-meeting participant designation may be assigned, for example, to individuals detected to be located outside a meeting environment (e.g., in a hallway, on an outside of a glass wall or window, etc.).

Individuals assigned a meeting participant designation may be assigned a role designation, or meeting role designation. The role designations relate to the role each individual has in the meeting. Role designations may include: presenter (e.g., an individual detected to be interacting with an object such as a whiteboard, model, or patient; controlling a slide presentation; standing behind or near a podium or lectern; etc.); (non-presenting) contributor (e.g., an individual determined to be engaged in a meeting and contributing to discussion, etc.); or passive participant/non-contributing audience participant (e.g., an individual determined to be a participant that is not actively contributing to a meeting, e.g. that is listening). Each identified/tracked individual, in particular each identified meeting participant, may be assigned a role designation by role assigner 4713. Individuals that are identified as non-participants, e.g. assigned a non-participant designation, may be assigned a role designation of non-participant.

Role assigner 4713 may use a variety of techniques to determine role designations for detected individuals. In some embodiments, assigned role designations may be based on one or more detected characteristics associated with detected individuals/meeting participants. The one or more detected characteristics may include, among other things, whether a participant is speaking (which may be determined from audio signals recorded by one or more microphones or DOA/audio units), a length of time a participant speaks, a percentage of a time duration during which a participant speaks, whether a participant is standing, a looking direction or head pose of a participant, changes in a looking direction of a participant, gestures performed by a participant, observed reactions associated with a participant, a location of a participant (e.g., at the head of a conference table, near a lectern or podium, near a screen, on a stage, in a seat of an auditorium, within a group of people, etc.), whether a participant interacts with an object (e.g., a whiteboard), etc.

In the disclosed embodiments, a video processing unit (e.g., including or implementing role assigner 4713) may include at least one trained network, or other trained AI or machine learning model, configured to output role designations (or information supporting role designation assignments) for identified meeting participants based on an input including one or more captured image frames (e.g., from overview streams 4711, 4721, etc.). In other words, the video processing unit(s) may be configured to assign the roles to the identified meeting participants based on analysis of the overview video output stream(s) by one or more trained models or networks. The one or more trained models may be trained to take as an input one or more overview video output streams and output assigned role designations to one or more individuals featured in the one or more overview video output streams, or output one or more inferences about the individuals from which the video processing unit may assign the roles. For example, the trained model(s) may determine the assigned the role designation for an individual based on one or more determined characteristics associated with the individual and may output the assigned role designation. The one or more trained models may determine the one or more characteristics based on analysis of the overview video output stream(s). For example, the video processing unit may automatically analyze available overview video output streams using one or more machine learning models and/or one or more statistical/mathematical models. The analysis of the overview stream(s) may be achieved by inclusion of one or more hardware accelerated programmable convolutional neural networks, such as a CNN pipeline.

In some cases, role assigner 4713 may include or implement at least one neural network or other trained model that is trained to receive one or more captured images as input and make inferences about individuals represented in the one or more captured images. The inferences may be used to generate outputs from which roles for individuals (or other properties or actions associated with the individuals) may be assigned. The inferences and corresponding outputs from the trained neural networks may include role assignments (e.g., presenter, audience, non-participant, contributor, etc.) or may include information from which role assignments may be determined (e.g., whether a represented individual is located in audience seating, standing near a lectern, interacting with an object associated with presentations, etc.).

The one or more neural networks, or other trained models, that may be included in role assigner 4713 may be trained in various ways. The one or more trained models may be trained by a supervised learning approach using a training set including inputs and correct or known outputs or inferences. The inputs may include a plurality of video frames or a plurality of video segments capturing a meeting environment featuring one or more individuals involved in a meeting. The correct outputs may include correct or known role designations for individuals featured in the inputs or correct or known characteristics associated with individuals featured in the inputs. For example, during a training phase a neural network may be provided with an input including a captured image frame including representations of one or more individuals in known scenarios relative to roles of interest. The neural network responds by generating an output including an inference about the scenario represented by the received image frame. For example, in response to an input including a representation of an individual standing in a location in front of a presentation screen and behind a lectern with a microphone, the neural network may output an inference indicative of whether this individual is a presenter, contributor, audience member, etc. or whether this individual is located in a position or setting consistent with a presenter, a contributor, and audience member etc. If the network generates an output that correctly represents the known situation (e.g., the individual is a presenter, the individual is located in a position consistent with a presenter, etc.), the network is rewarded. On the other hand, if the network generates an output that incorrectly represents the known situation (e.g., the individual is an audience member, the individual is not located in a position consistent with a presenter, etc.), the network is penalized. This process can be iteratively repeated 10's, 100's, 1000's of times or more with different captured images. As a result the performance of the neural network may be refined incrementally such that, as a result of the training process, the trained network may exhibit a performance level (e.g., prediction accuracy) at or above a target level. In general, the performance of the trained network may improve with increases in the number of input examples provided to the network, especially where the input examples represent edge cases where a role identification may be more difficult as compared to other examples.

In addition to training based on single image frames, the neural networks may also be trained based on input that includes two or more captured image frames (e.g., a series of captured image frames, a video snippet or segment, etc.). For example, in some cases, the neural network may be trained to make inferences relative to representations of one or more meeting participants across multiple image frames. Comparing changes of a subject (e.g., a meeting participant or objects) across a series of image frames, especially a series of time ordered images (e.g., images captured at a particular frame rate, such as 24 fps, 30 fps, etc.), may assist in making inferences relative to certain properties of those subjects or objects, actions associated with those subjects or objects, and/or roles associated with certain subjects. For example, a trained network may infer that a particular meeting participant is speaking based on changes in mouth shape or position observed across two or more captured images. Similarly, a trained network may infer that a subject is gesturing (e.g., raising a hand, pointing, waving, moving from sitting to standing, writing on a whiteboard, or positioning hands and arms in a manner supportive of a presentation, etc.) by observing changes in arm orientation, elbow hinge angle, wrist angle, hand orientation, etc. over two or more captured images. In some cases, observing a subject as having closed eyes over a series of captured image frames can help distinguish a sleeping audience member from an active meeting contributor engaged in an eye blink represented over only a single frame or small number of frames. In some cases, observing a subject as having a fixed gaze over a series of captured image frames can help distinguish an inactive meeting participant from an active meeting contributor that varies her gaze direction toward different meeting participants or objects (e.g., a presentation screen or whiteboard) over the series of images. Such motion, gesture, or action inferences can assist a trained neural network in accurately determining a role of a meeting participant.

In another embodiment, a machine learning model may be trained to produce a normalized output that predicts whether a participant is a contributor or not. In other words, the video processing unit(s) may be configured to determine whether each of the identified individuals is a meeting participant based on analysis of the overview video output stream(s) by one or more trained models or networks. This may be done by training on a set, where each participant track is given a set property and set likelihood that the associated individual is a participant or contributor. This model may run in addition to the models in the vision pipeline and predict a participant score.

Similar to the training of a neural network based on single captured image inputs, training of neural networks relative to multi-image inputs may involve providing a plurality of examples to the neural network, where each example represents a known scenario or feature. The neural network is penalized for generating an incorrect output and rewarded for generating a correct output relative to the received multi-image inputs. For example, during training a neural network may be supplied with 100's, 1000's or more captured image streams representative of many different examples of meeting participants engaged in speech and other examples of meeting participants not engaged in speech. These examples may be used to iteratively refine the performance of the trained network (e.g., using rewards and penalties for correct and incorrect outputs) in detecting whether meeting participants are engaged in speech;

whether a meeting participant should be assigned a presenter designation, a contributor designation, etc.; among many other potential analytical tasks for which the neural network (s) may be trained to perform.

Algorithmic-based image analysis techniques may also be employed together with or as an alternative to the trained neural networks. For example, in some cases, a participant may be identified based on how closely they sit to a person that talks during the meeting. This may be measured in x/y overlap of the person bounding box or key points, and/or how close in depth they are to the person who talks. In addition, the system may gather information over time regarding typical positions (in terms of x/y/z coordinates) at which an audience member is expected to sit or a presenter is expected to speak. When a participant assumes one of these positions, the data collected for this position may be used to assist in role assignment relative to this participant. If a person is sitting in or close to a known participant position it may be more likely they are a participant or contributor. Other factors may include how much a person has talked during a meeting, and where they have been looking. The more the person has looked at a screen or at another participant or in the camera the more likely it is that the person is participating in the conversation. Each of the previously mentioned properties may be weighted differently and will contribute to the overall likelihood that this person is a participant of the conversation.

Generally speaking, the video processing unit(s) may be configured to assign a role designation to each meeting participant based on one or more characteristics associated with the meeting participant determined based on analysis of the overview video output stream(s) captured by the camera (s) of the system.

Using any of the techniques described above, each individual represented in one or more captured image frames may be assigned a role designation. Such role designations may be assigned at a rate equal to an image capture frame rate (e.g., 24 fps, 30 fps, etc.) or may be evaluated and assigned at another suitable rate. For example, in some cases, role designations may be periodically evaluated, assigned, and/or updated at a rate slower than an image frame capture rate. Such role designations may be periodically assigned/updated, for example, at a rate of once per 0.5 seconds, once every second, once every five seconds, once every ten seconds, etc.

Thus, at a suitable periodicity individuals represented in captured image frames may be assigned corresponding role designations, such as presenter, (non-presenting) contributor, (non-contributing) audience/participant, etc. Thus, in addition to detecting the likelihood of whether a person is participating, the system may also detect if a person is a presenter or not, whether a participant is an audience member, whether a person is contributing to a meeting, but not presenting, etc. This can be done by using an AI (e.g., a trained model) and/or a mathematical model that keeps track of each represented person over time, and determines how much that person is talking, sitting or standing, and looking, among other potential characteristics/actions/etc. For instance, a person that talks for a longer period of time without interruption, and is looking at a screen and/or a "passive" participant, and is standing is more likely to be a presenter. Each of the properties may be weighted differently to enhance a accuracy at which the system is able to identify individuals in different roles. The disclosed system can also change the weighting over time to best identify a presenter or other roles. For instance, if over time the system recognizes that a presenter is spending more time in a specific position (for instance a presenter desk) the x,y,z position of the person track may be weighted higher than other factors or characteristics in making a role prediction/assignment.

A contributor role may be assigned to a person that intermittently contributes to the conversation, but not enough to be assigned as a presenter.

If a person is assigned as an active presenter during the meeting, others can be assigned as contributors, depending on how long and how frequently they have been talking they are more likely to be a contributor. The contributor role may be important as people that choose to contribute to a conversation in a group are more likely to follow up and be active in the conversation as it progresses. This information can be used by the system to be ready to frame or feature contributors as the conversation in the meeting progresses. For example, a non-presenting contributor may be featured in a primary video output stream that is displayed in a tile that is smaller than a tile used to display a primary video output stream featuring a presenter. That way, if and when the contributor begins to speak, they are already featured in the primary video output streams. A system can use an AI model or a mathematical model to identify that a person is contributing to the meeting with words without speaking enough to constitute the person being the presenter in the meeting.

In addition, the system may detect and define participants that constitute an Audience role. The audience role may be assigned to people in the meeting that have not offered any contributions to the conversation within a preceding period of time. They may be regarded as observers to the conversation and the system will treat these people as audience members, or non-contributing participants. A system can use AI models and/or mathematical models to detect people in the room that have not offered any contributions to the conversation within a preceding time period.

It should be noted that the roles of presenter, contributor, and audience are exemplary only. Other role designations may be defined and used to characterize meeting participants depending on the requirements of a particular system. In such cases, trained neural networks and/or mathematical algorithmic models may be used to identify and assign such other role types to individuals represented in one or more captured image frames. It should also be noted that role designations assigned to a plurality of individuals represented in one or more captured image frames may be the same or different. For example, all represented individuals may be assigned a common role designation, all represented individuals may be assigned different role designations, or some represented individuals may be assigned a common role designation while other individuals are assigned different role designations.

A framing selection hierarchy may be determined based on assigned roles. Such a framing selection may be used by the video processing unit to determine which meeting participants to feature on a display and/or how to display meeting participants relative to one another and/or how the meeting participants should be framed in the video stream(s) output by the video processing unit for display. For example, a participant assigned a presenter role designation may be featured on a display (or in a primary video stream output by the system) in a more prominent position (or in a larger frame or tile) than an individual assigned an audience role or a contributor role. A meeting participant assigned a higher framing priority score may, for example, be featured in a primary video stream that is displayed in a display tile having a larger size (e.g. area) than a display tile in which a primary video stream featuring a meeting participant having a relatively lower framing priority score is displayed.

Additionally or alternatively, the frame hierarchy may be used to determine a length of time that certain individuals are featured on a display (or in a primary video stream output by the system) relative to other participants. For example, a presenter may be featured on a display or in an output video stream for longer periods of time as compared to individuals designated with contributor or audience roles. In generally, the video processing unit may output a primary video stream including a framed representation of a first meeting participant during a first period of time (which may be continuous or discontinuous) and a primary video stream including a framed representation of a second meeting participant during a second period of time (which, again, may be continuous or discontinuous). The relative durations of the first and second periods of time may be based on the relative framing priorities associated with the first two meeting participants. More specifically, meeting participants that are associated with a higher relative framing priority may be shown for longer durations of time than those associated with relatively lower framing priorities. This may provide remote meeting participants with a balanced view of the meeting environment that conveys the most pertinent information regarding the physical meeting environment, namely focusing on those individuals that are most actively engaged in the meeting or most likely to contribute to the meeting.

Based on the designation of roles to the various meeting participants represented in an overview video stream, the camera system may assign a framing priority to each participant. In the present disclosure, priorities may reflect the importance of featuring a given meeting participant represented in the overview video stream and of how likely a participant is to make a contribution to the meeting. Therefore, the participant roles may be used by the video processing unit in the vision pipeline to make video framing and/or video formatting decisions. Such decisions may be based on relative priorities associated with the role designations (discussed in further detail below). On the basis of framing and formatting decisions, the video processing unit may generate, as an output of the camera system, one or more primary video streams including framed representations of one or more meeting participants.

In some embodiments, a presenter role designation may be assigned or associated with a higher priority score than a contributor role designation. The contributor role designation may, in turn, be assigned or associated with a higher priority score than an audience role designation. The audience role designation may, in turn, be assigned or associated with a higher priority score than a non-participant role designation. In situations where two or more individuals are identified and assigned role designations, the video processing unit may be configured to output a primary video stream featuring an individual with a higher priority in preference to a primary video stream featuring an individual with a lower priority (relative to the higher priority), or may feature in one or more primary video output streams an individual with a higher priority for a longer duration than an individual with a lower priority. In this way, the system presents users with primary video stream outputs that preferentially feature the most relevant meeting participants and those meeting participants that are most likely to contribute to the meeting.

In some embodiments, the camera system may determine or infer one or more detected characteristics associated with individuals represented in an overview video stream. Such characteristics may include, among other things, whether a participant is speaking, a length of time a participant speaks, a percentage of a time duration during which a participant speaks, whether a participant is standing, a looking direction of a participant, or changes in a looking direction of a participant, or gestures performed by a participant. The assignment of these additional characteristics may allow for improved and dynamic characterization of individual roles of each of the meeting participants. These characteristics may also be used to influence video framing decisions, especially in cases where two or more participants are assigned the same role designation.

In addition to assigning roles to the people in a meeting, the disclosed systems can detect and assign properties and/or actions to these people as well. For example, properties can be detected or determined using AI (trained networks or models, trained according to the techniques described above) and/or mathematical models and may be assigned to people in the meeting. Such properties can be used to represent the detected or inferred demeanor of individuals in the meeting. Understanding people's demeanor in a meeting may help the camera system to prioritize shots and to make framing decisions relative to individuals engaged in a meeting. Examples of relevant properties for the system may include a demeanor, behavior or manner, such as (among others): focused, humorous, serious, casual, energetic, calm, engaged, disengaged, listening, questioning, surprised. Other relevant properties include a presentational property, such as a type of dress. Examples of types of dress include wearing uniform (e.g. doctor's uniform or judge's clothing), smartly dressed, casually dressed, etc. The disclosed camera systems may take the knowledge about these properties into consideration when deciding where to put emphasis in a meeting scenario by maintaining a running list of priorities of people in the system using people's assigned roles and properties. For example, based on analysis of an overview video stream, the described video processing unit/role assigner may assign role designations to each of the meeting participants and additionally may designate at least one observed property to each meeting participant, such as but not limited to a demeanor, such as serious, humorous, questioning, listening, disengaged, or any other properties described above.

The assignment of observed properties to each meeting participant may be used in conjunction with role designations for more comprehensive priority designation in making framing decisions. For example, the observed property assignments for each of the participants may be passed on to the video processing unit. This property assignment information may be used to make framing decisions between two or more meeting participants based on relative priorities associated with the assigned observed properties.

The combination of designated role and observed properties may allow for an allocation of more accurate or meaningful priority score. Such a combination can also help break framing priority ties between two or more individuals having the same role designations. For example, if two audience members do not contribute verbally to a meeting, but one of them is recognized as "listening", this participant will be assigned a higher priority over another participant that is labelled as "disengaged".

FIG. 48 includes several tables representative of examples of how the presently disclosed system may generate relative priorities among meeting participants upon which framing decisions may be made. For example, Tables #1 and #2 in FIG. 48 depict how the system can generate framing priorities based on knowledge about people's roles and properties in a meeting. For the scenario described in Table #1, there is one presenter (person #1) that will get the most focus from the system (priority=1). However, there are also two people (person #2 and person #3) designated as contributors. The system may stand ready to feature either of these individuals, for example, upon detecting that they are contributing to the conversation. Notably, person #2 has been assigned a property of "humorous" and person #3 has been assigned a property of "questioning." In this case, the humorous and questioning properties may have the same weight or value relative to framing priority, such that both person #2 and person #3 receive a framing priority of 2. As a result, neither has framing priority over the other, and either may be featured based on detection of conversation contributions, for example.

There are also two people (person #4 and person #5) designated by the system as audience members. The system may give framing focus to the listening audience member (person #3), for example, if there is a pause in the conversation or if there has been a longer period of time where focus has not changed. As person #5 has been assigned a property of "disengaged," person #5 is unlikely to be given framing focus, as person #5 has the lowest framing priority and has been designated with a detected property consistent with not actively engaging in the meeting.

Table #2 of FIG. 48 provides another example of framing priority determinations based on role and property designation for meeting participants. In this example, person #1 has been designated as a presenter, and person #2 has been designated as a contributor. Based on role designations alone, person #1, as a presenter, would ordinarily have a framing priority higher than person #2. In this case, however, person #1 is further characterized by a detected property of "serious," while person #2 is further characterized by a detected property of "humorous." In this example, a humorous designation may be weighted over a serious designation by an amount sufficient to overcome or eliminate the framing priority of the presenter role of person #1 over the contributor role of person #2. As a result, person #1 and person #2, despite having different role designations, have the same framing priority. In some cases, such framing priority equivalence may result in relatively equal framing emphasis for person #1 and person #2 in the output video (primary video stream). Further, while there are two individuals assigned a role designation of contributor (i.e., person #2 and person #3), person #2 receives a higher framing priority than person #3 based the "humorous" property designation of person #2, which the system emphasizes more heavily than the "questioning" property designation of person #3 in determining framing priority. There are also two people (person #4 and person #5) that have received a role designation of audience. Person #4 has been further characterized with the "listening" property, and person #5 has been further characterized with the "disengaged" property. As a result, and because the listening property may be weighted more heavily than the disengaged property, person #4 has received a framing priority higher than person #5.

In addition to roles and properties, actions undertaken or performed by meeting participants may also be used to determine framing priorities. For example, in some embodiments, the video processing unit of the disclosed camera systems may be configured to assign an observed action or posture to each of the meeting participants represented in an analyzed overview video stream, based on analysis of an overview video stream. The actions observed by the system may include standing, writing, sitting, laughing, applauding, pointing, raising a hand, writing on a whiteboard, interacting with a whiteboard or presentation screen, gesturing consistent with presentation movements, sleeping, writing, applauding, etc.

The identification of participant actions may be used for determining relative priorities among meeting participants. The information about the observed actions of participants may be used to make framing decisions relative to detected meeting participants.

Detected action designations may be used to break framing priority ties between two individuals having the same role designations and/or between two individuals whose combination of role and property designations results in the same framing priority level. For example, in a situation where two audience members are actively listening to the presenter, the priorities associated with their roles of "Audience" and detected property "Listening" are identical. Thus, these two audience members may be assigned the same framing priority. However, in the event one of the two participants is detected as pointing towards a whiteboard, this detected action may result in the pointing and listening audience member receiving a higher framing priority than the other audience member that is just sitting and listening.

Tables #3 and #4 of FIG. 48 provide examples of how the disclosed systems can determine framing priorities based on role and property assignments together with detected actions attributed to meeting participants. The property and action assignments may be termed attribute designations. In Table #3 there is a presenter (person #1) that has been associated with a property of "serious" and has been detected to be engaged in the activity of "standing." Based on this combination of role, property, and action, person #1 has received the highest framing priority. Next, two people (person #2 and person #3) are both assigned the role designation of contributor. Person #2 has been associated with the property, "humorous," while person #3 has been associated with the property, "questioning." As seen in the example of Table #2, based on these roles and properties alone, person #2 would be assigned a higher frame priority than person #3. In this example, however, person #2 has been detected as engaging in a sitting action, while person #3 is engaged in a hand raised action. Because a hand raised action may indicate a higher level of participation, as compared to sitting, in this example, person #3 has received a higher frame priority than person #2. And, as in the example of Table #2, in this case, out of the two audience members (person #4 and person #5), the person showing signs of active listening is be prioritized over the person appearing to be disengaged when making framing decisions.

The example represented by Table #4 indicates how framing priorities may change periodically based on detected changes in the meeting environment. For example, in the example of Table #4, the five meeting participants are assigned roles and properties identical to the five people of the Table #3 example. In this case, however, person #4 has been detected as engaged in the action of applauding. The applauding action is recognized by the system as a particular active action suggesting high engagement with the presentation being conducted by person #1. Thus, in this case, the detected applauding action leads to a temporary increase in framing priority assigned to person #4. Indeed, in this example, person #4 has received a framing priority equivalent to the framing priority assigned to the presenter (person #1). As a result, person #4 may be featured in the framed output video stream in a manner similar to person #1. For example, person #1 and person #4 may be framed together (e.g., in a gallery view with similarly sized frames, etc.) included in the primary video output or may be individually framed in the video output stream for substantially equal amounts of time over a certain time duration. In some cases, person #4 may be featured in the primary video output stream while applauding, and when the applauding action is detected to cease, the presenter (person #1) may again be featured in the primary video output stream rather than person #4 (or other meeting participants).

In one example, there is a meeting in a room with six people, where three people are detected as engaged in a discussion, while the other three are detected as listening to the conversation, while one of those people is exhibiting signs of being bored. The roles and participant system may assign the three speaking participants a higher framing priority based on their roles as active participants (e.g., contributor roles, speaking action, etc.). The system may adapt to feature most prominently in the output stream the person detected to be the most active speaker (e.g., most animated, speaking for highest percentage of time over a particular time duration, etc.). Next, the two other speaking participants may be featured in the output stream for similar amounts of time, in similarly sized frames in a gallery view, etc. It should be noted that the three speaking participants may each become listeners while others are speaking. Their priority level may not fall to the level of the three people detected to be solely listening to others, however, based on a detection that each has spoken recently or is engaged in back and forth conversation. The three people detected to be solely listening may be featured in the primary video stream output less than any of the contributors detected to be engaged in conversation. Among this group of listeners, however, the person determined to be exhibiting signs of boredom (e.g., distant, unchanging, gaze direction, slouched posture, etc.) may be featured less than the two other listeners or may be omitted from the primary video output stream entirely. If any of the listeners is determined to show signs of wanting to say something (e.g., sitting up in a chair, raising a hand, beginning to speak but pausing, etc.), those listeners may be given a higher framing priority—in some cases as high or higher than the speaking contributors. This may result in the person waiting to speak being featured in a listener shot while waiting to speak and then in a speaker shot once speaking has commenced.

The output of the disclosed systems may include a primary video output to be shown on a display. In other words, the primary video output stream(s) generated by the video processing unit(s) may be output by the video processing unit for display. The display may be a display used by a remote meeting participant to participate in a video conference performed using a video conference/camera system as disclosed herein. For example, the display may be a display of a user device (e.g. laptop, desktop computer, smartphone, tablet etc.). In other cases, the output of the system may be limited to the framed primary video output stream(s) that one or more meeting platforms (e.g., MS Teams, Zoom, etc.) may receive and use in constructing videoconference video streams.

The meeting participants that are selected for inclusion in the one or more primary video stream outputs may be featured in any of the formats or shot types described above. For example, meeting participants may be featured in a speaker shot, group shot, listener shot, over-the-shoulder shot, or reaction shot. More generally, the primary video streams output by the system may, in addition to featuring the selected framed representations of the meeting participants that are selected based on the relative framing priorities, feature framed representations of one or more other meeting participants, for example in a group shot. In other words, each of the primary video streams may feature a framed representation of a selected meeting participant and one or more additional meeting participants.

As previously noted, framing priorities for detected meeting participants may be assigned or updated at any suitable rate or periodicity. The roles, properties, and actions of meeting participants can change rapidly. In turn, assigned framing priorities may also be changed rapidly. In some cases, the rate at which framing priorities are updated may be user selected to provide a desired experience type. For example, a high framing priority update rate (e.g., greater than once every five seconds or greater than once every second) may be especially suitable for energetic meetings with many active participants. On the other hand, slower framing priority update rates may provide a less frantic or energetic user experience. For example, a speaker shot may be shown for a duration of about 7-10 seconds, and a listener shot may be shown for a duration of about 1-3 seconds, and framing priority update rates may therefore be commensurate with these framing timescales, e.g. updating about every 5-10 seconds.

The designations of participant's roles, properties and actions during a meeting are considered temporary. For example, all participants in a meeting are considered audience members until they have spoken and/or been promoted to contributor or presenter. A person recognized as a presenter in a meeting can be demoted to contributor or audience if the frequency of which the person is speaking is reduced (e.g., drops below a predetermined rate) or if the person goes silent for a significant time period (e.g., greater than 10 seconds, 30 seconds, one minute, etc.). Using these dynamic roles the system is able to keep track of the dynamics of conversation and natural flow of the meeting providing relevant focus from the cameras. And the resulting framing priorities and framing decisions provide a natural and engaging experience for users.

The roles assigned to each of the detected meeting participants based on analysis of the overview video output stream may remain fixed over the course a meeting or, more likely, may change (sometimes rapidly) over the course of the meeting. If a meeting participant is detected as a passive audience member and continues to remain passive, their role assignment will remain unchanged. However, by offering a contribution to the meeting, such participant may be promoted to the role of a contributor or even presenter. By reverting to a passive listener, the assigned role of the meeting participant may be reverted back to an audience member.

Similarly, the observed property or detected actions associated with each meeting participant may remain constant or may change during a meeting. For example, an observed property assigned to a participant may change from "listening" to "disengaged", when a participant exhibiting signs of attentive listener loses concentration during a meeting. An action of standing may change to sitting, an action of raising a hand may change to listening, etc. Indeed, it may be a common occurrence for a meeting participant to signal an intention to ask a question by raising their hand, Thus, the action assigned to this meeting participant may be changed from sitting or listening to raising a hand. A usual course of action following the acknowledgment of the question is for the participant to lower their hand, reverting to the previous action or perhaps transitioning into a different one.

As noted above, framing priorities may be determined for each detected meeting participant, and those framing priorities may be used in determining a framing scheme for generating one or more primary video stream outputs, for example which meeting participant(s) to feature in an output video stream and how to present the meeting participant(s) in the output video stream (e.g., time durations, gallery view, frame sizes, number of participants to include together in the output video, types of shots (over the shoulder, side, face, etc.) used to feature different participants, etc.). As described, the assigned framing priorities may be based on combinations of assigned roles, properties, actions, or any other suitable detectable characteristic of the meeting participants. For example, a framing priority may be determined for each individual based on the priority or priority scores associated with the role/property/action assigned to the individual. For example, the overall framing priority for an individual may be, or may be based on, an aggregation of the priorities associated with the assigned role/property/action for that individual. Alternatively, the overall framing priority may take the value of the highest of the priorities associated with the assigned role/property/action for that individual.

In some embodiments, designation of at least one of role, property or action, may contribute to prediction of the next camera stream and/or framed representation selection. When these properties and roles are detected by the system they are sent to the virtual director unit (e.g., implemented by the video processing unit). The determined and assigned roles may be used to adapt the framing and ruleset the virtual director unit uses, and may be used by the video processing unit to predict which participant will speak next or within a subsequent time period, and to prepare to show a primary video stream featuring a framed representation of the participant that is predicted to speak next or within a subsequent time period.

For example, the system may predict or anticipate which of the individuals in the meeting environment are likely to speak imminently, for example next, or within a subsequent or predetermined time period. This may involve determining which individuals have something they want to say, which can be based on one or more attributes determined from analysis of the overview video stream(s) and/or audio signals. The attributes may be indicative of imminent speech, and may, for example, include a time since the meeting participant last spoke, a frequency with which the meeting participant speaks, a turn of the head (e.g. to face the direction of a current speaker), a gesture or action (e.g. a raised hand), a facial expression, a change of facial expression, a nod, a gaze direction (e.g. if the participant is looking in the direction of an active speaker and for how long), audio cues such as a non-verbal sound (e.g. a "hmmm" sound), and a drawing of breath. Two or more of these attributes may be weighted and optimized to best give a prediction how likely it is that the person will imminently become a speaker, e.g. within the next few seconds or a predetermined period, or will become the next speaker.

The assigned roles also represent a powerful tool for predicting which meeting participants are likely to start speaking. This is because individuals with different roles generally contribute to a meeting in different patterns, for example at different frequencies or for different durations. For example, a presenter is typically most likely to speak, followed by contributors, and lastly non-participating audience. Table 5 illustrates an example scenario in which individuals with different assigned roles are assigned different likelihoods of speaking next in the meeting, with a lower the likelihood value associated with a higher probability of speaking next (i.e. 1 is the higher likelihood and 3 the lowest likelihood).

TABLE 5

| Person ID | Role | Likelihood to speak next |
|---|---|---|
| Person #1 | Presenter | 1 |
| Person #2 | Presenter | 1 |
| Person #3 | Contributor | 2 |
| Person #4 | Audience | 3 |
| Person #5 | Audience | 3 |

Additionally, or alternatively, the system may analyze the overview video output streams and/or audio signals output by one or more audio devices to infer how the conversation develops between the meeting participants. In particular, the system may determine, based on analysis of the video streams and/or audio signals, one or more quantities or variables characterizing the dynamics of the conversation between the meeting participants. In other words, the system may characterize the conversational dynamics between the meeting participants in terms of one or more determined quantities. The quantities may be values, vectors, or other observables or variables that characterize the conversational dynamics. The quantities may, for example, relate to or characterize which participants have spoken during the meeting, who each participant has spoken to, the duration and/or frequency with which each participant speaks, and/or an expected period between speaking episodes for each meeting participant.

In some embodiments, the conversational dynamics may be expressed as a number of vectors, each having a magnitude and a direction. Each vector may characterize a speaking episode during which one of the meeting participant speaks and/or the transition between one meeting participant speaking to the next meeting participant speaking. In such embodiments, the length or magnitude of the vector can represent the duration of a spoken contribution from one of the meeting participants, or the duration of a speaking episode in which one of the meeting participants speaks, and the direction of the vector can represent who the next speaker is, or to whom or where the spoken contribution is directed. Ascertaining these vectors and analyzing them throughout a meeting provides the system with an indication of how the conversation is developing and can be used to calculate the likelihood that a non-speaking meeting participant will speak next or become the next speaker, and how long each meeting participant will speak for during a speaking episode before the next speaker begins to speak.

Figure 50A:
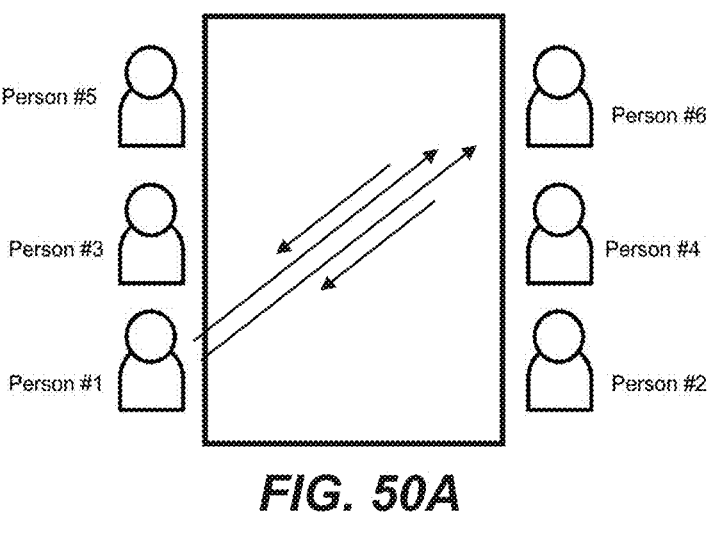
FIGS. 50A, 50B and 50C illustrate the use of vectors to predict which meeting participant will speak next.

FIG. 50A illustrates how a system in accordance with the present disclosure may ascertain how a conversation is developing between person #1 and person #6, who are both meeting participants. The arrows represent vectors expressing how long each person speaks for and who the next speaker is. In other words, each vector characterizes a spoken contribution or speaking episode made by the meeting participant from where the vector originates in terms of the duration of the spoken contribution and where it is directed, in this case in terms of who the next speaker is.

In this example, Person #1 speaks the most and the next speaker is Person #6. Person #6 does not speak for as long as Person #1, as expressed by the relative lengths of the vectors originating from Person #1 and Person #6. The system uses the information on the conversational dynamics conveyed by the vectors to predict that the next person to speak after Person #1 has spoken will most likely be Person #6. It also gives an indication that Person #1 speaks for longer periods than Person #6. As the conversation evolves the system will capture more vectors and adjust the likelihood or probability that each of the meeting participants will be the next speaker.

Figure 50B:
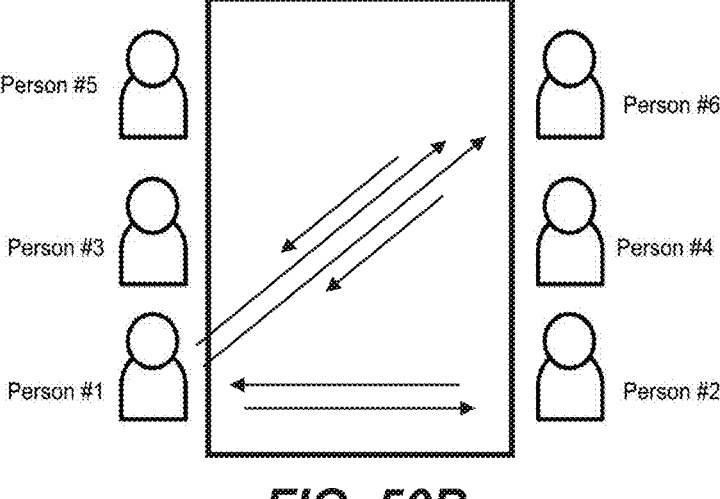

FIG. 50B illustrates how the conversation may evolve to include another meeting participant. In this case, the conversation has evolved to include Person #2, and it can be appreciated from the relative lengths of the vectors that Person #2 speaks for longer than Person #6 but for shorter than Person #1. With this information the system may develop a sense of the dynamics in the conversation and is therefore able to anticipate who the next speaker will be.

Figure 50C:
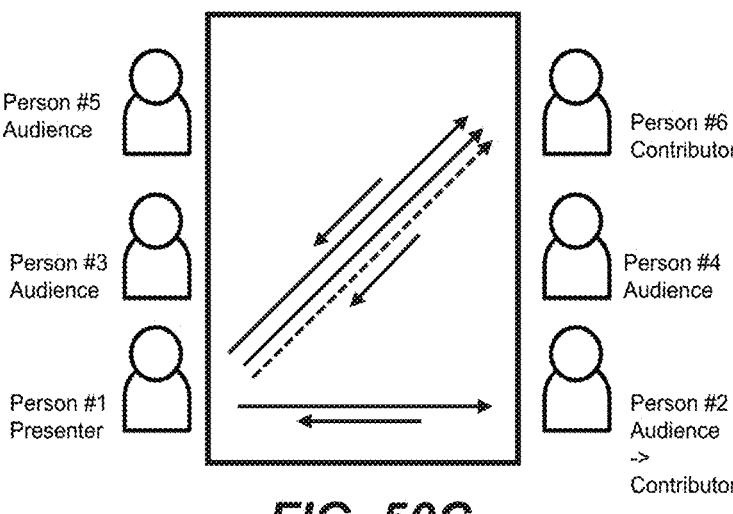

FIG. 50C illustrates a situation in which the system fails to correctly predict the next speaker. Such a situation is regarded by the system as an exception. In the case of an exception the system will ignore the prediction of the next speaker and will add the actual observed transition between speakers to the list of vectors. If the new speaker was previously considered to have a non-contributing role designation, such as an audience role designation, this person will now be considered to have a contributing role designation, such as contributor.

As illustrated in FIG. 50C, Person #1 (the presenter) has been receiving spoken contributions, e.g. comments or questions, from person #6 (a contributor). On this basis, the system makes the prediction that the next contribution will come from person #6, as indicated by the dashed vector. However, in this case Person #2 speaks next, as indicated by the vectors between Person #1 and Person #2. The system registers this as an exception and gives focus to Person #2, and also updates the role designation assigned to Person #2 from Audience to Contributor. The system then takes this new role designation for Person #2 into consideration for future predictions.

Using any or all of the above-described information (the assigned roles, the determined attributes, and/or the quantities characterizing the conversational dynamics), the system may determine, for each non-speaking meeting participant, a likelihood or probability that the meeting participant will begin to speak imminently, e.g. may become the next speaker/speak next, or will being to speak within a predetermined or subsequent time period. The determined likelihood may be expressed as a likeliness score or a probability score, and may be representative of the likelihood that the meeting participant will begin to speak imminently/next. The likelihood may be expressed in terms of an absolute probability, or may be expressed as a score or value that represents a relative likelihood or probability. For example, each meeting participant may be assigned a probability or likeliness score on a scale of 1 to 3, where 1 is the highest likelihood and 3 is the lowest likelihood. In some embodiments, such as in the example illustrated in Table 5, meeting participants assigned a presenter role designation may be assigned a higher likelihood than those assigned a contributor role designation, which in turn may be assigned a higher likelihood than those assigned an audience role designation.

The video processing unit(s) may also predict, for example based on one or more quantities characterizing the conversational dynamics between the meeting participants, how long a currently speaking meeting participant is likely to speak for. For example, the video processing unit may determine one or more durations of previous speaking episode(s) made by/expressed by/originating from a speaking meeting participant, for example based on analysis of video output from the camera(s). The video processing unit may then predict, based on the one or more determined durations of previous speaking episodes, an expected or predicted speaking episode duration for that meeting participant. Such quantities may be expressed as one or more vectors, as described above. The video processing unit may use this information to make decisions about when to generate and output for display various different output video streams, such as listener shots, group shots, overview shots, etc., or when to prepare for outputting for display a shot of another meeting participant, as described in further detail below. By taking the expected speaking durations into account, the video processing unit can reduce the likelihood of displaying a disjointed video experience in which different shots are displayed at inappropriate times.

Prior to calculating the likelihood scores, the video processing unit may determine which meeting participants are speaking and which are not speaking, for example as described above in more detail (e.g. based on analysis of the video output streams from one or more of the cameras and/or audio signals). The video processing unit may then determine likeliness scores for the non-speaking meeting participants, as it is the non-speaking meeting participants that may speak next or may begin speaking.

The system may use the determined likelihood scores in various ways. In some embodiments, the system uses the likelihood scores to anticipate which meeting participant(s) are most likely to speak next, and to prepare the video processing unit to switch to focus on the next speaker when they begin to speak, thus reducing lag in the response time of the system to a change in speaker. For example, the video processing unit may perform one or more actions to prepare the video processing unit to output for display a primary video stream featuring a framed representation of a meeting participant that is deemed likely to become the next speaker. In particular, the video processing unit may perform one or more actions to prepare the video processing unit to output a primary video stream featuring a framed representation of a meeting participant that is associated with a likelihood that meets one or more likeliness conditions. The likeliness condition(s) may include a likeliness or probability threshold, which may be predetermined or dynamic. The likeliness condition(s) may include that the meeting participant is determined to be the most likely to be the next speaker of all the meeting participants. In other words, that the likelihood associated with that meeting participant is the highest amongst all the meeting participants' likelihood scores.

The one or more actions performed by the video processing unit to prepare itself for outputting the primary video stream featuring the framed representation of the selected meeting participant that meets the likeliness condition may include pre-selecting the framed representation of the selected meeting participant. In other words, the video processing unit may pre-select a framing scheme for the primary video stream, or may determine or select framing for the framed representation of the selected meeting participant. In multi-camera systems, this may include selecting which camera overview video output stream to generate the framed representation from/from which camera overview video output stream the framed representation is to be derived from. This may involve selecting the "best shot" or "preferred shot" for the selected meeting participant based on one or more framing criteria, as described previously. Alternatively, the video processing unit may pre-generate the primary video stream featuring the framed representation of the first meeting participant, but not output the pre-generated primary video stream. The video processing unit may be configured to determine whether the selected meeting participant begins to speak, for example based on analysis of the overview video output stream(s). In response to making a determination that the selected meeting participant does begin to speak, the video processing unit may output for display the primary video stream featuring the framed representation of the first meeting participant.

In some embodiments, the video processing unit may generate and output a group shot video stream featuring a meeting participant who is determined to be a speaker together with one or more meeting participants who are determined to be likely to speak next or soon. For example, the video processing unit may analyze the overview video output stream(s) to identify a speaking meeting participant amongst the identified meeting participants and a plurality of non-speaking meeting participants. The video processing unit may assign a respective role designation to each of the identified non-speaking meeting participants (e.g. contributor, audience), and may select one or more of the non-speaking meeting participants for inclusion in the group shot together with the speaker based. The non-speaking meeting participants may be selected for inclusion in the group shot on the basis of the assigned roles, which, as explained above, indicate relative likelihoods of the meeting participants speaking next. In some embodiments, the video processing unit may determine, for each of the non-speaking meeting participants, a respective likelihood that the non-speaking meeting participant will begin to speak based on the respective role designation assigned to the non-speaking meeting participant, as described previously. In such cases, selection of the one or more non-speaking meeting participants for inclusion in the group shot may be based on the determined likelihoods. The likelihoods may also be determined based on any of the other factors discussed above, such as the conversational dynamics and/or other attributes. The video processing unit may select one or more non-speaking meeting participants that meet one or more likeliness conditions, as described above, for inclusion in the group shot. The likeliness condition(s) may include that the meeting participant is determined to be the most likely to be the next speaker of all the meeting participants. In other words, that the likelihood associated with that meeting participant is the highest amongst all the meeting participants' likelihood scores. Generation of group shots in this way allows the camera system to focus on "hot zones" within the meeting environment where most of the conversational activity takes place, and avoids the need for the system to rapidly switch between shots when different participants begin to speak, thus reducing the computational burden associated with pre-configuring individual video streams for each of the meeting participants that are deemed likely to speak next.

In some embodiments, the video processing unit may generate and output for display at least one listener shot video stream, as described above, featuring one or more meeting participants who are determined to be likely to speak next or soon. For example, the video processing unit may analyze the overview video output stream(s) to identify a plurality of non-speaking meeting participants. The video processing unit may assign a respective role designation to each of the identified non-speaking meeting participants, and may select one or more of the non-speaking meeting participants for inclusion in the listener shot. The non-speaking meeting participants may be selected for inclusion in the listener shot on the basis of the assigned roles, which, as explained above, indicate relative likelihoods of the meeting participants speaking next. In some embodiments, the video processing unit may determine, for each of the non-speaking meeting participants, a respective likelihood that the non-speaking meeting participant will begin to speak based on the respective role designation assigned to the non-speaking meeting participant, as described previously. In such cases, selection of the one or more non-speaking meeting participants for inclusion in the listener shot may be based on the determined likelihoods. The likelihoods may also be determined based on any of the other factors discussed above, such as the conversational dynamics and/or other attributes. The video processing unit may select one or more non-speaking meeting participants that meet one or more likeliness conditions, as described above, for inclusion in the listener shot. The likeliness condition(s) may include that the meeting participant is determined to be the most likely to be the next speaker of all the meeting participants. In other words, that the likelihood associated with that meeting participant is the highest amongst all the meeting participants' likelihood scores. As described above, listener shots may be displayed either simultaneously with one or more speaker shots, or alternately with speaker shots. Generation of speaker shots in this way allows the camera system to focus on those meeting participants who are most likely to actively contribute to the meeting, thereby displaying the most relevant participants to remote participants.

The likeliness or likeliness score(s) may be determined using one or more trained models, such as a neural network. The trained model(s) may accept as an input one or more video frames from the overview video output stream(s) and optionally one or more of the determined characteristics or quantities/variables described above, such as assigned roles/attributes or variables/quantities characterizing the conversational dynamics. The trained model(s) may the output, for each meeting participant, a likelihood score indicating the likelihood or probability that that meeting participant will begin to speak. The trained model may be trained using supervised learning using input/output pairs. The inputs may be one or more video frames featuring one or more meeting participants, and the outputs may be known outcomes, in particular which of the meeting participants speaks next.

The video processing unit may provide to the virtual director unit the next/imminent-speaker likelihood scores and/or the expected speaking durations of speaking meeting participants, as described above, so that the virtual director unit can make informed decisions about which shot types to output at which times. In other words, the virtual director unit may determine which shot types to output and when based on the likelihood scores and/or the expected speaking durations. In some embodiments, the video processing unit may provide to the virtual director unit a list of the next-speaker likelihood scores and an expected speaking duration for the current speaker, and the virtual director may take this list into account when selecting which persons to display to the far end participants and in which framing formats (e.g. speaker shot, listener shot, group shot, overview shot, reaction shot, over-the-shoulder shot).

In embodiments consistent with the disclosure, the video processing unit may be configured to receive a user input specifying a user-assigned role designation for a selected individual featured in the overview video stream, for example an identified meeting participant. The user input also specifies a user-assigned priority or priority score associated with the user-assigned role designation for the selected individual. In such situations, the video processing unit may assign the user-assigned role designation to the selected individual rather than determining the role designation for that individual based on one or more characteristics associated with the individual. In other words, the user-assigned role designation may override the usual role determination process. Accordingly, the video processing unit may assign the associated user-assigned framing priority to the selected individual and use the user-assigned priority to determine the relative framing priorities/framing hierarchy associated with the individuals featured in the overview video stream.

In some embodiments, the user input may specify a user-assigned priority or priority score for a selected individual without specifying a particular user-assigned role. In such cases the step of assigning a role to the selected individual may be omitted, or the video processing unit may assign a generic "user assigned" role designation to the selected individual. The user-assigned priority may be set or defined so that the selected individual is always featured in a primary video stream output by the video processing unit. Alternatively, the user-assigned priority may be set or defined so that the selected individual is never featured in the primary video streams output by the video processing unit. The ability for a user to manually assign a priority or a role to one or more selected individuals featured in the overview video stream may be particularly useful in situations where it is important that a particular individual is featured/not featured due to the role they have in the meeting. The user defined role allows the system to be instructed on how to react according to specific vertical scenarios in which one or more individuals have a predetermined or intrinsic importance within the meeting. Examples of vertical scenarios include legal, remote learning, and medical. In these examples there are established roles such as judge, professor and doctor, who have an important role and should therefore always be shown. Conversely, it may be important that individuals with other roles, such as witness, defendant or patient, are not featured in the primary video stream(s) output by the video processing unit. The user defined role allows users to create an understanding in the system for such specific scenarios, thus providing the system with the functionality required to ensure that the most relevant people within the meeting are featured, thus conveying crucial physical information from the meeting environment to remote meeting participants. Non-limiting examples of user-assigned roles include CEO (Chief Executive Officer), judge, doctor, professor, teacher, student, lecturer, patient, witness, defendant, etc.

Tables #6 and #7 of FIG. 49 provide examples of how the disclosed systems can determine framing priorities based on user-assigned roles and associated user-assigned priorities. In the scenario represented by Table #6 person #2 is assigned a user-assigned role having an associated priority of 1 (the highest priority in this example). Person #1 is assigned the role designation of presenter by the video processing unit, and is therefore also assigned the highest priority score of 1. Persons #1 and #2 will therefore share equal focus by the system, and will feature to the same extent in the primary video stream(s) output by the system. For example, the video processing unit may always output a primary video stream featuring person #1 and a primary video stream featuring person #2. 1. Without the user-assigned priority score, person #2 may be featured less than the presenter (person #1). However a user of the system has decided that person #2 is important and should share priority 1 with person #1. Table #7 illustrates a similar scenario, but this time person #2, who is a judge, is assigned a user-assigned role and a user-assigned priority score of 1, and is also featured equally compared to a presenter, in this case person #1 who is a presenting lawyer. In this situation, it is important that the judge is shown as they play a crucial role in the courtroom, but since the judge is rarely a presenter they would otherwise be featured to a lesser degree than the presenters without the user-assigned role/priority.

Alternatively, the system may permit a user to assign a user-assigned priority or priority score to a particular observed attribute or combination of attributes, such as a particular property or action or a combination of properties and/or actions. For example, the video processing unit may be configured to receive a user input specifying a priority for a user-selected property or action that the video processing unit is configured to recognize. The video processing unit may be configured to assign the user-assigned priority or priority score to the user-selected property or action. For example, a user may specify, via a user input, that the action of having a raised hand is assigned the highest priority score of 1. In this way, participants who are observed to have a raised hand may be assigned the highest priority score and may consequently be featured in the primary video output streams to the same extent as the presenter. The video processing system may also be configured to assign a "user assigned" or "user defined" role to each individual that is identified as having the observed attribute to which the user-assigned priority is attributed via the user input. Table #8 provides an example of such a scenario in a school setting. In the scenario illustrated in Table #8 persons #2 and #3 are assigned an action of "hand raised" by the video processing unit based on analysis of the overview output video stream. A user has specified via a user input that the action of "hand raised" should be associated with a priority score of 1. Person #1 is assigned the role designation of presenter by the video processing unit, and is therefore also assigned the highest priority score of 1. Persons #1, #2 and #3 will therefore share equal focus by the system, and will feature to the same extent in the primary video stream(s) output by the system. Table #9 provides a variation on the scenario set out in Table #8. In this case, person #4 is assigned a user-assigned role with an associated user-assigned priority of 9, indicating that person #4 should never be shown in a video output stream. In this case, the parents of Person #4 have asked the school to not have their child shown on video, and the priority assigned to Person #4 has therefore been set so that they are never included in a video stream output by the video processing unit for display.

The user-assigned priorities discussed above may be combined with priorities associated with other roles/properties/actions associated with the individuals, and the overall framing priority for each individual may be calculated based on an aggregation of the priorities associated with the various roles/properties/actions assigned to the individuals by the video processing unit. Alternatively, the user-assigned priorities may be used as the overall framing priority for the individual to which the user-assigned priority is assigned, effectively overriding the priority scores associated with any other roles/properties/actions assigned to the individuals. Where the term "user-assigned" is used herein, this could equally be described as "user-defined", "user-specified" or "user-selected".

It is envisioned that the role/property/action assignment functionality may be combined with any of the previously described aspects of this disclosure. For example, the primary video streams output by the video processing unit may be shown on a user display using different shaped/positioned/sized tiles and/or floating tiles, as described above in relation to FIGS. 37-44. In such cases, those participants assigned the role designation of presenter, or the highest framing priority, may be displayed in the manner of the speaker or presenter, as described in relation to FIGS. 37-44. Those participants assigned the role designation of (non-presenting) contributor may, for example be displayed in the manner of the active meeting participants, as described in relation to FIGS. 37-44. Those participants assigned the role designation of (non-contributing) audience may, for example be displayed in the manner of the other meeting participants, as described in relation to FIGS. 37-44.

It should be noted that where a particular meeting participant is selected for inclusion in a primary video stream output on the basis of assigned roles/characteristics/properties/actions, as described above, that meeting participant may also be featured in one or more other primary video streams output by the system/video processing unit(s) for display. For example, the primary video stream that the meeting participant is included in based on the assigned roles/characteristics/properties/actions may be a speaker or presenter shot, and the meeting participant may simultaneously be featured in an overview or group shot primary video stream output by the system.

The presently disclosed technique of basing framing decisions for a video output stream on determined roles, properties, actions, etc. (and associated framing priorities) may be used in a single camera system. For example, each meeting participant represented in the overview video output of a single videoconference camera may be assigned a role, property, action, etc. and a corresponding framing priority, which in turn may be used to generate a primary video output stream.

Similar techniques may also be used with multi-camera systems including a plurality of cameras. In such cases, a video processing unit (e.g., included in a single camera, distributed across a plurality of cameras, located in a stand-alone computing unit, included in a cloud based server, etc.) may be configured to automatically analyze overview video streams from each of the plurality of cameras in a multi-camera system. Like in the single camera case, each meeting participant represented in the overview video output of each of the plurality of cameras including in the multi-camera system may be assigned a role, property, action, etc. and a corresponding framing priority. Here, however, there is the possibility (and indeed, the likelihood) that one or more meeting participants represented in the overview output video stream of a first camera are the same as one or more meeting participants represented in the overview output video stream of a second or different camera. In some cases, each of the plurality of cameras may include representations of different individuals (e.g., where the fields of view of each of the cameras do not overlap). In other cases, some of the individuals represented in the overview output video of one camera may be the same as the individuals represented in the overview output video of another camera (e.g., where the fields of view of at least some of the cameras at least partially overlap). Further, in some cases, every meeting participant may be represented in the overview video output stream generated by each of the plurality of cameras (e.g., where the fields of view of all of the cameras are associated with or capture a common volume or region of a meeting environment). An example of such a system is Huddly® Crew.

In such systems, the techniques described in the sections above for tracking and correlating individuals across a plurality of overview video streams may be used here to correlate assigned roles, properties, actions, etc. associated with each individual represented in at least one overview video stream generated by the plurality of cameras in a multi-camera system. For example, based on at least one identity indicator (discussed above), the representations of meeting participants may be tracked and correlated in the overview video streams generated by a plurality of cameras.

In multi-camera systems, there is a possibility that role designations, property determinations, and/or action determinations may be made for a particular individual based on analysis of multiple overview video streams. For example, in one example, a particular meeting participant may be represented in the overview video streams of three different cameras. In the overview video of the first camera, the individual appears facing the camera. In the overview video of the second camera, however, only the back of the individual's head is represented. And in the third camera, only the right side of the individual's body is visible.

A combined analysis of these output video streams may be used to determine a role, property, and/or action associated with the individual. For example, based on the overview video of the first camera (where the individual's face is visible), it may be determined, based on analysis of one or more image frames of the overview video that the individual is speaking. This can lead to an assigned role for the individual as a presenter, a contributor, etc. This can also lead to a determination that the individual is engaged in a speaking action. Further still, facial expressions associated with the individual may enable a determination of whether the individual is deemed to be questioning, serious, disengaged, etc. All of these determinations may affect the framing priority determined for the individual, as illustrated by the examples discussed relative to FIG. 48. Each of these determinations, however, may be difficult or impossible based solely on the overview video streams generated by the second and third cameras, however, which show only the back of the individual's head or the right side of the individual's body, respectively. Thus, the representations of an individual across multiple overview video streams from a plurality of cameras may offer an opportunity to more accurately determine roles, properties, actions, etc. for the individual. This can lead to framing priorities more relevant to the actual conditions experienced in a meeting environment, which in turn, can lead to better user experiences (e.g., disengaged meeting participants are less likely to be featured in a primary video output stream over a presenter, contributor, or engaged listener, among many other examples).

Multi-camera systems may also implement the "best shot" selection functionality described above. For example, the video processing unit can select a particular camera output for use in generating a feature shot of a particular meeting participant (e.g., a preferred or best shot for a particular meeting participant from among available representations from a plurality of cameras). The shot selection may depend on various shot selection criteria, for example as described in relation to FIG. 4 above. The predetermined criteria may include—but are not limited to—a looking direction of the common meeting participant (e.g., head pose) determined relative to each of a first and second video output streams, and/or a face visibility score (e.g., associated with a face visibility level) associated with the common meeting participant determined relative to each of the first and second video output streams, and/or a determination of whether a meeting participant is speaking. It is contemplated that any or all of these criteria may be analyzed relative to any number of video output streams that include a representation of the common meeting participant. Shot selection, for example, may be based on any of these criteria alone or in any combination.

Embodiments consistent with the present disclosure, particularly multi-camera systems such as those based on Huddly® Crew technology, may provide numerous advantages over alternative video conferencing systems. Namely, such systems may include adaptable software implementing an AI virtual director that acts in real-time to edit video streams from multiple cameras to provide a dynamic user experience. Such systems may provide intelligent shot-selection with seamless transitioning between different shots and angles to offer an engaging and effective experience focusing on the most pertinent meeting participants. Thus, such systems may be adapted to provide improved contextual information relating to the physical meeting environment to remote users. For example, the system may focus on the speaker(s), while also capturing non-verbal reactions from listeners and providing a full overview of the room to provide context when appropriate.

Although many of the disclosed embodiments are described in the context of a camera system, a video conferencing system or the like, it should be understood that the present disclosure specifically contemplates, in relation to all disclosed embodiments, corresponding methods. More specifically methods corresponding to the actions, steps or operations performed by the video processing unit(s), as described herein, are disclosed. Thus, the present disclosure discloses video processing methods performed by at least one video processing unit, including any or all of the steps or operations performed by a video processing unit as disclosed herein. Furthermore, disclosed herein is at least one (or one or more) video processing units. Thus, it is specifically contemplated that at least one video processing unit may be claimed in any configuration as disclosed herein. The video processing unit(s) may be defined separately and independently of the camera(s) or other hardware components of the video conferencing system. Also disclosed herein is one or more computer readable media storing instructions that, when executed by one or more video processing units, cause the one or more video processing units to perform a method in accordance with the present disclosure (e.g. any or all of the steps or operations performed by a video processing unit, as described herein).

The following numbered clauses set out a number of non-limiting aspects of the disclosure:

1. A camera system, comprising:

at least one camera configured to generate an overview video output stream representative of a meeting environment; and a video processing unit configured to:

automatically analyze the overview video output stream to identify at least a first meeting participant and a second meeting participant represented in the video output stream;

assign a first role designation to the first meeting participant, optionally based on one or more detected characteristics of the first meeting participant;

assign a second role designation to the second meeting participant, optionally based on one or more detected characteristics associated with the second meeting participant, wherein the first role designation is different from the second role designation;

select a framed representation of the first meeting participant or the second meeting participant based on relative priorities associated with the first role designation and the second role designation; and generate, as an output, a primary video stream including the selected framed representation of the first meeting participant or the second meeting participant.

2. The camera system of clause 1, wherein the at least one camera includes two or more cameras.

3. The camera system of clause 1 or clause 2, wherein the video processing unit is configured to select a framed representation of the meeting participant associated with the higher priority.

4. The camera system of any preceding clause, wherein the one or more detected characteristics include one or more of whether a participant is speaking, a length of time a participant speaks, a percentage of a time duration during which a participant speaks, whether a participant is standing, a head pose of a participant, a looking direction of a participant, changes in a looking direction of a participant, or gestures performed by a participant.

5. The camera system of any preceding clause, wherein the video processing unit is further configured to assign an observed property to each of the first meeting participant and the second meeting participant based on analysis of the overview video output stream.

6. The camera system of clause 5, wherein the observed property includes or is a demeanor, optionally wherein the demeanor is at least one of serious, humorous, questioning, listening, or disengaged.

7. The camera system of clause 5 or clause 6, wherein the selected framed representation of the first meeting participant or the second meeting participant is further based on relative priorities associated with the assigned observed property.

8. The camera system of any preceding clause, wherein the video processing unit is further configured to assign an observed action to each of the first meeting participant and the second meeting participant based on analysis of the overview video output stream.

9. The camera system of clause 8, wherein the observed action includes at least one of standing, sitting, raising a hand, interacting with a whiteboard, applauding, speaking, sleeping, writing, or laughing.

10. The camera system of clause 8 or clause 9, wherein the selected framed representation of the first meeting participant or the second meeting participant is further based on relative priorities associated with the assigned observed actions.

11. The camera system of any preceding clause, wherein the at least one camera includes a plurality of cameras, and the video processing unit is further configured to automatically analyze overview video streams from each of the plurality of cameras, and, based on at least one identity indicator, track and correlate representations of meeting participants across the overview video streams.

12. The camera system of clause 11, wherein the video processing unit is included in one of the plurality of cameras.

13. The camera system of any preceding clause, wherein the video processing unit includes one or more microprocessors onboard a camera and/or one or more microprocessors remotely located relative to a camera, e.g. cloud-based.

14. The camera system of any preceding clause, further including at least one directional audio unit.

15. The camera system of any preceding clause, wherein the roles assigned to each of the first meeting participant and the second meeting participant based on analysis of the overview video output stream are periodically updated.

16. The camera system of any preceding clause, wherein role designations include presenter, contributor, and/or audience, and optionally further include user-assigned or user-defined.

17. The camera system of clause 16, wherein the presenter role designation is associated with a higher priority than the contributor role designation.

18. The camera system of clause 16 or 17, wherein the contributor role designation is associated with a higher priority than the audience role designation.

19. The camera system of any preceding clause, wherein a video processing unit implements at least one trained network configured to output role designations for identified meeting participants based on an input including one or more captured image frames.

20. A camera system, comprising:

at least one camera configured to generate an overview video output stream representative of a meeting environment; and a video processing unit configured to:

automatically analyze the overview video output stream to identify at least a first meeting participant and a second meeting participant represented in the video output stream;

assign a first role designation to the first meeting participant based on one or more detected characteristics of the first meeting participant;

assign a second role designation to the second meeting participant based on one or more detected characteristics associated with the second meeting participant, wherein the first role designation and the second role designation are the same;

assign a first attribute designation to the first meeting participant based on one or more detected properties and/or actions associated with the first meeting participant;

assign a second attribute designation to the second meeting participant based on one or more detected properties and/or actions associated with the second meeting participant, wherein the first attribute designation is different from the second attribute designation;

determine a relative framing priority between the first meeting participant and the second meeting participant based on a first combination, including the first role designation and the first attribute designation, and based on a second combination, including the second role designation and the second attribute designation;

select a framed representation of the first meeting participant or the second meeting participant based on the determined relative framing priority; and generate, as an output, a primary video stream including the selected framed representation of the first meeting participant or the second meeting participant.

21. The camera system of clause 20, wherein the observed property associated with both the first meeting participant and the second meeting participant includes a demeanor, wherein the demeanor optionally includes at least one of one of serious, humorous, questioning, listening, or disengaged.

22. The camera system of clause 20 or clause 21, wherein the observed action associated with both the first meeting participant and the second meeting participant includes at least one of one of standing, sitting, raising a hand, interacting with a whiteboard, applauding, speaking, sleeping, writing, or laughing.

23. A camera system, comprising:

at least one camera configured to generate an overview video output stream representative of a meeting environment; and a video processing unit configured to:

automatically analyze the overview video output stream to identify at least a first meeting participant and a second meeting participant represented in the video output stream;

assign a first role designation to the first meeting participant based on one or more detected characteristics of the first meeting participant;

assign a second role designation to the second meeting participant based on one or more detected characteristics associated with the second meeting participant, wherein the first role designation is different from the second role designation;

generate a framed representation of the first meeting participant and a framed representation of the second meeting participant; and generate, as an output, a primary video stream including the framed representation of the first meeting participant during a first period of time and a primary video stream including the framed representation of the second meeting participant during a second period of time;

wherein relative durations of the first and second periods of time are based on relative priorities associated with the first role designation and the second role designation.

24. The camera system of clause 23, wherein the priority associated with the first role designation is higher than the priority associated with the second role designation; and wherein the duration of the first period of time is longer than the duration of the second period of time.

25. The camera system of clause 23 or clause 24, wherein the first period of time and/or the second period of time is discontinuous.

26. A video conferencing system, comprising:

at least one camera configured to generate an overview video output stream representative of a meeting environment; and at least one video processing unit configured to:

automatically analyze the overview video output stream to identify at least a first meeting participant and a second meeting participant represented in the video output stream;

assign a first role designation to the first meeting participant and a second role designation to the second meeting participant based on one or more detected characteristics associated with at least one of the first meeting participant or the second meeting participant;

determine, based on priorities associated with the first and second role designations relative framing priorities associated with the first meeting participant and the second meeting participant; and generate, based on the relative framing priorities, one or more primary video streams featuring the first meeting participant and/or the second meeting participant (e.g. including or featuring a framed representation of the first meeting participant and/or a framed representation of the second meeting participant).

27. The system of clause 26, wherein the at least one video processing unit is configured to select which of the first and second meeting participants to feature in the one or more primary video streams based on the relative framing priorities associated with the first meeting participant and the second meeting participant.

28. The system of clause 27, wherein the at least one video processing unit is configured to feature in the one or more primary video streams the meeting participant associated with the higher relative framing priority in preference to the meeting participant associated with the lower relative framing priority.

29. The system of clause 27 or 28, wherein the at least one video processing unit is configured to feature in the one or more primary video streams the meeting participant associated with the higher relative framing priority and to not feature in the one or more primary video streams the meeting participant associated with the lower relative framing priority.

30. The system of clause 26, wherein the at least one video processing unit is configured to determine relative durations during which the first meeting participant and the second meeting participant are featured in the one or more primary video streams based on the relative framing priorities associated with the first meeting participant and the second meeting participant.

31. The system of clause 30, wherein the at least one video processing unit is configured to feature the first meeting participant in the one or more primary video streams for a first period of time, and to feature the second meeting participant in the one or more primary video streams for a second period of time, wherein the relative durations of the first and second periods of time are determined based on the relative framing priorities.

32. The system of clause 30 or 31, wherein the at least one video processing unit is configured to feature in the one or more primary video streams the meeting participant associated with the higher relative framing priority for a longer duration of time than the meeting participant associated with the lower relative framing priority.

33. The system of clause 26, wherein the at least one video processing unit is configured to cause a display to show a primary video stream featuring the first meeting participant and a primary video stream featuring the second meeting participant in respective display tiles; wherein a size (e.g. area) of the display tile in which the meeting participant associated with the higher relative framing priority is displayed is larger than a corresponding size of the display tile in which the meeting participant associated with the lower relative framing priority is displayed.

34. The system of clause 26, wherein, wherein the at least one video processing unit is configured to receive a user-assigned priority associated with the first meeting participant; and determine the relative framing priorities associated with the first meeting participant and the second meeting participant based on the user-assigned priority associated with the first meeting participant and the priority associated with the second role designation.

35. The system of any preceding clause, wherein the at least one camera includes two or more cameras, for example, 3 cameras, 5 cameras or 7 cameras.

36. The system of any preceding clause, wherein the meeting environment is a meeting room, an office space, a classroom, a lecture theatre, a medical environment, or a surgical theatre.

37. The system of any preceding clause, wherein at least one of the primary video stream(s) output by the at least one video processing unit is, includes, or is composed as a speaker shot, a presenter shot, an overview shot, a reaction shot, an over-the-shoulder shot or a group shot, optionally wherein each of the primary video streams is one of a speaker shot, a presenter shot, an overview shot or a group shot.

38. The system of clause 37, wherein a speaker shot features a speaker and optionally one or more other meeting participants, or wherein a speaker shot includes framed representation(s) of a speaker and optionally one or more other meeting participants in the same frame.

39. The system of clause 37 or clause 38, wherein a presenter shot features a speaker and no other meeting participants, or wherein a presenter shot includes a framed representation of a speaker and no other meeting participants in the same frame.

40. The system of any one of clauses 37 to 39, wherein a group shot features a plurality of meeting participants, or wherein a group shot includes framed representations of a plurality of meeting participants in the same frame.

41. The system of any one of clauses 37 to 40, wherein an overview shot features an overview of the meeting environment, optionally including the entire field of view of the respective camera, or featuring all identified meeting participants within the field of view of the respective camera.

42. The system of any preceding clause, wherein the video processing unit is configured to transition between primary video stream outputs using hard cut transitions and/or smooth cut transitions.

43. The system of any preceding clause, wherein a meeting participant featured in one of the primary video stream outputs (e.g. in a speaker or presenter shot) is also featured in another primary video stream output (e.g. in an overview or group shot).

44. The system of any preceding clause, wherein the at least one camera includes two or more cameras, for example, 3 cameras, 5 cameras or 7 cameras.

45. The system of any preceding clause, wherein the camera system is a multi-camera video conferencing camera system, and wherein the meeting environment is a meeting room, an office space, a classroom and/or a lecture hall.

What is claimed is:

1. A video conferencing system, comprising:

at least one camera, each configured to generate an overview video output stream representative of a meeting environment; and at least one video processing unit configured to:

automatically analyze the at least one overview video output stream to identify at least a first meeting participant and a second meeting participant represented in the overview video output stream;

assign a first role designation to the first meeting participant and a second role designation to the second meeting participant based on one or more detected characteristics associated with at least one of the first meeting participant or the second meeting participant, wherein the first role designation is different from the second role designation;

select a framed representation of the first meeting participant or the second meeting participant based on relative priorities associated with the first role designation and the second role designation and based on an expected speaking duration associated with the first meeting participant or the second meeting participant, wherein the expected speaking duration is based on one or more previous speaking durations associated with the first meeting participant or the second meeting participant; and generate, as an output, a primary video stream including the selected framed representation of the first meeting participant or the second meeting participant.

2. The system of claim 1, wherein the at least one camera includes two or more cameras.

3. The system of claim 1, wherein the one or more detected characteristics include one or more of whether a participant is speaking, a length of time a participant speaks, a percentage of a time duration during which a participant speaks, whether a participant is standing, a looking direction of a participant, changes in a looking direction of a participant, gestures performed by a participant or reactions performed by a participant.

4. The system of claim 1, wherein the at least one video processing unit is further configured to assign an observed property to each of the first meeting participant and the second meeting participant based on analysis of the at least one overview video output stream.

5. The system of claim 4, wherein the observed property includes a demeanor.

6. The system of claim 5, wherein the observed property includes at least one of serious, humorous, questioning, listening, or disengaged.

7. The system of claim 4, wherein the selection of the framed representation of the first meeting participant or the second meeting participant is further based on relative priorities associated with the assigned observed properties.

8. The system of claim 4, wherein the priority associated with at least one of the observed properties is user-assignable.

9. The system of claim 1, wherein the at least one video processing unit is further configured to assign an observed action to each of the first meeting participant and the second meeting participant based on analysis of the at least one overview video output stream.

10. The system of claim 9, wherein the observed action includes at least one of standing, sitting, raising a hand, interacting with a whiteboard, applauding, speaking, sleeping, writing, or laughing.

11. The system of claim 9, wherein the selection of the framed representation of the first meeting participant or the second meeting participant is further based on relative priorities associated with the assigned observed actions.

12. The system of claim 9, wherein the priority associated with at least one of the observed actions is user-assignable.

13. The system of claim 1, wherein the at least one camera includes a plurality of cameras, and the at least one video processing unit is further configured to automatically analyze overview video output streams from each of the plurality of cameras, and, based on at least one identity indicator, track and correlate representations of meeting participants across the overview video output streams.

14. The system of claim 13, wherein the at least one video processing unit is included in one of the plurality of cameras.

15. The system of claim 1, wherein the at least one video processing unit includes one or more microprocessors onboard a camera and/or one or more microprocessors remotely located relative to a camera.

16. The system of claim 1, further including at least one directional audio unit.

17. The system of claim 1, wherein the roles assigned to each of the first meeting participant and the second meeting participant based on analysis of the at least one overview video output stream are periodically updated.

18. The system of claim 1, wherein role designations include presenter, contributor, or audience, and optionally further include user-assigned.

19. The system of claim 1, wherein the at least one video processing unit is configured to implement at least one trained network configured to output role designations for identified meeting participants based on an input including one or more captured image frames.

20. The system of claim 1, wherein the at least one video processing unit is configured to:

receive a user-assigned priority associated with the first meeting participant; and select the framed representation of the first meeting participant or the second meeting participant based on the user-assigned priority associated with the first meeting participant and the priority associated with the second role designation.

21. The system of claim 1, wherein the at least one video processing unit is configured to:

receive a user-assigned role designation associated with the first meeting participant and a user-assigned priority associated with the user-assigned role designation;

assign the user-assigned role designation to the first meeting participant; and select the framed representation of the first meeting participant or the second meeting participant based on the user-assigned priority associated with the user assigned role designation and the priority associated with the second role designation.

22. The system of claim 1, wherein the selected framed representation is of the second meeting participant, and wherein the at least one video processing unit is configured to:

determine, based on the first role designation assigned to the first meeting participant, a likelihood that the first meeting participant will begin to speak;

perform, in response to the likelihood that the first meeting participant will begin to speak meeting a likeliness condition, one or more actions to prepare the video processing unit to output a primary video stream featuring a framed representation of the first meeting participant;

determine, based on analysis of the at least one overview video output stream, whether the first meeting participant begins to speak; and in response to a determination that the first meeting participant begins to speak, outputting for display the primary video stream including the framed representation of the first meeting participant.

23. The system of claim 22, wherein performing one or more actions to prepare the video processing unit to output a primary video stream featuring the first meeting participant comprises one or more of:

selecting the framed representation of the first meeting participant for the primary video stream; and generating the primary video stream featuring the framed representation of the first meeting participant.

24. The system of claim 22, wherein the determination of the likelihood that the first meeting participant will begin to speak is further based on one or more determined quantities characterizing conversational dynamics between the first meeting participant and one or more other meeting participants featured in the one or more video output streams.

25. The system of claim 24, wherein the one or more determined quantities include one or more determined vectors representing one or more conversational exchanges between the first meeting participant and one or more other meeting participants featured in the one or more video output streams.

26. The system of claim 25, wherein each vector represents a speaking episode during which the first meeting participant or one of the one or more other meeting participants is determined to have spoken.

27. The system of claim 26, wherein the magnitude of each vector represents a duration of the speaking episode, and the direction of each vector represents the meeting participant that speaks next.

28. The system of claim 24, wherein the one or more determined quantities include at least one of:

the identities of the one or more other meeting partici-
pants;
one or more durations characterizing one or more epi-
sodes during which the first meeting participant or one
or more other meeting participants is determined to
have spoken;
one or more frequencies characterizing the frequency of
episodes during which the first meeting participant or
one or more other meeting participants is determined to
have spoken;
one or more periods characterizing one or more gaps
between episodes during which the first meeting par-
ticipant or one or more other meeting participants is
determined to have spoken.

29. The system of claim 22, wherein the determination of
the likelihood that the first meeting participant will begin to
speak is further based on one or more determined attributes
associated with the first meeting participant.

30. The system of claim 29, wherein the one or more
determined attributes include at least one of: a time since the
meeting participant last spoke, a frequency with which the
meeting participant speaks, a turn of the head to face the
direction of a speaker, a gesture, a facial expression, a
change of facial expression, a nod, a gaze direction, a
non-verbal sound, and a drawing of breath.

31. The system of claim 1, wherein the at least one video
processing unit is configured to cause a display of a user
device to show the primary video stream.

32. A video conferencing system, comprising:
at least one camera, each configured to generate an
overview video output stream representative of a meet-
ing environment; and
at least one video processing unit configured to:
automatically analyze the at least one overview video
output stream to identify at least a first meeting
participant represented in the at least one overview
video output stream;
assign a first role designation to the first meeting
participant based on one or more detected charac-
teristics associated with the first meeting participant;
determine, based on the first role designation assigned
to the first meeting participant, a likelihood that the
first meeting participant will begin to speak;
perform, in response to the likelihood that the first
meeting participant will begin to speak meeting a
likeliness condition, one or more actions to prepare
the video processing unit to output a primary video
stream featuring a framed representation of the first
meeting participant for display, wherein the framed
representation is based on an expected speaking
duration associated with the first meeting participant,
and wherein the expected speaking duration is based
on one or more previous speaking durations associ-
ated with the first meeting participant;
determine, based on analysis of the at least one over-
view video output stream, whether the first meeting
participant begins to speak; and
in response to a determination that the first meeting
participant begins to speak, outputting for display the
primary video stream featuring the framed represen-
tation of the first meeting participant.

33. A video conferencing system, comprising:
at least one camera, each configured to generate an
overview video output stream representative of a meet-
ing environment; and
at least one video processing unit configured to:

automatically analyze the at least one overview video
output stream to identify a plurality of meeting
participants featured in the at least one overview
video output stream;
identify a plurality of non-speaking meeting partici-
pants amongst the identified meeting participants;
assign a respective role designation to each of the
identified non-speaking meeting participants based
on one or more detected characteristics associated
with each of the non-speaking meeting participants;
generate, as an output for display, a primary video
stream featuring one or more of the non-speaking
meeting participants, wherein selection of the one or
more non-speaking meeting participants for inclu-
sion in the primary video stream is based on the roles
assigned to each of the non-speaking meeting par-
ticipants;
identify a speaking meeting participant amongst the
identified meeting participants;
generate, as an output for display, a second primary
video stream featuring the speaking meeting partici-
pant;
determine an expected speaking duration associated
with the speaking meeting participant based on one
or more determined previous speaking durations
associated with the speaking meeting participant;
and
based on the expected speaking duration, determine
when to output the second primary video stream for
display.

34. The system of claim 33, wherein the at least one video
processing unit configured to identify a speaking meeting
participant amongst the identified meeting participants; and
wherein the primary video stream features the speaking
meeting participant.

35. The system of claim 34, wherein the at least one video
processing unit is configured to output, for display, the
primary video stream during a first period of time, and to
output, for display, the second primary video stream during
a second period of time.

36. The system of claim 35, wherein the first and second
periods of time do not overlap.

37. The system of claim 36, wherein the first period of
time is shorter than the second period of time.

38. The system of claim 33, wherein the at least one video
processing unit is configured to output the primary video
stream and the second primary video stream for simultane-
ous display.

39. The system of claim 33, wherein the at least one video
processing unit is configured to:
determine, for each of the non-speaking meeting partici-
pants, a respective likelihood that the non-speaking
meeting participant will begin to speak based on the
respective role designation assigned to the non-speak-
ing meeting participant;
wherein selection of the one or more non-speaking meet-
ing participants for inclusion in the first primary video
stream is based on the determined likelihoods.

40. The system of claim 39, wherein the at least one video
processing unit is configured to select non-speaking meeting
participants for inclusion in the first primary video stream
that have a determined likelihood of beginning to speak that
meets a likeliness condition.

41. A video conferencing system, comprising:
at least one camera, each configured to generate an
overview video output stream representative of a meet-
ing environment; and at least one video processing unit configured to:

automatically analyze the at least one overview video output stream to identify at least a first meeting participant and a second meeting participant represented in the at least one overview video output stream;

assign a first role designation to the first meeting participant and a second role designation to the second meeting participant based on one or more detected characteristics associated with at least one of the first meeting participant or the second meeting participant, wherein the first role designation and the second role designation are the same;

assign a first attribute designation to the first meeting participant and a second attribute designation to the second meeting participant based on one or more detected properties or actions associated with at least one of the first meeting participant or the second meeting participant, wherein the first attribute designation is different from the second attribute designation;

determine a relative framing priority between the first meeting participant and the second meeting participant based on a first combination, including the first role designation and the first attribute designation, and based on a second combination, including the second role designation and the second attribute designation;

select a framed representation of the first meeting participant or the second meeting participant based on the determined relative framing priority and based on an expected speaking duration associated with the first meeting participant or the second meeting participant, wherein the expected speaking duration is based on one or more previous speaking durations associated with the first meeting participant or the second meeting participant; and generate, as an output, a primary video stream including the selected framed representation of the first meeting participant or the second meeting participant.

42. The system of claim 41, wherein the first attribute designation is assigned based on an observed property or action associated with the first meeting participant, and the second attribute designation is assigned based on an observed property or action associated with the second meeting participant.

43. The system of claim 42, wherein the observed property associated with both the first meeting participant and the second meeting participant includes at least one of one of serious, humorous, questioning, listening, or disengaged.

44. The system of claim 42, wherein the observed action associated with both the first meeting participant and the second meeting participant includes at least one of one of standing, sitting, raising a hand, interacting with a whiteboard, applauding, speaking, sleeping, writing, or laughing.

45. The system of claim 41, wherein the relative framing priority is based on a framing priority associated with the first meeting participant and a framing priority associated with the second meeting participant.

46. The system of claim 45, wherein the framing priority associated with the first meeting participant is based on a priority associated with the first role designation and a priority associated with the first attribute designation, and wherein the framing priority associated with the second meeting participant is based on a priority associated with the second role designation and a priority associated with the second attribute designation.

47. The system of claim 46, wherein the at least one video processing unit is configured to:

receive a user-assigned role designation for the first meeting participant and a user-assigned priority associated with the user-assigned role designation; and assign the user-assigned role designation to the first meeting participant.

48. The system of claim 47, wherein the user-assigned role designation is selected from: CEO, judge, doctor, professor, teacher, student, lecturer, patient, witness, defendant.

49. The system of claim 47, wherein the user-assigned priority is defined so that the first meeting participant is never featured in a primary video stream output.

50. The system of claim 46, wherein the priority associated with the first attribute designation is based on one or more priorities associated with one or more detected properties or actions associated with the first meeting participant and the priority associated with the second attribute designation is based on one or more priorities associated one or more detected properties or actions associated with the second meeting participant; wherein the priority of at least one of the actions or properties is user-assignable.

51. A video conferencing system, comprising:

at least one camera configured to generate video output representative of a meeting environment; and at least one video processing unit configured to:

automatically analyze the video output to identify at least a first meeting participant and a second meeting participant represented in the video output;

assign a first role designation to the first meeting participant and a second role designation to the second meeting participant based on one or more detected characteristics associated with at least one of the first meeting participant or the second meeting participant, wherein the first role designation is different from the second role designation; and generate, as an output, a first primary video stream including a framed representation of the first meeting participant during a first period of time and a second primary video stream including a framed representation of the second meeting participant during a second period of time, wherein the framed representation is based on an expected speaking duration associated with the first meeting participant or the second meeting participant, and wherein the expected speaking duration is based on one or more previous speaking durations associated with the first meeting participant or the second meeting participant;

wherein relative durations of the first and second periods of time are based on relative priorities associated with the first role designation and the second role designation.

52. The system of claim 51, wherein the priority associated with the first role designation is higher than the priority associated with the second role designation; and wherein the duration of the first period of time is longer than the duration of the second period of time.

53. The system of claim 51, wherein the first period of time and/or the second period of time is discontinuous.

54. A video conferencing system, comprising:

at least one camera, each configured to generate an overview video output stream representative of a meeting environment; and at least one video processing unit configured to:

automatically analyze the at least one overview video output stream to identify at least a first meeting participant and a second meeting participant represented in the at least one overview video output stream;

assign a first role designation to the first meeting participant and a second role designation to the second meeting participant based on one or more detected characteristics associated with at least one of the first meeting participant or the second meeting participant;

determine, based on priorities associated with the first and second role designations relative framing priorities associated with the first meeting participant and the second meeting participant; and generate, based on the relative framing priorities, one or more primary video streams featuring the first meeting participant and/or the second meeting participant, the one or more primary video streams including at least one framed representation of the first meeting participant or the second meeting participant, wherein the at least one framed representation is based on at least one expected speaking duration associated with the first meeting participant or the second meeting participant, and wherein the at least one expected speaking duration is based on one or more previous speaking durations associated with the first meeting participant or the second meeting participant.

55. The system of claim 54, wherein generating, based on the relative framing priorities, one or more primary video streams featuring the first meeting participant and/or the second meeting participant comprises:

selecting, based on the relative framing priorities associated with the first meeting participant and the second meeting participant, a framed representation of the first meeting participant or a framed representation of the second meeting participant; and generating, as an output, one or more primary video streams featuring the selected framed representation of the first meeting participant or the second meeting participant.

56. The system of claim 44, wherein generating, based on the relative framing priorities, one or more primary video streams featuring the first meeting participant and/or the second meeting participant comprises:

generating, as an output, a first primary video stream including a framed representation of the first meeting participant during a first period of time and a second primary video stream including a framed representation of the second meeting participant during a second period of time;

wherein relative durations of the first and second periods of time are based on the relative framing priorities associated with the first meeting participant and the second meeting participant.

57. The system of claim 1, wherein the camera system is a multi-camera video conferencing camera system, and wherein the meeting environment is a meeting room, an office space, a classroom and/or a lecture hall.

58. The system of claim 1, wherein the meeting environment is a meeting room, an office space, a classroom, a lecture theatre, a medical environment, or a surgical theatre.

59. The system of claim 1, wherein the primary video stream output includes a speaker shot, a presenter shot, an overview shot, a reaction shot, an over-the-shoulder shot, or a group shot.

60. The system of claim 59, wherein a speaker shot includes a framed representation of a speaker, and optionally one or more framed representations of one or more other meeting participants in the same frame.

61. The system of claim 59, wherein a presenter shot includes a framed representation of a speaker and includes no framed representations of other meeting participants.

62. The system of claim 59, wherein a group shot includes framed representations of a plurality of meeting participants in the same frame.

63. The system of claim 59, wherein an overview shot features an overview of the meeting environment.

64. The system of claim 1, wherein the video processing unit is configured to transition between primary video stream outputs using hard cut transitions and/or smooth cut transitions.

65. The system of claim 1, wherein the meeting participant featured in the primary video stream output is also featured in another primary video stream output by the video processing unit.

66. A video processing method performed by at least one video processing unit, the method comprising:

automatically analyzing at least one overview video output stream representative of a meeting environment generated by at least one camera to identify at least a first meeting participant and a second meeting participant represented in the at least one overview video output stream;

assigning a first role designation to the first meeting participant and a second role designation to the second meeting participant based on one or more detected characteristics associated with at least one of the first meeting participant or the second meeting participant;

determining, based on priorities associated with the first and second role designations, relative framing priorities associated with the first meeting participant and the second meeting participant; and generating as an output, based on the relative framing priorities, one or more primary video streams featuring the first meeting participant and/or the second meeting participant, the one or more primary video streams including at least one framed representation of the first meeting participant or the second meeting participant, wherein the at least one framed representation is based on at least one expected speaking duration associated with the first meeting participant or the second meeting participant, and wherein the at least one expected speaking duration is based on one or more previous speaking durations associated with the first meeting participant or the second meeting participant.

67. The system of claim 1, wherein the framed representation is associated with a shot type.

68. The system of claim 67, wherein the shot type comprises a close shot, a medium shot, or a total shot.

* * * * *